United States Patent
Rigetti et al.

(10) Patent No.: US 10,748,082 B2
(45) Date of Patent: Aug. 18, 2020

(54) OPERATING A MULTI-DIMENSIONAL ARRAY OF QUBIT DEVICES

(71) Applicant: Rigetti & Co., Inc., Berkeley, CA (US)

(72) Inventors: Chad Tyler Rigetti, Emeryville, CA (US); Dane Christoffer Thompson, Granite Bay, CA (US)

(73) Assignee: Rigetti & Co, Inc., Berkeley, CA (US)

( * ) Notice: Subject to any disclaimer, the term of this patent is extended or adjusted under 35 U.S.C. 154(b) by 55 days.

(21) Appl. No.: 15/874,326

(22) Filed: Jan. 18, 2018

(65) Prior Publication Data

US 2018/0330267 A1  Nov. 15, 2018

Related U.S. Application Data

(63) Continuation of application No. 15/035,547, filed as application No. PCT/US2015/018152 on Feb. 27, 2015, now Pat. No. 9,892,365.

(Continued)

(51) Int. Cl.
 *G06N 20/00* (2019.01)
 *G06N 10/00* (2019.01)
 (Continued)

(52) U.S. Cl.
 CPC ............. *G06N 20/00* (2019.01); *G06F 13/36* (2013.01); *G06F 13/4068* (2013.01); *G06F 15/80* (2013.01); *G06N 10/00* (2019.01)

(58) Field of Classification Search
 CPC .... G06N 99/002; G06N 99/005; B82Y 10/00; H03K 3/38; Y10S 977/933
 See application file for complete search history.

(56) References Cited

U.S. PATENT DOCUMENTS

| 5,786,739 A | 7/1998 | Paul et al. |
| 6,347,237 B1 | 2/2002 | Eden et al. |

(Continued)

FOREIGN PATENT DOCUMENTS

| EP | 2562694 | 2/2013 |
| WO | 2005/093649 | 10/2005 |

(Continued)

OTHER PUBLICATIONS

EPO, Communication pursuant to Rule 114(2) EPC (3rd party submission) dated Jan. 18, 2019, in EP 15796357.0, 48 pgs.

(Continued)

*Primary Examiner* — Paulinho E Smith
(74) *Attorney, Agent, or Firm* — Henry Patent Law Firm PLLC

(57) ABSTRACT

In some aspects, a quantum computing system includes a multi-dimensional array of qubit devices. Coupler devices reside at intervals between neighboring pairs of the qubit devices in the multi-dimensional array. Each coupler device is configured to produce an electromagnetic interaction between one of the neighboring pairs of qubit devices. In some cases, each qubit device has a respective qubit operating frequency that is independent of an offset electromagnetic field experienced by the qubit device, and the coupling strength of the electromagnetic interaction provided by each coupler device varies with an offset electromagnetic field experienced by the coupler device. In some cases, readout devices are each operably coupled to a single, respective qubit device to produce qubit readout signals that indicate the quantum state of the qubit device.

28 Claims, 38 Drawing Sheets

Related U.S. Application Data

(60) Provisional application No. 62/032,864, filed on Aug. 4, 2014, provisional application No. 62/033,022, filed on Aug. 4, 2014, provisional application No. 61/946,545, filed on Feb. 28, 2014, provisional application No. 61/946,390, filed on Feb. 28, 2014.

(51) Int. Cl.
  *G06F 13/36* (2006.01)
  *G06F 13/40* (2006.01)
  *G06F 15/80* (2006.01)

(56) References Cited

U.S. PATENT DOCUMENTS

| | | | |
|---|---|---|---|
| 6,563,311 B2 | 5/2003 | Zagoskin | |
| 6,627,915 B1 | 9/2003 | Ustinov et al. | |
| 6,822,255 B2 | 11/2004 | Tzalenchuk et al. | |
| 7,253,654 B2 | 8/2007 | Amin | |
| 7,418,283 B2 | 8/2008 | Amin | |
| 7,529,717 B2 | 5/2009 | Vala et al. | |
| 7,546,000 B2 | 6/2009 | Spillane et al. | |
| 7,560,726 B2 | 7/2009 | Beausoleil et al. | |
| 7,601,946 B2 | 10/2009 | Powers et al. | |
| 7,932,514 B2 | 4/2011 | Farinelli et al. | |
| 7,932,515 B2 | 4/2011 | Bunyk | |
| 8,294,538 B2 | 10/2012 | Ueda | |
| 8,441,329 B2 | 5/2013 | Thom et al. | |
| 8,536,566 B2 | 9/2013 | Johansson et al. | |
| 8,615,867 B2 | 12/2013 | Giunchi | |
| 8,620,855 B2 | 12/2013 | Bonderson | |
| 9,041,427 B2 | 5/2015 | Gambetta et al. | |
| 9,059,707 B2 | 6/2015 | Gambetta et al. | |
| 9,178,154 B2* | 11/2015 | Bunyk | H01L 49/006 |
| 9,892,365 B2 | 2/2018 | Rigetti et al. | |
| 10,192,168 B2 | 1/2019 | Rigetti et al. | |
| 10,496,934 B2 | 12/2019 | Rigetti et al. | |
| 2003/0169041 A1* | 9/2003 | Coury | G06N 10/00 324/307 |
| 2005/0078902 A1 | 4/2005 | Beausoleil et al. | |
| 2008/0109500 A1 | 5/2008 | MacReady et al. | |
| 2008/0131047 A1 | 6/2008 | Beausoleil et al. | |
| 2008/0162613 A1 | 7/2008 | Amin | |
| 2008/0215850 A1 | 9/2008 | Berkley et al. | |
| 2009/0014714 A1 | 1/2009 | Koch | |
| 2009/0289638 A1 | 11/2009 | Farinelli et al. | |
| 2011/0055520 A1† | 3/2011 | Berkley et al. | |
| 2011/0065586 A1 | 3/2011 | Maibaum et al. | |
| 2011/0079889 A1 | 4/2011 | Baillin | |
| 2011/0152104 A1 | 6/2011 | Farinelli et al. | |
| 2012/0005456 A1 | 1/2012 | Berkley et al. | |
| 2012/0027340 A1 | 2/2012 | Kline | |
| 2012/0124432 A1 | 5/2012 | Pesetski et al. | |
| 2012/0144159 A1* | 6/2012 | Pesetski | B82Y 10/00 712/36 |
| 2012/0319085 A1* | 12/2012 | Gambetta | H01L 39/04 257/31 |
| 2012/0319684 A1 | 12/2012 | Gambetta et al. | |
| 2012/0326720 A1* | 12/2012 | Gambetta | H01L 39/04 324/307 |
| 2013/0005580 A1 | 1/2013 | Bunyk et al. | |
| 2013/0196855 A1* | 8/2013 | Poletto | H01L 39/04 505/170 |
| 2013/0278283 A1† | 10/2013 | Berkley | |
| 2013/0319085 A1 | 12/2013 | Gambetta et al. | |
| 2014/0164313 A1* | 6/2014 | Alboszta | G06N 7/005 706/52 |
| 2014/0167811 A1* | 6/2014 | Gambetta | H03K 17/92 326/3 |
| 2014/0167836 A1† | 6/2014 | Gambetta et al. | |
| 2014/0264283 A1* | 9/2014 | Gambetta | G06N 10/00 257/31 |
| 2014/0264285 A1* | 9/2014 | Chow | H01L 49/006 257/31 |
| 2014/0264286 A1* | 9/2014 | Chang | H01L 21/304 257/31 |
| 2014/0340085 A1 | 11/2014 | Cappellaro | |
| 2015/0077138 A1 | 3/2015 | Ghasr et al. | |
| 2015/0357550 A1 | 12/2015 | Schoelkopf, III et al. | |
| 2016/0093790 A1* | 3/2016 | Rigetti | H01L 39/223 257/31 |
| 2016/0253563 A1* | 9/2016 | Lam | H04L 63/08 348/130 |
| 2016/0267032 A1* | 9/2016 | Rigetti | G06F 13/36 |

FOREIGN PATENT DOCUMENTS

| | | |
|---|---|---|
| WO | 2007/147243 | 12/2007 |
| WO | 2011153060 † | 8/2011 |
| WO | 2012044149 | 4/2012 |
| WO | 2014092819 | 6/2014 |
| WO | 2014163728 | 10/2014 |

OTHER PUBLICATIONS

Chow, et al., "A simple all-microwave entangling gate for fixed-frequency superconducting qubits", arXiv:1106.0553v1, Jun. 3, 2011, 6 pgs.

EPO, Examination Report dated Dec. 4, 2018, in EP15796784.5, 7 pgs.

USPTO, Non-Final Office Action dated Mar. 6, 2019, in U.S. Appl. No. 15/035,574, 47 pgs.

EPO, Extended European Search Report issued in EP App. No. 15796357.0 dated Nov. 3, 2017.

EPO, Extended European Search Report issued in EP App. No. 15796784.5 dated Oct. 26, 2017.

Third-Party Submission Under 37 CFR 1.290 filed on May 5, 2017 in U.S. Appl. No. 15/035,547, 14 pages.

USPTO, Final Office Action dated May 17, 2018, in U.S. Appl. No. 15/035,574, 21 pgs.

Third-Party Submission Under 37 CFR 1.290 filed on May 24, 2017 in U.S. Appl. No. 15/035,574, 27 pages.

Third-Party Submission Under 37 CFR 1.290 filed on May 19, 2017 in U.S. Appl. No. 15/035,615, 31 pages.

EPO, Communication pursuant to Rule 114(2) EPC (3rd party submission), dated Jul. 5, 2018, in EP15795777.0, 34 pgs.

USPTO, Final Office Action dated Mar. 20, 2018, in U.S. Appl. No. 15/035,615, 34 pgs.

Third-Party Submission Under 37 CFR 1.290 filed on May 13, 2017 in U.S. Appl. No. 15/035,547, 36 pages.

USPTO, Office Action in U.S. Appl. No. 15/035,574 dated Jun. 30, 2017, 39 pages.

USPTO, Office Action issued in U.S. Appl. No. 15/035,547 dated Jun. 26, 2017, 44 pages.

USPTO, Non-Final Office Action in U.S. Appl. No. 15/035,615 dated Sept 11, 2017, 53 pgs.

Third-Party Submission Under 37 CFR 1.290 filed on May 26, 2017 in U.S. Appl. No. 15/035,574, 68 pages.

Third-Party Submission Under 37 CFR 1.290 filed on May 15, 2017 in U.S. Appl. No. 15/035,547, 8 pages.

European Patent Office, Extended European Search Report issued in European Patent Application No. 15795777.0 dated Oct. 17, 2017, 8 pgs.

USPTO, Third-Party Submission Under 37 CFR 1.290 filed on May 24, 2017 in U.S. Appl. No. 15/035,615, 85 pages.

USPTO, Notice of Allowance dated Nov. 22, 2017, in U.S. Appl. No. 15/035,547, dated Nov. 22, 2017, 12 pgs.

"Cutoff frequency", Wikipedia, https://en.wikipedia.org/w.index.php?title=Cutoff_frequency&oldid=587843245, Dec. 27, 2013, 5 pgs.

"International Search Report and Written Opinion for International Application No. PCT/US2015/018126, dated Dec. 10, 2015, 16 pages."

"International Search Report and Written Opinion for International Application No. PCT/US2015/018152, dated Dec. 10, 2015, 13 pages."

(56) References Cited

OTHER PUBLICATIONS

"International Search Report and Written Opinion for International Application No. PCT/US2015/018167, dated Dec. 10, 2015, 8 pages."

"Josephson effect", Wikipedia, https://en.wikipedia.org/w/index.php?title=Josephson_effect&oldid=592751347, Jan. 28, 2014, 4 pgs.

"Waveguide (electromagnetism)", Wikipedia; https://en.wikipedia.org/w/index.php?title=Waveguide_(electromagnetism)&oldid=593301161, Jan. 31, 2014, 8 pgs.

Ashab, et al., ""Interqubit coupling mediated by a high-excitation-energy quantum object"", 0709.0237v2 [cond-mat.supr-con], Jan. 29, 2008, 15 pgs.

Averin, et al., "Variable electrostatic transformer: controllable coupling of two charge qubits", arXiv:cond-mat/0304166v2 [cond-mat.mes-hall], Jul. 28, 2003, 4 pgs.

Barends, et al., ""Logic gates at the surface code threshold: Superconducting qubits poised for fault-tolerant quantum computing,"", 1402.4848 [quant-ph], Feb. 19, 2014, 17 pgs.

Barends, et al., "Coherent Josephson Qubit Suitable for Scalable Quantum Integrated Circuits", Physical Review Letters, 111, 080502,, Aug. 2013.

Barends, R., et al., "Logic gates at the surface code threshold: Superconducting qubits poised for fault-tolerant quantum computing", Nature 508, 500-503, 2014, 18 pages.

Berends, "Logic gates at the surface code threshold: Superconducting qubits poised for fault-tolerant quantum computing", Nature 508, 500-503, 2014, Feb. 19, 2014, 18 pgs.

Berends, R, "Logic gates at the surface code threshold: Superconducting qubits poised for fault-tolerant quantum computing", Nature 508, 500-503, Feb. 19, 2014, 18 pgs.

Bertet, et al., ""Dephasing of a Superconducting Qubit Induced by Photon Noise," Phys. Rev. Lett., vol. 95, 257002"", 2005, 4 pgs.

Bertet, P., et al., "Parametric coupling for superconducting qubits", Physical Review B 73, 064512, Feb. 14, 2006, 6 pages.

Bialczak, et al., "Fast Tunable Coupler for Superconducting Qubits", PRL 106, 060501, Feb. 11, 2011, 4 pgs.

Blais, et al., "Cavity quantum electrodynamics for superconducting electrical circuits: an architecture for quantum computation," Phys. Rev. A, vol. 69, 062320, American Physical Society; Ridge, NY; US, 2004, 14 pgs.

Blais, Alexandre, et al., "Cavity quantum electrodynamics for superconducting electrical circuits: an architecture for quantum computation", arXiv:cond-mat/0402216v1 [cond-mat.mes-hall], Feb. 2008, 14 pages.

Boissonneault, Maxime, et al., "Back-action of a driven nonlinear resonator on a superconducting qubit", Physical Review A 85, 022305, Feb. 3, 2012, 15 pages.

Boissonneault, Maxime, et al., "Dispersive regime of circuit QED: Photon-dependent qubit dephasing and relaxation rates.", http://arXiv:0810.1336v2 [quant-ph], Oct. 24, 2008, 18 pages.

Bravyi, et al., "Fermionic Quantum Computation, Annals of Physics 298, 210-226", 2002, 17 pgs.

Chen, Yu, et al., "Multiplexed dispersive readout of superconducting phase qubits", Applied Physics Letters 101, 182601, Nov. 1, 2012, 4 pages.

Chen, et al., "Qubit architecture with high coherence and fast tunable coupling", arXiv:1402.7367v1, Feb. 28, 2014, 10 pgs.

Chow, J., "Quantum Information Processing with Superconducting Qubits—Chapter 4.", Dissertation, Yale School of Engineering and Applied Sciences, May 2010, 39 pages.

Devoret, ""Superconducting Artificial Atoms: From Tests of Quantum Mechanics to Quantum Computers," and R. Schoelkopf, "Circuit Qed, Schrodinger Cats and Quantum Jumps of Parity," CQIQC—University of Toronto", Aug. 15, 2013, 26 pgs.

Devoret, et al., "Superconducting Circuits for Quantum Information: An Outlook", Science 339, 1169-74, Mar. 2013, 7 pgs.

Dicarlo, L, et al., "Demonstration of two-qubit algorithms with a superconducting quantum processor", Nature, vol. 460, 240, Jul. 9, 2009, 5 pages.

Divincenzo, "Quantum Computation, Science 270, 5234, pp. 255-261", Oct. 1995, 7 pgs.

Ekert, Artur, et al., "Geometric Quantum Computation", arXiv:quant-ph/004015v1, Feb. 1, 2008, 15 pages.

Elshafiey, Tarief M, "Simple Novel Qualitative Approach for Electromagnetic Wave Analysis of Rectangular Waveguides without Usage of Maxwell's Equations", IEEE Symposium on Wireless Technology and Applications (ISWTA); Langkawi, Malaysia, Sep. 25, 2011, 6 pgs.

Fowler, et al., Surface Codes: Towards Practical Large-Scale Quantum Computation, Physical Review A 86, 032324; American Physical Society; Ridge, NY; US, 2012, 48 pgs.

Fowler, et al., ""Surface codes: Towards practical large-scale quantum computation"", arXiv:1208.0928v2 [quant-ph], Oct. 27, 2012, 56 pgs.

Gambetta, et al., ""Qubit-photon interactions in a cavity: Measurement-induced dephasing and number splitting," Phys. Rev. A, vol. 74, 2006, 042318", 14 pgs.

EPO, Summons to attend oral proceedings pursuant to Rule 115(1) EPC mailed Jul. 22, 2019, in EP 157967845, 9 pgs.

EPO, Communication pursuant to Article 94(3) EPC, dated Sep. 20, 2018, in EP15795777.0, 6 pgs.

Harris, et al., "Sign- and Magnitude-Tunable Coupler for Superconducting Flux Qubits", arXiv:cond-mat/0608253v4 [cond-mat.supr-con], Jul. 5, 2007, 5 pgs.

Hoffman, et al., ""Atoms Talking to SQUIDs," arXiv:1108.4153v2 [quant-ph]", Sep. 23, 2011, 17 pgs.

Jerger, M., et al., "Frequency Division Multiplexing Readout and Simultaneous Manipulation of an Array of Flux Qubits", http://arXiv:1205.6375v2 [quant-ph], Jul. 13, 2012, 4 pages.

Jones, et al., ""Highly controllable qubit-bath coupling based on a sequence of resonators," Journal of Low Temperature Physics, vol. 173, No. 3-4, pp. 152-169", 2013, 17 pgs.

Jones, ""Logic Synthesis for Fault-Tolerant Quantum Computers,"", 1310.7290v1 [quant-ph], Oct. 28, 2013, 201 pgs.

Kerman, "Quantum information processing using quasiclassical electromagnetic interactions between qubits and electrical resonators, New Journal of Physics, vol. 15", Dec. 6, 2013, 24 pgs.

Koch, Jens, et al., "Charge-insensitive qubit design derived from the Cooper pair box", Physical Review A 76, 042319, Oct. 12, 2007, 19 pages.

Majer, J., et al., "Coupling superconducting qubits via a cavity bus", Nature 449, pp. 443-447, Sep. 27, 2007, 5 pages.

Motzoi, F., et al., "Simple pulses for elimination of leakage in weakly nonlinear qubits", arXiv:0901.0534v3 [cond-mat.mes-hall], Oct. 22, 2009, 4 pages.

Niskanen, et al., ""Quantum Coherent Tunable Coupling of Superconducting Qubits," Science vol. 316", arXiv:0512238, May 4, 2007, 5 pgs.

Niskanen, et al., ""Tunable coupling scheme for flux qubits at the optimal point"", arXiv:cond-mat/0512238v2 [cond-mat.mes-hall], Jan. 24, 2006, 8 pgs.

Niskanen, Antti O, et al., "Tunable coupling scheme for flux qubits at the optimal point", Physical Review B 73, 094506, Mar. 15, 2006, 8 pages.

Paik, Hanhee, et al., "Observation of High Coherence in Josephson Junction Qubits Measured in a Three-Dimensional Circuit QED Architecture", Physical Review Letters 107, 240501, Dec. 5, 2011, 5 pages.

Jopovic, et al., "Chapter 23—"Waveguides and Resonators," Introductory Electromagnetics", 2000, 40 pgs.

Rafique, et al., ""Niobium Tunable Microwave Filter." IEEE Transactions on Microwave Theory and Techniques, vol. 57, No. 5", 2009, 6 pgs.

Reed, et al., ""Fast reset and suppressing spontaneous emission of a superconducting qubit," Appl. Phys. Lett., vol. 96, 203110", 2010, 3 pgs.

Richer, Susanne, "Perturbative analysis of two-qubit gates on transmon qubits", Thesis, RWTH Aachen University, Sep. 2013, 70 pages.

Rigetti, Chad Tyler, "Quantum Gates for Superconducting Qubits", Dissertation—Yale University, May 2009, 248 pages.

(56) References Cited

OTHER PUBLICATIONS

Rigetti, Chad, et al., "Superconducting qubit in a waveguide cavity with a coherence time approaching 0.1 ms", Physical Review B 86, 100506(R), Sep. 24, 2012, 5 pages.

Riste, et al., ""Initialization by measurement of a two-qubit superconducting circuit"", arXiv: 1204.2479v1 [cond-mat.mes-hall], Apr. 2012, 8 pgs.

Riste, D., et al., "Deterministic entanglement of superconducting qubits by parity measurement and feedback", 350, Nature, vol. 502, Oct. 17, 2013, 15 pages.

Saira, O. P., et al., "Entanglement genesis by ancilla-based parity measurement in 2D circuit QED", Phys. Rev. Lett. 112, 070502, 2014, 13 pages.

Schreier, et al., ""Suppressing charge noise decoherence in superconducting charge qubits"", Phys. Rev. B 77-180502(R), May 12, 2008, 4 pgs.

Srinivasan, et al., ""Tunable coupling in circuit quantum electrodynamics using a superconducting charge qubit with a V-shaped energy level diagram," Physical Review Letters, vol. 106, No. 8, 083601", 2011, 8 pgs.

Srinivasan, et al., ""Tunable coupling in circuit quantum electrodynamics with a superconducting V-system"", 1011.4317v1 [cond-mat.supr-con], Nov. 2010, 5 pgs.

Steffen, et al., ""High-Coherence Hybrid Superconducting Qubit," Phys. Rev. Lett., vol. 105, 100502", 2010, 4 pgs.

Tektronix, Inc., "Arbitrary Waveform Generators", AWG520, Product Information, 2004, 4 pages.

Van Der Ploeg, S.H.W., et al., "Controllable coupling of superconducting flux qubits", http://arXiv:cond-mat/0605588v3 [cond-mat.supr-con], May 23, 2007, 4 pages.

Vandersypen, L. M. K., et al., "NMR techniques for quantum control and computation", Reviews of Modern Physics, vol. 76, Oct. 2004, 33 pages.

Yin, et al., ""Catch and release of microwave photon states," Physical Review Letters, vol. 110, No. 10, 107001", 2013, 5 pgs.

EPO, Communication pursuant to Rule 114(2) EPC ("third party observations") dated Jun. 12, 2019, in EP 15796357.0, 47 pgs.

"Demultiplexer—Versionunterschied", Wikipedia Jan. 10, 2014, retrieved from https://de.wikipedia.org/w/index.php?title=Demultiplexer&oldid=126318745%E2%80%9C, Jan. 10, 2014, 3 pgs.

Ekanayake, et al., "Quantum bit controller and observer circuits in SOS-CMOS technology for gigahertz low-temperature operation", Proceedings of the 7th IEEE International Conference on Nanotechnology, Hong Kong, Aug. 2-5, 2007, 5 pgs.

EPO, Communication pursuant to Rule 114(2) EPC dated Sep. 26, 2018, in EP15796784.5, 46 pgs.

Helmer, et al., "Cavity grid for scalable quantum computation with superconducting circuits", arXiv:0706.3625v2, Mar. 24, 2009, 6 pgs.

Koch, J., et al., "Charge insensitive qubit design derived from the Cooper pair box", arXiv:cond-mat/0703002v2 [cond-mat.mes-hall], Sep. 26, 2007, 21 pages.

EPO, Summons to attend oral proceedings pursuant to Rule 115(1) EPC mailed May 8, 2019, in EP 15795777.0, 8 pgs.

EPO, Communication pursuant to Rule 114(2) EPC dated Apr. 22, 2020, reporting Third Party Submission in EP 15795777.0, 8 pgs.

\* cited by examiner
† cited by third party

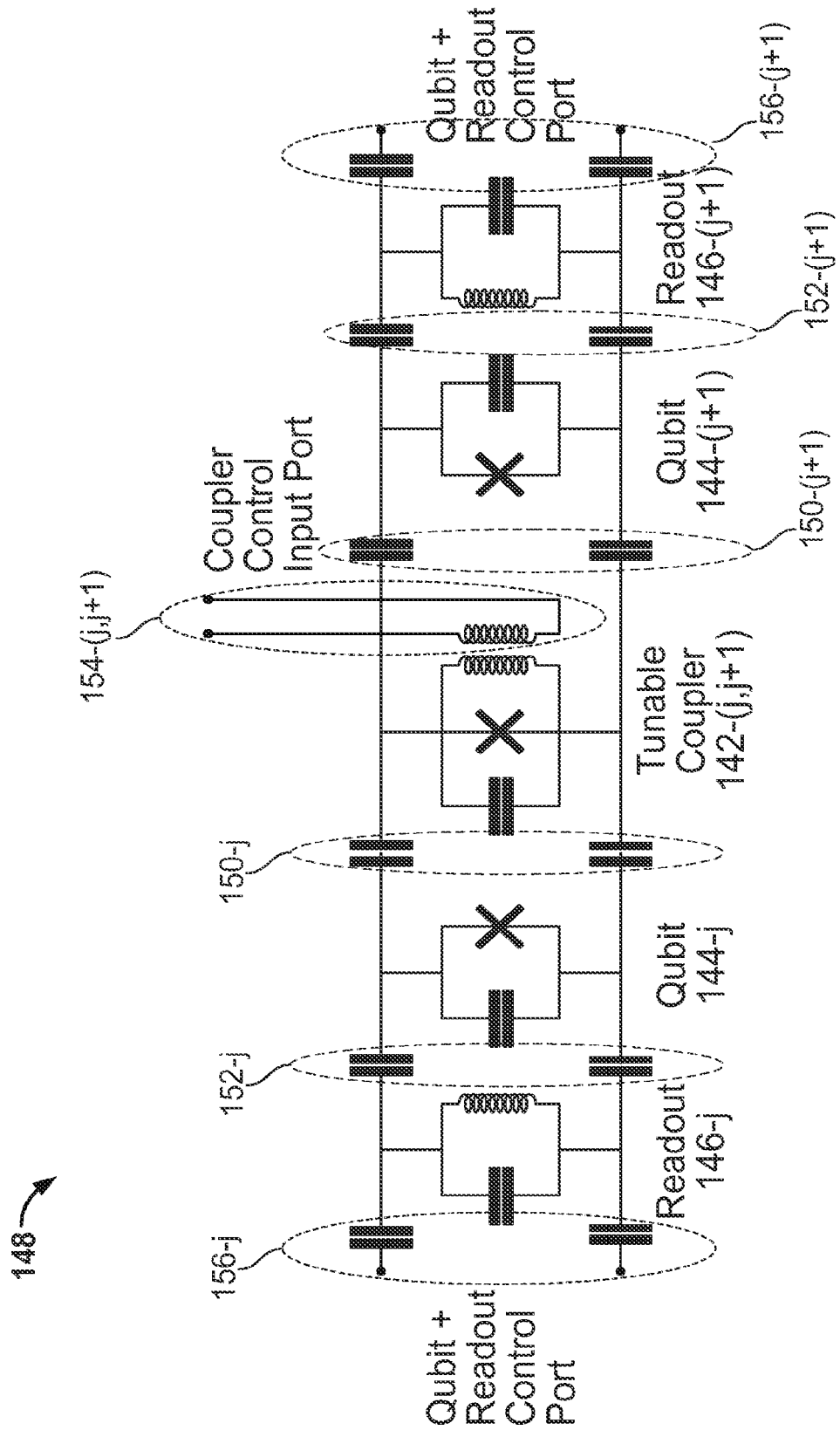

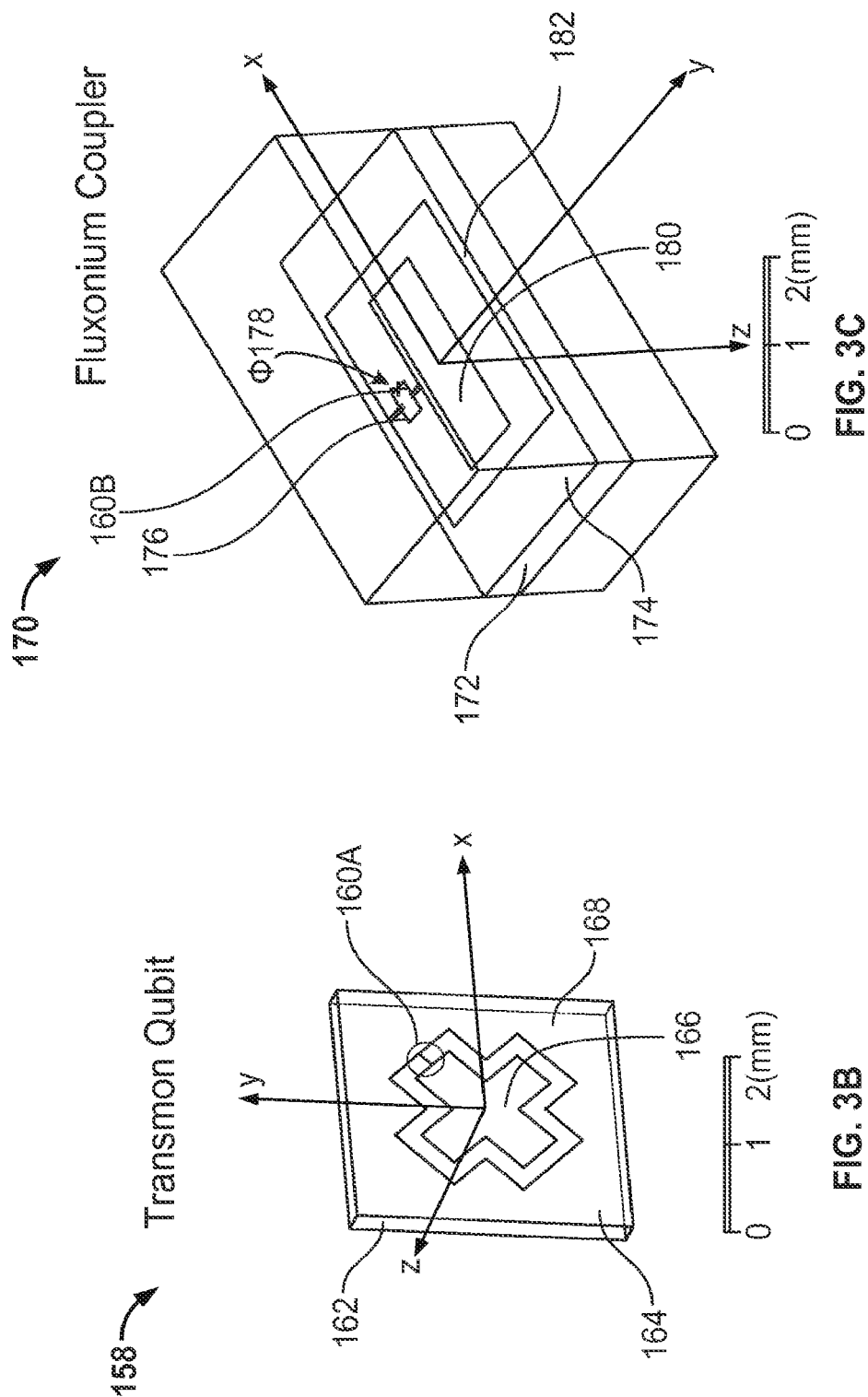

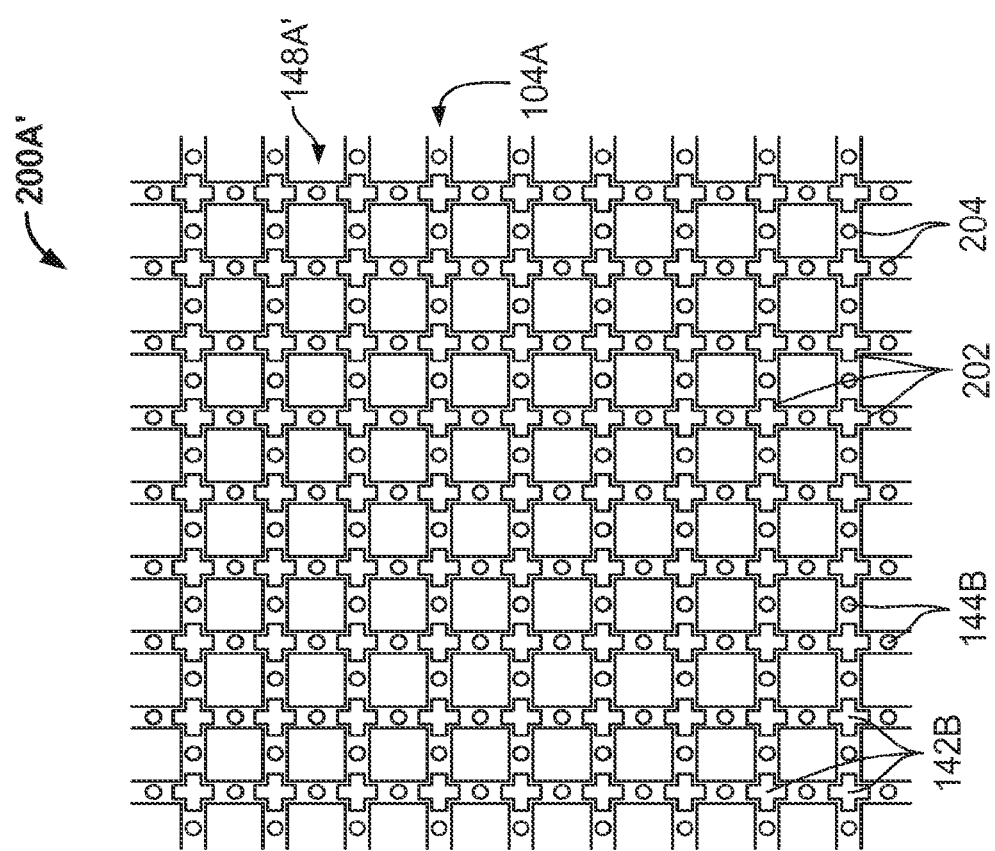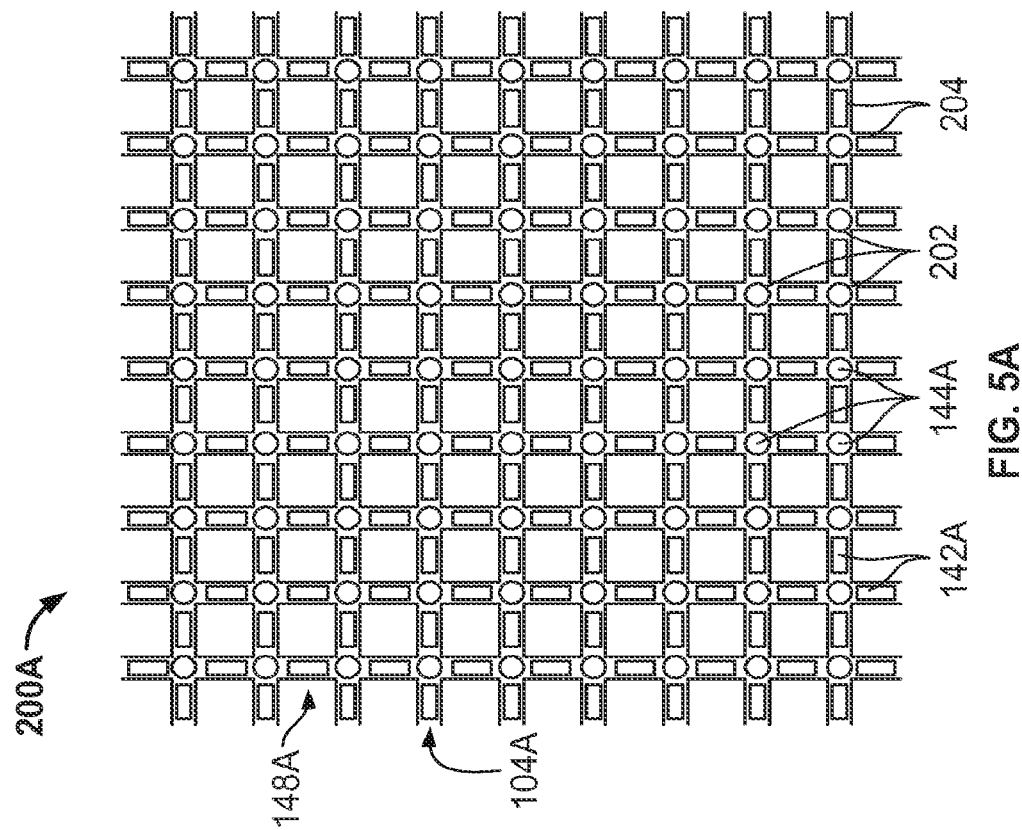

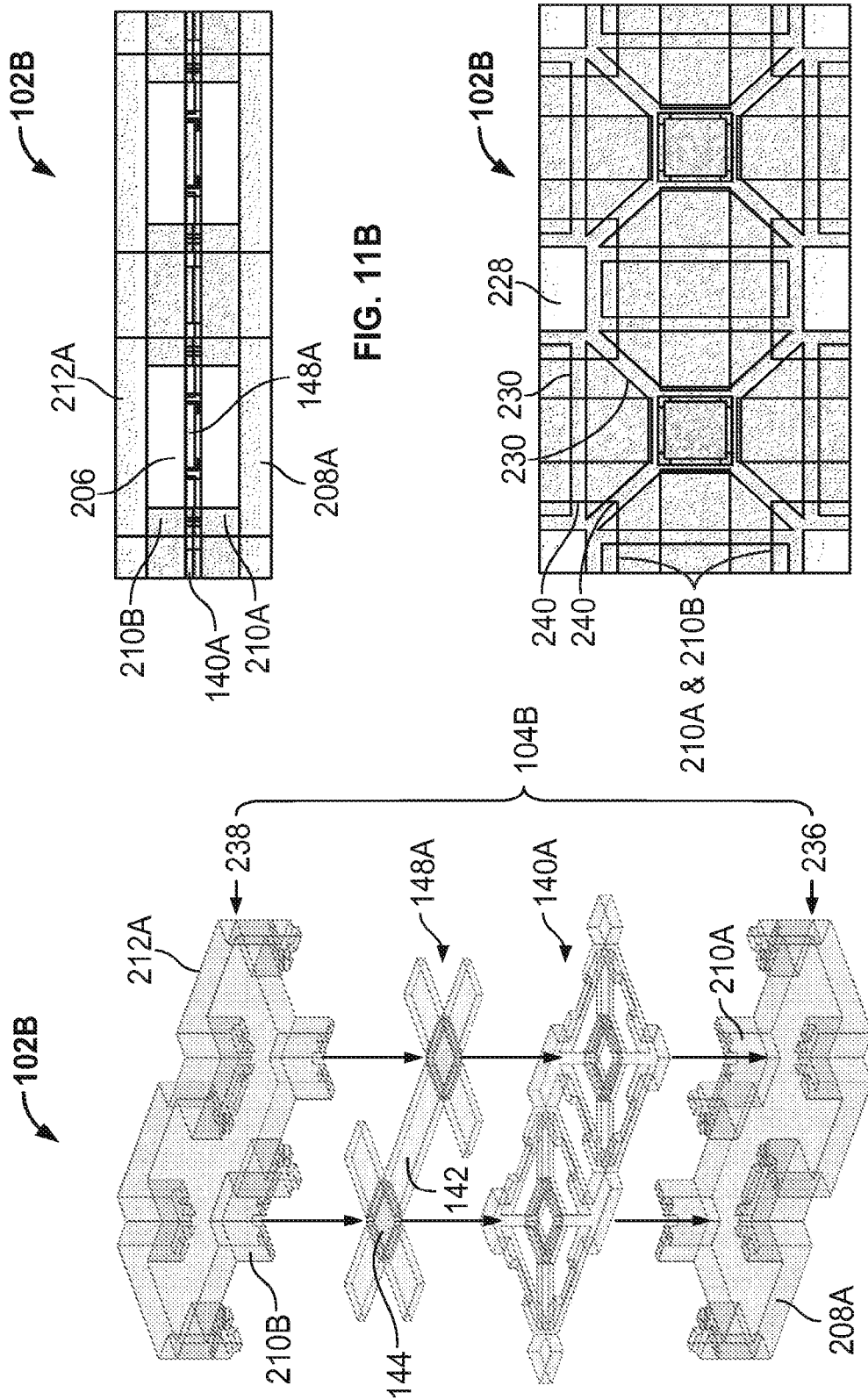

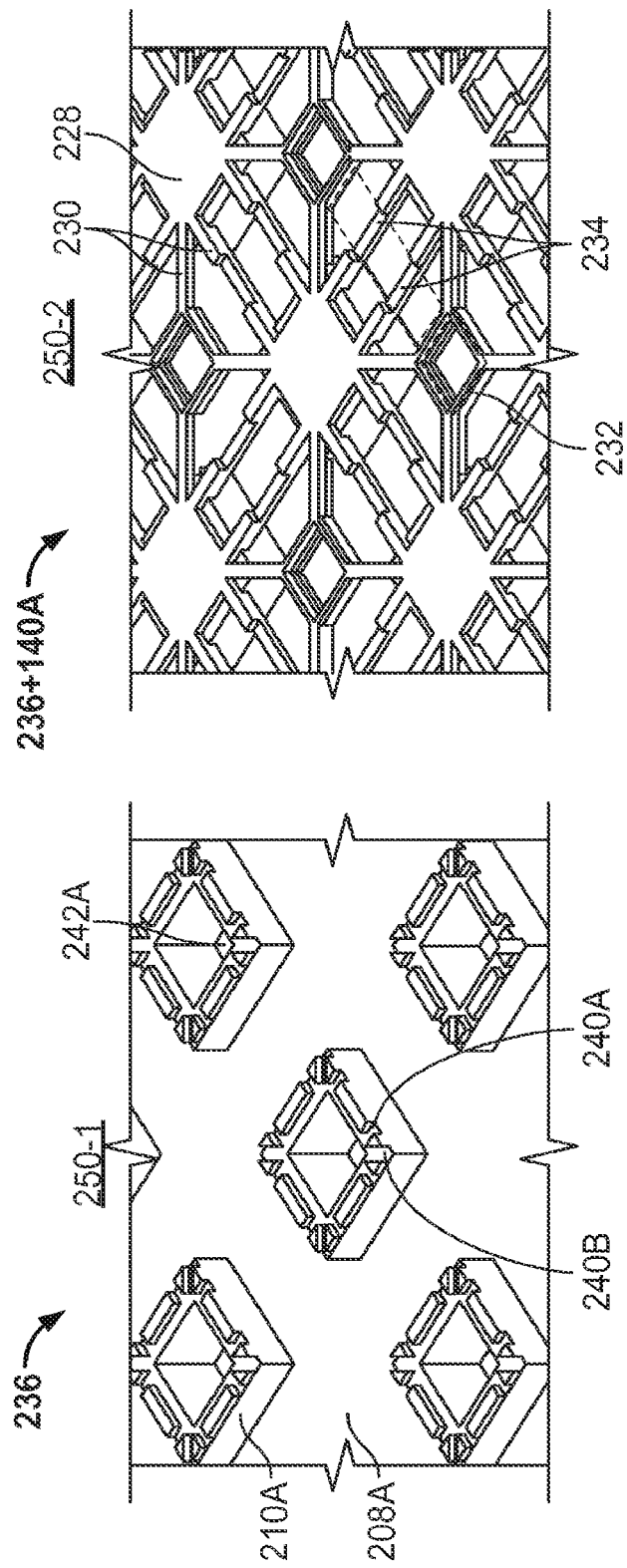

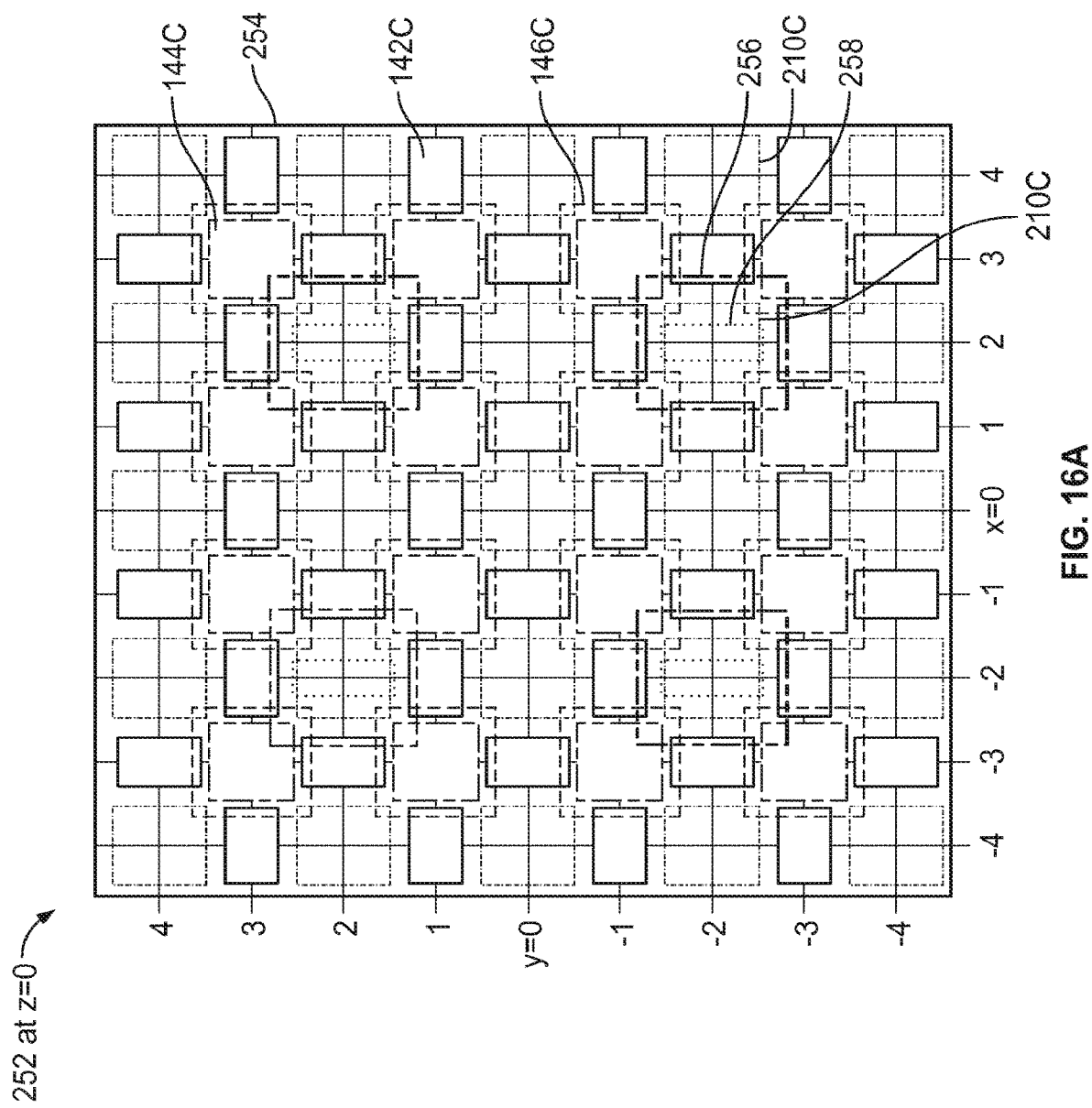

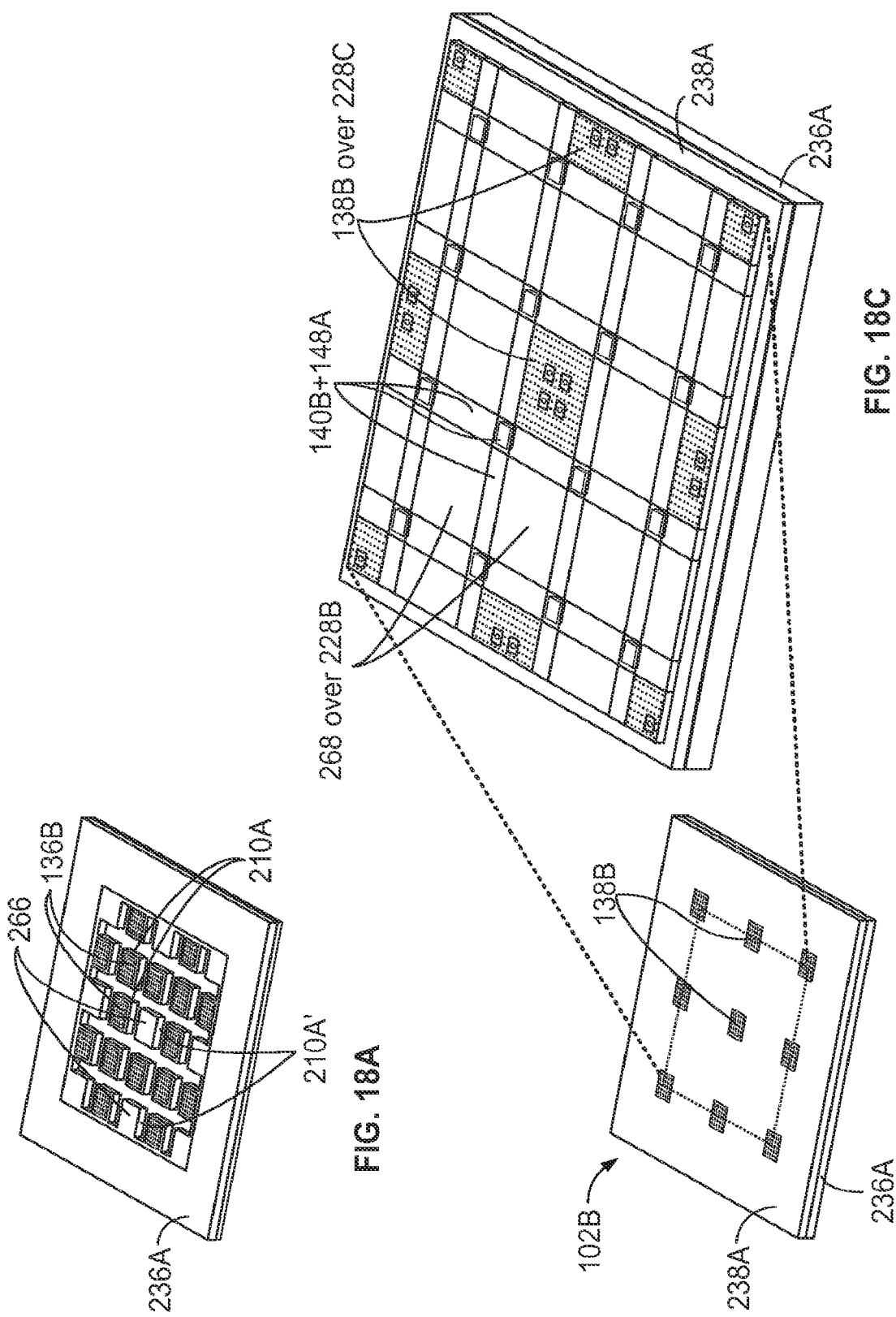

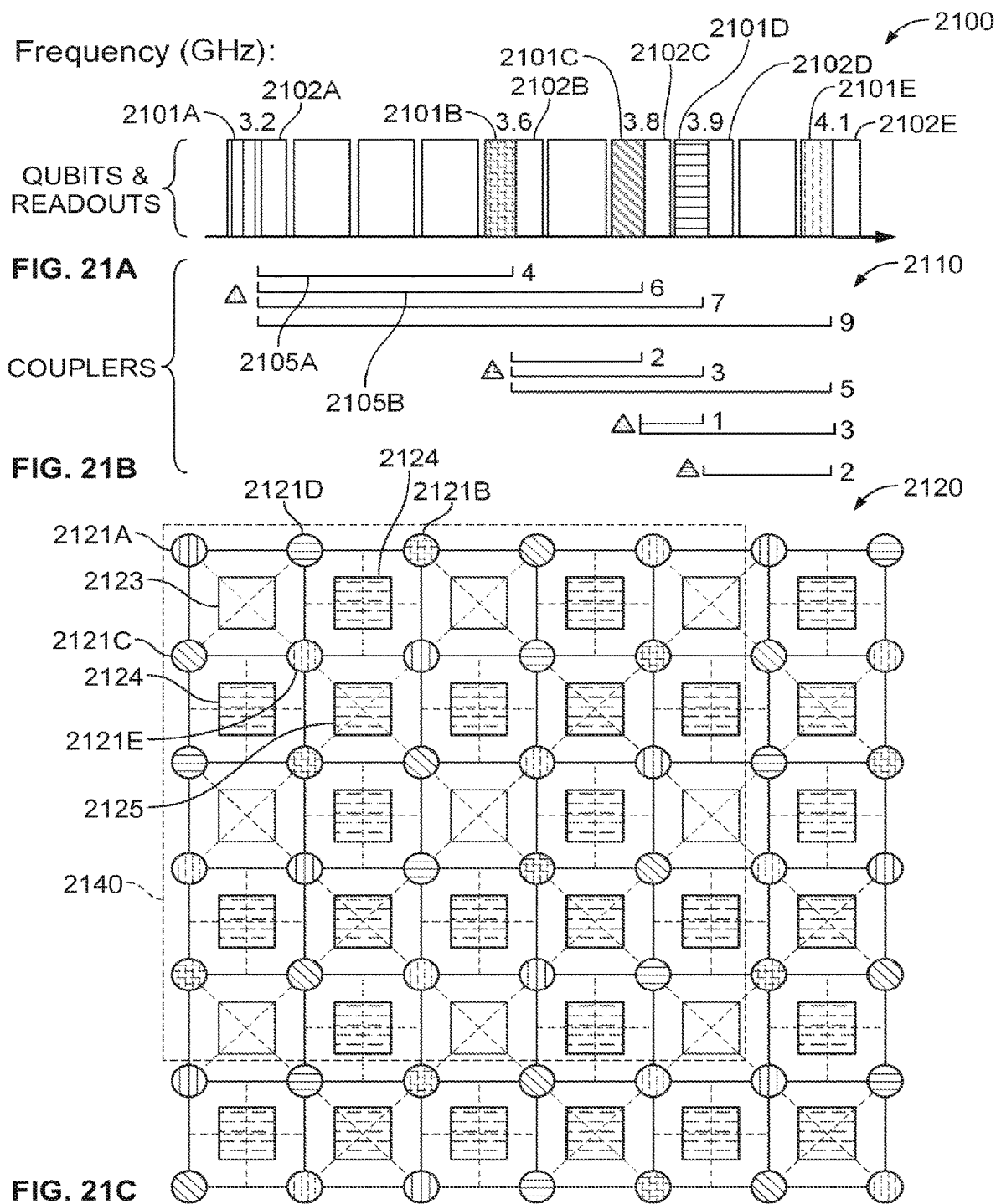

OPERATING A MULTI-DIMENSIONAL ARRAY OF QUBIT DEVICES

CROSS REFERENCE TO RELATED APPLICATIONS

This application is a continuation of U.S. patent application Ser. No. 15/035,547, filed May 10, 2016, entitled "Operating a Multi-Dimensional Array of Qubit Devices," which is a 371 national stage of International Application No. PCT/US2015/018152, filed Feb. 27, 2015, which claims priority to U.S. Provisional Patent Application No. 61/946,390, filed Feb. 28, 2014, entitled "Waveguide Array for Quantum Processors;" U.S. Provisional Patent Application No. 61/946,545, filed on Feb. 28, 2014, entitled "Quantum Processor Cell Architectures;" U.S. Provisional Patent Application No. 62/032,864, filed on Aug. 4, 2014, entitled "Quantum Processor Control Architecture;" and U.S. Provisional Patent Application No. 62/033,022, filed on Aug. 4, 2014, entitled "Quantum Processor Substrate." All above-referenced priority documents are incorporated herein by reference.

TECHNICAL FIELD

The subject matter described here relates to quantum computing.

BACKGROUND

Quantum computing generally involves storage or processing of information in quantum mechanical states of light or matter. Information stored in these systems can display the quantum properties of the storage medium. These properties are different from classical Newtonian laws of physics that govern classical computing hardware.

Significant evidence shows that the quantum computing paradigm allows certain advantages; for example, some problems can be solved by a quantum computer using exponentially fewer resources (e.g., time, memory size, energy) than would be used by the best known classical algorithms and computing systems.

SUMMARY

In a general aspect, a quantum computing system includes a multi-dimensional array of qubit devices.

In some aspects, qubit control signals are received in a multi-dimensional array of qubit devices. Each qubit device has a respective qubit operating frequency that is independent of an offset electromagnetic field experienced by the qubit device. The qubit control signal received by each qubit device is configured to manipulate a quantum state of the qubit device. Coupler control signals are received at coupler devices. The coupler devices reside at intervals between neighboring pairs of the qubit devices in the multi-dimensional array. The coupler control signal received by each coupler device is configured to produce an electromagnetic interaction between the neighboring pair of qubit devices that the coupler device resides between. A coupling strength of the electromagnetic interaction produced by each coupler device is influenced by an offset electromagnetic field experienced by the coupler device.

In some aspects, qubit control signals are received in a multi-dimensional array of qubit devices. Each qubit device has a respective qubit operating frequency that is independent of an offset electromagnetic field experienced by the qubit device. The qubit control signal received by each qubit device is configured to manipulate a quantum state of the qubit device. Qubit readout signals are produced at readout devices associated with the multi-dimensional array of qubit devices. Each readout device is operably coupled to a single, respective qubit device. Each qubit readout signal is produced by one of the readout devices based on an electromagnetic interaction between the readout device and the respective qubit device.

In some aspects, qubit control signals are received at a quantum processor cell that includes a multi-dimensional array of qubit devices. The multi-dimensional array includes sub-arrays associated with separate frequency bands. The qubit devices in each sub-array have a qubit operating frequency within the frequency band associated with the sub-array. The qubit control signal received by each qubit device is configured to manipulate a quantum state of the qubit device. The qubit control signals are communicated to respective qubit devices in the quantum processor cell.

The details of one or more example implementations are provided in the accompanying drawings and the description below. Other features, objects, and advantages of the subject matter will be apparent from the description and drawings, and from the claims.

BRIEF DESCRIPTION OF DRAWINGS

FIGS. 3A-3E show aspects of example devices that may be housed in a quantum processor cell; FIG. 3A shows an equivalent circuit of a portion of an example device array; FIG. 3B shows an example transmon device; FIG. 3C shows an example fluxonium device; FIG. 3D shows an equivalent circuit for the transmon device shown in FIG. 3B; FIG. 3E shows an equivalent circuit for the fluxonium device shown in FIG. 3C.

FIG. 4A shows an example energy level diagram for a qubit device; FIG. 4B shows an example frequency diagram for a readout device; FIG. 4C shows an example energy level diagram with a coupler device in its OFF state; FIG. 4D shows an example energy level diagram with a coupler device in its ON state; FIG. 4E shows an example coupler control signal.

FIGS. 5A-5B are schematic diagrams of example device arrays arranged within an electromagnetic waveguide system that includes a 2D lattice of intersecting waveguides.

FIG. 6A shows a portion of an interior volume of an example electromagnetic waveguide system; FIG. 6B shows dimensions of an example waveguide interval.

FIG. 10A is a side cross-sectional view; FIG. 10B is a perspective view.

FIGS. 11A-11E show aspects of the example QPC of FIG. 9; FIG. 11A shows an exploded view of a portion of the example QPC; FIG. 11B is a side cross-sectional view of the portion illustrated in FIG. 11A; FIG. 11C is a plan view of the portion illustrated in FIG. 11A; FIG. 11D is a perspective view of the electromagnetic waveguide system in the example QPC of FIG. 9; FIG. 11E is a zoomed-in view of a portion of FIG. 11D.

FIGS. 13A-13G show an example process for assembling the example QPC of FIG. 9.

FIGS. 16A-16F show aspects of an example quantum computing system that includes an electromagnetic waveguide system. FIG. 16A is a top cross-sectional view of an example quantum processor cell (QPC) at Z=0; FIG. 16B is a side cross-sectional view of the example QPC at Y=0 and Y=±4; FIG. 16C is a top cross-sectional view of the example QPC at Z=+1; FIG. 16D is a top cross-sectional view of the example QPC at Z=−1; FIG. 16E is a side cross-sectional view of the example QPC at Y=±1 and Y=±3; and FIG. 16F is a side cross-sectional view of the example QPC at Y=±2.

FIG. 17A is a schematic diagram showing an example signal flow; FIG. 17B is a perspective view showing aspects of components represented in FIG. 17A.

FIGS. 18A-18C show examples of input and output connector hardware for an example quantum processor cell; FIG. 18A is a perspective view of an example base portion of an electromagnetic waveguide system with vertical interconnects; FIG. 18B is a perspective view of an example electromagnetic waveguide system showing a lid portion with vertical interconnects; FIG. 18C shows a perspective view of internal components of the example electromagnetic waveguide system shown in FIG. 18B.

FIG. 20A is a side view of an example system; FIG. 20B is a perspective view of an example input interconnect plate; FIG. 20C is a perspective view of an example output interconnect plate; FIG. 20D is a perspective view of an example input signal processing system; FIG. 20E is a perspective view of an example output signal processing system.

FIGS. 21A-C are diagrams showing example operating frequencies for devices in a quantum processor cell; FIG. 21A is a frequency spectrum plot that indicates example operating frequencies of qubit devices and readout devices; FIG. 21B is a frequency difference plot that indicates differences between the operating frequencies shown in FIG. 21A; FIG. 21C shows an example device array based on the operating frequencies shown in FIG. 21A.

FIG. 22A is a frequency spectrum plot that indicates example operating frequencies of qubit devices and readout devices; FIG. 22B is a frequency difference plot that indicates differences between the operating frequencies shown in FIG. 22A; FIG. 22C shows an example device array based on the operating frequencies shown in FIG. 22A.

DETAILED DESCRIPTION

Figure 1:
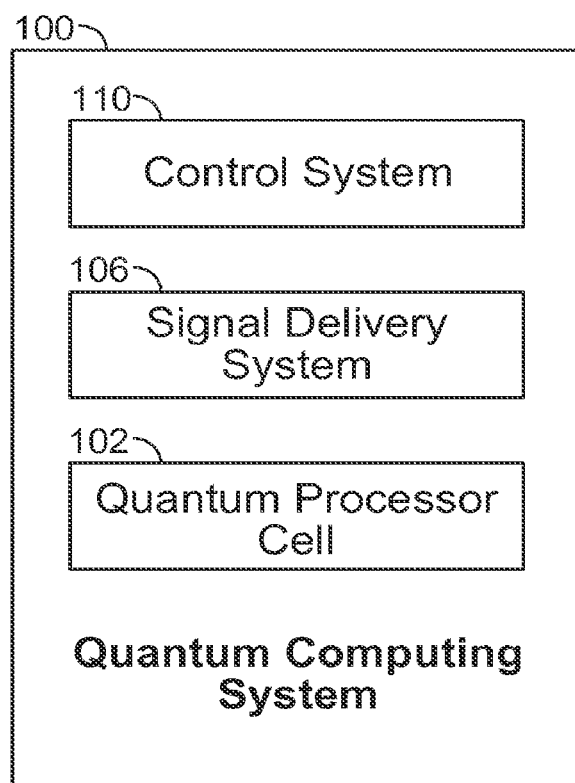
FIG. 1 is a schematic diagram of an example quantum computing system.

FIG. 1 is a schematic diagram of an example quantum computing system 100. The example quantum computing system 100 shown in FIG. 1 includes a control system 110, a signal delivery system 106, and a quantum processor cell 102. A quantum computing system may include additional or different features, and the components of a quantum computing system may operate as described with respect to FIG. 1 or in another manner.

The example quantum computing system 100 shown in FIG. 1 can perform quantum computational tasks and algorithms. In some implementations, the quantum computing system 100 can perform quantum computation by storing and manipulating information within individual quantum states of a composite quantum system. For example, qubits (i.e., quantum bits) can be stored in and represented by an effective two-level sub-manifold of a quantum coherent physical system. The formation of composite systems for quantum computing can be achieved by couplings between the individual physical qubits, for example, to perform conditional quantum logic operations. In some instances, the couplings between physical qubits can be rendered in a manner that allows large-scale entanglement within the quantum computing device. Control signals can manipulate the quantum states of individual qubits and the couplings between qubits. In some instances, information can be read out from the composite quantum system by measuring the quantum states of the individual qubits.

In some implementations, the quantum computing system 100 can operate in a fault-tolerant regime. For example, fault-tolerance may be achieved through the use of carefully engineered dissipation and redundant encodings. In some example gate-based models for quantum computing, fault-tolerance can be achieved by applying a set of high-fidelity control and measurement operations to the qubits. For example, topological quantum error correction schemes can operate on a lattice of nearest-neighbor-coupled qubits. In some instances, these and other types of quantum error correcting schemes can be adapted for a two- or three-dimensional lattice of nearest-neighbor-coupled qubits, for example, to achieve fault-tolerant quantum computation.

The lattice can allow each qubit to be independently controlled and measured without introducing crosstalk or errors on other qubits in the lattice. Adjacent pairs of qubits in the lattice can be addressed, for example, with two-qubit gate operations that are capable of generating entanglement, independent of other pairs in the lattice.

In some implementations, the quantum computing system 100 is constructed and operated according to a scalable quantum computing architecture. For example, in some cases, the architecture can be scaled to a large number of qubits to achieve large-scale general purpose coherent quantum computing. In some instances, the architecture is adaptable and can incorporate a variety of modes for each technical component. For example, the architecture can be adapted to incorporate different types of qubit devices, coupler devices, readout devices, signaling devices, etc. In some cases, the architecture of the quantum computing system 100 provides a practicable and economical solution for large-scale quantum computation.

The example quantum processor cell 102 shown in FIG. 1 includes qubits that are used to store and process quantum information. In some instances, all or part of the quantum processor cell 102 functions as a quantum processor, a quantum memory, or another type of subsystem. The quantum processor cell 102 shown in FIG. 1 can be implemented, for example, as the quantum processor cell 102A shown in FIG. 2, the quantum processor cell 102B shown in FIG. 9, or in another manner.

In the example quantum processor cell 102, the qubits each store a single bit of quantum information, and the qubits can collectively define the computational state of a quantum processor or quantum memory. The quantum processor cell 102 may also include readout devices that selectively interact with the qubits to detect their quantum states. For example, the readout devices may generate readout signals that indicate the computational state of the quantum processor or quantum memory. The quantum processor cell 102 may also include couplers that selectively operate on pairs of qubits and allow quantum interactions between the qubits. For example, the couplers may produce entanglement or other multi-qubit states over two or more qubits in the quantum processor cell 102.

In some implementations, the example quantum processor cell 102 can process the quantum information stored in the qubits by applying control signals to the qubits or to the couplers housed in the quantum processor cell. The control signals can be configured to encode information in the qubits, to process the information by performing logical gates or other types of operations, or to extract information from the qubits. In some examples, the operations can be expressed as single-qubit gates, two-qubit gates, or other types of logical gates that operate on one or more qubits. A sequence of operations can be applied to the qubits to perform a quantum algorithm. The quantum algorithm may correspond to a computational task, a quantum error correction procedure, a quantum state distillation procedure, or a combination of these and other types of operations. The quantum processor cell 102 may output information indicating the states of the qubits, for example, by applying control signals to the readout devices.

In the example shown in FIG. 1, the signal delivery system 106 provides communication between the control system 110 and the quantum processor cell 102. For example, the signal delivery system 106 can receive control signals (e.g., qubit control signals, readout control signals, coupler control signals, etc.) from the control system 110 and deliver the control signals to the quantum processor cell 102. In some instances, the signal delivery system 106 performs preprocessing, signal conditioning, or other operations to the control signals before delivering them to the quantum processor cell 102. In some instances, the signal delivery system 106 receives qubit readout signals from the quantum processor cell and delivers the qubit readout signals to the control system 110. In some instances, the signal delivery system 106 performs preprocessing, signal conditioning or other operations on the readout signals before delivering them to the control system 110.

Figure 2:
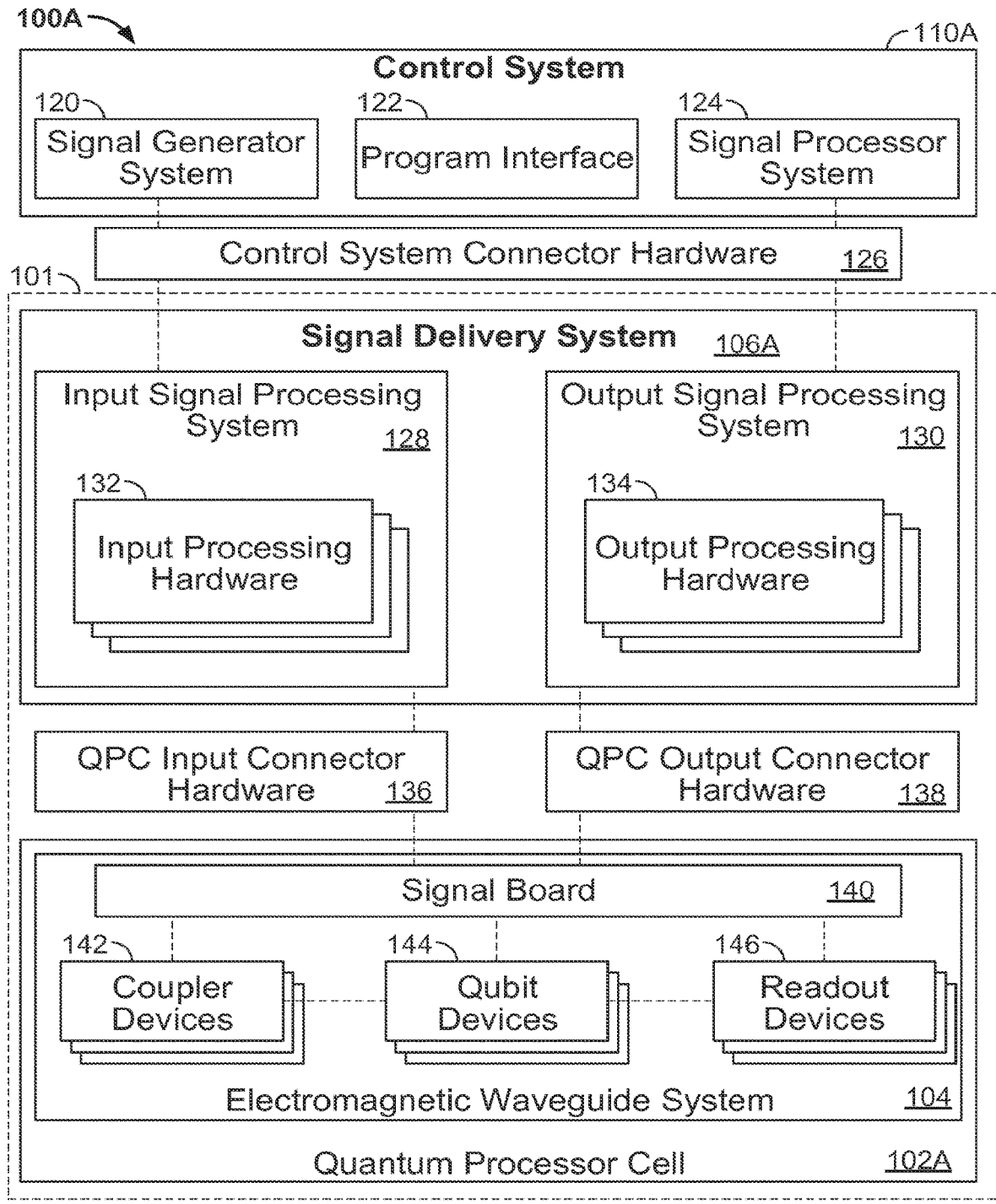
FIG. 2 is a schematic diagram of an example quantum computing system in which a quantum processor cell (QPC) includes an electromagnetic waveguide system.
Figure 17A:
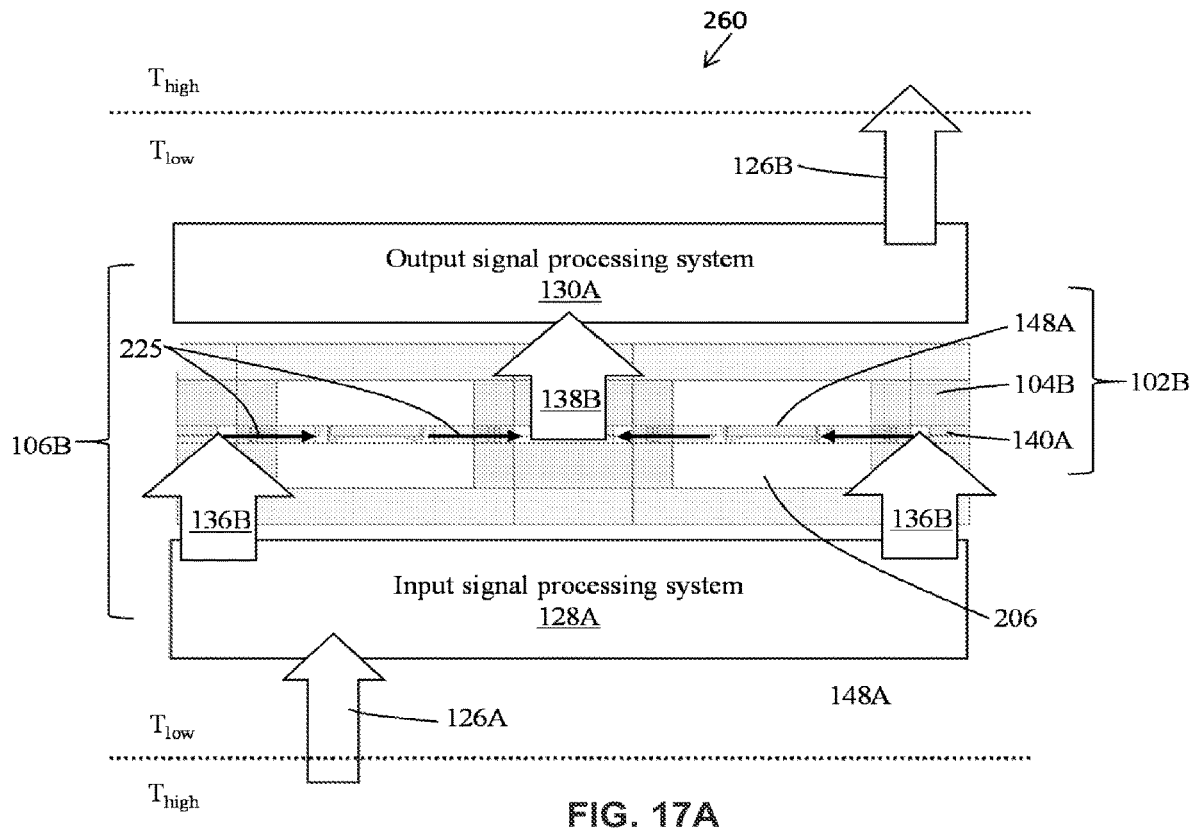
FIGS. 17A-17B show aspects of an example quantum computing system that includes a signal delivery subsystem and an electromagnetic waveguide system.

The signal delivery system 106 shown in FIG. 1 can be implemented according to the example signal delivery system 106A shown in FIG. 2, according to the example signal delivery system 106B shown in FIG. 17A, or in another manner. In some implementations, the signal delivery system 106 includes one or more input signal processing systems, one or more output signal processing systems, or a combination of these and other types of components. Examples of features that may, in some implementations, be included in a signal delivery system are shown and described with respect to FIGS. 20A-20E, 23A-23B and others. Example operations that may, in some implementations, be performed by a signal delivery system are shown and described with respect to FIGS. 23A-23B and 24-28.

In the example quantum computing system 100 shown in FIG. 1, the control system 110 controls operation of the quantum processor cell 102. The example control system 110 may include data processors, signal generators, interface components and other types of systems or subsystems. In some cases, the control system 110 includes one or more classical computers or classical computing components. The example control system 110 shown in FIG. 1 can be implemented according to the example control system 110A shown in FIG. 2, or the control system 110 can be implemented in another manner. Examples of features that may, in some implementations, be included in a control system are shown in FIGS. 23A-23B and 24-28. Example operations that may, in some implementations, be performed by a control system are shown in FIGS. 23A-23B and 24-28.

FIG. 2 is a schematic diagram of an example quantum computing system 100A, showing example components and interactions of an example control system 110A, an example signal delivery system 106A and an example quantum processor cell (QPC) 102A. As shown in FIG. 2, the control system 110A interfaces with the signal delivery system 106A through control system connector hardware 126; and the signal delivery system 106A interfaces with the quantum processor cell 102A through QPC input connector hardware 136 and QPC output connector hardware 138. The example connector hardware elements 136, 138 shown in FIG. 2 can include signal lines, processing components, feedthrough devices, or a combination of these and other types of components.

In the example shown in FIG. 2, the signal delivery system 106A and the quantum processor cell 102A are maintained in a QPC environment 101. The QPC environment 101 can be provided, for example, by shielding equipment, cryogenic equipment, and other types of environmental control systems. In some examples, the components in the QPC environment 101 operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc. The levels and types of noise that are tolerated or controlled in the QPC environment 101 can vary, for example, based on the features and operational requirements of the quantum processor cell 102A and the signal delivery system 106A.

The example control system 110A shown in FIG. 2 includes a signal generator system 120, a program interface 122 and a signal processor system 124. A control system may include additional or different components, and the components can operate as described with respect to FIG. 2 or in another manner. In some examples, components of the control system 110A operate in a room temperature regime, an intermediate temperature regime, or both. For example, the control system 110A can be configured to operate at much higher temperatures and be subject to much higher levels of noise than are present in the QPC environment 101. In the example shown, the control system connector hardware 126 can be configured to isolate the components in the QPC environment 101 from noise in the environment of the control system 110A.

The example signal generator system 120 generates control signals from control information provided by the program interface 122. For example, the signal generator system 120 may include a microwave signal generator, a DC control source, or other types of components that generate control signals. In the example shown, the control signals can be delivered to the quantum processor cell 102A by the signal delivery system 106A.

The example program interface 122 provides control information to the signal generator system 120. For example, the program interface 122 can include a classical computing cluster, servers, databases, networks, or other types of classical computing equipment. In some instances, the program interface 122 includes one or more microprocessors running software, monitors or other display apparatus, interface devices, and other types of classical computing components. The program interface 122 can generate control information, for example, based on a quantum task or a quantum algorithm to be performed by the quantum computing system 100A, based on qubit readout information, or based on a combination of these and other types of information.

The example signal processor system 124 can receive and process qubit readout signals from the quantum processor cell 102A. For example, the signal processor system 124 can include a digitizer, a microwave source, and other types of signal processing components. In the example shown, the qubit readout signals can be delivered to the signal processor system 124 by the signal delivery system 106A. The signal processor system 124 can process (e.g., digitize, or otherwise process) the qubit readout signals and provide the processed information to the program interface 122. The program interface 122 can extract qubit readout data, for example, to identify the quantum states of qubits in the quantum processor cell 102A.

The example signal delivery system 106A shown in FIG. 2 includes an input signal processing system 128 and an output signal processing system 130. A signal delivery system may include additional or different components, and the components of a signal delivery system may operate in the manner shown in FIG. 2 or in another manner. In the example shown in FIG. 2, the signal generator system 120 communicates signals to the input signal processing system 128 through the control system connector hardware 126; and the output signal processing system 130 communicates signals to the signal processor system 124 through the control system connector hardware 126.

The control system connector hardware 126 can include signal lines, signal processing hardware, filters, feedthrough devices (e.g., light-tight feedthroughs, etc.), and other types of components. In some implementations, the control system connector hardware 126 can span multiple different temperature and noise regimes. For example, the control system connector hardware can include a series of temperature stages (60 K, 3 K, 800 mK, 150 mK) that decrease between the higher temperature regime of the control system 110A and the lower temperature regime of the QPC environment 101.

As shown in FIG. 2, the input signal processing system 128 includes input processing hardware 132. An input signal processing system may include various types of processing hardware, such as, for example, filters, attenuators, directional couplers, multiplexers, diplexers, bias components, signal channels, and other types of components. An example of an input signal processing system is shown in FIG. 20D; other types of input signal processing systems may be used.

In some examples, the input signal processing system 128 includes multiple processing cards housed on a circuit board. The circuit board can include receptacle slots that form mechanical connections and signal path connections between the circuit board and the processing cards. The receptacle slots can support the processing cards and allow the processing cards to be removed or exchanged for other components. In some examples, the input signal processing system 128 includes multiple processing sections, and each processing section receives and processes signals for an operating domain that includes a group of devices in the quantum processor cell 102A. In some cases, each processing section of the input signal processing system 128 includes an input channel that receives multiplexed control signals, a de-multiplexer configured to separate device control signals from the multiplexed control signal, and output channels configured to communicate the respective device control signals into the quantum processor cell 102A.

In some implementations, each multiplexed control signal received by the input signal processing system 128 can include control signals for multiple devices in the quantum processor cell 102A. For example, in some cases, a multiplexed control signal includes qubit control signals for a group of the qubit devices, coupler control signals for a group of the coupler devices, or readout control signals for a group of the readout devices. In some cases, the input signal processing system 128 receives DC control signals, AC control signals, or combination of these and other types of signals.

As shown in FIG. 2, the output signal processing system 130 includes output processing hardware 134. An output signal processing system may include various types of processing hardware, such as, for example, isolators, superconducting amplifiers, semiconducting amplifiers, diplexers, multiplexers, power dividers, filters, signal channels, and other types of components. An example of an output signal processing system is shown in FIG. 20E; other types of output signal processing systems may be used.

In some examples, the output signal processing system 130 includes multiple processing cards housed on a circuit board. The circuit board can include receptacle slots that form mechanical connections and signal path connections between the circuit board and the processing cards. The receptacle slots can support the processing cards and allow the processing cards to be removed or exchanged for other components. In some examples, the output signal processing system includes multiple processing sections, and each processing section receives and processes signals from a group of devices in the quantum processor cell 102A. In some cases, each processing section of the output signal processing system 130 includes input channels configured to receive the qubit readout signals from a group of the readout devices in an operating domain, a multiplexer configured to generate a multiplexed readout signal from the qubit readout signals, and an output channel configured to output the multiplexed readout signal.

The example quantum processor cell 102A shown in FIG. 2 includes an electromagnetic waveguide system 104. In the example shown, the electromagnetic waveguide system 104 houses a signal board 140, coupler devices 142, qubit devices 144, and readout devices 146. A quantum processor cell may include additional or different components, and the components of the quantum processor cell may operate as shown in FIG. 2 or in another manner.

In the example shown in FIG. 2, the input signal processing system 128 communicates signals to the signal board 140 through the QPC input connector hardware 136, and the signal board 140 communicates signals to the output signal processing system 130 through the QPC output connector hardware 138. The QPC input connector hardware 136 can be implemented, for example, as an input interconnect plate or another type of structure, and the QPC output connector hardware 138 can be implemented, for example, as an output interconnect plate or another type of structure. Example input and output interconnect plates are shown in FIGS. 20B-20C; other types of interconnect plates may be used.

In some examples, the QPC input connector hardware 136 includes one or more input interconnect signal lines for each coupler device, each qubit device, and each readout device, and the QPC output connector hardware 138 includes one or more output interconnect signal lines for each readout device. The interconnect signal lines can extend from an exterior of the electromagnetic waveguide system 104 to the interior of the electromagnetic waveguide system 104. In some cases, the interconnect signal lines are supported by a plateau structure that extends (e.g., in a vertical direction) between the signal board 140 and either the input signal processing system 128 or the output signal processing system 130.

The example electromagnetic waveguide system 104 provides a low-noise electromagnetic environment for the qubit devices 144. Example attributes of electromagnetic waveguide systems are shown in FIGS. 6A-6B, 7-8, 11A-11E, 13A-13F and others. In some examples, the electromagnetic waveguide system 104 is formed by an assembly of quantum processor cell components. For example, the electromagnetic waveguide system 104 may be formed by assembling a lower member (a lid) to an upper member (a base) to form an enclosed (partially, substantially or fully enclosed) interior volume that corresponds to a lattice of intersecting waveguides.

In some implementations, the example electromagnetic waveguide system 104 provides an environment for a lattice of devices (e.g., qubit, coupler and readout devices). The environment provided by the electromagnetic waveguide system 104 can meet or exceed the requisite operating conditions for each individual qubit, coupler and readout device, and for quantum error correction on a large-scale lattice of qubits. In some instances, the electromagnetic waveguide system 104 includes apertures or other features that allow the delivery of signals to the lattice of qubits and to the controllable coupling devices, and allow the extraction of readout signals from readout devices.

In some implementations, the example electromagnetic waveguide system 104 suppresses signals (e.g., passively) to achieve low crosstalk between qubits, for example, such that signals applied to a target device can be contained (e.g., localized in space) without significant leakage to non-target devices. In some cases, the example electromagnetic waveguide system 104 provides shielding and isolation of each qubit from external noise and the external environment, and from the other qubits in the lattice. The electromagnetic environment provided by the electromagnetic waveguide system 104 can allow sustained coherence of individual qubits and entangled quantum states. The electromagnetic waveguide system 104 may allow neighboring qubits to be coupled to perform two-qubit gates, for example, when a coupler device located between the neighboring qubits is selectively activated (e.g., by control signals addressed to the coupler device).

In some implementations, the electromagnetic waveguide system 104 has an interior surface that defines intersecting waveguides. An example of an interior volume of intersecting waveguides formed by an electromagnetic waveguide system is shown in FIGS. 6A-6B, 7-8, 11B, 11E, 13F, 14A-14B and others. In some cases, intersecting waveguides include waveguide sections that meet at waveguide intersections. In the examples shown, the waveguide intersections include the portions of the interior volume that are shared between the two or more intersecting waveguides. In some implementations, the waveguide sections define cutoff frequencies, and each waveguide section suppresses the propagation of electromagnetic signals below the cutoff frequency. Thus, electromagnetic signals below the cutoff frequency are evanesced (and not propagated) by the waveguide sections.

In some instances, the cutoff frequency for a waveguide section is defined by the waveguide's cross-section. An electromagnetic waveguide system can include waveguide sections having square cross-sections, rectangular cross-sections, circular cross-sections, elliptical cross-sections, irregular cross-sections, or cross-sections of other geometries. Moreover, the cross-section of each waveguide section, taken perpendicular to the main axis of the waveguide (i.e., perpendicular to the propagation axis), may vary along the main axis of the waveguide. Electromagnetic waves above the cutoff frequency are propagated in the direction of the propagation axis, while electromagnetic waves below the cutoff frequency are evanesced (e.g., attenuated exponentially) in the direction of the propagation axis. In some implementations, the largest dimension of the waveguide cross-sections is between 0.1 and 1.0 centimeters. The largest dimension of a waveguide cross-section can be, for example, the height or width of a rectangular waveguide cross-section, the diameter of a circular waveguide cross-section, the major axis of an elliptical waveguide cross-section, etc.

In some examples, the intersecting waveguides form a lattice, and the waveguide intersections are arranged as a multi-dimensional array within the lattice. The lattice structure of the intersecting waveguides can be defined by a first subset of waveguides extending in a first dimension of the electromagnetic waveguide system (e.g., in the "x" direction of a Cartesian coordinate system) and a second subset of the waveguides extending in a second dimension of the electromagnetic waveguide system (e.g., in the "y" direction of a Cartesian coordinate system) to form a two-dimensional array of waveguide intersections. In some cases, a third subset of the waveguides extend in a third dimension of the electromagnetic waveguide system (e.g., in the "z" direction of a Cartesian coordinate system) to form a three-dimensional array of waveguide intersections. The intersecting waveguides may intersect at right angles, or they may intersect at non-right (acute or obtuse) angles. In some implementations, the distance between the waveguide intersections in a two-dimensional or three-dimensional array is in the range of 0.2 to 2.0 centimeters.

The devices within the electromagnetic waveguide system 104 can be arranged within the waveguide lattice, with the devices forming one or more multi-dimensional device arrays within the electromagnetic waveguide system 104. For example, the qubit devices 144, the coupler devices 142, the readout devices 146, or a subset or combination of them can form a two-dimensional array or a three-dimensional array within the electromagnetic waveguide system 104. A device array can be aligned with the array of waveguide intersections, between the waveguide intersections, or a combination of these and other locations. Two examples of how qubit devices and coupler devices may be arranged in a system of intersecting waveguides are shown in FIGS. 5A and 5B. The devices within the quantum processor cell 102A may be arranged in another configuration.

In some implementations, the coupler devices 142 are housed between neighboring pairs of the qubit devices 144, and the readout devices 146 are housed near the qubit devices 144. The qubit devices 144 can be controlled individually, for example, by delivering qubit control signals to the individual qubit devices 144. The qubit devices 144 can interact with each other, for example, through the coupler devices 142. The interactions between neighboring qubit devices 144 can be controlled, for example, by delivering coupler control signals to the individual coupler devices 142. The readout devices 146 can detect the states of the qubit devices 144, for example, by interacting directly with the respective qubit devices 144. The readout operations performed by the readout devices 146 can be controlled, for example, by delivering readout control signals to the individual readout devices 146.

The example signal board 140 can provide mechanical support for the coupler devices 142, the qubit devices 144 and the readout devices 146. The interior surface of the electromagnetic waveguide system 104 may also provide direct or indirect mechanical support for the coupler devices 142, the qubit devices 144 and the readout devices 146. The signal board 140 also includes signal lines that route control signals and readout signals between the devices and the connector hardware. In the example shown in FIG. 2, the signal board 140 includes signal lines that communicate qubit control signals from the QPC input connector hardware 136 to the individual qubit devices 144, readout control signals from the QPC input connector hardware 136 to the individual readout devices 146, and coupler control signals from the QPC input connector hardware 136 to the individual coupler devices 142. The example signal board 140 also includes signal lines that communicate qubit readout signals from the individual readout devices 146 to the QPC output connector hardware 138.

Figure 10A:
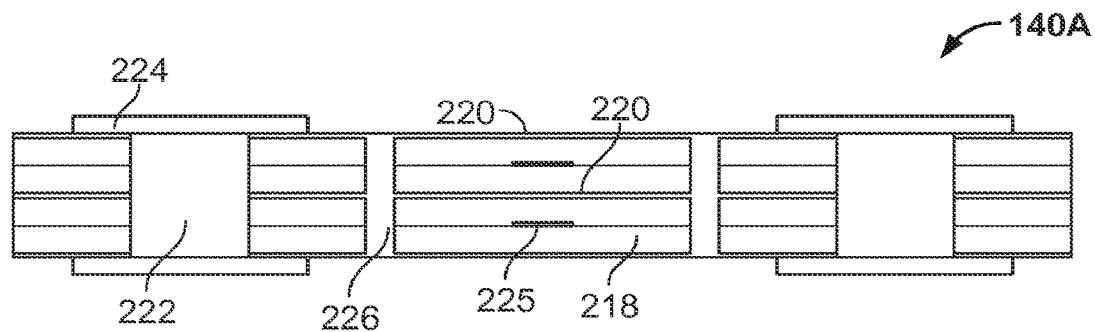
FIGS. 10A-10B show aspects of the signal board in the example QPC of FIG. 9.
Figure 10B:
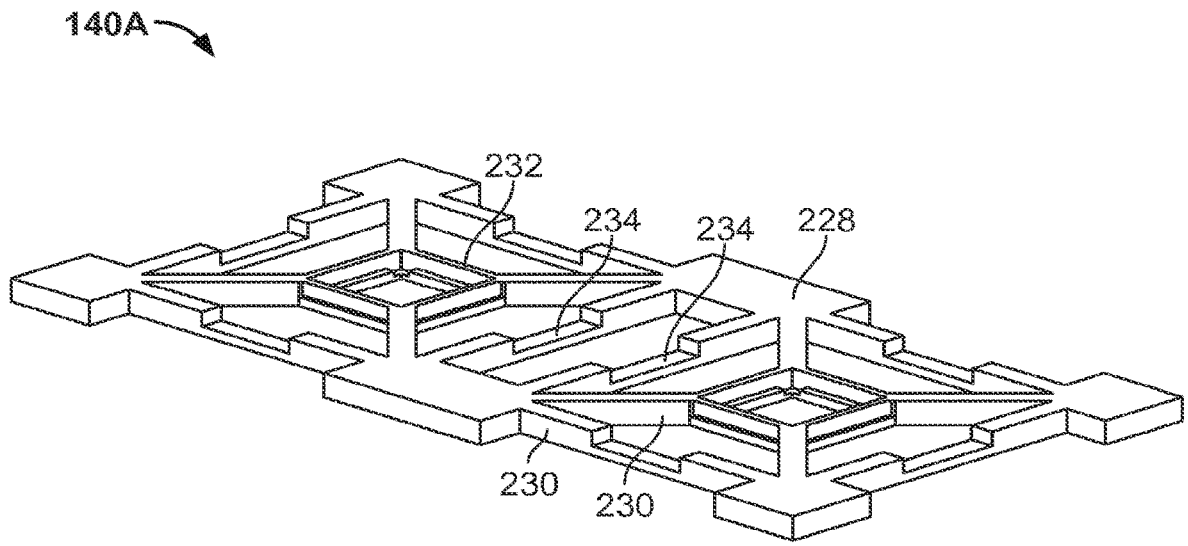

The example signal board 140 can include receptacles that hold the respective devices within the device array, and the signal board 140 can include arms that mechanically connect the receptacles to each other or to other portions of the signal board. Examples of features that may, in some implementations, be included in a signal board are shown in FIGS. 10A-10B and others. The signal board 140 can be implemented, for example, as a layered structure that includes multiple layers of insulating material and multiple layers of conducting or superconducting material (or both). For example, the signal lines of the signal board 140 can be formed by conductive strips between layers of insulating material in the signal board 140. The signal board 140 can include vias between conducting layers separated by insulating layers. The insulating materials can include printed circuit boards materials or substrates (e.g., silicon, sapphire, fused quartz, diamond, beryllium oxide (BeO), aluminum nitride (AlN), or others).

In the example shown in FIG. 2, the qubit devices 144 can each be used to encode and store a single bit of quantum information. Each of the qubit devices 144 has two eigenstates used as computational basis states ("0" and "1"), and each qubit device 144 can transition between its computational basis states or exist in an arbitrary superposition of its basis states. The quantum state of the qubit devices 144 can be manipulated by qubit control signals provided by the signal delivery system 106A. An example of a qubit device is the transmon qubit shown in FIG. 3B. Other types of qubit devices may also be used.

In some examples, each qubit device has a fixed qubit operating frequency that is defined by an electronic circuit of the qubit device. For instance, a qubit device (e.g., a transmon qubit) may be implemented without a superconducting SQUID loop. In some examples, the operating frequency of a qubit device is tunable, for example, by application of an offset field. For instance, a qubit device (e.g., a fluxonium qubit) may include a superconducting SQUID loop that is tunable by application of magnetic flux. A qubit device can be driven at its qubit operating frequency (or in some cases, at another frequency) to manipulate the quantum state of the qubit. For example, a single-qubit gate can be applied to a qubit by applying a pulse that is configured to perform the single-qubit gate.

The readout devices 146 can be used to probe the quantum states of the qubit devices 144. The readout devices 146 can be operatively coupled to individual qubit devices 144. In some examples, each readout device is capacitively coupled to exactly one qubit device. The readout device can be housed on a common chip or in a common structure with the associated qubit device, or the readout device can be formed on a separate chip or in a separate structure from the qubit device.

In some examples, each readout device has a resonance that depends on the quantum state of its associated qubit device. For example, the resonance frequency of a particular readout device can indicate the quantum state of the associated qubit device. The readout device can be probed by a readout control signal, and the readout device can produce a qubit readout signal in response to the readout control signal. The properties of the qubit readout signal can indicate one of the two computational basis states of the associated qubit device. For instance, the readout device can produce a qubit readout signal by reflecting the readout control signal with additional information. The additional information can be, for example, a frequency shift, a phase shift, an amplitude shift, or a combination of these and other modifications, that indicates the state of the associated qubit device.

In some implementations, solid state qubit devices can be realized from individual atoms or ions, individual electron or nuclear spins, charge- or spin-based quantum dots, superconducting quantum circuits based on Josephson junctions, impurities and defects in diamond or silicon carbide, or other types of systems. Superconducting qubits with Josephson junctions can be embedded within a resonator for shielding and isolation and to provide a linear resonant mode coupled to the qubit for purposes of qubit readout. The resonator may be formed from a two-dimensional transmission line segment, for example, a coplanar waveguide geometry, or a microstrip geometry. The resonator may be formed as a lumped or quasi-lumped element resonator, or the resonator may be realized as a rectangular waveguide cavity, formed of a shorted (closed on both ends) section of a waveguide transmission line.

In some implementations, the example coupler devices 142 allow the qubits to be selectively coupled on-demand, to perform multi-qubit gates, to entangle neighboring pairs of qubits, or to perform other types of operations. The coupler devices 142 can have a high "on/off" ratio, which refers to the ratio of the coupling rate provided by the coupler device when the coupler device is in its ON state versus its OFF state. In some examples, the coupler devices 142 are implemented by a flux-based qubit, such as, for example, the fluxonium coupler shown in FIG. 3C. Other types of coupler devices may be used.

In some implementations, the coupling strength provided by each coupler device 142 can be tuned by coupler control signals communicated into the quantum processor cell. For instance, the coupling strength of an individual coupler device 142 can decreased (e.g., to zero or substantially to zero) to place the coupler device in its OFF state, or the coupling strength of an individual coupler device 142 can be increased to place the coupler device in its ON state. Here, the coupling strength between the qubit devices determines the rate of coupling between the qubit devices.

In some examples, the coupling strength of the electromagnetic interaction between qubit devices varies with an offset field experienced by the coupling device that produces the electromagnetic interaction. For example, the coupler device may have a coupler operating frequency that varies with the offset field experienced by the coupling device, and the coupling operating frequency may influence the coupling strength of the electromagnetic interaction between the neighboring pair of qubit devices. In such examples, the coupling strength can be modified by tuning the coupler operating frequency. In some examples, the coupler device may have another operating parameter (e.g., a capacitance or inductance) that varies with the offset field experienced by the coupling device, and the operating parameter may influence the coupling strength of the electromagnetic interaction between the neighboring pair of qubit devices. In such examples, the coupling strength can be modified by tuning one or more of the relevant operating parameter (e.g., the capacitance, inductance, etc.).

In some examples, each coupler device has a tunable coupler operating frequency. For example, the coupler operating frequency can be tuned by applying an offset field to the coupler device. The offset field can be, for example, a magnetic bias field, a DC electrical voltage, or another type of constant field. To turn the coupler device "on," the coupler device can be tuned to a particular coupler operating frequency and driven at a drive frequency to increase the coupling rate between the neighboring pair of qubits. To turn the coupler device "off," the coupler device can be tuned to a different frequency that does not strongly interact with the neighboring qubit devices.

As a particular example, a coupler device may include a superconducting quantum interference device (SQUID) loop whose resonance frequency determines the coupling strength of the electromagnetic interaction between the neighboring pair of qubit devices. For instance, the coupling strength may be increased by setting the resonance frequency of the SQUID loop in a frequency range near the resonance frequency of either qubit device. In such examples, the resonance frequency of the SQUID loop can be tuned by controlling the amount of magnetic flux experienced by the SQUID loop. Thus, manipulating the magnetic flux can increase or decrease the resonance frequency of the SQUID loop, which in turn influences the coupling strength provided by the coupler device. In this example, the magnetic flux through the SQUID loop is an offset field that can be modified in order to tune the coupler resonance frequency. For instance, the coupler device can include an inductor that is coupled to the SQUID loop by a mutual inductance. Thus, the magnetic flux through the SQUID loop can be controlled by the DC component of the current through the inductor. In some cases, the coupling strength is controlled by both AC and DC components of the coupler control signal.

In some implementations, coupler devices that are tunable by application of an offset field are used with qubit devices that do not respond to offset fields. This may allow the coupler devices to be selectively activated by an offset field that does not disturb the information encoded in the qubit device. For instance, although the offset field may cause the coupler device to produce an electromagnetic interaction between neighboring qubit devices, the offset field does not directly interact with the qubit device or disturb the quantum state of the qubit device even if the qubit device experiences the offset field. Thus, the combination of tunable couplers with fixed-frequency qubit devices may allow selective, on-demand coupling of qubit devices while improving performance of the qubit devices. For example, the fixed-frequency qubit devices may have longer coherence times, may be more robust against environmental or applied offset fields, etc.

In some instances, information is encoded in the qubit devices 144, and the information can be processed by operation of the qubit devices and the coupler devices. For instance, input information can be encoded in the computational states or computational subspaces defined by some of all of the qubit devices 144. The information can be processed, for example, by applying a quantum algorithm or other operations to the input information. The quantum algorithm may be decomposed as gates or instruction sets that are performed by the qubit devices and coupler devices over a series of clock cycles. For instance, a quantum algorithm may be executed by a combination of single-qubit gates and two-qubit gates. In some cases, information is processed in another manner. Processing the information encoded in the qubit devices produces output information that can be extracted from the qubit devices. The output information can be extracted, for example, by performing state tomography or individual readout operations. In some instances, the output information is extracted over multiple clock cycles or in parallel with the processing operations.

In some instances, the quantum computing system 100A operates based on a clock cycle or another type of synchronization scheme. For example, a quantum algorithm or quantum computing task may be expressed as a sequence of instructions corresponding to quantum gates, readouts, or other operations on the qubit devices 144, and a subset of the instructions can be executed on each clock cycle. In some instances, on each clock cycle, the control system 110A generates control signals to implement a subset of instructions, control signals are delivered to the quantum processor cell 102A, and qubit readout signals are delivered to the control system 110A. The control signals delivered on each clock cycle can be configured, for example, based on the sequence of instructions, based on readout signals from a previous cycle, quantum error correction operations, error matching calculations, other information, or a combination of these.

Various implementations of the quantum computing system 100A are described below, including various alternatives for its subsystems and their respective components along with various methods for operating the quantum computing system 100A and its subsystems.

Figure 3D:
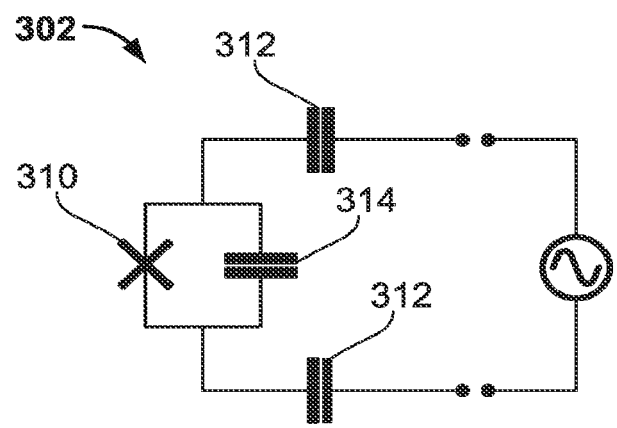

FIGS. 3A-3E show aspects of example devices in a device array 148 that may be housed in a quantum processor cell and used to perform quantum operations. Here, the device array 148 includes a subset of the qubit devices 144, their corresponding readout devices 146 and a subset of the coupler devices 142 that may be housed in the example quantum processor cell 102A. FIG. 3A shows an equivalent circuit for a portion of the device array 148 that includes qubit devices 144-$j$ and 144-($j$+1), corresponding readout devices 146-$j$ and 146-($j$+1), and a tunable coupler device 142-($j,j$+1) disposed between the qubit devices 144-$j$ and 144-($j$+1). In some cases, the quantum processor cell 102A may be implemented using other types of qubit devices, readout devices and coupler devices. In the examples shown in FIGS. 3A-3E, both of the qubit devices 144-$j$ and 144-($j$+1) are capacitively coupled to the coupler device 142-($j,j$+1) by respective differential capacitances 150-$j$ and 150-($j$+1). Also, each of the qubit devices 144-$j$ and 144-($j$+1) is capacitively coupled to its respective readout device 146-$j$ and 146-($j,j$+1) by respective differential capacitances 152-$j$ and 152-($j$+1). The qubit devices and coupler devices may be implemented by other types of systems, and the features and components represented in FIG. 3A can be extended in a larger two-dimensional or three-dimensional array of devices.

Write signals (e.g., coupler control signals, qubit control signals, readout control signals, etc.) can be transmitted from the input signal processing system 128, through the signal board 140, to various input ports of the device array 148. In some implementations, the same port can be used for both write signals (received by a device) and readout signals (reflected by a device). The example shown in FIG. 3A can be adapted to include input ports that are distinct from the output ports. For instance, the readout resonators can be connected in transmission instead of reflection (as shown in FIG. 3A), and the input ports (that receive readout control signals from the input signal processing system) can be distinct from the output ports (that send qubit readout signals to the output signal processing system).

An example input port is shown in FIG. 3A as a coupler control input port 154-($j,j$+1). In this manner, the tunable coupler device 142-($j,j$+1) is inductively coupled, at the coupler control input port 154-($j,j$+1), to a source of coupler control signals. Other examples of input ports are shown in FIG. 3A as the qubit+readout control port 156-$j$ and the qubit+readout control port 156-($j$+1). In this manner, each of the readout devices 146-$j$ and 146-$j$+1 is capacitively coupled, by the respective qubit+readout control ports 156-$j$ and 156-($j$+1), to a source of qubit control signals and a source of readout control signals. Additionally, readout signals (e.g., qubit readout signals) are received by the output signal processing system 130, through the signal board 140, from various output ports in the device array 148. In the example device array 148 shown in FIG. 3A, the qubit+readout control ports 156-$j$ and 156-($j$+1) may operate as output ports. Other types of input and output ports may be used.

In the example shown in FIG. 3A, each of the qubit devices 144-$j$, 144-($j$+1) includes a Josephson junction (represented by the symbol "X" in FIG. 3A) and a shunt capacitance. FIG. 3B shows an example implementation of a qubit device 144 as a transmon qubit 158. FIG. 3D shows an equivalent circuit 302 for the example transmon device shown in FIG. 3B. The transmon qubit 158 is an example of a charge qubit and includes a substrate 162 (e.g., formed from sapphire, silicon, etc.) that supports a superconducting thin film 164 (e.g., formed from aluminum, niobium, etc.). The example transmon qubit 158 shown in FIG. 3B includes a Josephson junction 160A and a shunt capacitance. In this example, the shunt capacitance is formed in a topologically closed manner to reduce far-field coupling and spurious qubit couplings to non-adjacent couplers and non-neighboring qubits. A differential capacitance of the inner electrode 166 and the outer electrode 168 of the example transmon qubit 158 to an electrode of an adjacent device (e.g., a coupler device, a readout device, or a qubit+readout control port) forms an effective input capacitance 150 or 152 for capacitively coupling the transmon qubit 158 to the adjacent device or to an input port or to an output port. In other implementations of the device array 148, the qubit devices 144-$j$, 144-($j$+1) can be configured as flux qubits (e.g., as fluxonium qubits) or another type of qubit device. In some cases, the transmon qubit 158 can be fabricated, for example, by double-angle evaporation of thin-film aluminum onto a sapphire or silicon substrate, or by another fabrication process.

As shown in the equivalent circuit 302 in FIG. 3D, the transmon device includes a Josephson junction 310 and a shunt capacitance 314. The shunt capacitance 314 can be formed in a topologically closed manner, for instance, to reduce far-field coupling and spurious qubit couplings to non-adjacent couplers and non-neighboring qubits. The effective input capacitance 312 can be formed by a differential capacitance of the inner electrode 166 and the outer electrode 168 of the transmon to a nearby electrode, which may be a control electrode or a coupling electrode.

In the example shown in FIG. 3A, the coupler circuitry of the tunable coupler device 142-($j,j$+1) includes a Josephson junction (represented by the symbol "X" in FIG. 3A), a shunt inductance and a shunt capacitance. The tunable coupler device 142-($j,j$+1) also includes bias circuitry (connected to the coupler control input port 154-($j,j$+1)) that is configured to apply an offset field to the coupler circuitry. In particular, the bias circuitry includes an inductor that has a mutual inductance with the coupler circuitry. In the example shown, the magnetic flux generated by the bias circuitry controls a resonance frequency of the coupler circuitry of the tunable coupler device 142-($j,j$+1).

In the example shown in FIG. 3A, the resonance frequency of the coupler circuitry in the coupler device 142-($j,j$+1) determines the coupling strength of the electromagnetic interaction between the neighboring pair of qubit devices 144-$j$ and 144-($j$+1). For instance, the coupling strength may be increased by setting the resonance frequency of the coupler circuitry in a frequency range near the resonance frequency of either qubit device 144-$j$, 144-($j$+1). The resonance frequency of the coupler circuitry can be tuned by controlling the amount of magnetic flux experienced by the coupler circuitry. Thus, manipulating the magnetic flux can increase or decrease the resonance frequency of the coupler circuitry, which in turn influences the coupling strength provided by the coupler device 142-($j,j$+1). In this example, the magnetic flux through coupler circuitry is an offset field that can be modified in order to tune the coupler resonance frequency. Because the inductor in the bias circuitry has a mutual inductance with the coupler circuitry, the magnetic flux through the coupler circuitry can be controlled by the DC component of the current through the inductor. In some instances, the coupling strength is controlled by both the AC and DC components received through the coupler control input port 154-(j,j+1).

Figure 3E:
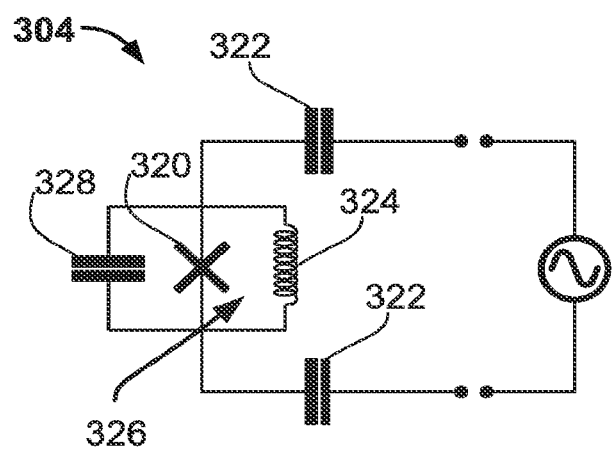

FIG. 3C shows an implementation of a coupler device 142 as a fluxonium coupler 170. FIG. 3E shows an equivalent circuit 304 for the example fluxonium device shown in FIG. 3C. The example fluxonium coupler 170 shown in FIG. 3C includes a substrate 172 (e.g., formed from silicon, sapphire, etc.) that supports a superconducting thin film 174 (e.g., formed from aluminum, niobium, etc.). The example fluxonium coupler 170 includes a Josephson junction 160B, a shunt inductance and a shunt capacitance connected in parallel and forming a loop 176. A magnetic flux signal 178 can be applied to the loop 176. A differential capacitance 150 across the Josephson junction 160B may be formed of a topologically closed capacitance where an inner island 180 is encircled by an outer island 182. The differential capacitance 150 can provide a charge-coupling control port to an adjacent qubit device 144. In other implementations of the device array 148, a coupler device can be configured as a charge qubit (e.g., as a transmon qubit), a parametric frequency converter controlled by one or more microwave pump signals, or another type of device. In some cases, the fluxonium coupler 170 can be fabricated, for example, by double-angle evaporation of thin-film aluminum onto a sapphire substrate, or by another fabrication process.

As shown in the equivalent circuit 304 in FIG. 3E, the fluxonium device includes a Josephson junction 320, a shunt inductance 324 and a shunt capacitance 328 connected in a loop to which a magnetic flux signal 326 can be applied. The magnetic flux signal 326 can be applied to the loop, for example, by applying a DC signal to bias circuitry that has a mutual inductance with the loop. The input capacitance 322 across the Josephson junction 320 can provide a charge-coupling control port. The charge-coupling control port may be formed of a topologically closed capacitance, for instance, where the inner island 180 is encircled by the outer island 182. In some implementations, a control or coupling port can be realized by coupling the device with a differential capacitance with respect to these two islands to a nearby electrode.

Various example techniques for operating devices of the device array 148 to encode information in the qubit devices, to implement one-qubit gate operations or multi-qubit gate operations, or to perform other operations based on instructions received from control system 110A, are described below.

Figure 4A:
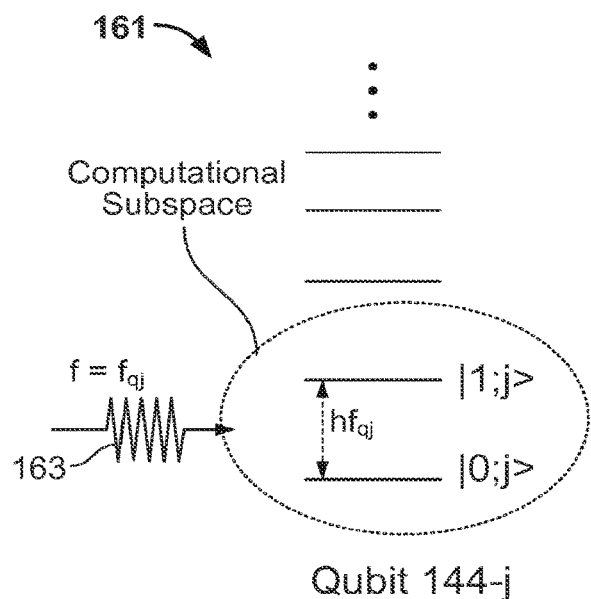
FIGS. 4A-4E show example attributes and operations of devices that may be included in an example quantum processor cell.

FIG. 4A is an example energy level diagram 161 that shows aspects of operating a qubit device 144-j using an example qubit control signal 163 (also referred to as a write signal). In some implementations, other types of qubit control signals (e.g., signals at other frequencies, etc.) can be used to operate the qubit device 144-j. In some instances, the qubit control signal 163 can be applied to the qubit+readout control port 156-j of the example device array 148 shown in FIG. 3A, for example, to manipulate a quantum state of the qubit device 144-j. The example qubit device 144-j has a fixed qubit operating frequency fq-j that is defined by an electronic circuit of the qubit device (e.g., electronic circuits of qubit devices shown in FIGS. 3A-3E). The qubit operating frequency fq-j is independent of an offset electromagnetic field (e.g., applied or environmental magnetic flux, or applied or environmental current or voltage) experienced by the qubit device 144-j. The example qubit device 144-j has two computational basis states ("0" and "1"). The qubit device can exist in either of its computational basis states or any arbitrary superposition of its basis states. A frequency of the example qubit control signal 163 is set to the qubit operating frequency fq-j, such that the qubit control signal 163 causes transitions between the computational basis states of the qubit device 144-j. In some instances, the qubit control signal 163 is configured to perform a particular single-qubit gate, to encode input information, or to execute another operation by manipulating an amplitude or phase (or both) of the qubit control signal 163.

Figure 4B:
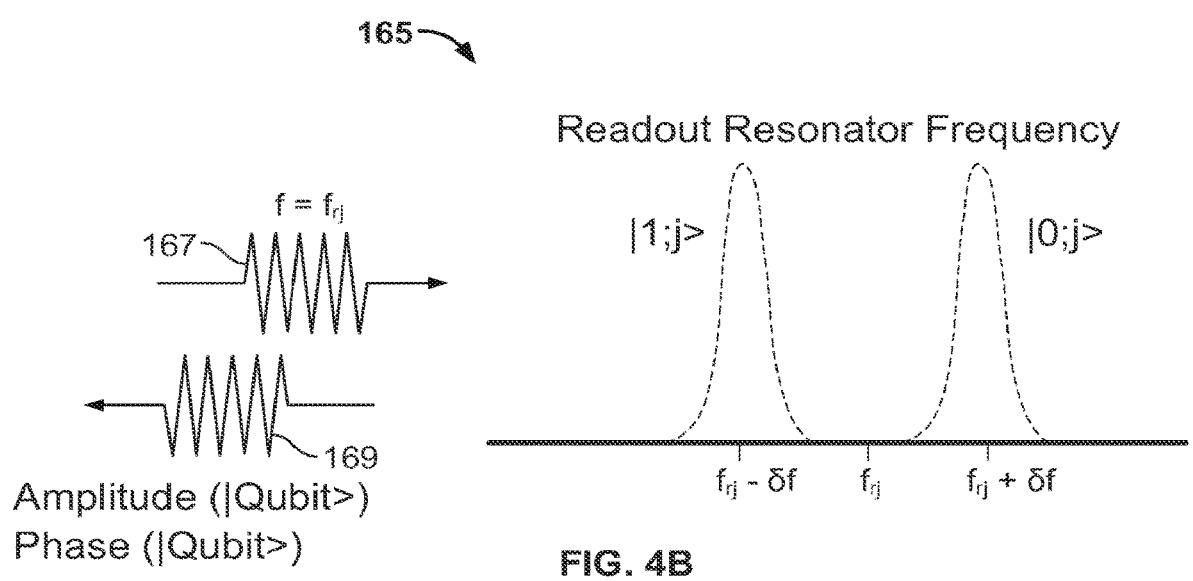

FIG. 4B shows an example frequency diagram 165 for the example readout device 146-j associated with a qubit device 144-j. In some instances, a readout control signal 167 (also referred to as a read signal) can be applied to the qubit+readout control port 156-j of the device array 148 shown in FIG. 3A. The readout device 146-j has a resonant circuit tuned to a resonant frequency fr that is different from the qubit operating frequency fq-j of the qubit device 144-j to which it is associated. In some implementations, the qubit operating frequency can be less than the readout frequency (fq-j<fr). In some implementations, the qubit operating frequency can be greater than the readout frequency (fq-j>fr). When the frequency of the readout control signal 167 is set to the resonant frequency fr, which is different from qubit operating frequency fq-j, the readout control signal 167 probes a state of the qubit device 144-j, which can project the state of the qubit onto one of its two computational basis states.

In some examples, the qubit readout signal 169 produced by the readout device is a frequency-shifted instance of the readout control signal 167, and the frequency-shifted signal is reflected by the resonant circuit of the readout device 146-j. For instance, the readout device 146-j can produce the qubit readout signal 169 by reflecting the readout control signal 167 with a frequency shift of ±δf. In the example shown, a frequency shift of +δf indicates that the qubit device is in the "0" computational basis state, and a frequency shift of −δf indicate that the qubit device is in the "1" computational basis state. In some examples, the qubit readout signal 169 produced by the readout device is a phase-shifted instance of the readout control signal 167. For instance, the readout device 146-j can produce the qubit readout signal 169 by reflecting the readout control signal 167 with a phase shift of ±δφ, where a phase shift of +δφ indicates that the qubit device is in the "0" computational basis state, and a frequency shift of −δφ indicate that the qubit device is in the "1" computational basis state.

In some implementations, the qubit readout signal 169 is reflected back out the same qubit+readout control port 156-j. In other implementations, the qubit readout signal 169 is redirected to a different, output port of the readout device 146-j. In this manner, characteristics of the qubit readout signal 169 measured at the qubit+readout control port 156-j or at another output port can be used to determine the state of the qubit device 144-j. For example, measurements of a magnitude and a phase shift of the qubit readout signal 169 relative to the readout control signal 167 can indicate of a state of the qubit device 144-j. In some instances, measurements of a change in amplitude or a change in phase of the qubit readout signal 169 relative to the readout control signal 167 indicate the state of the qubit device 144-j.

Figure 4C:
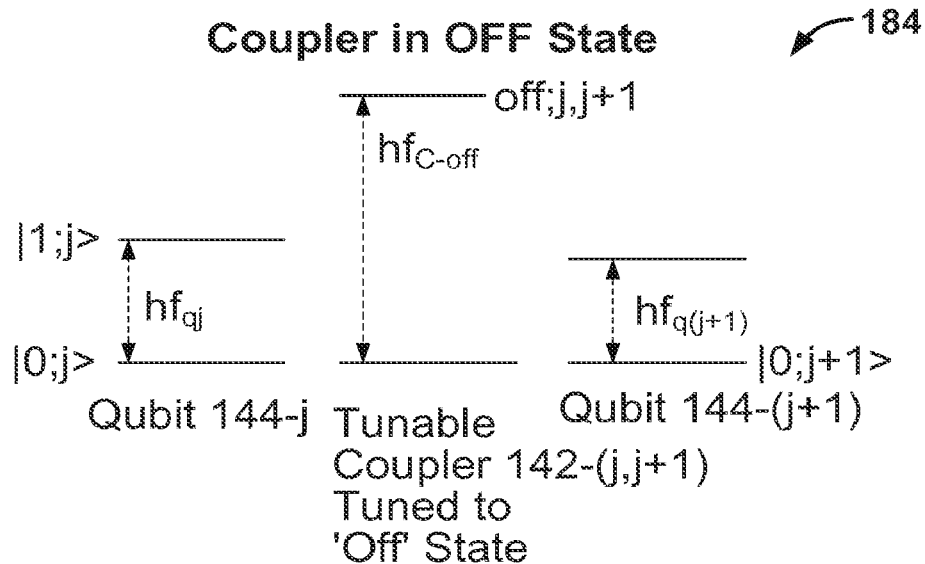
Figure 4D:
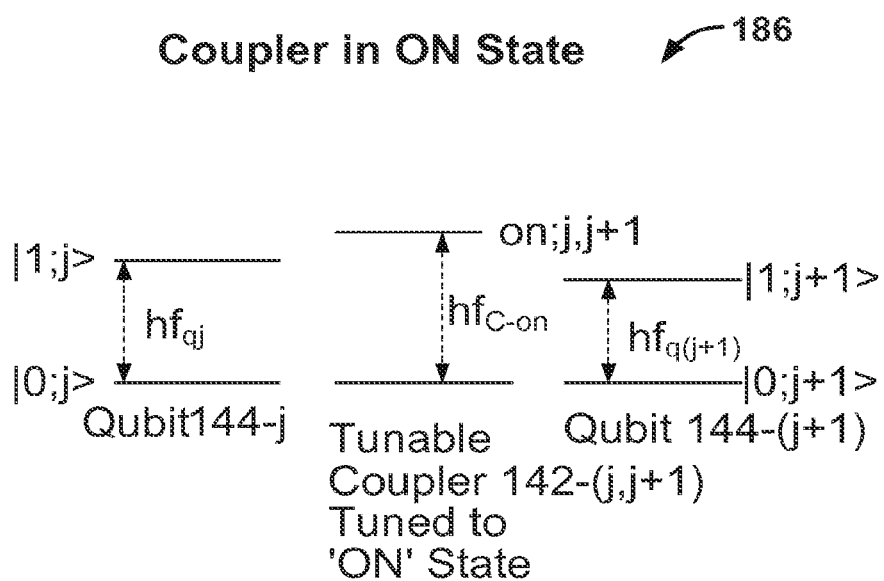

FIGS. 4C-4D show aspects of operating an example tunable coupler device 142-(j,j+1) to couple adjacent qubit devices 144-j and 144-(j+1). Here, the qubit operating frequencies fq-j, fq-(j+1) of the adjacent qubit devices 144-j and 144-(j+1) are different from each other. As described above, each of the qubit devices 144-j and 144-(j+1) has two computational basis states ("0" and "1"). The tunable coupler device 142-(j,j+1) disposed between the qubit devices 144-j and 144-(j+1) is configured to generate an electromagnetic interaction between the qubit devices 144-$j$ and 144-($j$+1). In this manner, the tunable coupler device 142-($j,j$+1) allows the qubit devices 144-$j$ and 144-($j$+1) to be selectively coupled on-demand, to perform multi-qubit gates, to entangle the pair of qubit devices 144-$j$ and 144-($j$+1), or to perform other types of operations. Here, the tunable coupler device 142-($j,j$+1) has a high "on/off" ratio, which refers to the ratio of the coupling rate provided by the tunable coupler device 142-($j,j$+1) when the coupler device is in its ON state versus its OFF state.

Figure 4E:
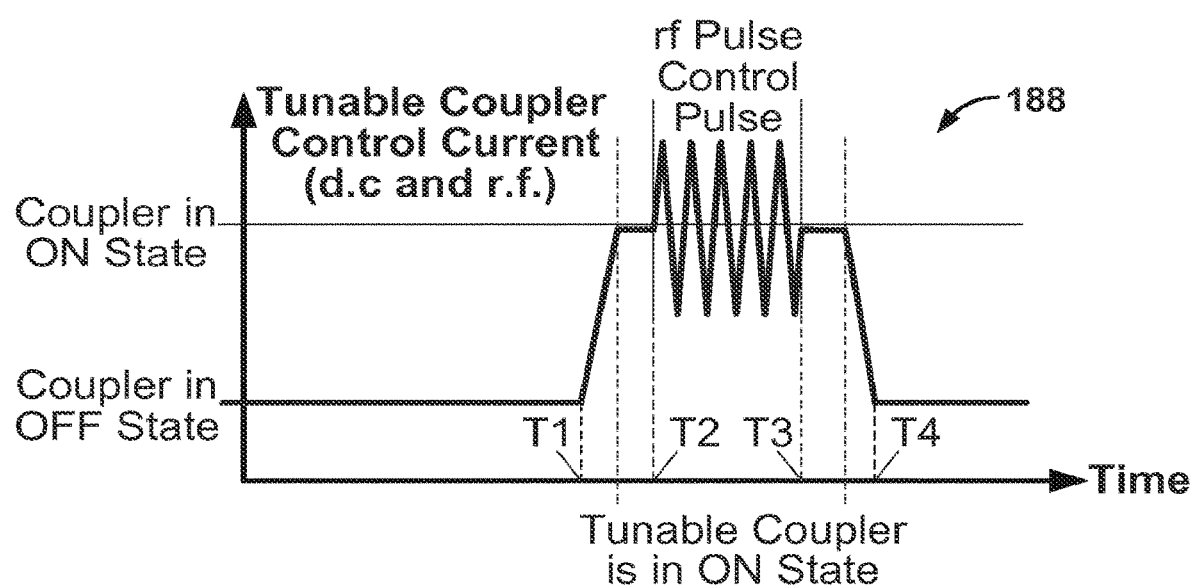

FIG. 4C shows an example energy level diagram 184 for an example coupler device in its OFF state, and FIG. 4D shows an example energy level diagram for the example coupler device in its ON state. FIG. 4E shows an example coupler control signal 188 that can control operation of the example coupler device. A coupler device may have other features or attributes, and may operate in another manner.

The example energy level diagram 184 shown in FIG. 4C represents a portion of the device array 148 when the tunable coupler device 142-($j,j$+1) is tuned to its OFF state. In its OFF state, the tunable coupler device 142-($j,j$+1) is operated at a frequency (fc-off) that is higher than either of the qubit operating frequencies fq-j, fq-(j+1). With the coupler device 142-($j,j$+1) in its OFF state, the coupling strength (and therefore, the rate of coupling) between the adjacent qubit devices 144-$j$ and 144-($j$+1) is low because of the mismatch between fc-off and either of the qubit operating frequencies fq-j, fq-(j+1). For example, when the coupler device 142-($j,j$+1) is in the OFF state, the coupling between the adjacent qubit devices 144-$j$ and 144-($j$+1) can be a second- or third-order interaction. Thus, the example tunable coupler device 142-($j,j$+1) is said to be in its OFF state when operated at fc-off.

The example energy level diagram 186 shown in FIG. 4D represents the same portion of the device array 148 when the tunable coupler device 142-($j,j$+1) is tuned to its ON state. In its ON state, the tunable coupler device 142-($j,j$+1) is operated at a frequency fc-on that is tuned near one of the qubit operating frequencies fq-j or fq-(j+1). With the coupler device 142-($j,j$+1) in its ON state, the coupling strength (and therefore, the rate of coupling) between the adjacent qubit devices 144-$j$ and 144-($j$+1) is high because fc-on matches or is tuned near one of the qubit operating frequencies fq-j or fq-(j+1). For example, when the coupler device 142-($j,j$+1) is in the ON state, the coupling between the adjacent qubit devices 144-$j$ and 144-($j$+1) can be a first-order interaction. Thus, the example tunable coupler device 142-($j,j$+1) is said to be in its ON state when operated at fc-on.

FIG. 4E shows time dependence of an example coupler control signal 188 that can be used to operate the tunable coupler device 142-($j,j$+1). In some instances, the coupler control signal 188 can be applied to the coupler control input port 154-($j,j$+1) of the example device array 148 shown in FIG. 3A. As shown in FIG. 4E, before a time T1, the tunable coupler device 142-($j,j$+1) is operated at the operational frequency fc-off and, hence, it is in its OFF state. When the tunable coupler device 142-($j,j$+1) is in its OFF state, the coupling rate of the adjacent qubit devices 144-$j$ and 144-($j$+1) is low due to the low coupling strength. For instance, in some examples, the coupling rate can be in the range of approximately 50 kHz or less. As shown in FIG. 4E, at time T1 a bias (or offset) component of the coupler control signal 188 is applied at the coupler control input port 154-($j,j$+1), which causes the tunable coupler device 142-($j,j$+1) to transition into its ON state. The bias component can be, for example, a bias current that creates a magnetic bias field (e.g., flux 178 through the loop 176 shown in FIG. 3C). From the time T1 to a later time T4, the tunable coupler device 142-($j,j$+1) is operated at operational frequency fc-on and, hence, it is in its ON state. When the tunable coupler device 142-($j,j$+1) is in its ON state, the coupling rate for the adjacent qubit devices 144-$j$ and 144-($j$+1) is higher due to the higher coupling strength. For instance, in some examples, the coupling rate can be in the range of approximately 200 kHz to 2 MHz or more. At an intermediate time T2 (where T1<T2<T4) an AC (alternating current) component of the coupler control signal 188 is superposed with the bias component, at the coupler control input port 154-($j,j$+1), to increase the rate of coupling between the adjacent qubit devices 144-$j$ and 144-($j$+1). Here, the AC component of the coupler control signal 188 is a radio frequency (RF) or microwave frequency current, and the AC component is maintained until an intermediate time T3 (where T2<T3<T4), forming a pulse of duration T3–T2. In some instances, the frequency of the pulse can be at or near either a sum of the neighboring qubit operating frequencies (i.e., (fq-j)+(fq-(j+1))) or a difference of the neighboring qubit operating frequencies (i.e., (fq-j)–(fq-(j+1))). In this manner, a high rate of coupling between the adjacent qubit devices 144-$j$ and 144-($j$+1) can be maintained over the duration (T3–T2) of the AC component. For instance, in some examples, the coupling rate can be in the range of approximately 5 MHz to 500 MHz. At time T3, the AC component of the coupler control signal 188 is removed, which reduces the coupling strength between the adjacent qubit devices 144-$j$ and 144-($j$+1). Between time T3 and time T4, the coupler control signal 188 continues to have the bias component, so the tunable coupler device 142-($j,j$+1) remains in its ON state. At T4, the bias component of the coupler control signal 188 is removed, which causes the tunable coupler device 142-($j,j$+1) to return to its OFF state. After T4, the tunable coupler device 142-($j,j$+1) is operated at operational frequency fc-off and, hence, remains in its OFF state.

Figure 14A:
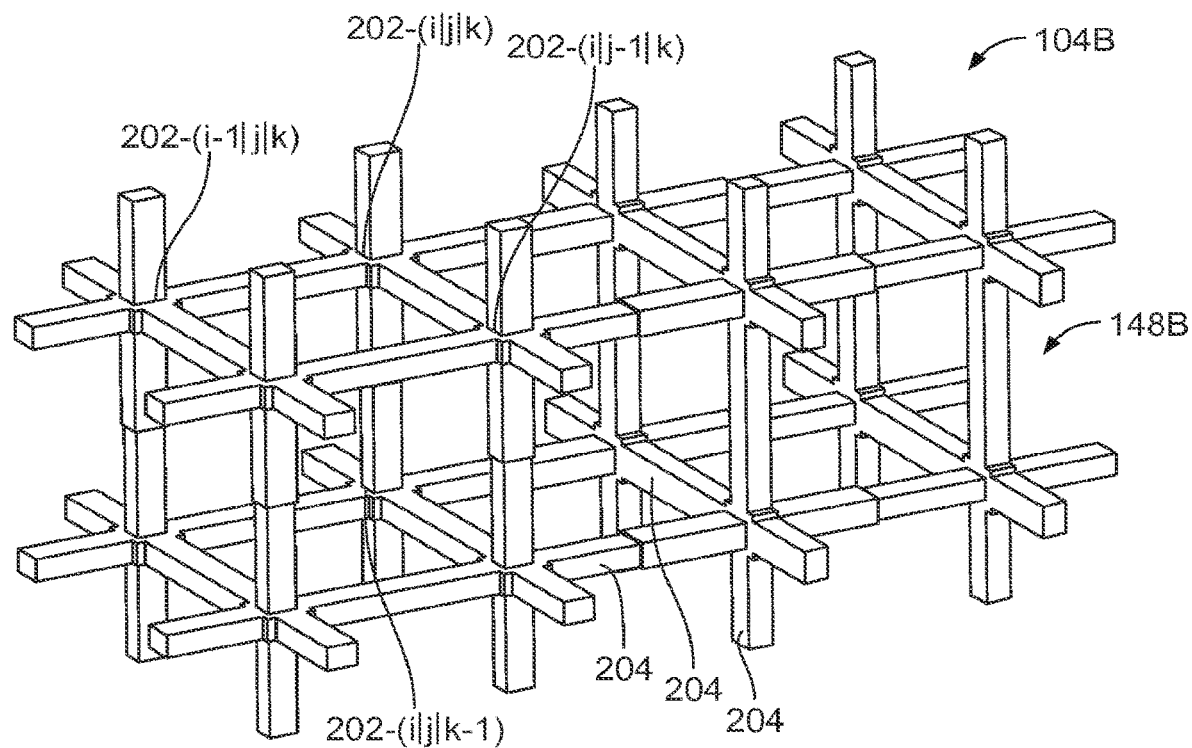
FIG. 14A shows a portion of an interior volume of an example electromagnetic waveguide system that includes a 3D lattice of intersecting waveguides.
Figure 15:
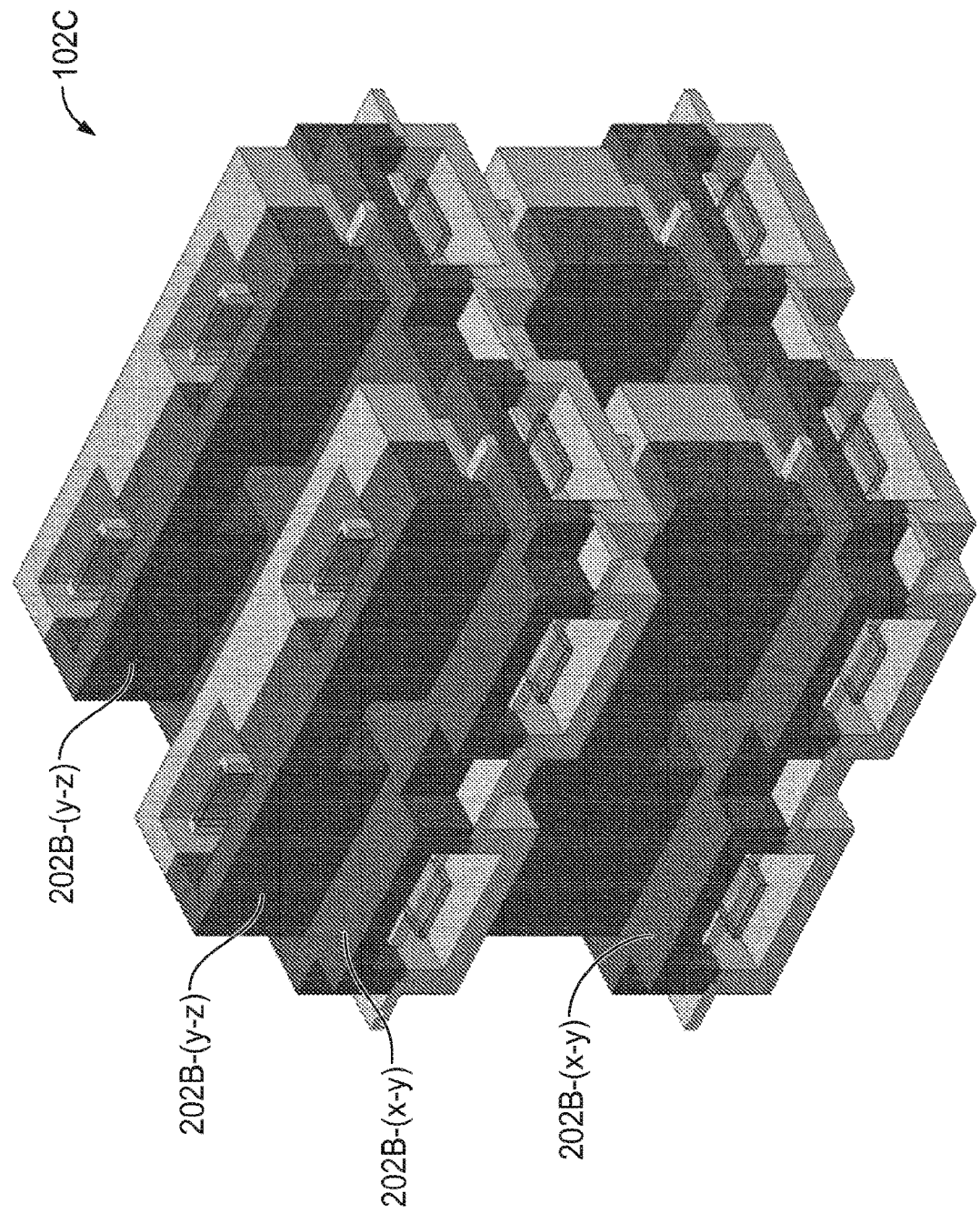
FIG. 15 shows an example electromagnetic waveguide system that includes a 3D lattice of intersecting waveguides.

All or part of the portion of the example device array 148 illustrated in FIG. 3A can be copied multiple times, as a unit cell, to extend the device array 148 along a path (e.g., along x-axis of a Cartesian coordinate system), on a surface (e.g., x-y plane of a Cartesian coordinate system) or in space (e.g., as layers parallel to x-y plane that are distributed along a z-axis of a Cartesian coordinate system). For example, fault-tolerant quantum computing can be achieved by implementing gate-based models in a two-dimensional (2D) device array 148A that includes a large number of nearest-neighbor-coupled qubit devices 144. In some cases, a 2D device array 148A can allow each qubit device 144 to be independently controlled and measured without introducing crosstalk or errors on other qubit devices 144 in the 2D device array 148A. In some instances, nearest-neighbor pairs of qubit devices 144 in the 2D device array 148A can be addressable with two-qubit gate operations capable of generating entanglement, independent of all other such pairs in the 2D device array 148A. As another example, fault-tolerant quantum computing can likewise be performed, and possibly advantaged, in a three-dimensional (3D) device array 148B (e.g., as shown in FIGS. 14A and 15) that includes a large number of nearest-neighbor-coupled qubit devices 144.

In some implementations, to carry out large-scale, fault tolerant quantum computing, at least some of the following technical features can be provided in the example device arrays described here. One such feature is the delivery of control signals to qubit devices 144 and tunable coupling devices 142 of a 2D device array 148A or a 3D device array 148B, and another such feature is the extraction of measurement signals from the qubit devices 144 being performed with low-crosstalk of the applied signals from target qubit devices to non-target qubit devices. Another such feature is the shielding and isolation of the qubit device 144-j from external noise, from the external environment, and from each other qubit device 144-(j+k) in the 2D device array 148A or the 3D device array 148B to which the qubit device 144-j is not specifically coupled (k≠0 or ±1) for performing a two-qubit gate. Yet another such feature is the ability to sustain coherence of individual and entangled quantum states of the qubit devices 144 of the 2D device array 148A or the 3D device array 148B.

In some instances, to achieve one or more of the above-noted features or other advantages, the 2D device array 148A or the 3D device array 148B can be embedded in an electromagnetic waveguide system 104 that includes a lattice of intersecting waveguides. Here, the lattice of intersecting waveguides is geometrically commensurate with the 2D device array 148A or the 3D device array 148B. Moreover, the intersecting waveguides are configured such that electromagnetic modes of the waveguides are evanescent with respect to relevant operating frequencies fq-j of the qubit devices 144-j and fc-on/fc-off of adjacent tunable coupler devices 142-(j,j±1) that control their respective coupling with nearest-neighbor qubit devices 144-(j±1). In this manner, the lattice of intersecting waveguides can provide high (e.g., exponential) electromagnetic isolation between nearest-neighbor array sites (j,j+1). Moreover, individual qubit devices 144 in the 2D device array 148A or the 3D device array 148B can be shielded and isolated from all but their nearest-neighbors, and all qubit devices 144 can be isolated from the external electromagnetic environment. Additionally, apertures formed in the walls of the lattice of intersecting waveguides can provide ports to inject or extract (or both) electromagnetic signals for control or measurement (or both).

Multiple example arrangements of the 2D device array 148A or the 3D device array 148B within an electromagnetic waveguide system 104 that includes a lattice of intersecting waveguides are described below.

FIGS. 5A and 5B are schematic diagrams of example systems 200A and 200A', respectively, each of which includes an electromagnetic waveguide system 104A that defines a 2D lattice of intersecting waveguides. Here, a subset of the waveguides in the 2D lattice (e.g., the waveguides oriented along the x-axis of a Cartesian coordinate system) intersect another subset of the waveguides in the 2D lattice (e.g., the waveguides oriented along the y-axis of the Cartesian coordinate system) at intersections 202 (also referred to as nodes). Moreover, the waveguides form intervals (also referred to as bonds) 204 between the intersections 202.

In the example illustrated in FIG. 5A, the system 200A includes a device array 148A arranged within the 2D lattice of intersecting waveguides defined by the electromagnetic waveguide system 104A. The device array 148A is an example of a 2D device array, where qubit devices 144A are placed at nodes of the device array 148A and coupler devices 142A are placed along the bonds (between the nodes) of the device array 148A. In this manner, the device array 148A forms rows of devices (e.g., along the x-axis of a Cartesian coordinate system) and columns of devices (e.g., along the y-axis of a Cartesian coordinate system). The device array 148A also is referred to as the 2D device array 148A. Each qubit device 144A of the example 2D device array 148A has four adjacent coupler devices 142A and four nearest-neighbor qubit devices 144A. Moreover, each of the coupler devices 142A of the example 2D device array 148A has two adjacent qubit devices 144A.

In the example shown in FIG. 5A, the bonds of the 2D device array 148A have the same size and orientation as the intervals 204 of the 2D lattice of intersecting waveguides; thus, the 2D device array 148A is commensurate to the 2D lattice of intersecting waveguides. Here, the example 2D device array 148A is aligned with the 2D lattice of intersecting waveguides such that the nodes of the 2D device array 148A coincide with the intersections 202 of the 2D lattice of intersecting waveguides. In this manner, qubit devices 144A of the 2D device array 148A are placed inside the electromagnetic waveguide system 104A at intersections 202 of the 2D lattice of intersecting waveguides, and coupler devices 142A of the 2D device array 148A are placed inside the electromagnetic waveguide system 104A along intervals 204 (between intersections 202) of the 2D lattice of intersecting waveguides. In some implementations, the distance between each adjacent pair of qubit devices 144A in the 2D device array 148A is in the range of 0.2 to 2.0 centimeters. In the example device array 148A shown in FIG. 5A, each coupler device 142A is operably coupled between a single pair of neighboring qubit devices 144A, and each neighboring pair of qubit devices 144A is operably coupled by a single coupler device 142A.

In the example illustrated in FIG. 5B, the system 200A' includes a device array 148A' arranged within the 2D lattice of intersecting waveguides of the electromagnetic waveguide system 104A. The example device array 148A' is an example of a 2D device array, where coupler devices 142B are placed at nodes of the device array 148A' and qubit devices 144B are placed along bonds (between the nodes) of the device array 148A'. In this manner, the device array 148A' forms rows of devices (e.g., along the x-axis of a Cartesian coordinate system) and columns of devices (e.g., along the y-axis of a Cartesian coordinate system). The device array 148A' is also referred to as the 2D device array 148A'. Each coupler device 142B of the example 2D device array 148A' has four adjacent qubit devices 144B. Moreover, each qubit device 144B of the example 2D device array 148A' has two adjacent coupler devices 142B, and six other qubit devices 144B are also adjacent to the two adjacent coupler devices 142B.

In the example shown in FIG. 5B, the bonds of the 2D device array 148A' have the same size and orientation as the intervals 204 of the 2D lattice of intersecting waveguides; thus, the 2D device array 148A' is commensurate to the 2D lattice of intersecting waveguides. Here, the 2D device array 148A' is aligned with the 2D lattice of intersecting waveguides such that the nodes of the 2D device array 148A' coincide with the intersections 202 of the 2D lattice of intersecting waveguides. In this manner, coupler devices 142B of the 2D device array 148A' are placed inside the electromagnetic waveguide system 104A at intersections 202 of the 2D lattice of intersecting waveguides, and qubit devices 144B of the 2D device array 148A' are placed inside the electromagnetic waveguide system 104A along intervals 204 (between intersections 202) of the 2D lattice of intersecting waveguides. In some implementations, the distance between each adjacent pair of coupler devices 142B in the 2D device array 148A' is in the range of 0.2 to 2.0 centimeters. In the example device array 148A shown in FIG. 5A, each coupler device 142A is operably coupled between a single pair of neighboring qubit devices 144A, and each neighboring pair of qubit devices 144A is operably coupled by a single coupler device 142A.

In some implementations, the arrangement of the devices in the device array corresponds to a multi-dimensional device lattice, where the device lattice includes unit cells extending along each dimension. For instance, the devices shown in FIGS. 5A and 5B are arranged as a two-dimensional device lattice, where each unit cell of the device lattice includes one or more qubit devices and one or more coupler devices. In some cases, each unit cell of the device lattice can include one or more readout devices. Each unit cell in a two-dimensional device array can include one or more rows and one or more columns of devices.

In some cases, two-dimensional lattices (e.g., either of those shown in FIG. 5A or 5B, or others) can be extended into three dimensions. For instance, the lattice that forms the example device array 148A can be extend to three dimensions by forming layers of the example device array 148A, with additional coupler devices between the nearest neighbor qubit devices of adjacent layers; or the example device array 148A' can be extend to three dimensions by forming layers of the example device array 148A' with additional qubit devices between the nearest neighbor coupler devices of adjacent layers. Each unit cell in a three-dimensional device array can include one or more rows, one or more columns, and one or more layers of devices.

In some implementations, the device lattice can be aligned in a multi-dimensional waveguide lattice formed by intersecting waveguide sections. For instance, each unit cell of the device lattice can be housed in section of the electromagnetic waveguide system that corresponds to one or more unit cells of the waveguide lattice.

Figure 6B:
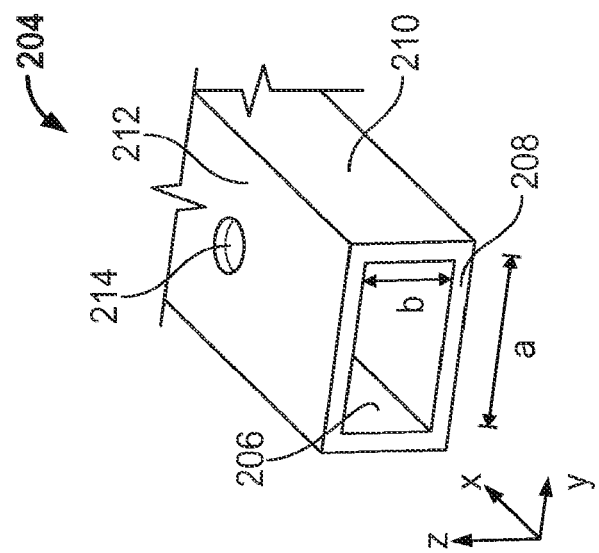
FIGS. 6A-6B show aspects of an example electromagnetic waveguide system that includes a 2D lattice of intersecting waveguides.
Figure 6A:
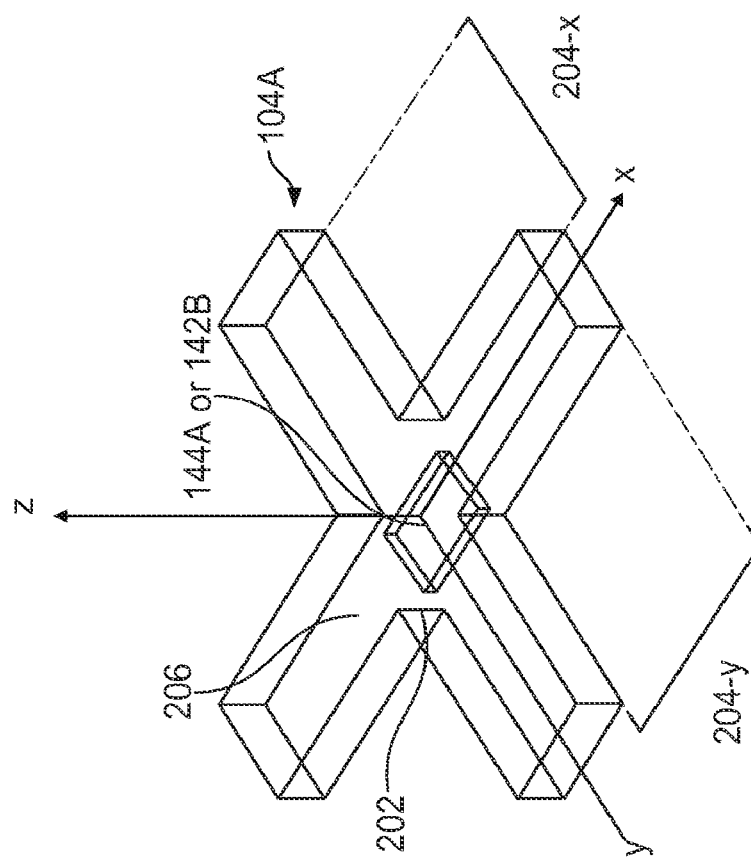

FIG. 6A shows a portion of the interior volume 206 of an example electromagnetic waveguide system 104A. In particular, FIG. 6A shows a portion of the electromagnetic waveguide system 104A where two waveguides intersect at a waveguide intersection 202. In the example shown, a first of the two waveguides includes two intervals **204-*x* oriented along the x-axis, and a second of the two waveguides includes two intervals 204-*y* oriented along the y-axis. In some instances, a qubit device 144A of the 2D device array 148A or a coupler device 142B of the 2D device array 148A' can be placed at the example waveguide intersection 202**.

FIG. 6B shows a close-up view of an example interval 204 of a waveguide. In this example, the waveguide interval 204 is formed by a base 208, two opposing side walls 210 and a lid 212. As shown in FIG. 6B, the base 208 has an upper surface that is parallel to the x-y plane and defines a lower boundary of a portion of the interior volume 206. As shown in FIG. 6B, the two side walls 210 include vertical side surfaces that are orthogonal to the base 208 and parallel to each other, and the side walls 210 define side boundaries of a portion of the interior volume 206. As shown in FIG. 6B, the lid 212 has a lower surface that is parallel to and opposes the upper surface of the base 208; the lower surface of the lid 212 defines an upper boundary of a portion of the interior volume 206. In this manner, the base 208, the side walls 210 and the lid 212 partially enclose the interior volume 206 and define a cross section of the example interval 204. In the example shown, the cross-section of each waveguide interval 204 is at least partially defined by opposing pairs of right and left side walls (provided by the side walls 210), and opposing pairs of upper and lower side walls (provided by the upper surface of the base 208 and the lower surface of the lid 212). At each waveguide intersection 202, the right and left sidewalls of the waveguide that extends along the x-axis meets the right and left sidewalls of the waveguide that extends along the y-axis. The base 208, the side walls 210 and the lid 212 can be formed from a conductor material, a superconductor material or a combination thereof.

The base 208, the side walls 210 and the lid 212 can be formed in a number of different ways, for example, as an assembly of multiple components or as an integrated structure. In some implementations, the base 208, the side walls 210 and the lid 212 can be formed as a micro-machined silicon wafer device, for example, from one or more wafers etched and coated with thin film superconductor material such as aluminum or niobium. In some implementations, the base 208, the side walls 210 and the lid 212 can be formed from bulk superconducting metal machined to form the base, lid, and sidewalls of the electromagnetic waveguide system. In some implementations, the base 208 and the side walls 210 can be formed as a single component that is then assembled to another component that includes the lid 212; or the lid 212 and the side walls 210 can be formed as a single component that is then assembled to another component that includes the base 208; or the base 208, the side walls 210, and the lid 212 can be formed as a layered or laminated structure.

One or more of the base 208, the side walls 210 or the lid 212 can include an aperture from the interior volume 206. In some cases, the apertures are openings through the interior surface that defines the interior volume 206. In some examples, apertures are located adjacent to the regions where qubit devices or coupler devices reside. In the example illustrated in FIG. 6B, an aperture 214 is provided through the lid 212 that defines the example interval 204. Apertures may additionally or alternatively be provided in the base 208 or side walls 210.

In some instances, control signals can be transmitted, through the aperture 214, from a signal source located outside the electromagnetic waveguide system 104A to a qubit device 144A/144B or a coupler device 142A/142B located inside the interval 204. Similarly, in some instances, readout signals can be transmitted, through the aperture 214, from a readout device associated with the qubit device 144A/144B located inside the interval 204 to a signal receiver located outside the electromagnetic waveguide system 104A. Apertures can also be provided at other locations. For example, apertures may additionally or alternatively be located adjacent to waveguide intersections 202 or at other locations in the electromagnetic waveguide system.

In the examples shown in FIGS. 6A and 6B, the waveguides defined by the electromagnetic waveguide system 104A have rectangular cross-sections. As shown in FIG. 6B, the example rectangular cross-section of the interval 204 has a width "a" along the y-axis and a height "b" along the z-axis. In the example shown, the largest transverse dimension determines a frequency fc of the lowest frequency mode that can propagate through the interval 204 of the waveguide. The frequency fc is referred to as the cutoff frequency fc of the waveguide. In this manner, signals having frequencies above the cutoff frequency (f>fc) can propagate through the waveguide, while signals having frequencies below the cutoff frequency (f<fc) evanesce in the waveguide. For this reason, signals having frequencies below the cutoff frequency (f<fc) that are injected into the waveguide through the aperture 214 will be attenuated (e.g., exponentially) inside the waveguide from the aperture 214. For example, for a waveguide with rectangular cross-section having dimensions a=0.5 cm and b=0.3 cm, the cutoff frequency is approximately 30 GHz (fc≈30 GHz). In some examples, the waveguides have other dimensions and cutoff frequencies in other ranges.

In some implementations, a diagonal cross-section of the waveguide intersection 202 of two intersecting waveguides has a transverse dimension a√2 which determines a minimum frequency (denoted fmin) that is smaller than the cutoff frequency fc of the interval 204 (i.e., fmin<fc). In the foregoing example, where dimensions of the waveguide with rectangular cross-section are a=0.5 cm and b=0.3 cm, the minimum frequency corresponding to the waveguide intersection 202's diagonal cross-section mode is approximately 24 GHz (fmin≈24 GHz).

Figure 7:
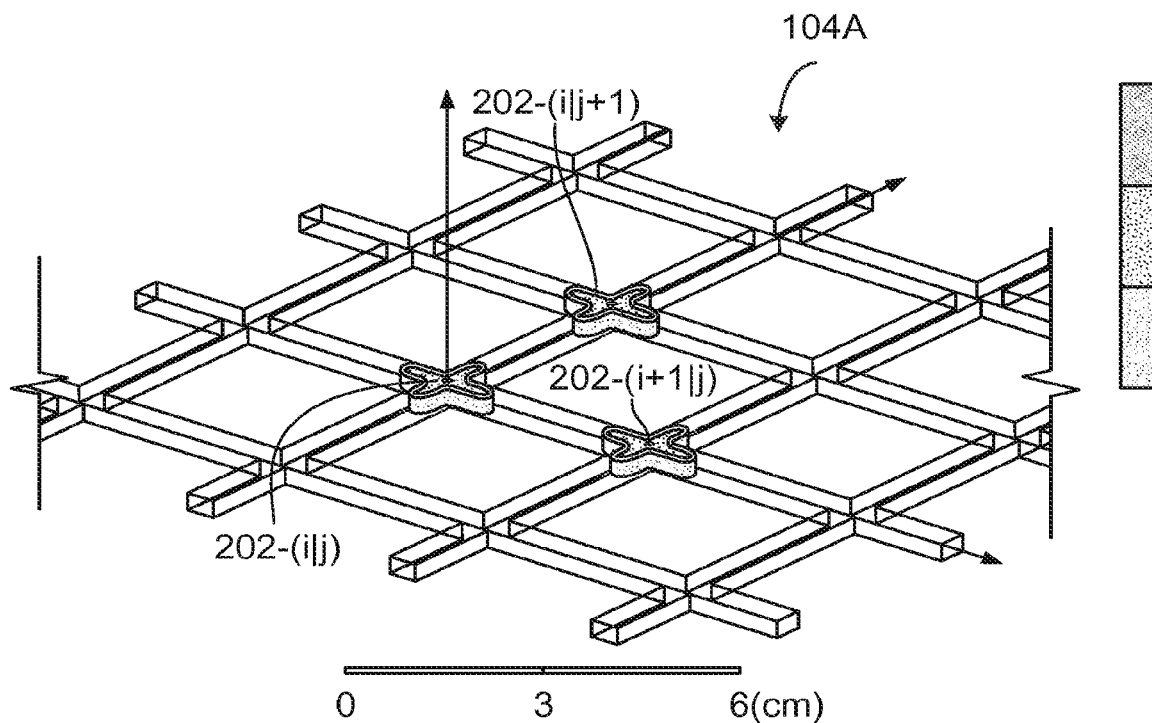
FIG. 7 shows electromagnetic properties at example waveguide intersections in a 2D lattice of intersecting waveguides.

FIG. 7 shows a portion of the interior volume of the example electromagnetic waveguide system 104A. In the example shown, the electromagnetic waveguide system includes a first subset of waveguides i=1, 2, . . . oriented along the x-axis of a Cartesian coordinate system that intersect a second subset of waveguides j=1, 2, . . . oriented along the y-axis of the Cartesian coordinate system. The waveguides intersect at a 2D array of intersections 202-($i|j$) shown in FIG. 7. In the example shown, signals having frequencies below the minimum frequency (f≤fmin) that are injected into the electromagnetic waveguide system 104A through apertures located at a group of nearest-neighbor intersections, e.g., 202-($i|j$), 202-($i|j$+1) and 202-($i$+1|j), remain localized at the intersections where they are injected.

In some implementations, signals can be strongly localized to individual waveguide intersections 202 if the signals' frequencies are between zero and the minimum frequencies defined by the waveguide intersections 202, i.e., in the range of f=0 to f=fmin<fc, where fmin is a frequency of the lowest-lying resonant mode of the waveguide intersections 202, and fc is the cutoff frequency of the intervals 204. In some implementations, disorder in the coupling strength between waveguide intersections 202 of the 2D lattice can be added by slightly altering the lateral dimensions of the waveguide crossings or otherwise introducing small perturbations of the frequencies of the modes. In some instances, localization of spurious resonant modes at fmin can be further increased by dissipation in the waveguide intervals 204 connecting the intersections 202.

In the example shown in FIG. 7, the shading at the waveguide intersections 202-($i|j$), 202-($i|j$+1) and 202-($i$+1|j) represents the spatial distribution of the electromagnetic field strength for electromagnetic waves introduced into the interior volume of the example waveguide system 104A at the respective waveguide intersections 202-($i|j$), 202-($i|j$+1) and 202-($i$+1|j). In the example shown, the electromagnetic waves are introduced at the frequency (fmin) that corresponds to the lowest-lying resonant mode of the waveguide intersections. The shading in FIG. 7 shows that the resulting electromagnetic field strength drops to essentially zero within a short distance of the respective waveguide intersections 202-($i|j$), 202-($i|j$+1) and 202-($i$+1|j).

As shown in FIG. 7, because the electromagnetic waves have a frequency (fmin) that is less than the cutoff frequency (fc) of the waveguide intervals 204, the electromagnetic waves do not propagate in the waveguide intervals 204. In particular, the waveguide intervals 204 evanesce electromagnetic waves below the cutoff frequency (fc). In the example shown, the field strength drops significantly in each direction from the respective waveguide intersections 202-($i|j$), 202-($i|j$+1) and 202-($i$+1|j). In some instances, when an electromagnetic wave is evanesced by a waveguide structure, the electromagnetic field strength drops exponentially along the main axis of the waveguide structure.

In the example shown in FIG. 7, the waveguide intervals 204 have a width of 0.5 cm and a height of 0.3 cm; the waveguide intervals 204 define a cutoff frequency (fc) of 29.98 GHz; and the waveguide intersections 202 define a lowest-lying resonant mode frequency (fmin) of 24.42 GHz. Signals introduced at or below the cutoff frequency (fc) correspond to evanescent modes of the waveguide intervals 204, and therefore, the waveguide intervals 204 suppress all such signals. In the example shown, signals having the frequency fmin are introduced at the waveguide intersections 202-($i|j$), 202-($i|j$+1) and 202-($i$+1|j), and the signal strength becomes negligible within a short distance of each respective waveguide intersection. In the particular example shown, the electromagnetic field strength drops by approximately nine orders of magnitude (from $1.33(10)^9$ to below $(10)^0$) before reaching the midpoint of the adjacent waveguide interval 204.

In some implementations, the devices housed in the electromagnetic waveguide system 104 have operating frequencies well below the cutoff frequencies of the waveguide intervals, and the electromagnetic signals that control the devices correspond to evanescent modes of the waveguide intervals. Thus, the control signals are evanesced by the waveguide intervals, and they do not spatially propagate within the interior volume of the waveguide system. For instance, the electromagnetic signals introduced at a waveguide intersection can control a device housed at the waveguide intersection without introducing noise at other intersections.

Figure 8:
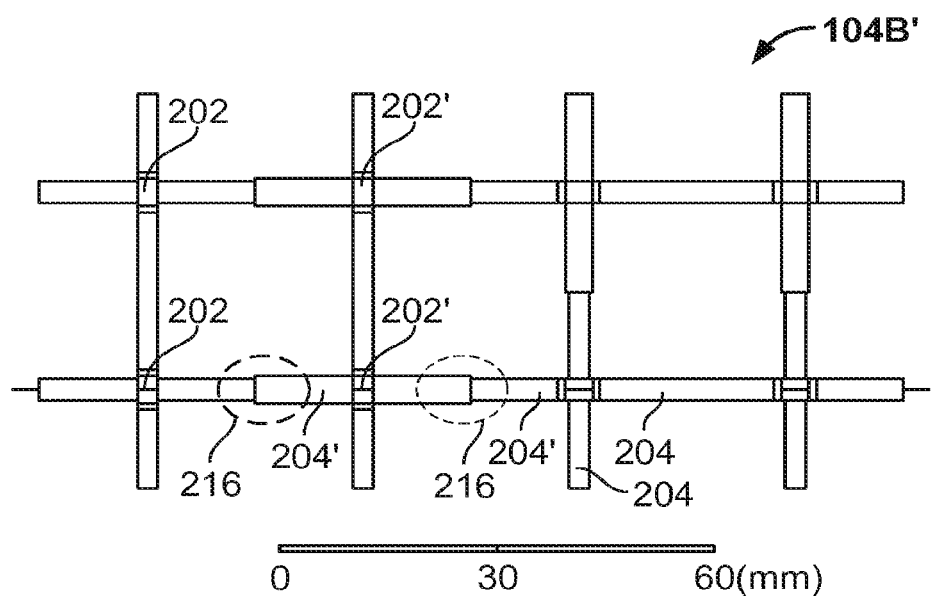
FIG. 8 shows a portion of an interior volume of another example electromagnetic waveguide system that includes a 3D lattice of intersecting waveguides.

FIG. 8 shows a portion of an interior volume of an electromagnetic waveguide system 104B' that includes a 3D lattice of intersecting waveguides in which some of the intersections 202 have a size (along at least one of two rectangular cross-section dimensions) that is different from a size of other the intersections 202'. In the example shown, the interior volume is viewed along one of the Cartesian axes, and the small features at the intersections 202 represent the waveguides extending in or out of the plane of the page. Here, a minimum frequency fmin corresponding to the diagonal cross-section of a first waveguide intersection 202 is different from a minimum frequency fmin corresponding to the diagonal cross-section of another waveguide intersection 202' (i.e., fmin≠fmin). Further, in the example shown in FIG. 8, the 3D lattice of intersecting waveguides includes a subset of intervals 204 that have continuous cross-sections (do not include discontinuities) and another subset of intervals 204' that have cross-section discontinuities 216. At cross-section discontinuities, a size (along at least one of two rectangular cross-section dimensions) of the cross-section of an interval 204' changes discontinuously (e.g., in a stepwise fashion). Here, a cutoff frequency fc corresponding to the cross-section of the interval 204' on one side of the discontinuity 216 is different from a cutoff frequency f c corresponding to the cross-section of the interval 204' on the opposing side of the discontinuity 216 (i.e., fc≠fc).

In some instances, apertures 214 in an interval 204 of a waveguide or at a waveguide intersection 202 may produce sufficient dissipation to provide strong localization of resonant modes. In some implementations, another source of dissipation is the finite loss tangent and resistivity of materials of various devices or components (e.g., a signal board) housed inside the 2D lattice of intersecting waveguides. Additional dissipation in the intervals 204 of the 2D lattice of intersecting waveguides may be added through incorporation of metallic (as opposed to superconducting) segments in the 2D or 3D lattice of intersecting waveguides. Further, localization may be increased in some cases by decoupling intersections 202, for instance, by decreasing the ratio of the waveguide cross section (e.g., the longer dimension of the cross-section) to the length of the interval 204; decreasing the ratio may cause the intersections to be more decoupled.

Figure 9:
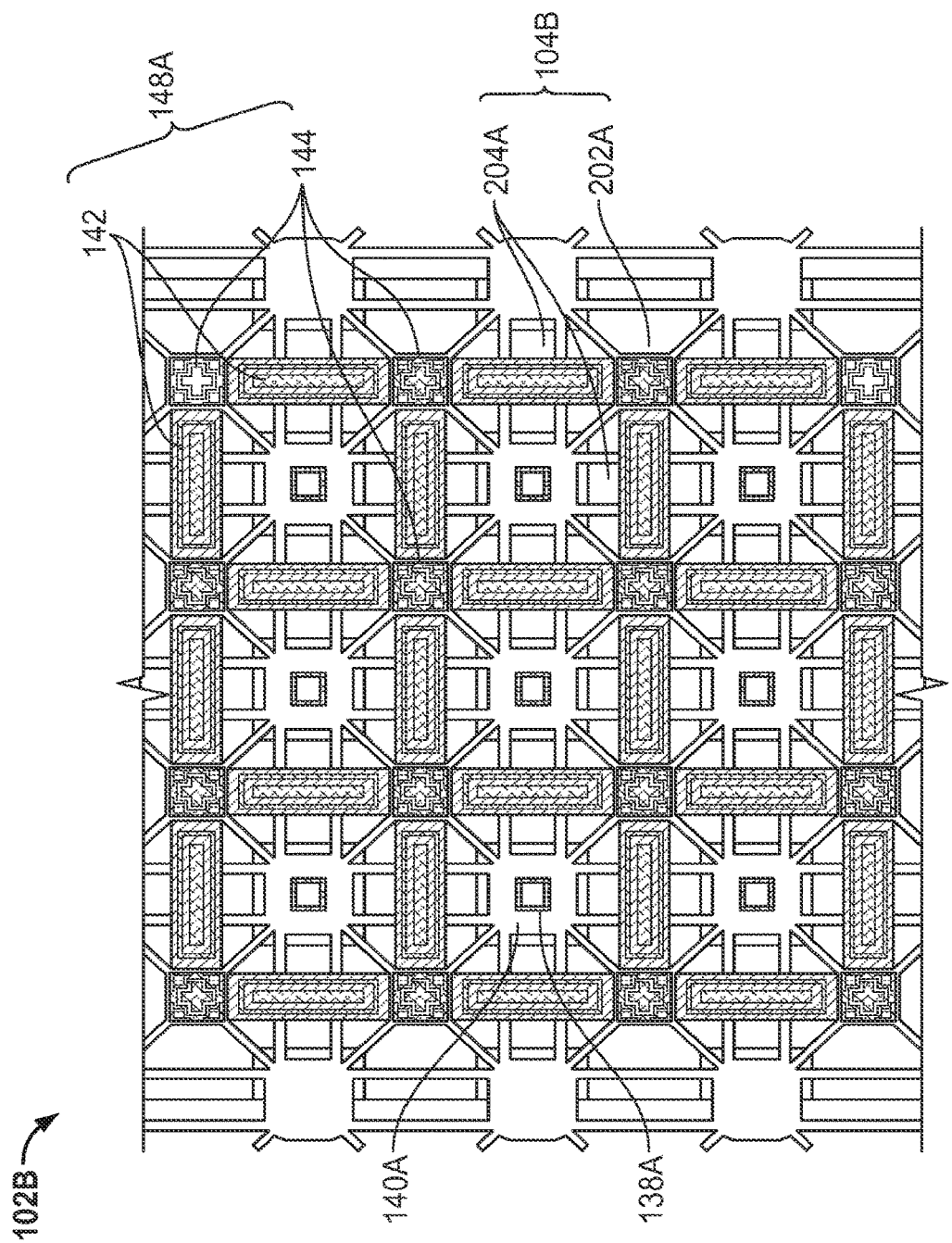
FIG. 9 shows aspects of an example quantum processor cell (QPC) that includes an electromagnetic waveguide system.

In view of the above, the example electromagnetic waveguide system 104A that includes a 2D lattice of intersecting waveguides can provide a high degree (e.g., exponential) isolation of qubit devices 144A/144B of the 2D device array 148A/148A' arranged within the 2D lattice of intersecting waveguides. In some cases, the isolation of the qubit devices can be provided independent of the number of intersections 202 of the 2D lattice of intersecting waveguides and independent of the number and the length of intervals 204 of the 2D lattice of intersecting waveguides. Using the example 2D device array and the example 2D lattice of intersecting waveguides, the example systems 200A/200A' can be used, in some instances, to fabricate large scale quantum processor cells 102 for performing fault tolerant quantum computation with solid state qubit devices 144A/144B and tunable coupler devices 142A/142B. Example implementations of quantum processor cells 102 are described below. Moreover, the concepts can be extended directly to three-dimensions, for example, to provide a high degree of (e.g., exponential) isolation of qubit devices of a 3D device array arranged within a 3D lattice of intersecting waveguides FIG. 9 shows a plan view of a portion of an example quantum processor cell (QPC) 102B. The example QPC 102B represented in FIG. 9 includes an electromagnetic waveguide system 104B that defines a 2D lattice of intersecting waveguides. Here, a subset of the waveguides in the 2D lattice (e.g., the ones oriented along the x-axis of a Cartesian coordinate system) intersect another subset of the waveguides (e.g., the ones oriented along the y-axis of the Cartesian coordinate system) at waveguide intersections 202A. Moreover, the waveguides form intervals 204A between the waveguide intersections 202A. In this manner, signals communicated into the interior volume of the waveguide system are strongly localized to individual waveguide intersections 202A, for example, if the signals' frequencies are between zero and the lowest-lying resonant mode of the intersection, i.e., in the range of f=0 to f=fmin<fc, where fmin is a frequency of the lowest-lying resonant mode of the intersections 202A and fc is the cutoff frequency of the intervals 204A.

The example QPC 102B shown in FIG. 9 includes a 2D device array 148A housed inside the electromagnetic waveguide system 104B. The example 2D device array 148A includes qubit devices 144 located at nodes of the 2D device array 148A and coupler devices 142 located along bonds (between the nodes) of the 2D device array 148A. Further, the example QPC 102B includes a signal board 140A. The example signal board 140A communicates signals to and from the devices of the 2D device array 148A. For instance, the signal board 140A can communicate control signals to the qubit devices and coupler devices, and communicate readout signals from the readout devices. The example signal board 140A also mechanically supports the devices of the 2D device array 148A inside the interior volume of the electromagnetic waveguide system 104B. Further, the example QPC 102B also includes input connector hardware through which control signals can be delivered to the signal board 140A (e.g., from an input signal processing system 128), and output connector hardware 138B through which readout signals can be delivered from the signal board 140A (e.g., to an output signal processing system 130).

In some implementations, signals that are configured to control the qubit devices 144A have frequencies fq, and signals that are configured to control the tunable coupler devices 142A have frequencies ft. In various implementations, the coupler operating frequencies can be larger than the qubit operating frequencies (fq<ft), or the qubit operating frequencies can be larger than the coupler operating frequencies (ft<fq). In the example 2D device array 148A shown in FIG. 9, readout devices associated with respective qubit devices 144A are arranged such that each of the readout devices is collocated with its qubit device at a respective node of the example 2D device array 148A where its qubit device is located. In some examples, signals that are configured to control the readout devices associated with qubit devices 144A have frequencies fr that are higher than both the qubit operating frequencies (fq) and the coupler operating frequencies (ft), such that fq<fr and ft<fr. For these reasons, the devices in the 2D device array 148A are configured such that their operating frequencies and the frequencies (fq, fr and ft) of the control signals that operate them are smaller (e.g., ten times smaller) than fmin. For example, the devices can be configured such that fq<ft<fr<fmin<fc, such that ft<fq<fr<fmin<fc, or in another manner. Thus, in some instances, individual qubit devices 144A in the 2D device arrays 148A are shielded and isolated from all but their nearest-neighbors.

FIG. 10A shows a side cross-sectional view of the example signal board 140A. The example signal board 140A is formed from a multilayer substrate 218. The multilayer substrate 218 of the example signal board 140A can include conducting layers separated by insulating layers. The insulating layers can include, for example, silicon, sapphire, fused quartz, diamond, beryllium oxide (BeO), aluminum nitride (AlN), or others insulative materials. In the example shown, ground planes 220 are formed by metal layers on outer (e.g., top and bottom) surfaces of the multilayer substrate 218 or inner surfaces (e.g., between two or more of the adjacent layers) of the multilayer substrate 218. The example signal board 140A also includes thermalization posts 222 formed through the thickness of the signal board 140A. The example thermalization posts 222 are thermally shorted to the outer and inner ground planes 220 to maintain a bulk of the multilayer substrate 218 at a cryogenic operating temperature. Further, the example signal board 140A includes thermalization post contact areas 224 for application of pressure against additional bulk thermalization materials that may be in contact with the signal board 140A. Furthermore, the example signal board 140A includes signal lines 225. The signal lines can be formed as patterned stripline or buried microstrip or other microwave transmission lines to carry control or readout signals on interior layers of the multilayer substrate 218. Additionally, the example signal board 140A includes signal board vias 226 that are configured to provide electrical contact and thermalization between various layers of the multilayer substrate 218. A signal board may include additional or different features.

FIG. 10B shows a perspective view of the example signal board 140A. As shown in FIG. 10B, the example signal board 140A includes contiguous areas 228, referred to as plateaus, and arms 230 that connect nearest-neighbor plateaus 228 and next-to-nearest-neighbor plateaus 228. Portions of the example signal board 140A between the plateaus 228 and the arms 230 are vacant, such that the arms render the signal board 140A a reticulated aspect. In this example, each plateau has four nearest-neighbor plateaus and four next-to-nearest-neighbor plateaus. In the example shown in FIG. 10B, next-to-nearest-neighbor plateaus are connected through arms that extend diagonally to a qubit receptacle 232, and nearest-neighbor plateaus are directly connected through a pair of arms that define a coupler receptacle 234. The qubit receptacles 232 are each sized to support a qubit device 144 of the 2D device array 148A, and the coupler receptacles are each sized to support a coupler device 142 of the 2D device array 148A. In some implementations, in which readout devices are collocated with respective qubit devices 144, the qubit receptacles 232 are each sized to support a qubit device 144 and its readout device. As shown in FIG. 10B, each of the qubit receptacles 232 includes a perimeter frame that has a stepped inner profile, and is supported by four arms that extend diagonally from a surrounding group of plateaus 228; and each of the coupler receptacles 234 includes a pair of sidewalls defined by a stepped profile of two parallel arms. A signal board can include additional or different features, and the arms, receptacles, and other features of a signal board can be configured in another manner.

FIG. 11A is an exploded view of a portion of the example QPC 102B shown in FIG. 9. The exploded view in FIG. 11A shows that the 2D lattice of intersecting waveguides defined by the example electromagnetic waveguide system 104B is formed from a base portion 236 and a lid portion 238. The base portion 236 includes a base 208A and base wall structures 210A extending vertically from the base 208A. The base wall structures 210A include side surfaces that can be orthogonal to an upper surface of the base 208A. The base wall structures 210A are arranged relative to one another such that their side surfaces form the lower half of the walls that define the waveguide intersections 202A and intervals 204A shown in FIG. 9. Further, the base wall structures 210A include upper ledge surfaces that can be parallel to the upper surface of the base 208A. The base wall structures 210A are further arranged relative to one another such that the plateau portions of the signal board 140A can rest on the upper ledge surfaces of the base wall structures 210A.

Similarly, the lid portion 238 includes a lid 212A and lid wall structures 210B extending vertically from the lid 212A. The lid wall structures 210B include side surfaces that are orthogonal to a lower surface of the lid 212A. The lid wall structures 210B are arranged relative to one another such that their side surfaces form the upper half of the walls that define the waveguide intersections 202A and intervals 204A shown in FIG. 9. Further, the lid wall structures 210B include a lower ledge surface that is parallel to a lower surface of the lid 212A. The lid wall structures 210B are further arranged relative to one another such that the plateau portions of the signal board 140A can be sandwiched between the upper ledge surfaces of the base wall structures 210A and the lower ledge surfaces of the lid wall structures 210B, as shown in FIG. 11B, which is a side cross-sectional view of the example QPC 102B. FIG. 11B also shows that the example base 208A, the wall structures 210A, 210B and the lid 212A of the electromagnetic waveguide system 104B together enclose an interior volume 206 of the 2D lattice of intersecting waveguides.

FIGS. 9 and 11A show that qubit devices 144 and coupler devices 142 of the 2D device array 148A can be supported by the signal board 140A to form rows of devices (e.g., along the x-axis of a Cartesian coordinate system) and columns of devices (e.g., along the y-axis of a Cartesian coordinate system). In this manner, each qubit device 144 of the 2D device array 148A has four adjacent coupler devices and four nearest-neighbor qubit devices. Moreover, each coupler device 142 of the 2D device array 148A has two adjacent qubit devices. Here, separation of the qubit receptacles 232 and coupler receptacles 234 of the signal board 140A are configured such that bonds of the 2D device array 148A have the same size and orientation as the intervals 204A of the 2D lattice of intersecting waveguides; thus, the 2D device array 148A is commensurate to the 2D lattice of intersecting waveguides. Moreover, the signal board 140A is arranged relative to the electromagnetic waveguide system 104B to align the 2D device array 148A to the 2D lattice of intersecting waveguides such that the nodes of the 2D device array 148A coincide with the intersections 202A of the 2D lattice of intersecting waveguides. In this manner, qubit devices 144 of the 2D device array 148A are placed inside the electromagnetic waveguide system 104B at intersections 202A of the 2D lattice of intersecting waveguides, and coupler devices 142 of the 2D device array 148A are placed inside the electromagnetic waveguide system 104B along intervals 204A (between intersections 202A) of the 2D lattice of intersecting waveguides.

In the example shown in FIGS. 11A-11E, the signal board 140A includes signal board vias 226 (shown in FIG. 10A) that form a connection between the base portion 236 and the lid portion 238 of the electromagnetic waveguide system. The holes 242 in the base portion 236 or the lid portion 238 (or both) can provide access to the signal board 140A for sending input signals into the signal board 140A and receiving output signals from the signal board 140A.

FIG. 11C is plan view of the portion of the example QPC 102B shown in FIG. 11A. FIG. 11C shows that at least a portion of the plateaus 228 of the signal board 140A in the example QPC 102B reside outside the interior volume 206 of the electromagnetic waveguide system 104B. In the example shown, the arms 230 that extend between next-to-nearest-neighbor plateaus (and which support qubit receptacles 232) and the arms 230 that extend between nearest-neighbor plateaus (and which define the coupler receptacles 234) pass through the wall structures 210A (which partially define the 2D lattice of intersecting waveguides) through the apertures 240.

In some implementations, control lines extend through all or part of one or more of the arms 230. The control lines can extend in the apertures 240, and in some cases, through the full thickness of the wall. In this manner, a control signal can be communicated into the interior volume 206 of the electromagnetic waveguide system 104B from a plateau 228 through an aperture 240 of the electromagnetic waveguide system 104B. For instance, a control signal can be communicated on a signal line housed in an arm 230 that connects the plateau to a receptacle that supports a device (e.g., a qubit device 144 or a coupler device 142) to which the control signal is addressed. Similarly, a readout signal can be extracted from a qubit device 144 located inside the interior volume 206 of the electromagnetic waveguide system 104B to a plateau 228 through an aperture 240 of the electromagnetic waveguide system 104B. For instance, a readout signal can be communicated on a signal line housed in an arm 230 that connects the qubit device 144 to the plateau 228. In the example shown in FIGS. 11A-11E, the apertures are formed in the side walls 210A, 210B. In this or other examples, apertures may additionally or alternatively be formed in the upper walls (through the lower surface of the lid 212A), in the lower walls (through the upper surface of the base 208A), or both.

Figure 11D:
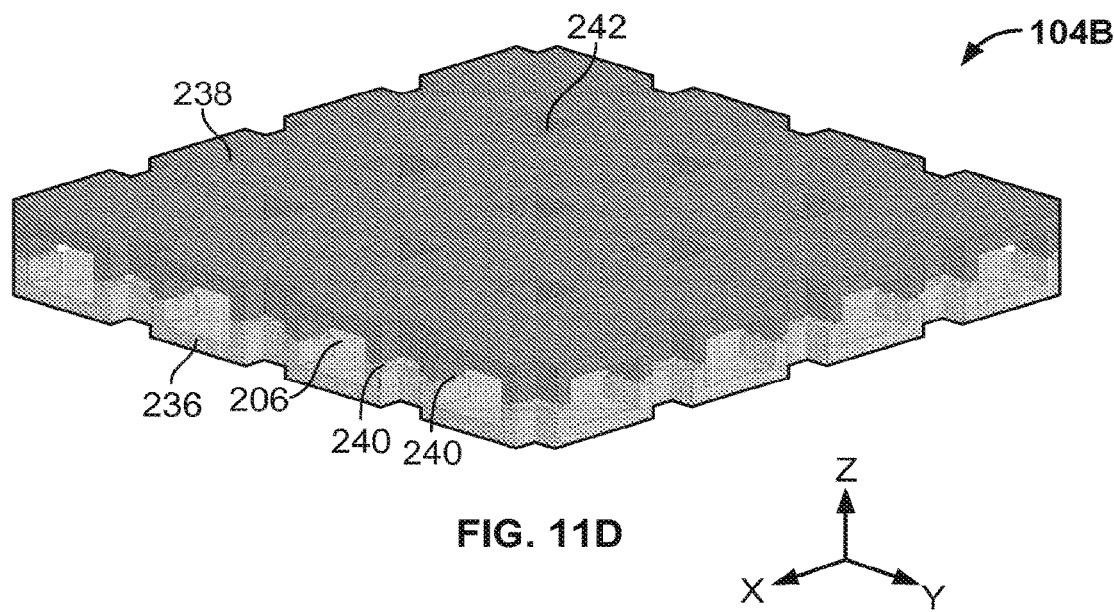
Figure 11E:
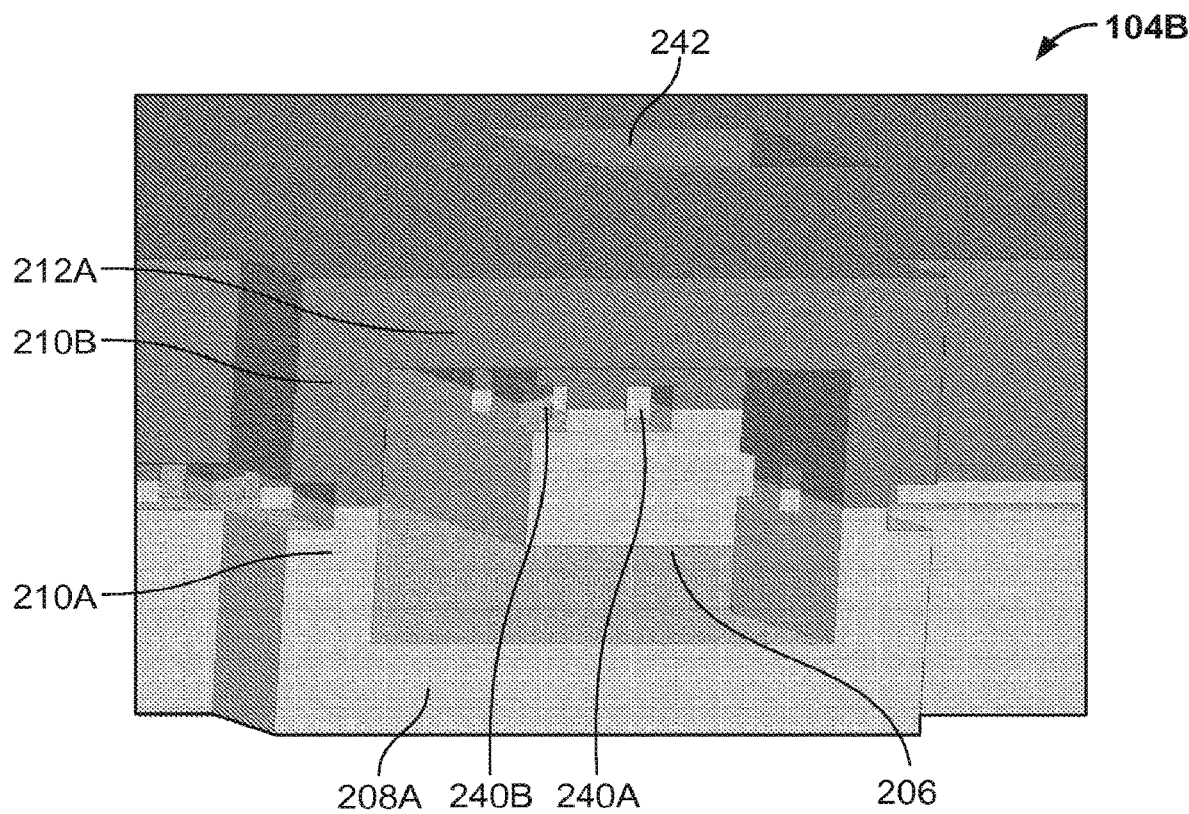

FIG. 11D is a perspective view of the example electromagnetic waveguide system 104B, and FIG. 11E is a zoom-in view of a portion of the same. As shown in FIG. 11D, the example electromagnetic waveguide system 104B is formed by an assembly of two components. In particular, the example electromagnetic waveguide system 104B is formed by mating, connecting, bonding or otherwise assembling the lid portion 238 with the base portion 236. The assembly of the wall structures 210A, 210B, the base 208A and the lid 212A define an interior volume 206 of a 2D lattice of intersecting waveguides. Additionally, the wall structures 210A, 210B define holes 242 through the lid portion 238 and through the base portion 236. The holes 242 provide access to plateaus 228 of the signal board 140A which are located outside the partially enclosed inner volume 206 of the electromagnetic waveguide system 104B. The apertures 240 of the wall structures 210A, 210B described above in connection with FIG. 11C are also shown in FIGS. 11D and 11E. When the electromagnetic waveguide system 104B is used in the QPC 102B, arms of the signal board 140A that connect nearest-neighbor plateaus penetrate the apertures 240A to deliver control signals from a plateau 228 to a coupling device 142; and arms of the signal board 140A that connect next-to-nearest-neighbor plateaus penetrate the apertures 240B to deliver control signals from a plateau 228 to a qubit device 144 or to retrieve readout signals from the qubit device to the plateau 228.

Figure 12B:
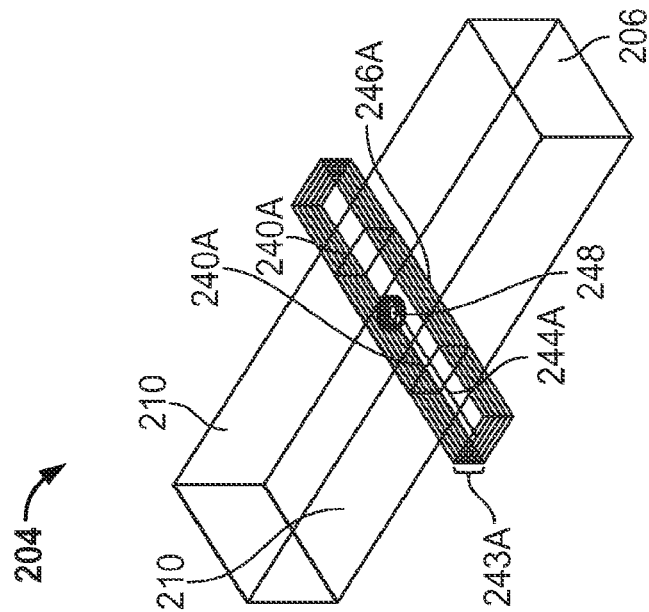
FIGS. 12A-12B show aspects of example pass-through structures in a section of an example electromagnetic waveguide system.
Figure 12A:
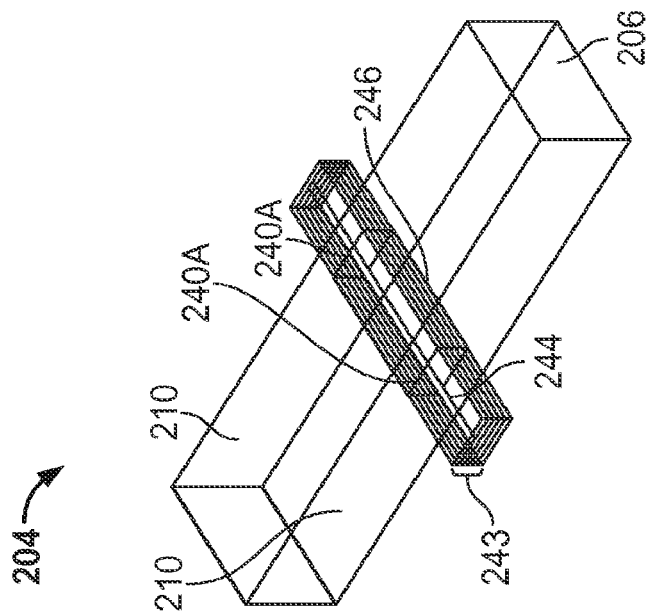

Each of FIGS. 12A and 12B shows an example of an interval 204 of a waveguide of an example electromagnetic waveguide system. The example intervals 204 shown in FIGS. 12A and 12B include pass-through structures. FIG. 12A shows a first example pass-through structure 246, and FIG. 12B shows a second example pass-through structure 246A. In the example shown, the side walls 210 are made from a conducting or superconducting material and partially define the boundary of the example interior volume 206. The example pass-through structures 246, 246A extend between two apertures 240A located on opposing side walls 210. An outer surface of the pass-through structure 246, 246A can be made from the same conducting or superconducting material as the side walls 210. In some cases, the outer surface of the pass through structures 246, 246A can be a thin film metal, a bulk metal, from a row or array of via structures, or another structure. In the example illustrated in FIG. 12A, a multi-layer board 243 includes a strip line 244 and crosses the interior volume 206 of the waveguide through the pass-through structure 246. In this manner, a signal carried through the strip line 244 is electromagnetically insulated from any qubit device 144 or coupler device 142 that may be housed inside the interval 204 adjacent to the pass-through structure 246. In the example illustrated in FIG. 12B, the pass-through structure 246A has an additional aperture 248 on one of its side surfaces, such that the additional aperture opens to the interior volume 206 of the interval 204. Here, a multilayer board 243A crosses the interior volume 206 of the waveguide through the pass-through structure 246, and a strip line 244A of the multilayer board 243A ends at a location adjacent to the additional aperture 248 of the pass-through structure 246A. In this manner, a signal carried through the strip line 244 can be delivered through the additional aperture 248 to a qubit device 144 or coupler device 142 that may be housed inside the interval 204 adjacent to the pass-through structure 246A. In some cases, other types of pass-through structures can be used. For instance, a pass-through structure can include multiple apertures, other types of boards, etc.

Example components and structures of the example QPC 102B have been described above. Examples of methods for assembling the example QPC 102B are described below.

FIGS. 13A-13G show aspects of an example process 250 for assembling the example QPC 102B shown in FIG. 9. Some of the operations 250-1 through 250-6 of the example process 250 can be performed in a different order than as illustrated here, can be performed concurrently or can be replaced by other operations. Further, the example process 250 may include additional operations performed prior to, after or interspersed between the operations illustrated here. In some instances, one or more of the operations 250-1 through 250-6 of the example process 250 can be used in the assembly of other quantum processor cells.

At 250-1, a base portion 236 of an electromagnetic waveguide system 104B is provided. FIG. 13A is a partial perspective view of the base portion 236 of the example electromagnetic waveguide system 104B. In this example, the base portion 236 includes a base 208A and base wall structures 210A. In some implementations, the base 208A and base wall structures 210A are formed from a metallic conductor material, a superconductor material, or a combination of these and other materials. In some implementations, the base 208A and base wall structures 210A can be formed by deposition of thin film metallic or superconducting materials on a micro-machined silicon substrate, a pattered dielectric or insulating substrate, or other material system. In some cases, some portions of surfaces of the foregoing base 208A and base wall structures 210A are coated with a layer of superconductor material. In other implementations, the base 208A and base wall structures 210A are formed from a superconductor material.

The example base wall structures 210A are distributed on the base 208A to form intersections and intervals of a 2D lattice of intersecting waveguides. Moreover, the example base wall structures 210A enclose holes 242A (or openings) of the base 208A. The base wall structures 210A have an upper ledge surface that is parallel to an upper surface of the base 208A. The upper ledge surface of each base wall structure 210A defines first channels oriented in directions toward nearest-neighbor base wall structures. The first channels represent a lower half of a first type of apertures 240A described above in connection with FIGS. 11D and 11E. Additionally, the upper ledge surface of each base wall structure 210A defines second channels oriented in directions toward next-to-nearest-neighbor base wall structures. The second channels represent a lower half of a second type of apertures 240B described above in connection with FIGS. 11D and 11E.

At 250-2, a first sub-assembly (236+140A) is formed from the base portion 236 and a signal board 140A. FIG. 13B is a perspective view of a portion of the first sub-assembly (236+140A). The example signal board 140A was described above in connection with FIGS. 10A-10B. Here, the plateaus 228 of the signal board 140A are mated with the ledge surfaces of the base wall structures 210A over the holes 242A of the base 208A enclosed by the base wall structures. Arms 230 of the signal board 140A that define a coupler receptacle 234 located between nearest-neighbor plateaus rest in the lower half of the apertures 240A. Other arms 230 that extend to a qubit receptacle 232 located between next-to-nearest-neighbor plateaus rest in the lower half of the apertures 240B. In this manner, the first sub-assembly (236+140A) has coupler receptacles located in intervals (between intersections) of the 2D lattice of intersecting waveguides and qubit receptacles located at intersections of the 2D lattice of intersecting waveguides. In the example shown, the top half of the waveguide system (the lid 212A) can make good electromagnetic contact with the lower half of the waveguide system (the base 208A). In this example, the contact points where the base 208A can make electromagnetic contact with the lid 212A are provided on the ledges of the wall structures 210A, in particular, at raised portions on either side of the apertures 240A and 240B.

Electrical contact between the base 208A and lid 212A may be provided in another manner.

Figure 13C:
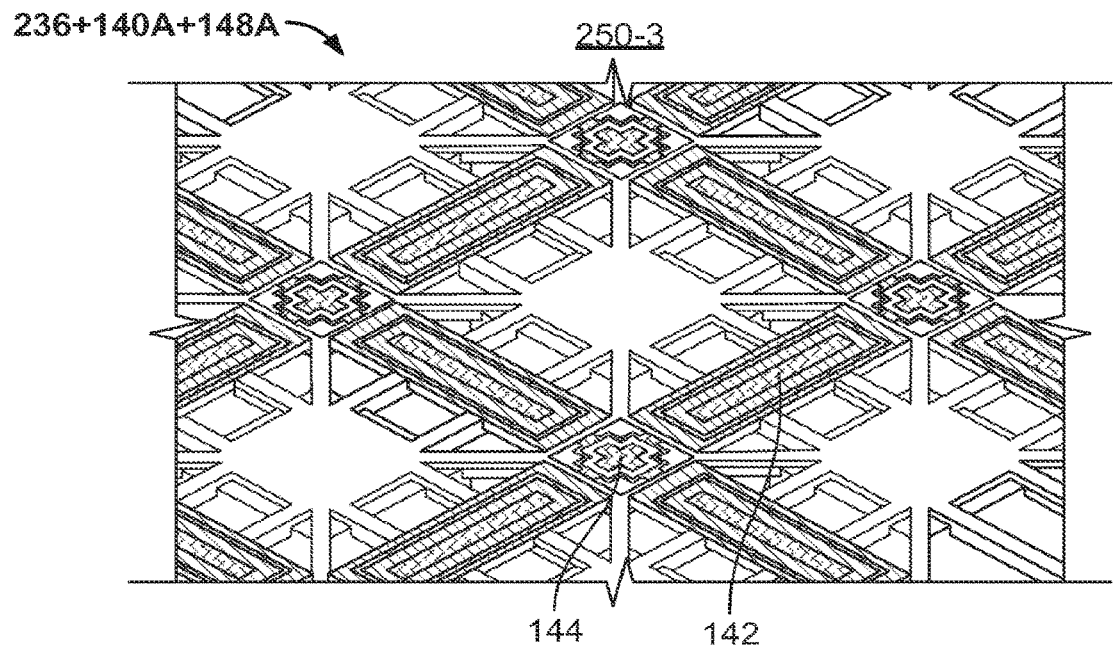

At 250-3, a second sub-assembly (236+140A+148A) is formed from the first sub-assembly (236+140A) and a 2D device array 148A. FIG. 13C is a perspective view of the second sub-assembly (236+140A+148A). Here, qubit devices 144 of the example 2D device array 148A are placed in the qubit receptacles 232 located at intersections of the 2D lattice of intersecting waveguides. In some implementations, in which readout devices are collocated with respective qubit devices 144, a qubit device and its readout device are placed in each of the qubit receptacles 232. For example, the collocated qubit device 144 and readout device can be formed on the same chip. As another example, the collocated qubit device 144 and readout device can be formed on separate chips. Separate chips can be located vertically above and below one another at the qubit sites/lattice intersections. Also, coupler devices 142 of the example 2D device array 148A are placed in the coupler receptacles 234 located in the intervals (between the intersection) of the 2D lattice of intersecting waveguides.

Figure 13D:
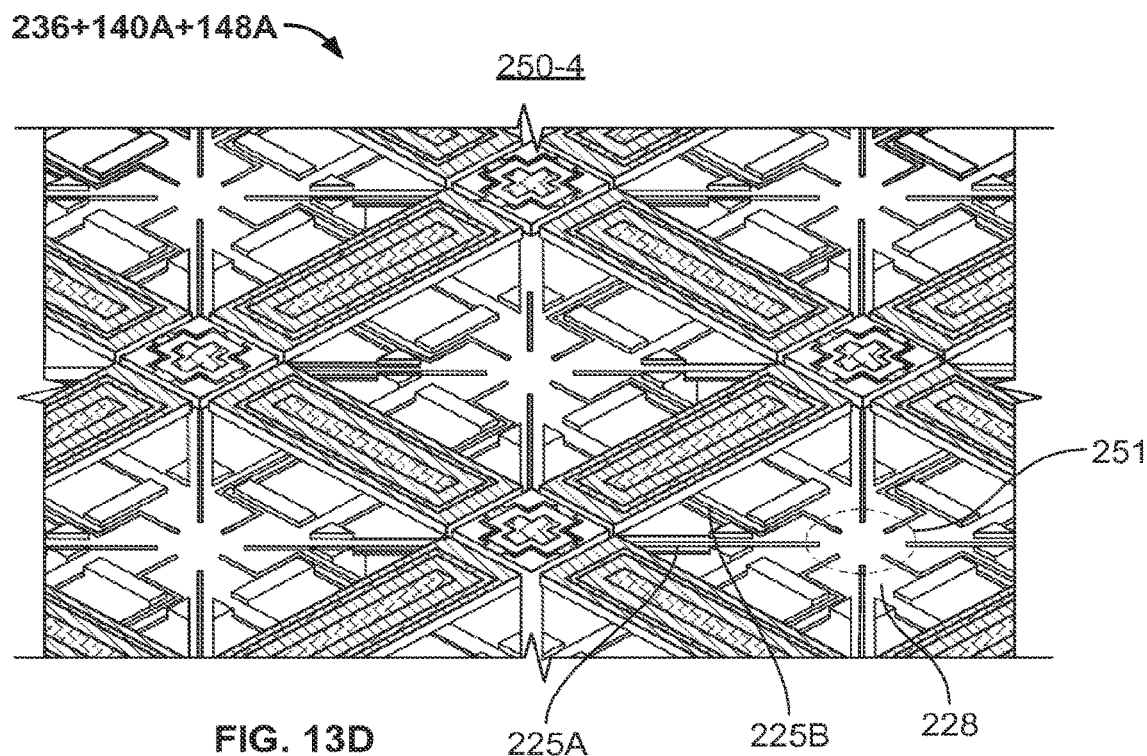

At 250-4, the qubit devices 144 and the coupler devices 142 of the example 2D device array 148A are connected with signal lines of the signal board 140A. FIG. 13D is another perspective view of the second sub-assembly (236+140A+148A), where some top layers of the example signal board 140A have been hidden from view. Here, signal lines originate at a connection junction 251 associated with each plateau 228 and extend to respective qubit devices 144 or the coupler devices 142 in the following manner. For example, a coupler signal line 225B is embedded between layers of the signal board 140A and extends from the connection junction 251 of a plateau 228 to a coupler device 142 along an arm 230 that enters the interior volume of an interval of the 2D lattice of intersecting waveguides through an aperture 240A. The coupler signal line 225B carries a coupler control signal from the plateau 228 located outside the electromagnetic waveguide system 104B to a coupler control input port (as shown in FIG. 3A) of the coupler device 142 located inside the electromagnetic waveguide system. Coupler signal lines 225B can be DC-coupled (e.g., by mutual inductive coupling or direct current coupling) to corresponding coupler devices 142. As another example, a qubit signal line 225A is embedded between layers of the signal board 140A and extends from the connection junction 251 of the plateau 228 to a qubit device 144 along another arm 230 that enters the interior volume of an interval of the 2D lattice of intersecting waveguides through apertures 240B. The qubit signal line 225A carries a qubit control signal from the plateau 228 located outside the electromagnetic waveguide system 104B to a qubit+readout control port (as shown in FIG. 3A) of the qubit device 144 located inside the electromagnetic waveguide system. Qubit signal lines 225A can be AC-coupled to corresponding qubit devices 144. In some implementations of the process 250, the operation 250-4 can be performed between operations 250-2 and 250-3.

Figure 13E:
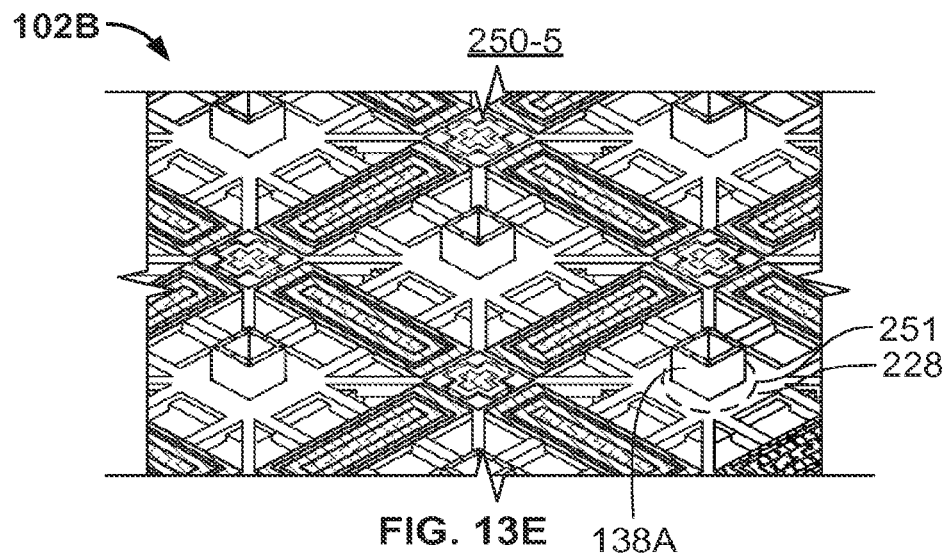

At 250-5, connection junctions 251 located at plateaus 228 of a signal board 140A are connected to respective multiple signal connectors 138A (also referred to as vertical interconnects). FIG. 13E is a perspective view of a portion of the second sub-assembly (236+140A+148A) that shows multiple signal connectors 138A connected adjacent respective plateaus 228 of the example signal board 140A. Each of the multiple signal connectors 138A is arranged and configured to create multiple electrical connections between qubit signal lines 225A and coupler signal lines 225B that are routed horizontally through the signal board 140A and corresponding vertical transmission lines or interposer structures that either deliver qubit control signals, qubit readout signals and coupler control signals from input processing hardware 132 located outside the QPC 102B or return readout signals from qubit devices to output processing hardware 134 located outside the QPC 102B. Examples of multiple signal connectors 138A are described below in connection with FIGS. 18A-18C. In some implementations, the vertical transmission lines—which can be coaxial or ribbon type transmission lines, for instance—connect the multiple signal connectors 138A with input or output processing hardware 132, 134 located outside the example QPC 102B. In some implementations of the example process 250, the operation 250-5 can be performed between operations 250-2 and 250-3 or between operations 250-3 and 250-4.

Figure 13F:
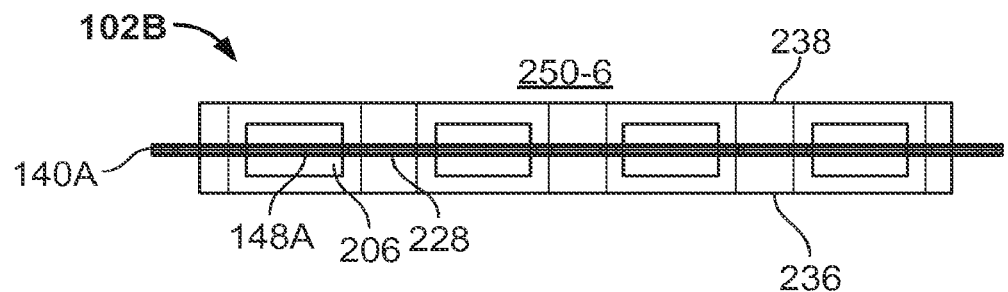
Figure 13G:
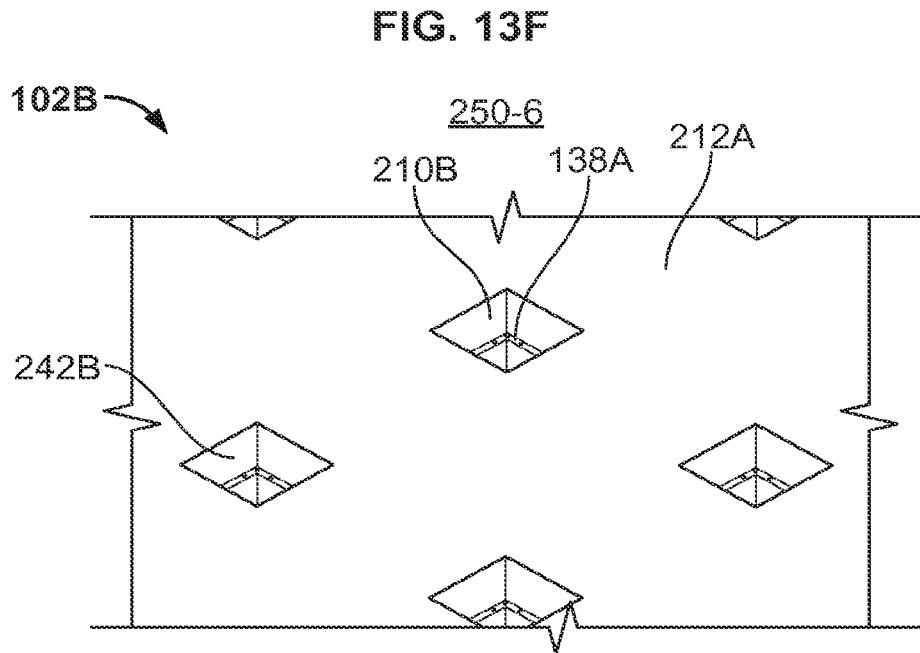

At 250-6, an electromagnetic waveguide system 104B of the QPC 102B is formed. FIG. 13F is a lateral cross-section of the QPC 102B. Here, a lid portion 238 of the electromagnetic waveguide system 104B is mated with the base portion 236 thereof to form an interior volume 206 of the 2D lattice of intersecting waveguides. Portions of the example signal board 140A that support the 2D device array 148A are enclosed within the interior volume 206 while the plateaus 228 of the signal board are sandwiched between the base portion 236 and the lid portion 238. FIG. 13G is a perspective view of a portion the example QPC 102B. Here, lid wall structures 210B of the lid portion 238 enclose holes 242B (or openings) of the lid 212B. The holes 242B allow access to respective multiple signal connectors 138A. In some implementations, thermalization blocks can be introduced in the holes 242B to extract heat generated during operation of the QPC 102B. In some implementations, the signal board 140A may extend outside the waveguide system, where additional interconnect plateaus may be formed.

Examples of QPCs fabricated by enclosing 2D device arrays 148A in electromagnetic waveguide systems 104A that includes a 2D lattice of intersecting waveguides have been described above. In some cases, such QPCs can be operated to solve a multitude of problems, for instance, by performing fault tolerant quantum computation based on algorithms that are optimized or otherwise adapted to operate on two-dimensional qubit arrays. Some algorithms are optimized or otherwise adapted to operate on three-dimensional qubit arrays, and in some cases, QPCs that enclose three-dimensional qubit arrays can be used for quantum computation. For instance, three-dimensional qubit arrays may be useful for performing fault tolerant quantum computation, in some instances, with higher effectiveness than other types of quantum computing systems.

In some implementations, all or part of the portion of the device array 148 shown in FIG. 3A can be copied multiple times, as a unit cell, to extend the device array 148 in space (e.g., in layers parallel to the x-y plane that are distributed along a z-axis of a Cartesian coordinate system or as layers parallel to the x-y plane that intersect layers parallel to the y-z plane). In some cases, such a three-dimensional (3D) device array may allow each qubit device to be independently controlled and measured without introducing crosstalk or errors on other qubit devices in the 3D device array. In some cases, nearest-neighbor pairs of qubit devices in the 3D device array can be addressable with two-qubit gate operations capable of generating entanglement, independent of all other such pairs in the 3D device array. In some instances, the device array may also be extended within the x-y plane to form systems of arbitrarily large number of qubits and couplers within a single modular electromagnetic waveguide system.

To shield the devices of a 3D device array from each other and from an electromagnetic environment, the 3D device array can be arranged inside an electromagnetic waveguide system 104C that includes a 3D lattice of intersecting waveguides. FIG. 14A shows a portion of the interior volume of an example electromagnetic waveguide system 104C. In particular, FIG. 14A is a perspective view of a portion of an example electromagnetic waveguide system 104C that includes a first set of waveguides i=1, 2, . . . oriented along the x-axis of a Cartesian coordinate system, a second set of waveguides j=1, 2, . . . oriented along the y-axis of the Cartesian coordinate system, and a third set of waveguides k=1, 2, . . . oriented along the z-axis of the Cartesian coordinate system, where the waveguides intersect each other at a 3D array of waveguide intersections 202-($i|j|k$). As shown in FIG. 14A, the waveguide intersections 202-($i|j|k$) are separated by waveguide intervals 204.

In some implementations, by forming such 3D device arrays, large-scale systems of arbitrarily large numbers of qubits and couplers can be produced within a single modular electromagnetic waveguide system for performing large scale fault-tolerant quantum computing and quantum information storage.

The example 3D device array 148B may include devices housed at the waveguide intersections 202, in the intervals 204 between the waveguide intersections 202, or a combination of these and other locations. For instance, either a qubit device or a coupler device can be placed at the waveguide intersections 202 shown in FIG. 14A. Here, the 3D lattice of intersecting waveguides is geometrically commensurate with the 3D device array 148B. In the example shown, the 3D device array 148B is aligned with the 3D lattice of intersecting waveguides such that the nodes of the 3D device array 148B coincide with the waveguide intersections of the 3D waveguide lattice. In some implementations, qubit devices of the 3D device array are placed inside the electromagnetic waveguide system 104C at the waveguide intersections 202-($i|j|k$) of the 3D lattice of intersecting waveguides, and the coupler devices of the 3D device array are placed inside the electromagnetic waveguide system 104C along intervals 204, between intersections 202-($i|j|k$), of the 3D lattice of intersecting waveguides. In other implementations, the coupler devices of the 3D device array are placed inside the electromagnetic waveguide system 104C at intersections 202-($i|j|k$) of the 3D lattice of intersecting waveguides and the qubit devices of the 3D device array are placed inside the electromagnetic waveguide system 104C along intervals 204, between intersections 202-($i|j|k$), of the 3D lattice of intersecting waveguides.

Figure 14B:
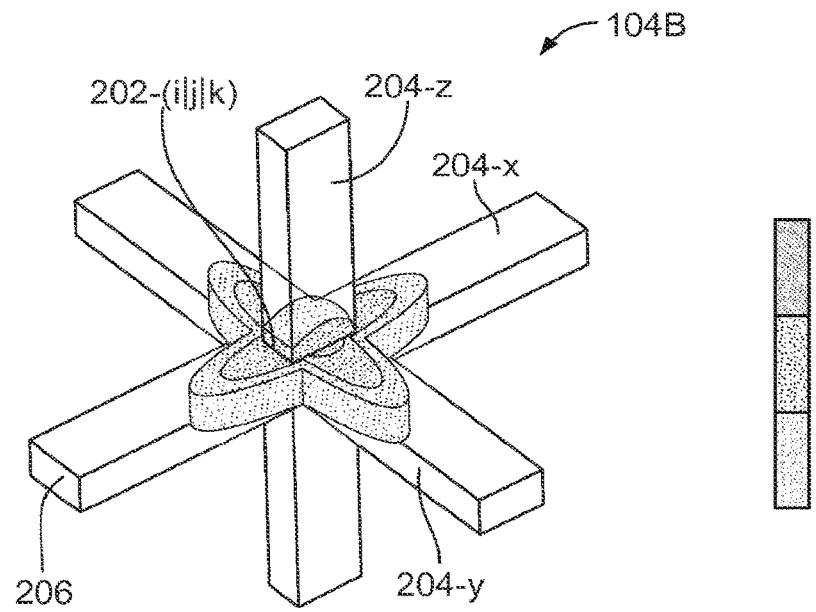
FIG. 14B illustrates electromagnetic properties at an example waveguide intersection in a 3D lattice of intersecting waveguides.

FIG. 14B shows a portion of the interior volume 206 of the electromagnetic waveguide system 104C near an example waveguide intersection 202-($i|j|k$). In the portion shown in FIG. 14B, the interior volume 206 of the electromagnetic waveguide system 104C is enclosed by three waveguides that intersect at the waveguide intersection 202-($i|j|k$), such that a first of the three waveguides has two intervals 204-$x$ along the x-axis, a second of the three waveguides has two intervals 204-$y$ along the y-axis, and a third of the three waveguides has two intervals 204-$z$ along the z-axis.

In the example shown in FIG. 14B, the intervals 204 of the 3D lattice of intersecting waveguides have rectangular cross-sections. In the example shown, the largest dimension of the two-dimensional rectangular cross-section (in this example the width) determines a cutoff frequency fc. In this manner, signals having frequencies above the cutoff frequency (f>fc) can propagate through the waveguide, while signals having frequencies below the cutoff frequency (f<fc) evanesce in the waveguide. For this reason, signals having frequencies below the cutoff frequency (f<fc) that are injected into the waveguide (e.g., through an aperture located at or near a waveguide intersection 202-($i|j|k$)) will be attenuated (e.g., exponentially) inside the waveguide from the aperture.

In the example shown in FIG. 14, the shading around the waveguide intersection 202-($i|j|k$) represents the spatial distribution of the electromagnetic field strength for electromagnetic waves introduced into the interior volume of the example waveguide system 104B at the intersection 202-($i|j|k$). In the example shown, the electromagnetic waves are introduced below the cutoff frequency (fc). The shading in FIG. 14 shows that the electromagnetic waves are evanesced, and the electromagnetic field strength drops to essentially zero within a short distance of the waveguide intersection 202-($i|j|k$).

In the example shown in FIG. 14, for an interval 204 of the waveguide with rectangular cross-section having a width of 0.5 cm and a height of 0.3 cm, the cutoff frequency is approximately 30 GHz (fc≈30 GHz). Additionally, in the example shown, a largest diagonal cross-section of the waveguide intersection 202-($i|j|k$) of three intersecting waveguides has a transverse dimension that defines a minimum frequency fmin, which is less than the cutoff frequency fc of the interval 204 (i.e., fmin<fc). In the example shown in FIG. 14B, where the rectangular cross-section has a width of 0.5 cm and a height of 0.3 cm, the minimum frequency fmin corresponding to the diagonal cross-section of the waveguide intersection 202-($i|j|k$) is fmin≈25.7 GHz.

In some instances, signals having frequencies below the minimum frequency (f<fmin) that are injected into the electromagnetic waveguide system 104A through apertures located at waveguide intersections, e.g., 202-($i|j|k$), 202-($i|j-1|k$) and 202-($i-1|j|k$), remain localized at the intersections where they are injected. In this manner, the 3D lattice of intersecting waveguides can provide high (e.g., exponential) electromagnetic isolation between an array site ($i|j|k$) and its six nearest-neighbor array sites ($i-1|j|k$), ($i|j-1|k$), ($i|j|k-1$), etc. Moreover, individual qubit devices in the 3D device array can be shielded and isolated, such that they only interact with other qubit devices when selectively coupled to nearest-neighbors by the coupler devices; and all qubit devices can be isolated from the external electromagnetic environment. In some cases, the isolation of the qubit devices can be provided independent of the number of intersections 202-($i|j|k$) of the 3D lattice of intersecting waveguides and independent of the number and the length of intervals 204 of the 3D lattice of intersecting waveguides. Additionally, apertures formed in the walls of the lattice of intersecting waveguides can provide ports to inject or extract (or both) electromagnetic signals for control or measurement (or both).

FIG. 15 is a perspective view of an example electromagnetic waveguide system 104C that defines a 3D lattice of intersecting waveguides, which can be used in a QPC 102C. In this example, the three-dimensional device array and other components in the QPC 102C can be formed by or adapted from an interpenetrated arrangement of multiple two-dimensional QPCs 102B. In the example illustrated in FIG. 15, the QPC 102C includes a first set of two-dimensional systems 202B-(x-y) that are oriented parallel to a plane (x-y) of a Cartesian coordinate system, and a second set of two-dimensional systems 202B-(y-z) that are oriented parallel to a plane (y-z) of the Cartesian coordinate system. Here, the two-dimensional systems 202B-(y-z) intersect the two-dimensional systems 202B-(x-y) along rows in the (x-y) plane, and the two-dimensional systems 202B-(x-y) intersect the two-dimensional systems 202B-(y-z) along layers in the (y-z) plane. In this manner, the example arrangement illustrated in FIG. 15 forms the 3D array of intersections 202-(i|j|k) shown in FIG. 14A. The electromagnetic waveguide system 104C formed in this manner can house a 3D device array that includes qubit devices 144 and coupler devices 142 as part of an example QPC 102C. For example, in some instances, the example QPC 102C can be used to perform fault tolerant quantum computation or quantum information storage based on algorithms and protocols optimized to work on three-dimensional qubit arrays.

Examples of QPCs 102B and 102C fabricated by enclosing multidimensional device arrays in an electromagnetic waveguide system 104 that includes a commensurate lattice of intersecting waveguides have been described above. Techniques for delivering control signals to a QPC, for example, by an input signal processing system 128, and for retrieving readout signals from a QPC, for example, by an output signal processing system 130, are described below.

Figure 16B:
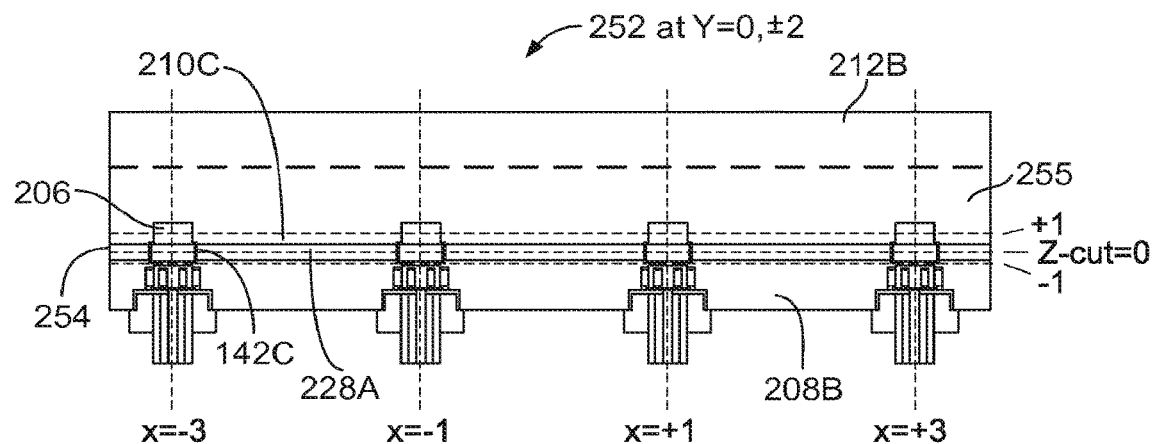
Figure 16C:
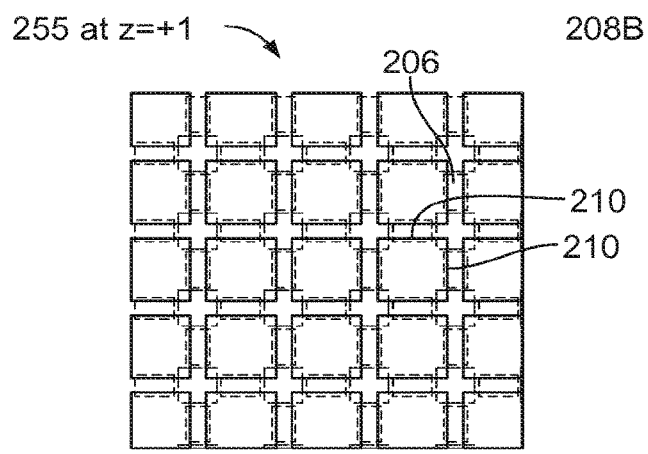
Figure 16D:
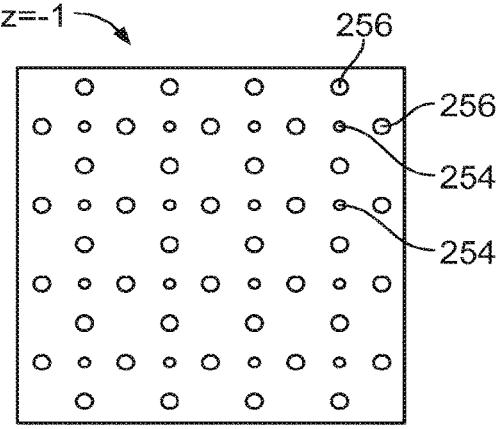
Figure 16E:
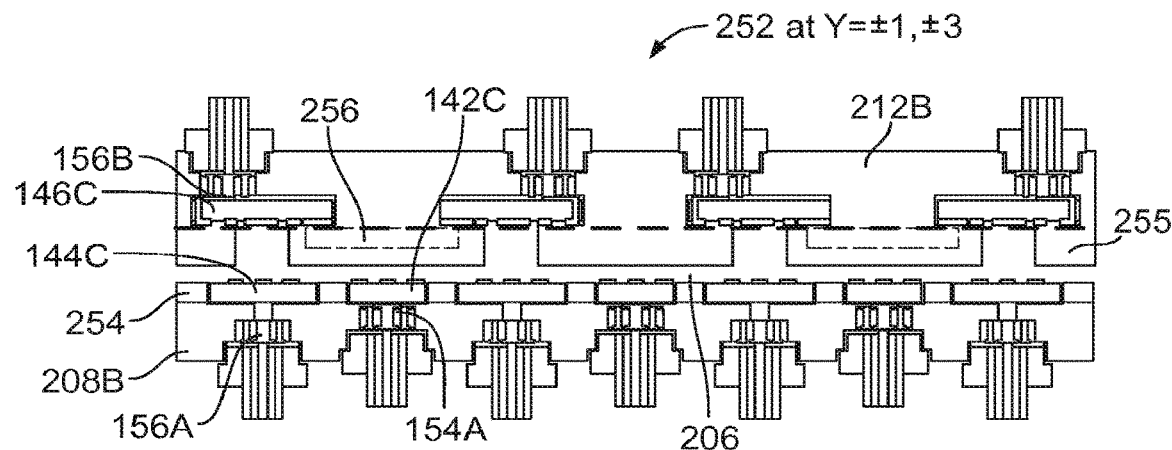

FIGS. 16A-16F show aspects of an example system 252 that includes a QPC assembly with an electromagnetic waveguide system. The components of the example system 252 shown in the figures also includes a portion of an example output signal processing subsystem. FIG. 16A is a top cross-sectional view of the example QPC assembly at Z=0. FIG. 16B is a side cross-sectional view of the example QPC assembly at Y=0 and Y=±4. FIG. 16C is a top cross-sectional view of the example QPC assembly at Z=+1. FIG. 16D is a top cross-sectional view of the example QPC assembly at Z=−1; FIG. 16E is a side cross-sectional view of the example QPC assembly at Y=±1 and Y=±3. FIG. 16E is a side cross-sectional view of the example QPC assembly at Y=±2. In some instances, the examples structures shown in FIGS. 16A-16F can be adapted to create three-dimensional electromagnetic waveguide systems and three-dimensional device arrays.

The example waveguide system shown in FIGS. 16A-16F includes a 2D lattice of intersecting waveguides, with a portion of an output signal processing subsystem. The system 252 includes a 2D device array of qubit devices 144C and coupler devices 142C arranged inside the 2D lattice of intersecting waveguides. In this example, the 2D device array is located in the (x-y) plane of a Cartesian coordinate system. As shown in FIG. 16A, each of the qubit devices 144C of the 2D device array has a dedicated readout device 146C. As shown in FIGS. 16A and 16E, the readout devices 146C are arranged in a 2D readout array located in a plane that is parallel to and spaced apart along the z-axis from the plane of the 2D device array.

Figure 16F:
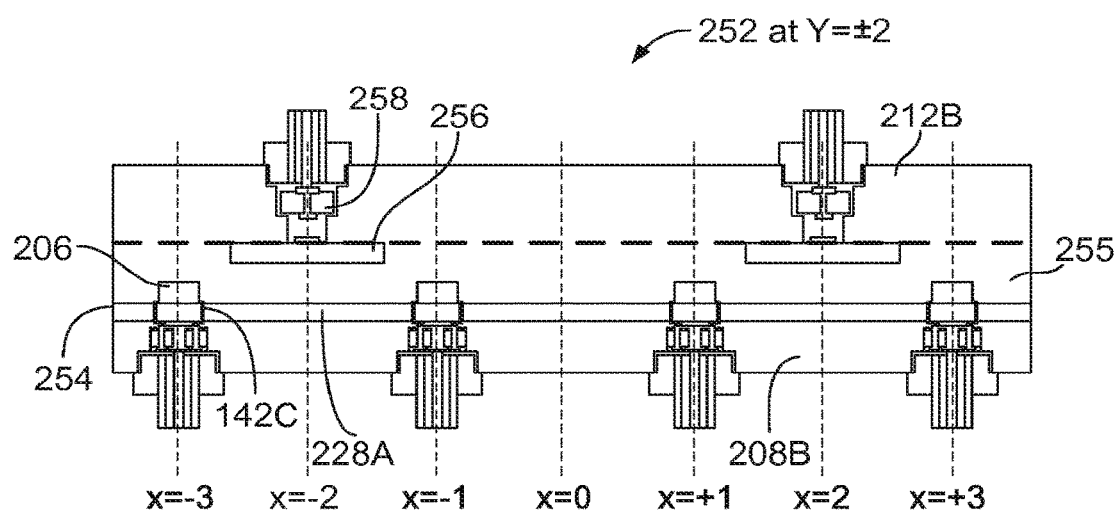

As shown in FIGS. 16E and 16F, the output signal processing subsystem that is part of the example system 252 can include amplifier circuits 256 configured to amplify qubit readout signals produced by the readout devices 146C. In some implementations, the amplifier circuits 256 are implemented as parametric amplifiers. A parametric amplifier can be configured to amplify an input signal when the amplifier is supplied with an electromagnetic pump signal. When the amplifier circuits 256 may be implemented as parametric amplifiers, the output signal processing subsystem may also include pump circuits 258 coupled to respective amplifier circuits. In the example system 252, the amplifier circuits 256 can be implemented as parametric amplifier devices. Further, the pump circuits 258 used to drive the parametric amplifier devices 256 can be implemented as pump devices.

In the example system 252, the qubit devices 144C and coupler devices 142C of the 2D device array are mechanically supported by a receptacle board 254. The receptacle board 254 can be a silicon wafer, a sapphire wafer or can be formed from other non-conductive materials. The receptacle board 254 includes qubit receptacles 232A and coupler receptacles 234A. Each of the qubit receptacles 232A can be formed as a slot in the receptacle board 254 that is sized to receive a qubit device 144C. In this example, the qubit receptacles 232A are arranged on the receptacle board 254 at nodes of a 2D array, such that when held in the qubit receptacles, the qubit devices 144C form the nodes of the 2D device array. Moreover, each of the coupler receptacles 234A can be formed as a slot in the receptacle board 254 that is sized to receive a coupler device 142C. In this example, the coupler receptacles 234A are arranged on the receptacle board 254 between the nodes of a 2D array, such that when held in the coupler receptacles, the coupler devices 142C form the bonds of the 2D device array. Areas of the receptacle board 254 located between the coupler receptacles 234A are referred to as plateaus 228A of the receptacle board. The plateaus 228A may include conductive or superconductive vias, e.g., oriented orthogonal to the (x-y) plane, to create conductive paths between opposing outer surfaces of the receptacle board 254 at the locations of the plateaus 228A.

As shown in FIG. 16B, the base 208B supports the receptacle board 254, which in turn supports the 2D device array. The receptacle board 254 is sandwiched between the base 208B and a flange 255. The flange 255 includes flange wall structures 210C. The flange wall structures 210C have mating surfaces that can mate and form an electrical, mechanical or thermal contact with the plateaus 228A of the receptacle board 254 and side surfaces orthogonal to the mating surfaces. FIG. 16C is a cross-section parallel to the (x-y) plane of the flange 255. The combination of FIGS. 16B-16C shows that the side surfaces of the flange wall structures 210C form walls that enclose an interior volume 206 of the electromagnetic waveguide system. Moreover, the combination of FIGS. 16A-16C shows that the 2D lattice of intersecting waveguides defined by the side surfaces of the flange wall structures 210C is commensurate with the 2D device array supported by the receptacle board 254. In the example system 252, the qubit devices 144C are arranged at intersections of the 2D lattice of intersecting waveguides and the coupler devices 142C are arranged on intervals (between the intersections) of the 2D lattice of intersecting waveguides.

The cross-section of the example system 252 in the (x-z) plane, as shown in FIG. 16B, represents a slice of the example system 252 that crosses through intervals of the 2D lattice of intersecting waveguides and coupler devices 142C housed therein. In the example shown, coupler signal lines configured to deliver coupler control signals to coupler devices 142C are DC-coupled (e.g., by mutual inductive coupling or by direct current coupling) to coupler control input ports 154A. FIG. 16D is a cross-section parallel to the (x-y) plane of the base 208B. FIG. 16D shows that the base 208B has coupler apertures arranged to allow for the coupler signal lines to reach the coupler control input ports 154A from an input signal processing system.

The cross-sectional view shown in FIG. 16E crosses through a waveguide oriented in the y-direction and shows a row of waveguide intersections and intervals. In this manner, this slice also crosses through the qubit devices 144C hosted at the waveguide intersections and the coupler devices 142C hosted inside the waveguide intervals. Along the view of the example system 252 shown in FIG. 16E, the interior volume 206 is enclosed between the flange 255 and the base 208B. In the example shown, qubit signal lines configured to deliver qubit control signals to qubit devices 144C are AC-coupled through a coupling capacitance to qubit control ports 156A. As shown in FIG. 16D, the base 208B has qubit apertures arranged to allow for the qubit signal lines to reach the qubit control ports 156A from the input signal processing system.

FIGS. 16B and 16E show that the example system 252 also includes a lid portion 212B positioned such that the flange 255 is sandwiched between the receptacle board 254 and the lid portion 212B. The lid portion 212B includes readout receptacles to hold readout devices 146C adjacent to an interface between the lid portion and the flange. Readout control signal lines configured to deliver readout control signals to readout devices 146C can be AC-coupled to readout control ports 156B. The lid portion 212B has readout control apertures arranged to allow for the readout control signal lines to reach the readout control ports 156B from the input signal processing system.

In the example shown, the readout receptacles form a 2D array that aligns with the 2D array of qubit receptacles 232A on the receptacle board 254. Moreover, the flange 255 has a 2D array of readout apertures aligned to both the 2D array of readout receptacles on the lid portion 212B and the 2D array of qubit receptacles on the receptacle board 254. In this manner, each of the readout devices 146C can be capacitively coupled, through a respective readout aperture, with a respective qubit device 144C to enable the state of the respective qubit device to be probed. A qubit readout signal that carries information about a qubit device 144C can be output by its associated readout device 146C at a readout output port. The readout output port is coupled with one of the amplifier circuits 256 of the example system 252. As shown in FIG. 16A, the example amplifier circuit 256 is laterally displaced in the x-y plane from a location of the readout device 146C, and the amplifier circuit 256 is represented with a dashed line in FIG. 16E.

The example cross-section shown in FIG. 16F crosses through intervals of the 2D lattice of intersecting waveguides and coupler devices 142C housed therein. The example cross-section shown in FIG. 16F also crosses through parametric amplifier devices 256 and pump devices 258 stacked above plateaus 228A of the receptacle board 254.

As shown in FIG. 16F, the example flange 255 includes amplifier receptacles to hold the parametric amplifier devices 256. In this manner, when the lid portion 212B is mated with the flange 255, the parametric amplifier devices 256 are held adjacent to an interface between the flange 255 and the lid portion 212B. The amplifier receptacles form a 2D array with nodes located above the plateaus 228A of the receptacle board 254. In this manner, each of the parametric amplifier devices 256, when held in an amplifier receptacle, is operably coupled to four nearest-neighbor readout devices 146C. Further, the lid portion 212B includes pump receptacles to hold the pump devices 258 in a plane of the lid portion 212B parallel to the (x-y) plane between the 2D array of readout receptacles and the lid portion's outer surface. Moreover, the pump receptacles form a 2D array on the lid portion 212B that aligns with a 2D array of amplifier receptacles on the flange 255.

Readout signals received by each of the parametric amplifier devices 256 from respective readout output ports of its four nearest-neighbor readout devices 146C can be amplified concurrently or sequentially by integrating a multiplexing function as part of each of the parametric amplifier devices 256. In some implementations, the parametric amplifier device 256 can use frequency multiplexing to concurrently amplify the received readout signals, because frequencies of readout signals from the four nearest-neighbors of a parametric amplifier device 256 are different from each other (e.g., as described below in connection with FIGS. 23A, 26 and others). In other implementations, the parametric amplifier device 256 can use time multiplexing to sequentially amplify the received readout signals. In some implementations, an amplifier with operational bandwidth including the frequency of all associated readout signals can be used.

In some implementations, components of a QPC (e.g., a lid portion, a base portion, a flange, etc.) are configured to accommodate devices that can process (e.g., amplify) readout signals immediately outside the interior volume of the electromagnetic waveguide system. Such configurations may, in some cases, result in significant reduction of the overall noise temperature of the amplification process due to elimination of noise that would be caused by transporting "raw" (unprocessed) readout signals for processing by an output signal processing subsystem located remotely from the QPC. Other example techniques described below combine the beneficial aspect of processing readout signals in close proximity to a QPC having another structure (e.g., the structures shown in FIGS. 9, 11A, 13F, or other QPC structures).

Figure 17B:
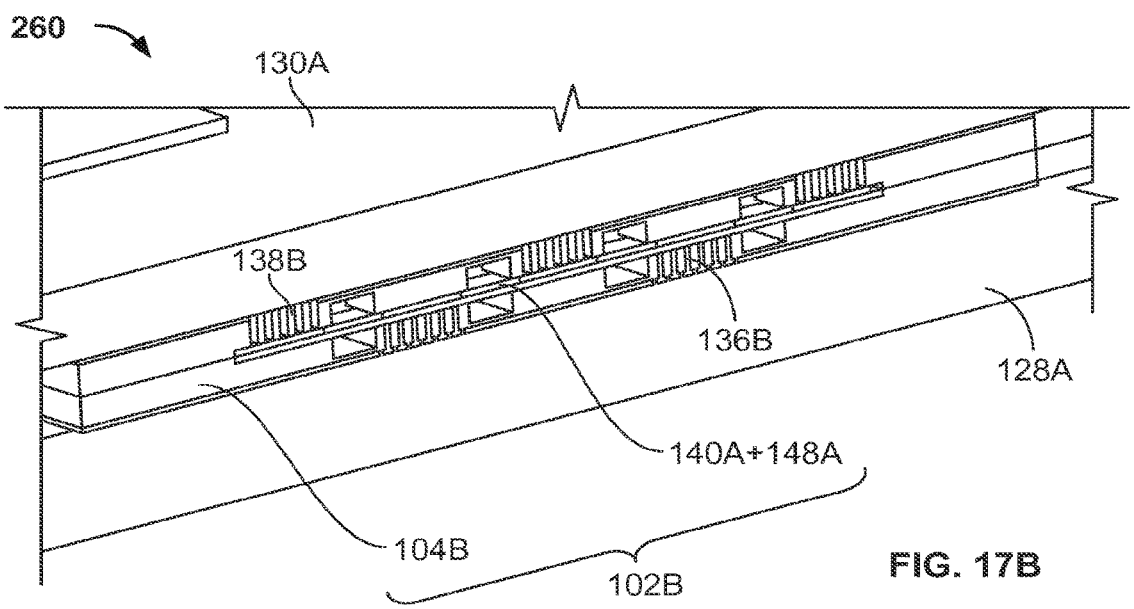

FIGS. 17A-17B show aspects of an example quantum computing system that includes a signal delivery subsystem and an electromagnetic waveguide system. FIG. 17A is a schematic diagram showing an example signal flow in the system 260, and FIG. 17B is a perspective view showing aspects of components represented schematically in FIG. 17A. As shown in FIGS. 17A and 17B, the signal flow can be performed by a signal delivery system 106B in connection with the example QPC 102B, which includes an electromagnetic waveguide system 104B that defines a 2D lattice of intersecting waveguides. The signal flow shown in FIG. 17A may be adapted for use with other types of systems.

The example system 260 operates in a cryogenic temperature regime, for example, at low operational temperatures T_op (e.g., T_op being less than 60K, 3K, 800 mK, 150 mK, 10 mK) and under conditions that are subject to very low electromagnetic and thermal noise. Such operational conditions can be achieved in a QPC environment 101, as described above in connection with FIG. 2. In some instances, the example system 260 can receive control signals (e.g., write and read signals) through input control system connector hardware 126A from a signal generator system 120 that is operated under an ambient environment (e.g., at higher operational temperatures, e.g., T_op>240K). In some instances, the example system 260 can transmit pre-processed or processed readout signals through output control system connector hardware 126B to a signal processor system 124.

In the example shown, the signal delivery system 106B includes an input signal processing system 128A and an output signal processing system 130A. The input signal processing system 128A is configured to receive and either pre-process or process control signals delivered by the signal generator system 120 through the input control system connector hardware 126A. The control signals can be delivered by the input signal processing system 128A to the QPC 102B through QPC input connector hardware 136B. In some implementations, some of the incoming signals may be routed horizontally within the signal board 140A (e.g., in both the left and right directions, or other directions within the plane of the signal board 140A).

In some instances, incoming signals (e.g., readout control signals) cause the quantum processor cell 102B to produce output signals that are routed to the output signal processing system 130A; some incoming signals (e.g., coupler control signals, qubit control signals) do not cause the quantum processor cell 102B to produce output signals that are routed to the output signal processing system 130A. In some instances, readout signals from readout devices inside the QPC 102B are delivered by the QPC 102B to the output signal processing system 130A through QPC output connector hardware 138B. The output signal processing system 130A is configured to either pre-process or process the readout signals and to deliver the readout signals to the signal processor system 124.

In the example system 260, the example QPC 102B includes a 2D device array 148A supported inside an interior volume 206 of the electromagnetic waveguide system 104B by a signal board 140A, as shown, for example, in FIGS. 9, 11A, and 13C-13E. The example electromagnetic waveguide system 104B includes holes (e.g., 242A) in a base portion (e.g., 236) adjacent to input plateaus (e.g., some of plateaus 228) of the signal board 140A, and at least a portion of the plateaus are located outside the interior volume 206 of the electromagnetic waveguide system 104B. The holes of the base portion can house, outside the interior volume 206 of the electromagnetic waveguide system 104B, QPC input connector hardware 136B. In the example illustrated in FIG. 17B, the QPC input connector hardware 136B includes an array of input vertical interconnects 136B, where each of the input vertical interconnects has an input end and an opposing, output end, and is formed from multiple wires directed from the input end to the output end. In the example system 260, a respective input vertical interconnect 136B is disposed in each hole of the base portion of the electromagnetic waveguide system 104B, such that the input end of the input vertical interconnect 136B is coupled with the input signal processing system 128A and the output end of the input vertical interconnect 136B is coupled with an input connection junction (e.g., some of connection junction 251) at a respective input plateau of the signal board 140A.

Similarly, the example electromagnetic waveguide system 104B includes holes (e.g., 242B) in a lid portion (e.g., 238) distributed adjacent to output plateaus (e.g., other plateaus 228) of the signal board 140A, and at least a portion of the plateaus are located outside of the interior volume 206 of the electromagnetic waveguide system 104B. The holes of the lid portion can house, outside the interior volume 206 of the electromagnetic waveguide system 104B, QPC output connector hardware 138B. In the example illustrated in FIG. 17B, the QPC output connector hardware 138B includes another array of output vertical interconnects 138B, where each of the output vertical interconnects has an input end and an opposing, output end, and is formed from multiple wires or conductive paths directed from the input end to the output end. In the example system 260, a respective output vertical interconnect 138B is inserted in each hole of the lid portion of the electromagnetic waveguide system 104B, such that the input end of the output vertical interconnect 138B is coupled with an output connection junction (e.g., other connection junctions 251) at a respective output plateau of the signal board 140A and the output end of the output vertical interconnect 138B is coupled with the output signal processing system 130A. A number of wires of an input vertical interconnect 136B can be the same as or different from a number of wires of an output vertical interconnect 138B. Also, a type of the wires (material, thickness, etc.) of the input vertical interconnect 136B can be the same as or different from a type of the wires of the output vertical interconnect 138B. Wires or conductive paths may be formed, for example, by vias, by interconnect pins, an interposer board, or other structures.

FIGS. 18A-18C show examples of input and output connector hardware for the example QPC 102B. FIG. 18A is a perspective view of the example base portion 236A that includes vertical interconnects 136B, and FIG. 18B is a perspective view showing the lid portion 238A that includes vertical interconnects 138B. FIG. 18C shows a perspective view of internal components of the example electromagnetic waveguide system shown in FIG. 18B.

In the example shown in FIG. 18A, the input vertical interconnects 136B reside in the holes (e.g., 242A) formed by base wall structures 210A of the base portion 236A of the electromagnetic waveguide system 104B. In some instances, the input vertical interconnects 136B may be installed in the base portion 236A, for example, between operations 250-1 and 250-2 of the example process 250 shown in FIGS. 13A-13G. The input vertical interconnects 136B may be installed in another manner or at other points in an assembly process. The input vertical interconnects 136B can mate with (e.g., contact) input plateaus 228B of the example signal board 140A. In some cases, holes of the remaining base wall structures 210A' of the base portion 236A that will be mated with output plateaus 228C of the example signal board 140A may be plugged or covered with base plugs 266.

As shown in the example shown in FIG. 18B, the output vertical interconnects 138B are installed in the lid portion 238A. For instance, output vertical interconnects 138B may be installed in a manner that is analogous to the installation of the input vertical interconnects described above. In some cases, the output vertical interconnects 138B may be installed in the lid portion 238A, for example, between or during a combination of operations 250-5 and 250-6 of the example process 250 shown in FIGS. 13A-13G. The output vertical interconnects 138B may be installed in another manner or at other points in an assembly process.

In the perspective view shown in FIG. 18C, portions of the QPC 102B from FIG. 18B are hidden from view; in particular, portions located above a slice that crosses the lid portion 238A and the input vertical interconnects 136B are hidden from view. As demonstrated by FIGS. 18B and 18C, the example 2D device array 148A is supported by the example signal board 140A, and the signal board 140A is sandwiched between the base portion 236A and the lid portion 238A of the electromagnetic waveguide system 104B. The output vertical interconnects 138B reside in holes (e.g., 242B) formed by lid wall structures (e.g., 210B) of the lid portion 238A. The output vertical interconnects 138B can mate with (e.g., contact) output plateaus 228C of the example signal board 140A. In some cases, holes of the remaining lid wall structures of the lid portion 238A that are mated with input plateaus 228B of the example signal board 140A can be plugged or covered with lid plugs 268.

In some instances, aspects of the signal flow illustrated in FIG. 17A can be performed by components shown in FIGS. 18A-18C. For example, control signals can be delivered from the input signal processing system 128 through the input vertical interconnects 136B to connection input junctions on the input plateaus 228B of the example signal board 140A. From the input junctions, the control signals can be communicated into the electromagnetic waveguide system 104B and routed (e.g., horizontally) through signal lines 225 (e.g., qubit signal lines 225A or coupler signal lines 225B) of the signal board 140A to target qubit devices or coupler devices of the 2D device array 148A. In some instances, the readout devices (which may be respectively collocated with the qubit devices of the 2D device array 148A) produce qubit readout signals by reflecting or otherwise modulating a readout control signal received from the input signal processing system. The qubit readout signals can be routed (e.g., horizontally) from the readout devices through signal lines 225 (e.g., readout signal lines) of the example signal board 140A to the exterior of the electromagnetic waveguide system 104B. In particular, the qubit readout signals can be routed to connection output junctions on the output plateaus 228C of the signal board 140A. From the connection output junctions, the qubit readout signals can be delivered to the output signal processing system 130A through the output vertical interconnects 138B.

Figure 19:
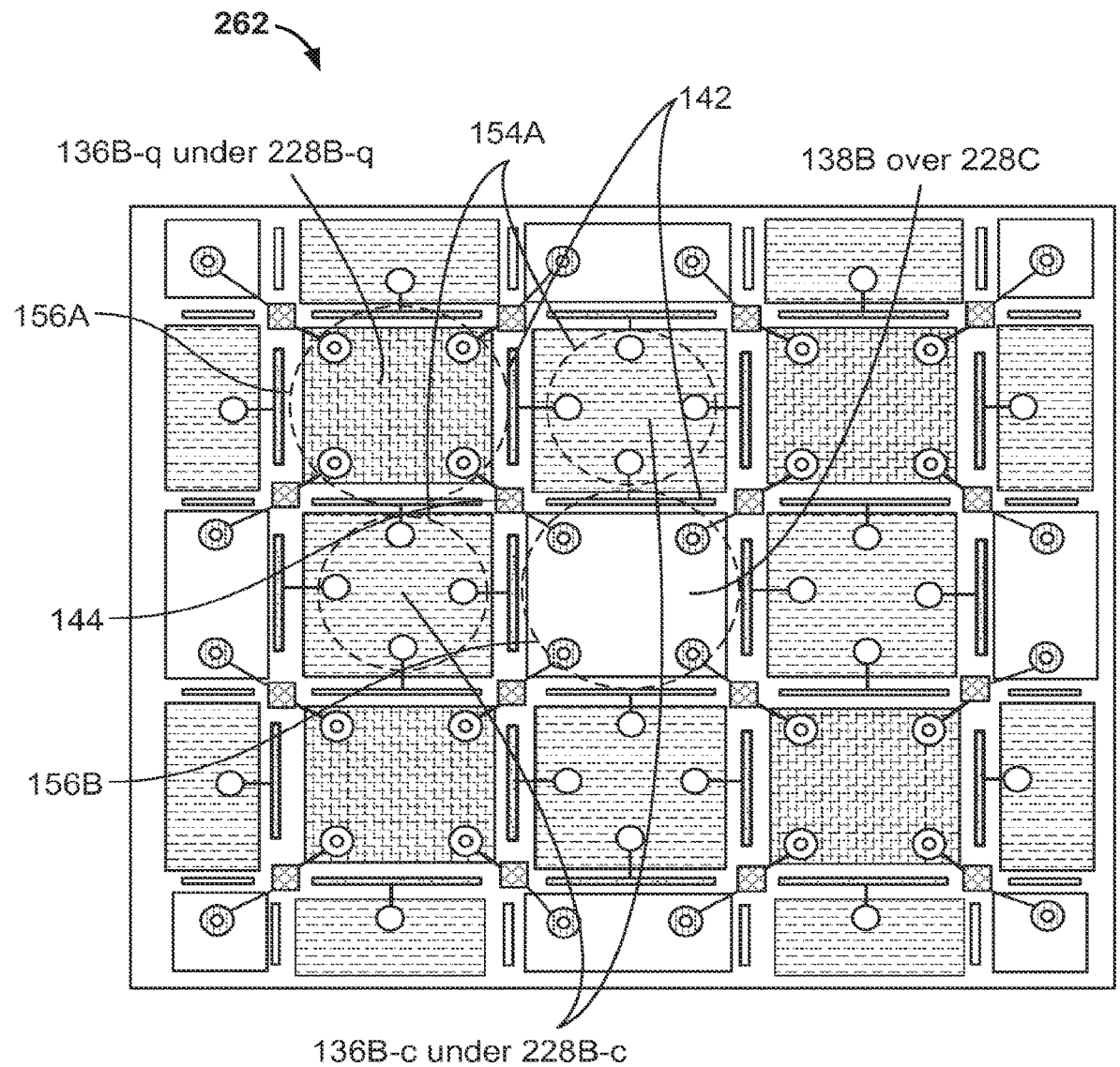
FIG. 19 shows aspects of an example device array in an example quantum processor cell.

FIG. 19 shows an example signal routing arrangement 262 for the example 2D device array 148A shown in FIGS. 18A-18C. The example routing arrangement 262 can be repeated in space to accommodate larger device arrays. For example, the attributes of the example routing arrangement 262 can be adapted for arrays that include tens or hundreds of qubit devices organized in N rows and M columns (e.g., where N and M can be equal or unequal), and coupler devices at the bonds between the qubit device. For instance, the example routing arrangement 262 can be used in a two-dimensional device array where N=M=4, 16, 32, 64, etc. In this manner, the example shown in FIG. 19 can be extended to implement QPCs of arbitrarily large size, for example, for general purpose quantum computing and quantum information storage.

In the example routing arrangement 262 shown in FIG. 19, each qubit input plateau 228B-q includes four qubit control ports 156A. Each of the qubit control ports 156A on a qubit input plateau 228B-q is connected (e.g., by a signal line) to a respective one of the four adjacent qubit devices 144. The four qubit control ports 156A on a qubit input plateau 228B-q can contact a qubit input vertical interconnect 136B-q associated with the qubit input plateau 228B-q.

In the example routing arrangement 262 shown in FIG. 19, each output plateau 228C includes four readout control ports 156B. Each of the readout control ports 156B on an output plateau 228C is connected (e.g., by a signal line) to a respective one of the four adjacent qubit devices 144. The readout qubit control ports 156B on an output plateau 228C can contact an output vertical interconnect 138B associated with the output plateau 228C. In some examples, the signal board includes equal numbers of input plateaus 228B-q and output plateaus 228C.

In the example routing arrangement 262 shown in FIG. 19, each coupler input plateau 228B-c includes four coupler control ports 154A. Each of the coupler control ports 154A on a coupler input plateau 228B-c is connected (e.g., by a signal line) to a respective one of the four adjacent coupler devices 142. The four coupler control ports 154A on a coupler input plateau 228B-c can contact a coupler input vertical interconnect 136B-c associated with the coupler input plateau 228B-c. In some examples, the signal board includes a number of coupler input plateaus 228B-c that is greater than (e.g., twice) the number of input plateaus 228B-q or output plateaus 228C.

In the example shown in FIG. 19, rows of alternating qubit input plateaus 228B-q and coupler input plateaus 228B-c alternate with rows of alternating output plateaus 228C and coupler input plateaus 228B-c. Similarly, columns of alternating qubit input plateaus 228B-q and coupler input plateaus 228B-c alternate with columns of alternating output plateaus 228C and coupler input plateaus 228B-c. Thus, there are a greater number of input vertical interconnects 136B than output vertical interconnects 138B. And, among the input vertical interconnects 136B, there are a larger number of coupler input vertical interconnects 136B-c than qubit input vertical interconnects 136B-q.

In some implementations, groups of input processing hardware components 132 of the input signal processing system 128A can be spatially distributed (e.g., relative to the QPC 102B) in a manner that shortens (reduces the physical length of) or minimizes the signal paths that communicate between the input processing hardware components and the devices in the QPC 102B (e.g., qubit devices 144A and coupler devices 142A). Similarly, groups of output processing hardware components 134 of the output signal processing system 130A can be spatially distributed (e.g., relative to the QPC 102B) in a manner that shortens (reduces the physical length of) or minimizes the signal paths that communicate between the output processing hardware components and the devices in the QPC 102B (e.g., readout devices). Examples of input and output signal processing systems that include such groups of input or output processing hardware are described below.

Figure 20A:
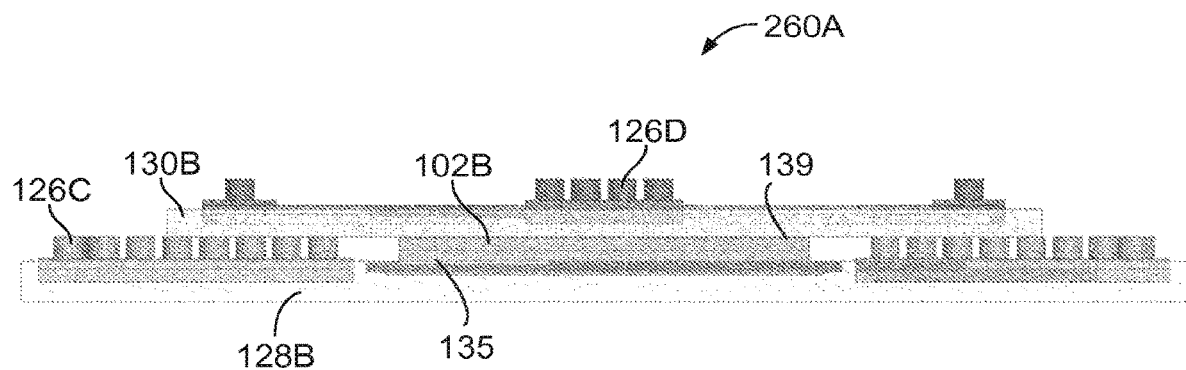
FIGS. 20A-20E show examples components of an example signal delivery subsystem.
Figure 20B:
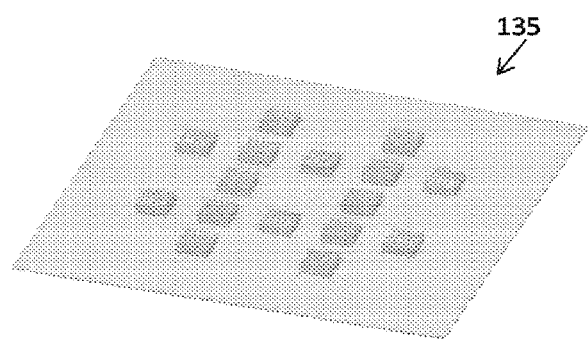
Figure 20C:
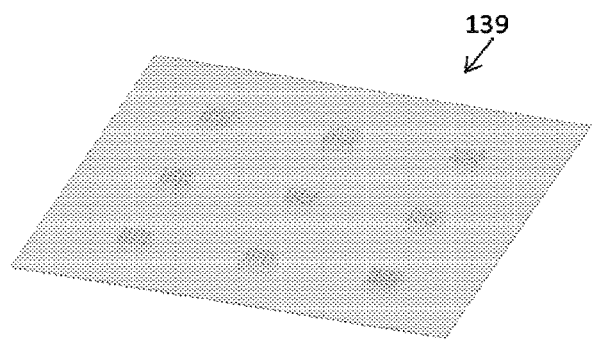
Figure 20D:
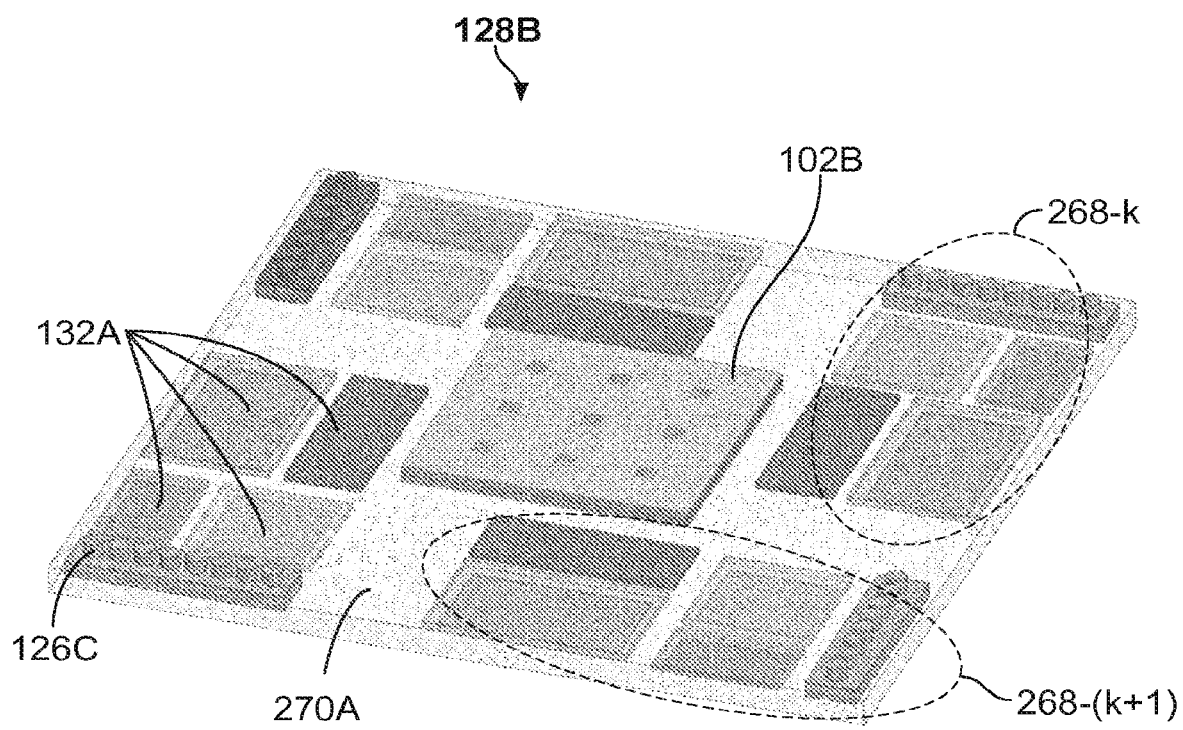
Figure 20E:
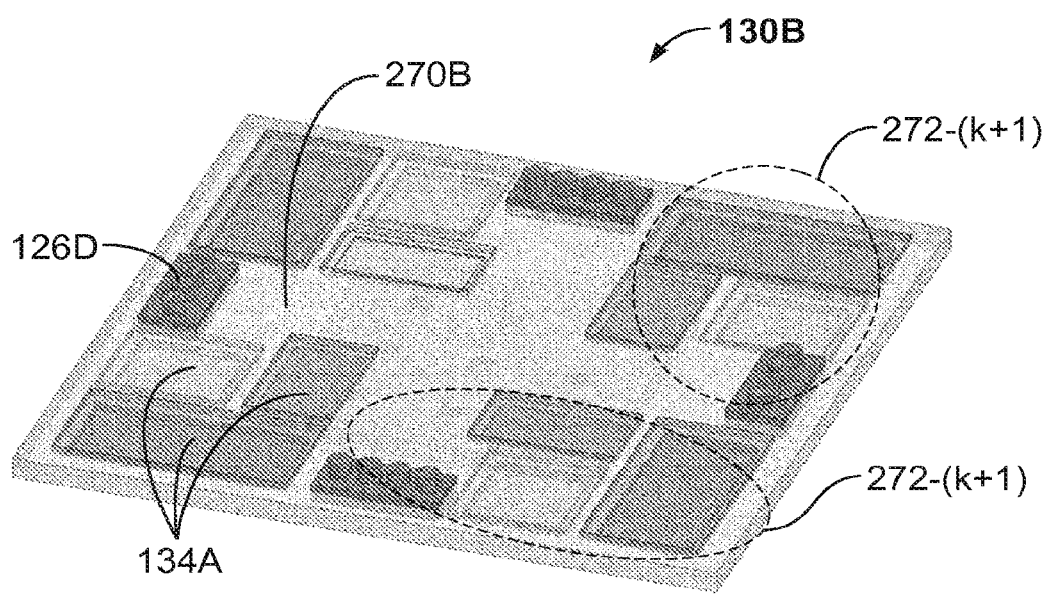

FIG. 20A is a side view of an example system 260A that includes the example QPC 102B, a modular input signal processing system 128B and a modular output signal processing system 130B. In the example shown, the modular input signal processing system 128B is communicably coupled (e.g., by signal lines) with a signal generator system 120 through input control system connectors 126C, and is communicably coupled with the QPC 102B through QPC input connector hardware 136. Also, the modular output signal processing system 130B is communicably coupled with the QPC 102B through QPC output connector hardware 138, and is communicably coupled with a signal processor system 124 (e.g., by signal lines) through output control system connectors 126D.

As described above in connection with FIGS. 17A-17B, 18A-18C and 19, the example QPC input connector hardware 136 includes an array of input vertical interconnects 136B configured to connect with input plateaus of an example signal board 140A of the QPC 102B. In the example shown in FIG. 20A, the QPC input connector hardware 136 includes, in addition to the array of input vertical interconnects 136B, an input interconnect plate 135. FIG. 20B shows an example input interconnect plate 135 having connectors patterned to match the array of input vertical interconnects 136B. Referring again to FIG. 20A, the example input interconnect plate 135 is sandwiched between the QPC 102B and the modular input signal processing system 128B. In this manner, the example input interconnect plate 135 can couple horizontal control signal lines of the modular input signal processing system 128B to vertical wires of the input vertical interconnects 136B.

Also as described above, the QPC output connector hardware 138 includes an array of output vertical interconnects 138B configured to connect with output plateaus of the example signal board 140A. In the example shown in FIG. 20A, the QPC output connector hardware includes, in addition to the array of output vertical interconnects 138B, an output interconnect plate 139. FIG. 20C shows an example output interconnect plate 139 having connectors patterned to match the array of output vertical interconnects 138B. Referring again to FIG. 20A, the example output interconnect plate 139 is sandwiched between the QPC 102B and the modular output signal processing system 130B. In this manner, the example output interconnect plate 139 can couple vertical wires of the output vertical interconnects 138B to horizontal signal lines of the modular output signal processing system 130B.

FIG. 20D is a perspective view of the example modular input signal processing system 128B. The modular input signal processing system 128B can include M input modules, where each input module 268-$k$ ($k=1 \ldots M$) includes a respective subset of input control system connectors 126C and input processing hardware 132A. Each input module 268-$k$ is configured to deliver control signals to qubit devices and coupler devices arranged in a $k^{th}$ section of the 2D device array 148A of the QPC 102B. In some implementations, the sections are defined based on a number of rows in each section. For example, each section may include N/M rows, where N is the total number of rows of the 2D device array 148A. In other implementations, the sections are defined based on a number of columns in each section. For example, each section may include N/M columns, where N is the total number of columns of the 2D device array 148A. In some other implementations, the sections are defined based on other schemes. In the example illustrated in FIG. 20D, each quadrant of the 2D device array can be a section that is controlled by a respective input module 268-$k$. The sections of a device array may be arranged in another manner.

In some implementations, the input modules 268-$k$ of the example modular input signal processing system 128B each include input processing cards housed on an input processing board 270A. The example input processing board 270A can include receptacle slots that support the input processing cards, and allow the input processing cards to be removed or exchanged for other components. Here, each of the receptacle slots that supports a respective input processing card is located on the input processing board 270A adjacent to the corresponding section of the QPC 102B. In the example input processing board 270A shown in FIG. 20D, the input processing cards in the input module 268-$k$ are located on the input processing board 270A adjacent to the $k^{th}$ quadrant of the QPC 102B. Signal lines that carry control signals for respective qubit devices or coupler devices arranged in the $k^{th}$ section of the QPC 102B are routed from the receptacle slot that supports the input processing cards in the input module 268-$k$ to an adjacent $k^{th}$ portion of the input interconnect plate 135. The signal lines and processing cards can be arranged in an efficient manner, for example, in a manner that reduces or minimizes a length of the signal lines in the input processing board 270A.

In some implementations, the input modules 268-$k$ of the example modular input signal processing system 128B are formed on respective input processing board sections of the input processing board 270A. In such cases, each of the input processing board sections is located on the input processing board 270A adjacent to the $k^{th}$ section of the QPC 102B. In the example input processing board 270A shown in FIG. 20D, the input processing board section for the input module 268-$k$ is located on the input processing board 270A adjacent to the $k^{th}$ quadrant of the QPC 102B.

In the example modular input signal processing system 128B, the input processing hardware 132A of each input module 268-$k$ can include one or more de-multiplexer circuits. In some implementations, the received control signals targeted for a subgroup of qubit devices or coupler devices of the $k^{th}$ quadrant are multiplexed together. In some implementations, the received control signals targeted for a subgroup of qubit devices and coupler devices arranged in the $k^{th}$ quadrant are multiplexed on a single input channel. In some implementations, write signals and read signals targeted for a qubit device arranged in the $k^{th}$ quadrant are multiplexed on a single input channel. The de-multiplexer circuits of the input module 268-$k$ can be configured to separate the multiplexed control signals, for example, device-by-device.

The example input processing hardware 132A of each input module 268-$k$ can include bias processing circuits. The bias processing circuits of the input module 268-$k$ are configured to combine AC control signals with DC bias control signals targeted for a coupler device of the $k^{th}$ quadrant. These and other input processing hardware 132A of each input module 268-$k$ of the example modular input signal processing system 128B are described in more detail below in connection with FIG. 23A and others.

Furthermore, the subset of input control system connectors 126C of each input module 268-$k$ is configured to receive, from the signal generator system 120, the above-noted multiplexed control signals for qubit devices and coupler devices of the $k^{th}$ quadrant of the 2D device array 148A. The multiplexed signals can be delivered from the subset of input control system connectors 126C of input module 268-$k$ to the input processing hardware 132A thereof through signal lines routed on or through the input processing board 270A.

FIG. 20E is a perspective view of the example modular output signal processing system 130B. The modular output signal processing system 130B can include M output modules, where each output module 272-$k$ ($k=1 \ldots M$) includes a respective subset of output control system connectors 126D and output processing hardware 134A. Each output module 272-$k$ is configured to receive readout signals from readout devices collocated with qubit devices arranged in a $k^{th}$ section of the 2D device array 148A of the QPC 102B. The sections of the 2D device array 148A can be allocated in the same manner as the sections are allocated for control signal management, or in a different manner. In the example illustrated in FIG. 20E, each quadrant of the 2D device array can be a section that sends readout signals to a respective output module 272-$k$.

In some implementations, the output modules 272-$k$ of the example modular output signal processing system 130B each include output processing cards housed on an output processing board 270B. The example output processing board 270B can include receptacle slots that support the output processing cards, and allow the output processing cards to be removed or exchanged for other components. Here, each of the receptacle slots that supports a respective output processing card is located on the output processing board 270B adjacent to the corresponding section of the QPC 102B. In the example output processing board 270B shown in FIG. 20E, the output processing cards in the output module 272-$k$ are located on the output processing board 270B adjacent to the $k^{th}$ quadrant of the QPC 102B. Signal lines that carry readout signals from readout devices in the $k^{th}$ section are routed from the receptacle slot that supports the output processing card 272-$k$ to adjacent $k^{th}$ portion of the output interconnect plate 139. The signal lines and processing cards can be arranged in an efficient manner, for example, in a manner that reduces or minimizes a length of the signal lines in the output processing board 270B.

In some implementations, the output modules of the example modular output signal processing system 130B are formed on respective output processing board sections of an output processing board 270B. In such cases, each of the output processing board sections can be located on the output processing board 270B adjacent to the $k^{th}$ section of the QPC 102B. In the example output processing board 270B shown in FIG. 20E, the output processing board section for the output module 272-$k$ is located on the output processing board 270B adjacent to the $k^{th}$ quadrant of the QPC 102B.

In the example modular output signal processing system 130B, the output processing hardware 134A of each output module 272-$k$ can include isolator circuits. When p is the number of qubit devices arranged in the $k^{th}$ section of the QPC 102B associated with the output module 272-$k$, the isolator circuits of the output module 272-$k$ can be configured to isolate respective p readout signals received from readout devices arranged in the $k^{th}$ section.

The example output processing hardware 134A of each output module 272-$k$ can include parametric amplifier circuits and their respective pump or driver circuits. The parametric amplifier circuits can be configured to amplify, in conjunction with the pump circuits, the isolated p readout signals. In this manner, the readout signals received from readout devices arranged in the $k^{th}$ section can be amplified at a location adjacent to the $k^{th}$ section of the QPC 102B where the readout signals were generated. Amplifying or otherwise processing readout signals near the QPC 102B can reduce noise, e.g., transmission line noise or other environmental noise sources.

The example output processing hardware 134A of each output module 272-$k$ can include one or more multiplexer circuits. The multiplexer circuits of the output module 272-$k$ can be configured to combine the p amplified readout signals corresponding to the p qubit devices of the $k^{th}$ section into a $k^{th}$ modulated readout signal associated with the $k^{th}$ section. These and other output processing hardware 134A of each output module 272-$k$ of the example modular output signal processing system 130B are described in more detail below in connection with FIG. 23A and others. Other configurations of the processing cards can be used in an output signal processing system or an input signal processing system.

Additionally, the subset of output control system connectors 126D of each output module 272-$k$ can be configured to receive, from the multiplexer circuits of output module 272-$k$, the $k^{th}$ multiplexed readout signal. The $k^{th}$ multiplexed readout signal can be delivered from the multiplexer circuits of output module 272-$k$ to its subset of output control system connectors 126D through a signal line routed on or through the output processing board 270B. The $k^{th}$ multiplexed readout signal can be extracted from the example modular output signal processing system 130B at the subset of output control system connectors 126D for the output module 272-$k$. The extracted multiplexed readout signal can be delivered to a signal processing system 124.

FIGS. 21A-21C are diagrams showing example operating frequencies for devices in a quantum processor cell. In some instances, the operating frequencies and other attributes shown and described with respect to FIGS. 21A-21C can implemented by the example quantum processor cells 102A, 102B, 102C described above, or another type of quantum processor cell. FIG. 21A shows a frequency spectrum plot 2100 that indicates example operating frequencies of qubit devices and readout devices. As shown in FIG. 21A, the frequency spectrum plot 2100 includes frequencies ranging from 3.2 GHz to 4.1 GHz. The example operating frequencies and other attributes shown in FIG. 21A can be adapted to other frequency bands or scaled to other frequency units, for example, for use with devices or systems operating in other frequency ranges.

Figure 22A:
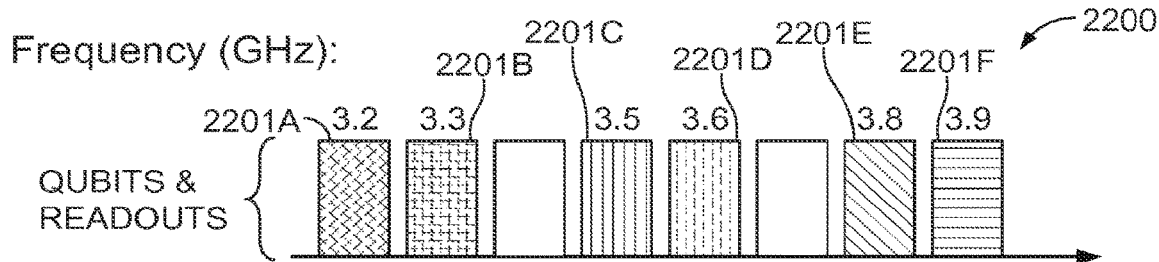
FIGS. 22A-C are diagrams showing other example operating frequencies for devices in a quantum processor cell.
Figure 22B:
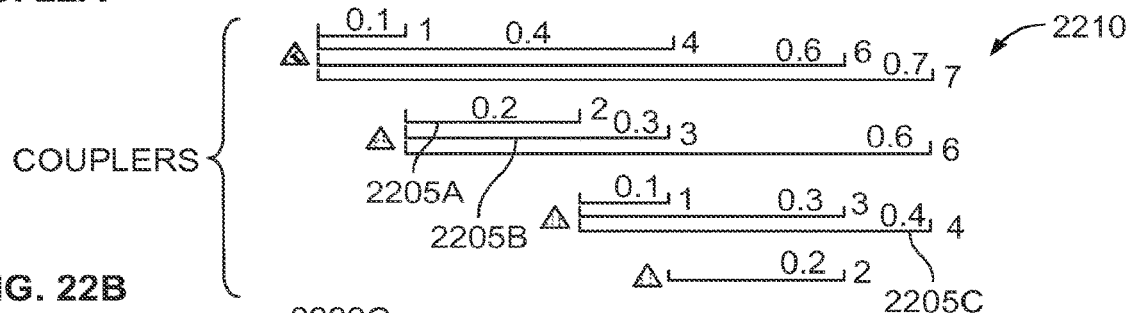
Figure 22C:
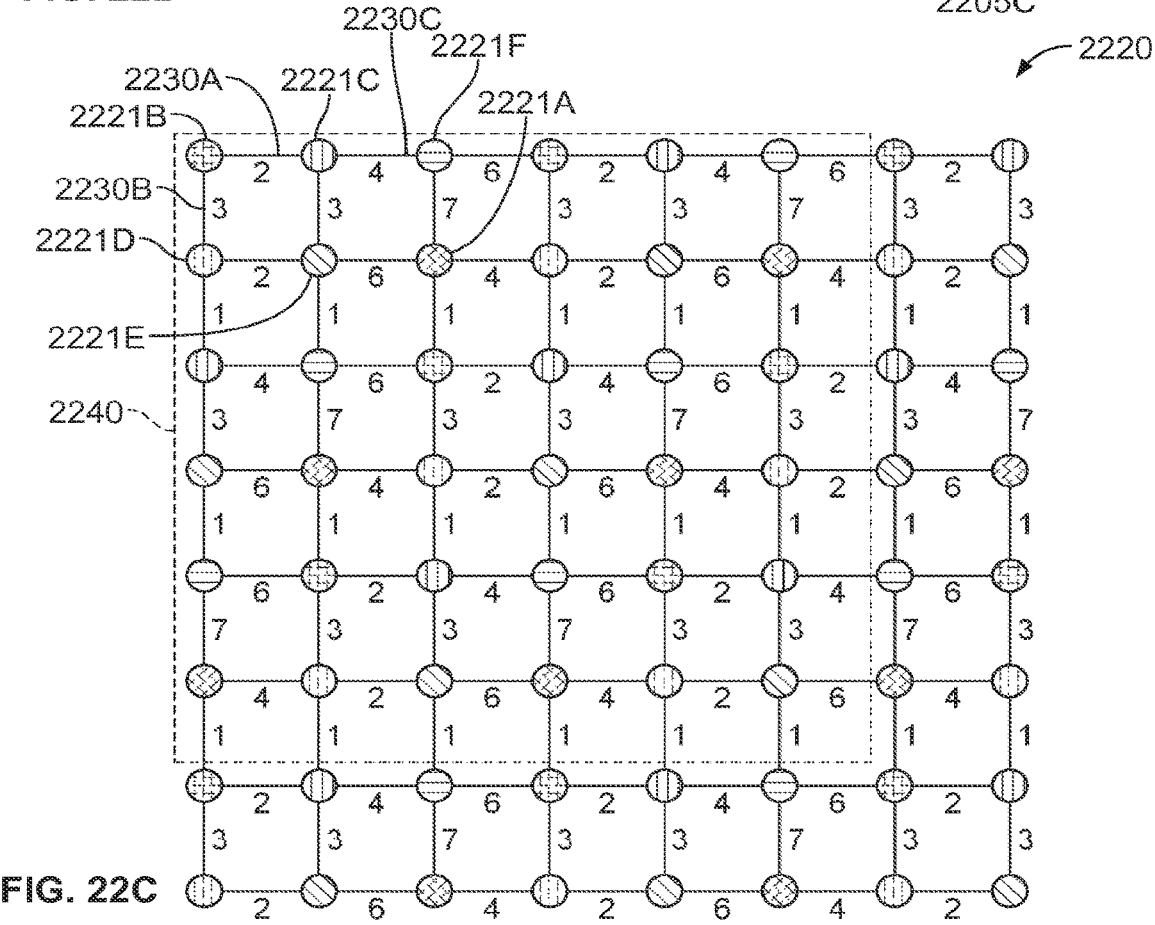

The example frequency spectrum plot 2100 in FIG. 21A indicates five distinct qubit operating frequencies and five distinct readout frequencies. In some cases, another number of qubit operating frequencies and readout frequencies can be used. For example, FIGS. 22A-C show an example where six qubit operating frequencies and six readout frequencies are used.

In the example shown in FIG. 21A, a first qubit operating frequency 2101A and a first readout frequency 2102A are within a first frequency band at 3.2 GHz, and the first qubit operating frequency 2101A is less than the first readout frequency 2102A; a second qubit operating frequency 2101B and a second readout frequency 2102B are within a second frequency band at 3.6 GHz, and the second qubit operating frequency 2101B is less than the second readout frequency 2102B; a third qubit operating frequency 2101C and a third readout frequency 2102C are within a third frequency band at 3.8 GHz, and the third qubit operating frequency 2101C is less than the third readout frequency 2102C; a fourth qubit operating frequency 2101D and a fourth readout frequency 2102D are within a fourth frequency band at 3.9 GHz, and the fourth qubit operating frequency 2101D is less than the fourth readout frequency 2102D; a fifth qubit operating frequency 2101E and a fifth readout frequency 2102E are within a fifth frequency band at 4.1 GHz, and the fifth qubit operating frequency 2101E is less than the fifth readout frequency 2102E. Each of the respective frequency bands is separate and distinct from the other frequency bands, so that there is no overlap between any two frequency bands indicated in the frequency spectrum plot 2100.

In the example shown, the respective readout frequencies are interleaved with the qubit operating frequencies in the frequency spectrum plot 2100. For example, progressing from the low end to the high end of the frequency spectrum, the qubit operating frequencies alternate with the readout frequencies. In some instances, the qubit operating frequency and the readout frequency within each frequency band can be interchanged or otherwise modified (increased or decreased), such that the qubit operating frequency may be higher than the readout frequency within one or more of the frequency bands. In some implementations, the qubit operating frequencies are not interleaved with the readout frequencies; for example, the qubit operating frequencies can be grouped in one frequency band, and the readout frequencies can be grouped in a separate, distinct frequency band.

As shown in FIG. 21A, the frequency bands are spaced apart from each other by intervals in the frequency spectrum 2100. The intervals between the neighboring pairs of frequency bands vary. For example, the interval between the first frequency band and the second frequency band is 0.4 GHz, and the interval between the second frequency band and the third frequency band is 0.2 GHz. Thus, the second frequency band is spaced apart from one of its nearest-neighbor frequency bands by a first interval (0.4 GHz), and the second frequency band is spaced apart from its other nearest-neighbor frequency band by a second, distinct interval (0.2 GHz). Some of the intervals between nearest-neighbor frequency bands are equal. For example, the spacing between the second frequency band and the third frequency band is 0.2 GHz, and the spacing between the fourth frequency band at the fifth frequency band is also 0.2 GHz. Thus, the intervals shown in the frequency spectrum plot 2100 can be sorted into subsets of equal intervals (where the intervals that form each subset are equal to each other, and intervals that are in distinct subsets are unequal).

FIG. 21B shows a frequency difference plot that indicates differences between the operating frequencies shown in FIG. 21A, and frequency differences for nearest neighbor qubits in the device array 2120 in FIG. 21C. In particular, each horizontal line indicates the frequency difference between two of the frequency bands in FIG. 21A. For example, the frequency difference 2105A indicates the difference between the first frequency band in FIG. 21A (which includes the first qubit operating frequency 2101A and the first readout frequency 2102A) and the second frequency band (which includes the second qubit operating frequency 2101B and the second readout operating frequency 2102B). Similarly, the frequency difference 2105B indicates the frequency difference between the first frequency band and the third frequency band (which includes the third qubit operating frequency 2101C and the third readout frequency 2102C).

In some instances, the frequency differences shown in FIG. 21B can be used to operate coupler devices in a quantum processor cell. For instance, the frequency differences indicated in the frequency difference plot 2110 can be used as drive frequencies for coupler devices that interact with qubit devices having the qubit operating frequencies indicated in FIG. 21A. In some implementations, coupler devices can be operated using the sum frequencies of the qubit frequencies, rather than difference frequencies.

FIG. 21C shows an example arrangement of devices in an example device array 2120. The circles in the device array 2120 indicate the locations of qubit devices, and the lines between the circles indicate the locations of coupler devices. FIG. 21C also indicates the locations of plateaus in the device array 2120 where signals are communicated between an external control system and the devices in the device array 2120. As shown in FIG. 21C, the frequency difference between any given qubit and each of its nearest-neighbor qubits is distinct. A device array may include additional or different features, and the devices and other attributes may be arranged in another manner.

In the example device array 2120, the qubit devices have respective qubit operating frequencies that are indicated by the shading of the qubit devices in the figure. For example, the first qubit device 2121A has an operating frequency that corresponds to the first qubit operating frequency 2101A shown in FIG. 21A, the qubit device 2121B has an operating frequency that corresponds to the second qubit operating frequency 2101B shown in FIG. 21A, etc.

The device array 2120 shown in FIG. 21C is an example of a multi-dimensional array that includes groups of qubit devices. In the example shown in FIG. 21C, each group of qubit devices includes five qubit devices, and the qubit devices in each group have distinct operating frequencies (corresponding to the five distinct qubit operating frequencies 2101A, 2101B, 2101C, 2101D, 2101E indicated in FIG. 21A). Thus, in the example shown, no two qubit devices in a group have the same qubit operating frequency, and the qubit control signals for the qubit devices in each group can be communicated on a single physical channel using, for example, the multiplexing and de-multiplexing systems and techniques described in this document. For example, each qubit device in the group of five qubit devices 2121A, 2121B, 2121C, 2121D, 2121E has a distinct qubit operating frequency, and qubit control signals addressed to the group of five qubit devices can be multiplexed onto a common signal line.

In FIG. 21C, the operating frequency of each individual coupler device can be selected based on the operating frequencies of the two qubit devices that are coupled by the individual coupler device. For example, the coupler device residing at the interval between the first qubit device 2121A and the third qubit device 2121C can be driven at a drive frequency that corresponds to the frequency difference 2105B shown in FIG. 21B, which is the difference between the first qubit operating frequency 2101A and the third qubit operating frequency 2101C; and the coupler device residing at the interval between the first qubit device 2121A and the fourth qubit device 2121D can be driven at a drive frequency that corresponds to the difference between the first qubit operating frequency 2101A and the fourth qubit operating frequency 2101D.

The example device array 2120 includes readout devices associated with the qubit devices. Each readout device can be operably coupled to a single, respective qubit device and configured to produce a qubit readout signal that indicates the quantum state of the single, respective qubit device. In the example shown, the readout device that is configured to read qubit device 2121A operates at the first readout frequency 2102A shown in FIG. 21A, the readout device that is configured to readout qubit device 2121B operates at the second readout frequency 2102B shown in FIG. 21A, etc.

In some implementations, the example device array 2120 includes groups of readout devices that correspond to the groups of qubit devices. For example, a group of five readout devices can be associated with the group of five qubit devices 2121A, 2121B, 2121C, 2121D, 2121E, and each readout device in the group can be operatively coupled to a respective one of the qubit devices. Like the groups of qubit devices, the readout devices within each group have distinct operating frequencies that correspond to the readout frequencies shown in FIG. 21A. In particular, each group of readout devices includes five readout devices, and the readout devices in each group have distinct readout frequencies (corresponding to the five distinct readout frequencies 2102A, 2102B, 2102C, 2102D, 2102E indicated in FIG. 21A). In some cases, each group can include another number of devices (e.g., a group may include two, three, four, five, six, seven, eight, nine, ten, or more devices).

The example device array 2120 includes three types of plateaus. A first subset of the plateaus include signal lines that deliver qubit control signals to the qubit devices, a second subset of the plateaus include signal lines that deliver coupler control signals to the control devices, and a third subset of the plateaus include signal lines that receive qubit readout signals from the readout devices. In the example shown in FIG. 21C, the qubit control plateau 2123 communicates qubit control signals to the four surrounding qubit devices (2121A, 2121C, 2121D, 2121E). Similarly, the coupler control plateau 2124 communicates coupler control signals to the four surrounding coupler devices (the coupler device between the qubits 2121D and 2121E, the coupler device between the qubits 2121D and 2121B, and the two other adjacent coupler devices). The qubit readout plateau 2125 communicates qubit readout signals from the four surrounding readout devices (including the readout device associated with the qubit device 2121E, and the three other adjacent readout devices). Additional or different types of plateaus may be used, and the plateaus may be arranged as shown or in another manner.

In some instances, the qubit devices in the device array 2120 receive qubit control signals that are configured to manipulate the quantum state of the qubit devices. For example, the qubit control signal can correspond to an encoding operation or a single-qubit gate in a quantum algorithm, a quantum error correction procedure, a quantum state distillation procedure, etc. In the example shown, the qubit control signals are microwave pulses, at the qubit operating frequencies indicated in FIG. 21A. In some cases, other types of qubit control signals may be used.

In some instances, qubit control signals for a group of qubits can be communicated (e.g., from a signal generator system) on a single physical channel to an input signal processing system associated with the device array 2120. The input signal processing system can separate the qubit control signals for each individual qubit device in the group based on the frequencies of the respective qubit control signals. For example, the qubit control signals that are addressed to the qubit device 2121A can have a signal frequency that corresponds to the qubit operating frequency 2101A, which can be separated (e.g., by operation of a de-multiplexer) from qubit control signals in other frequency ranges. Once the qubit control signals are divided onto separate physical channels, the qubit control signals can be routed to the appropriate qubit device and delivered through the appropriate qubit control plateau.

In some instances, the readout devices in the device array 2120 produce qubit readout signals based on the quantum states of the qubit devices. In some instances, the readout devices produce qubit readout signals in response to readout control signals received by the respective readout devices, for example, by reflecting the readout control signals with additional information (e.g., a phase shift, a frequency shift, an amplitude shift, etc.) that indicates the state of a qubit device. The qubit readout signals can be produced by the readout devices in response to the readout control signals, for example, based on electromagnetic interactions between the individual readout device and its respective qubit device. The qubit readout signals produced by a group of readout devices can be combined (e.g., multiplexed) onto a single physical channel. For example, the qubit readout signals can be communicated from the respective readout devices through the appropriate qubit readout plateaus to an output signal processing system. The output signal processing system can receive the respective qubit readout signals on multiple distinct physical channels and multiplex them onto a single physical channel.

The example device array 2120 is an example of a multi-dimensional array of qubit devices that includes sub-arrays, where each sub-array is associated with a separate one of the frequency bands shown in FIG. 21A. Each group of qubit devices includes one qubit device in each of the sub-arrays. In particular, the example device array 2120 includes five distinct sub-arrays, one sub-array for each frequency band shown in FIG. 21A. For example, all of the qubit devices in the example device array 2120 that are shaded as the first qubit device 2121A form a first sub-array, such that all qubit devices in the first sub-array have the first qubit operating frequency 2101A shown in FIG. 21A. Similarly, all of the qubit devices in the example device array 2120 that are shaded as the second qubit device 212B form a second sub-array, such that all qubit devices in the second sub-array have the second qubit operating frequency 2101B shown in FIG. 21A. In the example shown, the sub-arrays are mutually exclusive, such that no qubit device is included in more than one sub-array. Also in the example shown, the sub-arrays fully cover the device array 2120, such that every qubit device is included in one of the sub-arrays.

As shown in FIG. 21C, the qubit devices collectively define a tiling over the multi-dimensional device array 2120. In the example shown, each tile in the tiling is five-by-five in size; an individual tile 2140 is indicated by the dashed outline in FIG. 21C. The device array 2120 can include multiple tiles each arranged as the example tile 2140. The tiles in a multi-dimensional array can be repeated in any direction to scale the device array 2120 to include more qubit devices.

The example two-dimensional device array 2120 shown in FIG. 21C is an example of a rectilinear array, in which the qubit devices are arranged in rows and columns, with the columns perpendicular to the rows. The example two-dimensional array shown in FIG. 21C is also an example of a square array, in which the spacing is equal between all rectilinear rows and columns, and therefore, the physical length spacing is equal between each pair of nearest-neighbor qubit devices. In some examples, the physical length spacing between each pair of nearest-neighbor qubit devices is in the range of 0.2 to 2.0 centimeters. Another type of multi-dimensional array can be used, and the device spacing can be in a different range. For example, the array can be non-rectilinear, such that the rows are not perpendicular to the columns, or the array can be rectangular, such that the rows are spaced differently than the columns. Other types of two-dimensional arrays may be formed. In some instances, the example two-dimensional device array 2120 can be extended to three dimensions.

As shown in FIG. 21C, each of the qubit devices has two or more nearest-neighbor qubit devices. Thus, each qubit device is a member of at least two pairs of nearest-neighbor qubits. The qubit devices in each pair of nearest-neighbor qubit devices are connected to each other by a line (which represents the location of a coupler device) in the diagram shown in FIG. 21C. The four qubit devices at the corners of the device array 2120 each have two nearest-neighbors, the five qubit devices along each edge (between the corners) of the device array 2120 each have three nearest-neighbors, and the internal qubit devices that are not along the edges or corners each have four nearest-neighbors. In an example three-dimensional rectilinear array, the qubit devices at the corners would each have three nearest-neighbors, the qubit devices along each edge between the corners would each have four nearest-neighbors, and the internal qubit devices that are not along the edges or corners would each have six nearest-neighbors. Other types of three-dimensional arrays and lattices may be used. For instance, the devices can be arranged to form a Bravais lattice.

As shown in FIG. 21C, the qubit operating frequency of each qubit device is distinct from the qubit operating frequency of each of its nearest-neighbor qubit devices. For example, the qubit device 2121E has the fifth qubit operating frequency 2101E shown in FIG. 21A, and none of its nearest-neighbor qubit devices has the fifth qubit operating frequency 2101E. In particular, the nearest-neighbors of the qubit device 2121E have the first qubit operating frequency 2101A, the second qubit operating frequency 2101B, the third qubit operating frequency 2101C, and the fourth qubit operating frequency 2101D.

In the example shown in FIG. 21C, the readout frequencies of the readout devices in the device array 2120 can be arranged according to the same pattern as the qubit operating frequencies. Thus, the readout frequency of each readout device in the device array 2120 can be distinct from the readout frequency of each of its nearest-neighbor readout devices. For example, the readout device associated with the qubit device 2121E has the fifth readout frequency 2102E shown in FIG. 21A, and none of its nearest-neighbor readout devices has the readout frequency 2102E. In particular, the nearest-neighbors of the readout device associated with the qubit device 2121E have the first readout frequency 2102A, the second readout frequency 2102B, the third readout frequency 2102C, and the fourth readout frequency 2102D. Other arrangements of readout frequencies may be used.

For the example gate scheme shown in FIGS. 4C-4E or other gate schemes, the coupler devices in the example device array 2120 can be arranged such that no two coupler devices that have the same drive frequency are coupled to the same qubit device. For example, the coupler device between the qubit devices 2121D and 2121E can be driven at or near a drive frequency that is the difference between the operating frequencies of the qubit devices 2121D and 2121E. In particular, the coupler device between the qubit devices 2121D and 2121E can operate at 0.2 GHz, which is the difference between the fourth qubit operating frequency 2101D and the fifth qubit operating frequency 2101E. The other three coupler devices that are adjacent to the qubit device 2121E operate at different drive frequencies (i.e., different from 0.2 GHz). Specifically, the three other coupler devices that are adjacent to the qubit device 2121E are driven at 0.3 GHz (the difference between the third qubit operating frequency 2101C and the fifth qubit operating frequency 2101E), 0.9 GHz (the difference between the first qubit operating frequency 2101A and the fifth qubit operating frequency 2101E), and 0.5 GHz (the difference between the second qubit operating frequency 2101B and the fifth qubit operating frequency 2101E).

FIGS. 22A-22C are diagrams showing example operating frequencies for devices in a quantum processor cell. The example operating frequencies shown in FIGS. 22A-22C represent an alternative to the example shown in FIGS. 21A-21C. In some instances, the example operating frequencies shown in FIGS. 22A-22C can be implemented by a quantum processor cell in a manner that is analogous to the manner described with respect to FIGS. 21A-C. For instance, the operating frequencies and other attributes shown and described with respect to FIGS. 22A-C can be implemented by the example quantum processor cells 102A, 102B, 102C described above or another type of quantum processor cell.

FIG. 22A shows a frequency spectrum plot 2200 that indicates example operating frequencies of qubit devices and readout devices. As shown in FIG. 22A, the frequency spectrum includes frequencies ranging from 3.2 GHz to 3.9 GHz. The example operating frequencies shown in FIG. 22A can be adapted to other frequency bands or scaled to other frequency units, for example, for use with devices operating in other frequency ranges.

The example frequency spectrum plot 2200 in FIG. 22A indicates six distinct operating frequency bands 2201A, 2201B, 2201C, 2201D, 2201E and 2201F. Qubit operating frequencies and readout frequencies can be selected in each of the respective frequency bands. For example, each frequency band can include a qubit operating frequency and a readout frequency, such that there are six distinct qubit operating frequencies and six distinct readout frequencies. As shown in FIG. 22A, the frequency bands are spaced apart from each other at intervals along the frequency spectrum plot 2200, and the intervals between the neighboring pairs of frequency bands vary. Moreover, the frequency spectrum plot 2200 indicates two subsets of intervals, where the intervals within each subset are equal to each other (either 0.1 GHz or 0.2 GHz), and different from the intervals in the other subsets.

FIG. 22B shows a frequency difference plot that indicates differences between the frequency bands shown in FIG. 22B. In particular, each horizontal line indicates the frequency difference between two of the frequency bands and FIG. 22B. For example, the frequency difference 2205A indicates the difference between the second frequency band 2201B and the third frequency band 2201C. Similarly, the frequency difference 2205B indicates the difference between the second frequency band 2201B and the fourth frequency band 2201D, and the frequency difference 2205C indicates the difference between the third frequency band 2201C and the sixth frequency band 2201F. In the example shown, the frequency differences shown in FIG. 22B can be used to operate coupler devices in a quantum processor cell. As described with respect to FIG. 22C, the frequency differences indicated in the frequency difference plot 2210 can be used as drive frequencies for coupler devices that interact with qubit devices having the qubit operating frequencies indicated in FIG. 22A.

FIG. 22C shows an example arrangement of device frequencies in a device array 2220. Similar to FIG. 21C, the circles in the two-dimensional device array 2220 shown in FIG. 22C indicate the locations of qubit devices. The shading of each circle indicates the qubit operating frequency of the respective qubit device. For instance, the qubit device 2221A has a qubit operating frequency in the first frequency band 2201A shown in FIG. 22A, the qubit device 2221B has a qubit operating frequency in the second frequency band 2201B shown in FIG. 22A, etc.

Similar to FIG. 21C, the lines between the circles in the two-dimensional device array 2220 shown in FIG. 22C indicate the locations of coupler devices. The integer beside each line indicates the drive frequency that is used to operate the respective coupler device. For instance, the coupler device 2230B (which resides at the interval between the qubit device 2221B and the qubit device 2221D) is labeled "3" and is driven at a frequency of 0.3 GHz to produce an interaction between the two neighboring qubit devices (2221B, 2221D); the coupler device 2230A (which resides at the interval between the qubit device 2221B and the qubit device 2221C) is labeled "2" and is driven at a frequency of 0.2 GHz to produce an interaction between the two neighboring qubit devices (2221B, 2221C); and the coupler device 2230C (which resides at the interval between the qubit device 2221C and the qubit device 2221F) is labeled "4" and is driven at a frequency of 0.4 GHz to produce an interaction between the two neighboring qubit devices (2221C, 2221F).

The example device array 2220 includes groups of qubit devices and groups of readout devices. The groups of devices in the device array 2220 in FIG. 22C are similar to the groups in the example device array 2120 in FIG. 21C. For instance, no two qubit devices in a group have the same qubit operating frequency, and the control signals for the qubit devices in each group can be communicated on a single physical channel. However, the groups in the device array 2220 each include six devices (according to the six frequency bands shown in the frequency spectrum plot 2200) whereas the groups in the device array 2120 each include five devices (according to the five frequency bands shown in the frequency spectrum plot 2100). As an example, the qubit devices 2221A, 2221B, 2221C, 2221D, 2221E and 2221F all have distinct qubit operating frequencies and form a group in the example device array 2220. Accordingly, the multi-dimensional device array shown in FIG. 22C includes six distinct sub-arrays, one sub-array for each of the frequency bands.

In the example shown in FIG. 22C, the qubit devices collectively define a tiling over the multi-dimensional device array 2220. In the example shown in FIG. 22C, each tile in the tiling is six-by-six in size; an individual tile 2240 is indicated by the dashed outline in FIG. 22C. The device array 2220 can include multiple tiles each arranged as the example tile 2240. The tiles in the multi-dimensional array can be repeated in any direction to scale the device array 2220 to include more qubit devices.

The device array 2220 in FIG. 22C is another example of a two-dimensional square array, where each of the qubit devices has two or more nearest-neighbor qubit devices. Each pair of nearest-neighbor qubit devices is connected by a line (which represents the location of a coupler device) in the diagram shown in FIG. 22C. As shown in FIG. 22C, the qubit operating frequency of each qubit device is distinct from the qubit operating frequency of each of its nearest-neighbor qubit devices. Moreover, the readout frequencies of the readout devices in the device array 2220 can be arranged according to the same pattern as the qubit operating frequencies. As shown, the coupler devices in the device array 2220 are arranged such that no two coupler devices that have the same drive frequency are coupled to the same qubit device. Readout devices in the device array 2220 can each be coupled to a single, respective qubit device and configured to produce a qubit readout signal that indicates a quantum state of the respective qubit device.

In the example shown in FIG. 22C, the multi-dimensional array defines intervals between the qubit devices, and the coupler devices reside at the intervals between the neighboring pairs of the qubit devices in the multi-dimensional array. A first subset of the intervals are defined along the rows of the array, and a second subset of the intervals are defined along the columns of the array. Each coupler device is configured to generate an electromagnetic interaction between the respective neighboring pair of qubit devices that the coupler device resides between.

In some implementations, each of the coupler devices receives coupler control signals that are configured to produce an electromagnetic interaction between its neighboring pair of qubit devices (the pair of qubit devices that the coupler device resides between). For instance, the coupler control signals can be configured to produce a first-order interaction between the neighboring pair of qubit devices, and the interaction can modulate the degree of quantum entanglement of the qubit devices. In some cases, the coupler control signal corresponds to a two-qubit gate used in the execution of a quantum algorithm. In the example shown, the coupler control signals are radio frequency or microwave frequency pulses, at the drive frequencies indicated in FIG. 22B. In some cases, other types of coupler control signals may be used.

In some instances, each of the coupler devices is operated by applying both an offset field (e.g., a DC component) and a drive field (e.g., an AC component), while each qubit device is operated by applying only a drive field without an offset field. For example, the coupler devices can be implemented as flux qubit devices, and the qubit devices can be implemented as charge qubit devices. In some instances, each of the coupler devices has a respective coupler operating frequency that varies with an offset electromagnetic field experienced by the coupler device, and each qubit device has a respective qubit operating frequency that is independent of the electromagnetic field experienced by the qubit device. For example, the coupler devices can be implemented as fluxonium devices, and the qubit devices can be implemented as transmon devices.

In some implementations, each coupler device includes an offset field generator (e.g., an inductor) that is configured to generate an offset field that tunes the coupler operating frequency of the coupler device. The coupler device may also include a resonant circuit that is configured to generate an electromagnetic interaction between the neighboring pair of qubit devices. The coupler control signals received by the coupler device can include a DC component that causes the offset field generator of the coupler device to produce an offset electromagnetic field. The offset electromagnetic field can tune the coupler device to a particular frequency that increases a rate of interaction between the neighboring pair of qubit devices. The coupler control signals can also include an AC component that drives the resonant circuit at a drive frequency that corresponds to the difference between or sum of the qubit operating frequencies of the neighboring qubit devices. For instance, the AC component of the coupler control signals can have a frequency that is configured according to the integer beside the respective coupler device in FIG. 22C. In the example shown, the AC component of each coupler control signal is a radio frequency or microwave pulse.

In some implementations, the example arrangements of qubit operating frequencies and coupler drive frequencies shown in FIGS. 21C and 22C can provide advantages for building and operating a quantum computing system. For instance, the frequency allocation may allow the full spectrum of operating frequencies to be generated on a single channel and communicated in an efficient manner. This may reduce the number of wires and electronic components, the cost of materials, construction and maintenance, and provide other efficiencies. As another example, the arrangement of operating frequencies can enable scaling to larger numbers of qubits, by providing a repeatable pattern of operating frequencies. For example, each tile can use the same frequency spectrum as the example tiles 2140, 2240, or another tiling may be used.

The example device arrays 2120 and 2220 can form part of the example quantum processor cell 102A shown in FIG. 2, or the device arrays 2120, 2220 can be implemented in another type of quantum computing system. In some instances, the example device arrays 2120, 2220 can be operated based on the operating techniques and hardware shown in FIG. 23A, or the device array can be operated using other types of techniques or other types of hardware. In some cases, the qubit devices, readout devices, and coupler devices in the example device arrays 2120, 2220 are housed in the electromagnetic waveguide system 104 shown in FIG. 2 (e.g., in the type of arrangement shown in FIG. 5A), or the devices can be housed in another type of environment. Moreover, the qubit devices, readout devices and coupler devices in the example arrays 2120, 2220 can be implemented according to the examples shown in FIGS. 3A-3E, and they may operate as described, for example, with respect to FIGS. 4A, 4B, 4C, 4D and 4E. Alternatively, the devices can be implemented according to other designs or they may operate in another manner.

Figure 23A:
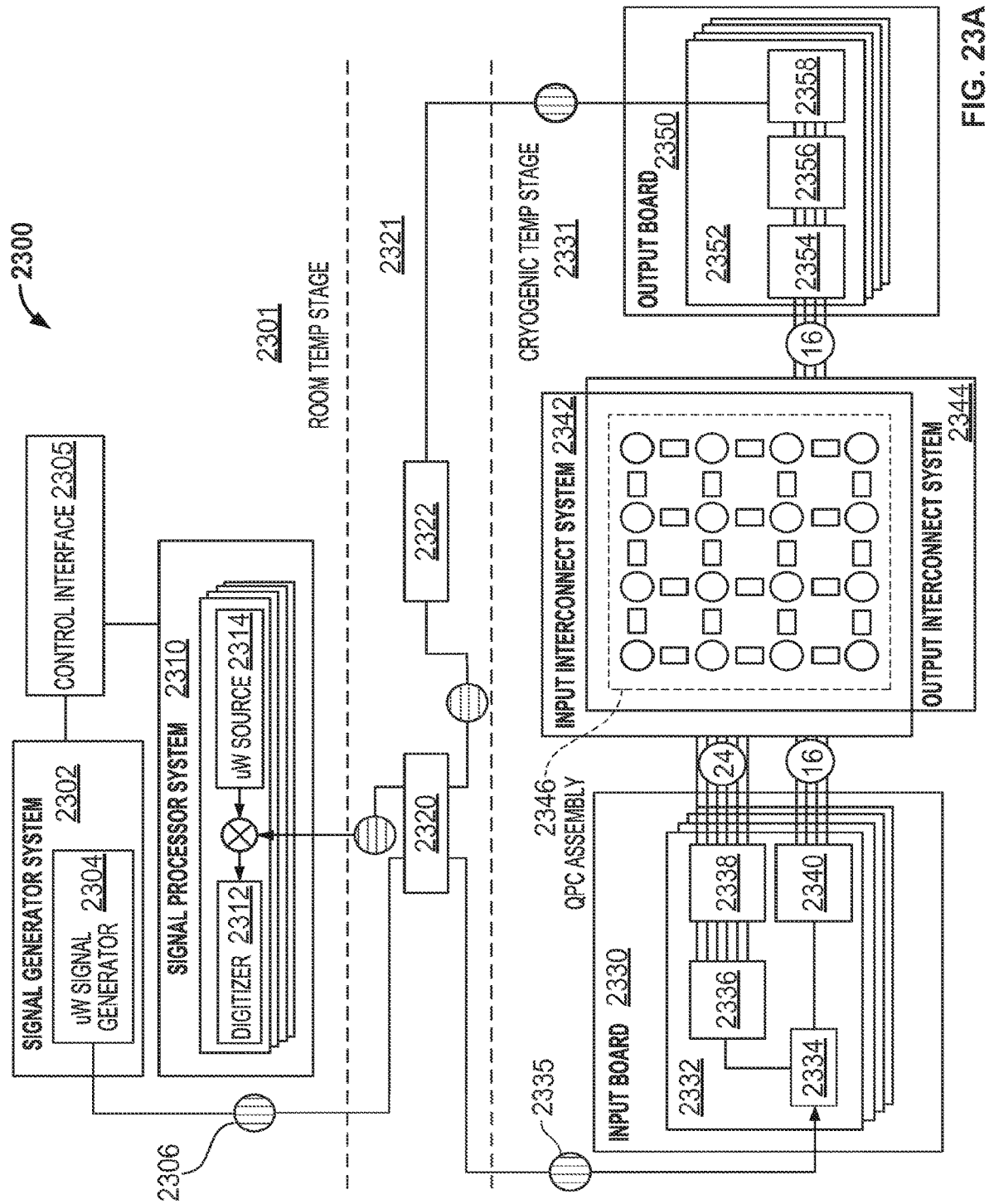
FIG. 23A is a block diagram of an example quantum computing system 2300 that includes multiple temperature stages and multiple operating domains.

FIG. 23A is a block diagram of an example quantum computing system 2300. The example quantum computing system 2300 can include the features of the example quantum computing system 100A shown in FIG. 2, or the example quantum computing system 2300 can be implemented in another manner. As shown in FIG. 23A, the example quantum computing system 2300 includes control system components that operate in a room temperature stage 2301. The room temperature stage 2301 can include operating conditions and an operational environment that is consistent with standard temperature and pressure, or another type of room temperature environment. For example, the components that operate in the room temperature stage 2301 can operate around 300 Kelvin or another typical room temperature.

The example quantum computing system 2300 also includes signal delivery and quantum processor cell components that operate in a cryogenic temperature stage 2331. The cryogenic temperature stage 2331 can include operating conditions and an operational environment that is consistent with cryogenic conditions. For example, the components that operate in the cryogenic temperature stage 2331 can operate at 5-10 mK or another cryogenic temperature. In some cases, the cryogenic temperature stage 2331 can provide appropriate operating conditions for low-temperature superconducting materials. In some cases, the cryogenic temperature stage 2331 includes an ultra-low noise environment that is shielded against an external environment. For example, the example quantum computing system can include a shielding system or shielding materials that prevent unwanted radio waves, microwaves or optical signals, or unwanted magnetic fields or mechanical vibrations, from entering the operating the environment of the cryogenic temperature stage 2331. For instance the shielding materials may include metallic, superconducting or lossy materials.

The example quantum computing system 2300 also includes components that operate in one or more intermediate temperature stages 2321. The intermediate temperature stages 2321 can include operating conditions and an operational environment that provide a buffer between the room temperature stage 2301 and the cryogenic temperature stage 2331. The intermediate temperature stages 2321 may be shielded from each other or from the room temperature stage 2301, for example, to maintain a temperature or noise level in the operating environment of the intermediate temperature stages 2321.

Signals can be communicated between the components operating in the different temperature stages of the quantum computing system 2300. In some cases, analog control signals are communicated in the room temperature environment on coaxial cables, waveguides, high-density microwave wires, or other types of transmission lines, and the analog control signals can be transferred between the room temperature environment and the intermediate temperature environments using feedthrough devices that allow signals to pass through but provide isolation for spurious electromagnetic noise outside of the signal band (e.g., light-tight feedthrough devices). In some cases, analog control signals are communicated in the cryogenic temperature environment on superconducting high-density microwave wires, co-axial or co-planar waveguide structures, or other types of transmission lines, and analog control signals can be transferred between the cryogenic temperature environment and the intermediate temperature environments using feedthrough devices (e.g., light-tight feedthrough devices).

The example quantum computing system 2300 includes multiple operating domains. Each of the operating domains can include dedicated hardware at one or more stages of the quantum computing system 2300. The operating domains can be controlled collectively and may share hardware at one or more stages of the quantum computing system 2300. In the example shown in FIG. 23A, the quantum processor includes an array of qubit devices, and each operating domain includes a particular group of the qubit devices and the associated devices and other hardware that operate in connection with the particular group of qubit devices. The devices in each group have distinct operating frequencies, such as, for example, the groups of devices described with respect to FIGS. 21A-C and 22A-C. A device in one group can have the same operating frequency as a device and another group, since the groups operate within different operating domains.

In some implementations, the qubit operating frequencies for an operating domain are interleaved with the readout frequencies for the same operating domain. For example, FIGS. 21A-C show an example of interleaved qubit operating frequencies and readout frequencies, where the qubit operating frequencies and readout frequencies alternate along the frequency spectrum plot. In some example interleaved schemes, each qubit device and its corresponding readout device operate within a frequency band, and the frequency band for each qubit and readout device pair is separate and distinct (non-overlapping) with the frequency band for the other qubit and readout device pairs within the same operating domain. Each operating domain in a quantum computing system can have the same allocation of frequency bands for the qubit and readout device pairs, or the various operating domains can have distinct frequency band allocations.

In some implementations, the qubit operating frequencies for an operating domain are not interleaved with the readout frequencies for the same operating domain. For example, the qubit devices within an operating domain can have respective qubit operating frequencies in a first frequency band, and the readout devices in the operating domain can have respective readout frequencies in a second, separate frequency band. In such cases, the qubit operating frequencies fall within one sub-band of the frequency spectrum, and the readout frequencies fall within a different sub-band of the frequency spectrum. In some example non-interleaved schemes, the qubit frequency band (the frequency band that contains the qubit operating frequencies) for a group of qubit devices within an operating domain is separate and distinct (non-overlapping) from the readout frequency band (the frequency band that contains the readout frequencies) for the group of readout devices in the same operating domain. The readout frequency band can be higher or lower than the qubit frequency band. Each operating domain can have the same allocation of operating frequencies, qubit frequency bands and readout frequency bands, or the various operating domains can have distinct frequency bands and operating frequency allocations.

The example quantum computing system 2300 illustrates four distinct operating domains, and each operating domain includes four of the qubit devices. Thus, there are sixteen qubit devices, sixteen readout devices, and twenty-four coupler devices that are controlled by four operating domains in the quantum computing system 2300. A quantum computing system 2300 can include another number of operating domains, and each domain may generally include another number of devices.

In the example shown in FIG. 23A, the control system components that operate in the room temperature stage 2301 include a signal generator system 2302, a signal processor system 2310, and a control interface 2305. Additional or different components may operate in the room temperature stage 2301. The example signal generator system 2302 includes a microwave signal generator 2304, and may include additional or different components.

In some cases, the signal generator system 2302 also includes a DC control system. For example, the DC control system can provide DC control signals to the coupler devices. In some cases, the signal generator system 2302 includes a dedicated DC control system for each operating domain. In the example shown in FIG. 23A, the signal generator system 2302 can include four DC control systems, where each DC control system controls six of the twenty-four coupler devices. For instance, each of the DC control systems can be a six-channel DC control system that is capable of providing a distinct DC control signal to each coupler device in the operating domain.

In some instances, the signal generator system 2302 includes a microwave signal generator 2304 for each of the operating domains. The microwave signal generator system 2304 can include an arbitrary waveform generator (AWG) that generates multiplexed control signals for an operating domain on a single physical channel. For example, the signal generator system 2302 may have an output channel for each operating domain, and the control signals generated on each output channel can include multiplexed control signals for multiple devices in the operating domain. In the example shown in FIG. 23A, signals from the microwave signal generator 2304 are communicated on four distinct channels, as indicated at 2306.

The microwave signal generator 2304 can generate analog control signals based on digital control information received from the control interface 2305. For example, the control interface 2305 may provide a digital multiplexed control signal for a group of devices in the quantum processor cell, and the microwave signal generator can generate an analog multiplexed control signal that corresponds to the digital multiplexed control signal. Each analog multiplexed control signal can be communicated into the cryogenic environment on a single physical channel in some instances.

The example signal processor system 2310 includes a digitizer 2312, a mixer and a microwave source 2314 for each operating domain. The signal processor system 2310 can receive qubit readout signals and convert the qubit readout signals to qubit readout information that can be used to determine the quantum states of the qubit devices. For example, the qubit readout signals can be analog qubit readout signals from the signal delivery system, and the signal processor system 2310 can convert the analog qubit readout signals to digital qubit readout information. The qubit readout information can be delivered to the control interface 2305 where the information can be processed, for example, by a classical processor running software or dedicated classical processing hardware.

In some cases, the qubit readout signals received by the signal processor system 2310 are multiplexed signals that include readout signals from multiple readout devices. For instance, each multiplexed readout signal can include readout signals from multiple devices in an operating domain. The control interface 2305 can digitally de-multiplex the readout signals after they have been digitized by the signal processor system 2310, or the signal processor system 2310 may extract qubit readout information directly from the digitized readout output pulses and send digital data to the control interface 2305, for instance.

The example quantum computing system 2300 includes a multichannel signal amplifier 2320 and a multichannel isolator 2322 in the intermediate temperature stages 2321. The quantum computing system 2300 may include additional or different features and components operating in one or more intermediate temperature stages. In the example shown, the multichannel signal amplifier 2320 can amplify or otherwise modulate signals that are communicated between the room temperature environment and the cryogenic environment. The multichannel isolator 2322 can isolate the signal lines between the cryogenic environment and the multichannel signal amplifier 2320. In the example shown, the multichannel isolator 2322 can be a four-channel isolator that isolates a signal line for each operating domain.

In the cryogenic temperature stage 2331, the example quantum computing system 2300 includes an input board 2330, an input interconnect system 2342, a quantum processor cell (QPC) assembly 2346, an output interconnect system 2344 and an output board 2350. The example quantum computing system 2300 can include additional or different features and components in the cryogenic temperature stage, and the components can be arranged or configured in the manner shown or in another manner.

The components operating in the cryogenic temperature stage 2331 receive input signals through the input board 2330, and send out signals through the output board 2350. Input control signals can be communicated to the input board 2330 on a distinct channel for each operating domain. In the example shown in FIG. 23A, four distinct input channels are indicated at 2335, where each of the channels receives AC control signals for one of the operating domains. Similarly, output control signals can be communicated from the output board 2350 on a distinct channel for each operating domain. In the example shown in FIG. 23A, four distinct output channels are shown, where each of the channels carries AC readout signals for one of the operating domains. In some examples, the input board 2330 includes additional input channels to receive DC control signals (e.g., from the signal generator system 2302). For example, the input board 2330 may receive one or more DC control signals for each coupler device.

In some cases, the example input board 2330 can be implemented as one or more structures that support signal processing components. For example, the input board 2330 can be or can include the example input processing board 270A shown in FIG. 20D or another system. In some implementations, the input board 2330 can be or can include a multilayered microwave printed circuit board, or another type of circuit board structure. The example input board 2330 includes output channels that contact input channels of the input interconnect system 2342. Thus, the input board 2330 can communicate control signals into the QPC assembly 2346 through the input interconnect system 2342. The input interconnect system 2342 can be or can include the example input interconnect plate 135 shown in FIG. 20B or another system.

The example input board 2330 can be formed as a multilayered structure that includes multiple layers of insulative material, for instance, with conducting or superconducting materials between some of the layers to form transmission lines. For instance, the insulative material can include multiple layers of silicon, sapphire, diamond, or other materials that form a multilayer structure by wafer bonding. In some implementations, the insulative material can include Rogers 3000-series laminate (available from Rogers Corporation), which may have, for example, a low coefficient of thermal expansion in the "z" direction and dielectric constants ranging from 3 to 10.2. In some examples, Rogers 3010 (dielectric constant=10.2), Rogers 6010 (dielectric constant=10.2), Rogers 4350 (dielectric constant=3.48), or another laminate material can be used. In some cases, a laminate material can include a transition between dielectric constants. In some cases, a laminate material is capable of high layer count constructions. A laminate material can include, for example, ceramic-filled PTFE composites or other materials.

The example input board 2330 includes an input processing subsystem 2332. The example input processing subsystem 2332 can include multiple input processing domains; for example, a dedicated input processing domain can process input signals for each operating domain of the quantum computing system 2300. In the example shown, the input processing subsystem 2332 includes four input processing domains, and each input processing domain receives and processes control signals for the devices (qubit devices, coupler devices, readout devices) within one of the operating domains.

Each input processing domain can be similar or identical to the other input processing domains. For example, the hardware for each input processing domain can be the same as the hardware for one or more of the other input processing domains. In some implementations, each input processing domain can include multiple processing cards that are supported on the input board 2330. The processing cards for one input processing domain may be interchangeable with one or more of the processing cards in another input processing domain.

In some implementations, processing cards are supported in receptacle slots defined in the input board 2330. The processing cards included in the example input board 2330 can be implemented as discrete devices that are mechanically secured and communicably coupled to the input board 2330. Each of the processing cards can include signal processing hardware configured to process (e.g., diplex, multiplex, de-multiplex, filter, bias, etc.) control signals, and the input board 2330 can include signal lines that transfer signals between the distinct processing cards. The processing cards can include transmission lines that carry signals within the processing card. For example, the transmission lines may include coplanar waveguide (CPW) structures. In some instances, coplanar waveguide (CPW) structures can be implemented as layered structures, with superconducting planes on the top and bottom of an insulating material, and a signal-carrying trace in the middle of the insulative material. In some instances, dielectric or insulative material in the processing cards can include silicon, sapphire, fused quartz, diamond, beryllium oxide (BeO), aluminum nitride (AlN), or others.

In the example shown, each input processing domain of the input processing subsystem 2332 includes a diplexer 2334, a de-multiplexer 2336, a DC bias component 2338 and a de-multiplexer 2340. Each of the components may be implemented, for example, in one or more processing cards on the input board 2330. The input processing subsystem 2332 may include additional or different components, and the components may be configured as shown or in another manner.

The example diplexer 2334 can separate input signals onto two distinct output channels based on the frequencies of the input signals. For example, the diplexer 2334 can separate low-frequency control signals from high-frequency control signals. In some examples, the drive signals for the coupler devices are all within a lower frequency band than the control signals for the qubit and readout devices. For example, in the example shown in FIGS. 22A-C, the qubit operating frequencies are in the range of 3.2 to 3.9 GHz, and the drive frequencies for the coupler devices are in the range of 0.1 GHz to 0.7 GHz. Thus, the diplexer 2334 can receive input signals ranging from a few MHz to high microwave frequencies, and send lower frequency signals to a first device and send higher frequency signals to a second device. In an example implementation, the diplexer 2334 sends low-frequency signals (e.g., 225 MHz through 1.375 GHz, or another frequency range) to the first de-multiplexer 2336, and the diplexer 2334 sends high-frequency signals (e.g., above 2.5 GHz, or another threshold frequency) to the second de-multiplexer 2340.

Each of the de-multiplexers 2336, 2340 separates input signals onto multiple distinct output channels based on the frequencies of the input signals. For example, each de-multiplexer can receive an input signal that includes multiple frequency components, and separate the distinct frequency components onto distinct output channels.

The example de-multiplexer 2340 receives the qubit control signals and the readout control signals, which are microwave-frequency signals addressed to the respective qubit devices and readout devices. The qubit control signals and the readout control signals for a group of qubit devices and readout devices are delivered on a single input channel to the de-multiplexer 2340, and the de-multiplexer separates the control signal for each individual qubit device onto the distinct physical output channels. In the example shown, the de-multiplexer 2340 is a 1:4 de-multiplexer that receives the high-frequency band output from the diplexer 2334 (e.g., 3 GHz to 4 GHz, or another frequency range).

The example de-multiplexer 2336 receives the AC components of the coupler control signals, which are radio-frequency or microwave-frequency drive signals addressed to the respective coupler devices. In some instances, the drive signals for a group coupler devices are delivered on a single input channel to the de-multiplexer 2336, and the de-multiplexer 2336 separates the drive signal for each individual coupler device onto a distinct physical output channel. In the example shown, the de-multiplexer 2336 is a 1:6 de-multiplexer that receives the low-frequency band output from the diplexer 2334 (e.g., 225 MHz through 1.375 GHz, or another frequency range).

The example DC bias component 2338 receives the drive signals from the de-multiplexer 2336 and adds a bias signal to each drive signal. The bias can be a low frequency or DC component of the coupler control signal. For example, the bias signal can be configured to tune the coupler device to a particular coupler operating frequency or bias point. In some cases, the DC component causes the coupler device to produce and offset electrical or magnetic field that tunes the coupler device and produces a higher rate of coupling between neighboring qubit devices. The bias signal in each coupler control signal can be configured for a particular control device. Thus, the DC bias component 2338 can apply distinct bias levels to distinct drive signals received from the de-multiplexer 2336. In some cases, the bias signals are received through a separate input of the input board 2330.

The input board 2330 can include an output channel for each qubit device and each coupler device in the QPC assembly 2346. In the particular example shown in FIG. 23A, there are forty output channels from the input board 2330, which includes ten output channels for each operating domain. Within each operating domain, there are six coupler control signal output channels from the input board 2330, and there are four qubit control signal output channels from the input board 2330. Thus, in the example shown, there are twenty-four output channels from the DC bias components 2338 to the input interconnect system 2342, and there are sixteen output channels from the second de-multiplexer 2340 to the input interconnect system 2342.

The example configuration shown in FIG. 23A can be used with an interleaved frequency scheme, where the qubit operating frequencies are interleaved with the readout frequencies. In some cases, the configuration shown in FIG. 23A can be used or adapted for use with a non-interleaved frequency scheme, for example, where the qubit operating frequencies are in a distinct band from the readout frequencies. For an example non-interleaved scheme, the input processing subsystem 2332 may include an additional diplexer and an additional de-multiplexer for each operating domain. The additional diplexer can operate between the diplexer 2334 and the second de-multiplexer 2340, and can separate qubit control signals (in a qubit frequency band) from readout control signals (in a readout frequency band). The qubit control signals can be delivered to the second de-multiplexer 2340, and the readout control signals can be delivered to the additional (third) de-multiplexer. The third de-multiplexer can be a 1:4 de-multiplexer that separates four readout control signals from a multiplexed control signal. In such examples, the input board 2330 includes sixteen additional output channels from the third de-multiplexer to the input interconnect system 2342.

The example QPC assembly 2346 houses the qubit devices, the coupler devices and the readout devices of the quantum computing system 2300. The qubit devices, the coupler devices and the readout devices may be housed, for example, in an electromagnetic waveguide system or another structure. The QPC assembly 2346 can be constructed according to the example quantum processor cells shown and described with respect to FIGS. 1-22, or the QPC assembly 2346 can be constructed and may operate in another manner. The example QPC assembly 2346 includes a two-dimensional array of sixteen qubit devices, with twenty-four coupler devices residing at intervals between the sixteen qubit devices in the array, and with sixteen readout devices each associated with an individual qubit device. The quantum computing system 2300 can be adapted to include other types of multi-dimensional qubit arrays and arrays of other sizes. For example, the quantum computing system 2300 may include a two- or three-dimensional array of tens or hundreds of qubit devices and appropriate coupler devices and readout devices associated therewith. These arrays may be tiled and repeated adjacent to one another or in an interpenetrated manner to construct arrays of arbitrary size for large-scale quantum computing.

The example output board 2350 can be implemented as one or more structures that support signal processing components. For example, the output board 2350 can be or can include the example output processing board 270B shown in FIG. 20E or another type of system. In some implementations, the output board 2350 can be a multilayered microwave printed circuit board, or another type of circuit board structure. The example output board 2350 includes input channels that contact output channels of the output interconnect system 2344. Thus, the output board 2350 can receive qubit readout signals from the QPC assembly 2346 through the output interconnect system 2344. The output interconnect system 2344 can be or can include the example output interconnect plate 139 shown in FIG. 20C. In some examples, the output board 2350 includes additional input channels, for example, to receive pump signals for parametric amplifiers, etc.

In some implementations, the output board 2350 can be formed as a multilayered structure that includes multiple layers of insulative material, for instance, with conducting or superconducting materials between some of the layers to form transmission lines. For instance, the insulative material can include the materials described above with respect to the input board 2330 (e.g., silicon, sapphire, diamond, laminate materials available from Rogers Corporation, etc.).

The example output board 2350 includes an output processing subsystem 2352. The example output processing subsystem 2352 can include multiple output processing domains; for example, a dedicated output processing domain can process output signals for each operating domain of the quantum computing system 2300. In the example shown, the output processing subsystem 2352 includes four output processing domains, and each output processing domain receives qubit readout signals from the readout devices within one of the operating domains.

Each output processing domain can be similar or identical to the other output processing domains. For example, the hardware for each output processing domain can be the same as the hardware for one or more of the other output processing domains. For instance, each output processing domain can include multiple processing cards that are supported on the output board 2350. The processing cards for one output processing domain may be interchangeable with one or more of the processing cards in another output processing domain.

In some implementations, processing cards are supported in receptacle slots defined in the output board 2350. The processing cards included in the example output board 2350 can be implemented using hardware and techniques that are similar to the processing cards in the example input board 2330. For example, the processing cards can be mechanically secured and communicably coupled to the output board 2350. Each of the processing cards can include signal processing hardware configured to process (e.g., filter, multiplex, amplify, de-multiplex, isolate, etc.) readout signals. The processing cards can include transmission lines (e.g., coplanar waveguide (CPW) structures or others) that carry signals within the processing card, and the output board 2350 can include signal lines the transfer signals between the distinct processing cards.

In the example shown, each output processing domain of the output processing subsystem 2352 includes a multichannel isolator 2354, and amplifier 2356 and a multiplexer 2358. The components may be implemented, for example, by one or more processing cards. The output processing subsystem 2352 may include additional or different components, and the components may be configured as shown or in another manner.

The example multichannel isolator 2354 can isolate the input channels between the output interconnect system 2344 and the amplifier 2356. In the example shown, the multichannel isolator 2354 and each operating domain can be a four-channel isolator that isolates a signal line for each qubit device in the operating domain. The isolator can include magnetic or electromagnetic shielding in some instances.

The example amplifier 2356 can amplify the qubit readout signals received from the multichannel isolator 2354. For example, the amplifier 2356 can receive power from an external power source and increase the voltage of the qubit readout signals. In some examples, the output processing subsystem includes a power divider for each operating domain, and the power divider receives power from the external system and delivers appropriate power levels to input ports of the amplifier 2356.

The example multiplexer 2358 receives the qubit readout signals, which are microwave-frequency signals from the respective readout devices. Each of the qubit readout signals is delivered to the multiplexer 2358 on a distinct input channel, and the multiplexer combines the qubit readout signals onto a single physical output channel. The qubit readout signals within an operating domain are in distinct frequency ranges, and the multiplexed signal produced by the multiplexer 2358 includes multiple frequency components corresponding to the multiple readout frequencies. In the example shown, the multiplexer 2358 is a 4:1 multiplexer that receives qubit readout signals in an operating frequency band (e.g., 3 GHz to 4 GHz, or another frequency range). For instance, the multiplexer 2358 can be similar or identical to the de-multiplexer 2340, but with the input and output ports interchanged.

The output board 2350 can include an input channel for each qubit device in the QPC assembly 2346. In the particular example shown in FIG. 23A, there are sixteen input channels from the output interconnect system 2344, which includes four input channels for each operating domain. The output board 2350 can include an output channel for each group of qubit devices in the QPC assembly 2346 (where each group of qubit devices corresponds to an individual operating domain of the quantum computing system 2300). In the particular example shown in FIG. 23A, there are four output channels from the output board 2350, which includes one output channel for each operating domain.

In some instances, the quantum computing system 2300 can perform quantum computational tasks, execute quantum computing algorithms, perform quantum error correction, quantum state distillation, or perform other types of processes. For instance, the control interface 2305 can include a quantum compiler and a master clock, and can operate the quantum computing system on clock cycles, where a set of instructions are executed by the quantum computing system 2300 on each clock cycle. For example, the control interface 2305 can generate control information for each clock cycle according to a set of instructions from a quantum compiler; the signal generator system 2302 can receive the control information from the control interface 2305 and generate control signals that are delivered to the input board 2330. The control interface 2305 may also receive qubit readout data on each clock cycle. For example, the signal processor system 2310 can receive readout signals from the output board 2350 and generate digital readout data that is delivered to the control interface 2305. In some implementations, the quantum computing system 2300 can operate in another manner.

In some instances, the control interface 2305 generates quantum processor control information that includes digital control information for multiple devices in the QPC assembly 2346. For example, the control interface 2305 may generate a digital control sequence for a group of qubit devices, a group of readout devices, a group of coupler devices, a group of amplifier devices, a group of other devices, or a combination of them. In some instances, the digital control information corresponds to pulses or other types of control signals to be delivered to individual devices. The control interface 2305 can digitally multiplex the digital control information for groups of devices in the QPC assembly 2346. For example, the control interface may digitally multiplex the digital control information for the group of qubit devices within each operating domain of the quantum computing system 2300. The operations performed by the control interface 2305 can be implemented, for example, by one or more data processors or other types of classical computing equipment.

In some instances, the digital control information generated by the control interface 2305 includes qubit control information for a group of qubit devices that operate in a common operating domain and each have distinct qubit operating frequencies. For instance, the qubit control information can include qubit control sequences for respective qubit devices in the group, and the qubit control sequence for each qubit device can be configured to execute a single-qubit operation on the qubit device.

In some instances, the digital control information generated by the control interface 2305 includes coupler control information for a group of coupler devices that operate in a common operating domain and each have distinct operating frequencies. For instance, the coupler control information can include coupler control sequences for each respective coupler device in the group, and the coupler control sequence for each coupler device can be configured to execute a two-qubit operation on a pair of qubit devices that neighbor the coupler device.

In some instances, the digital control information generated by the control interface 2305 includes readout control information for a group of readout devices that operate in a common operating domain and each have distinct readout frequencies. For instance, the readout control information can include readout control sequences for each respective readout device in the group, and the readout control sequence for each readout device can be configured to execute a readout operation on a qubit device associated with the readout device.

In some instances, the digital control information generated by the control interface 2305 includes a combination of qubit control information and coupler control information or another combination of control sequences that are configured to perform all or part of a quantum algorithm, a quantum error correction protocol, a state distillation protocol, one or more quantum logic gates, a quantum measurement, or other types of quantum computational tasks. In some instances, the digital control information generated by the control interface 2305 includes a combination of readout control information and other control information (e.g., qubit or coupler or both).

In some instances, the signal generator system 2302 receives the quantum processor control information from the control interface 2305 and generates a multiplexed control signal based on the quantum processor control information. For example, the quantum processor control information can include the digitally multiplexed control information for a group of devices (e.g., qubit devices, readout devices, coupler devices, or a combination), and the signal generator system 2302 can generate an analog control signal that is communicated from the signal generator system 2302 on a single physical channel. The signal generator system 2302 can communicate multiplexed control signals on each of the four output channels indicated at 2306, and each of the output channels carries multiplexed control signals for an individual operating domain.

Because, in the example quantum computing system 2300, the signal generator system 2302 operates in the room temperature stage 2301, the multiplexed control signals are generated in a room temperature environment. The multiplexed control signals are communicated into the cryogenic temperature stage 2331 through the intermediate temperature stage 2321. In some cases, the multiplexed control signals are microwave control signals that are communicated by a microwave waveguide or another type of transmission line. In the example shown, the multiplexed control signals are amplified by the multichannel signal amplifier 2320 in the intermediate temperature stage 2321 before they are communicated into the cryogenic temperature stage 2331.

In some instances, the signal generator system 2302 or signal processor system 2310 or control interface 2305 may be operated on hardware in a cryogenic environment. In some instances, the cryogenic environment may be at a temperature below room temperature but above the temperature of the QPC operating environment.

In some instances, each input processing domain of the input processing subsystem 2332 on the input board 2330 receives a multiplexed control signal for a group of devices in the QPC assembly 2346. For instance, each input processing domain can include an input channel configured to receive the respective multiplexed control signal. The de-multiplexer devices in each input processing domain of the input processing subsystem 2332 can separate device control signals from the multiplexed control signal by de-multiplexing the multiplexed control signal. For example, the de-multiplexer 2336 can separate six distinct drive signals from a multiplexed control signal, and the de-multiplexer 2340 can separate four distinct control signals from a multiplexed control signal. Because the input processing subsystem 2332 operates in the cryogenic temperature stage 2331, the multiplexed control signals are de-multiplexed in a low-noise, cryogenic environment.

The device control signals for each respective device are delivered into the QPC assembly 2346 on respective channels through the input interconnect system 2342. For instance, the input signal processing subsystem 2332 can include output channels configured to communicate the respective device control signals into the QPC assembly 2346 through the input interconnect system 2342. In some instances, the input interconnect system 2342 includes input interconnect signal lines that extend from an exterior of the QPC assembly 2346 to the interior of the QPC assembly 2346. The input interconnect signal lines can include a first end that contacts an output channel of the input board 2330, and a second end that contacts a lead that is inside the QPC assembly 2346 (e.g., on a plateau of the signal board). The input interconnect signal lines can be supported within the QPC assembly 2346, for example, by plateau structures that extend vertically with respect to the plane of the two-dimensional device array in the QPC assembly 2346.

The QPC assembly 2346 may include a signal board or another type of structure that supports the qubit devices, coupler devices, and readout devices within the QPC assembly 2346. For example, the QPC assembly 2346 may include the example signal board 140A shown in FIGS. 10A-10B and 11A-11B, or another type of signal board. The signal board can include input signal lines that route the device control signals within the quantum processor cell to the respective devices. For example, each input signal line in the signal board can have a first end that contacts a lead on the input interconnect system 2342 and a second end that couples (e.g., conductively, capacitively, inductively, etc.) to a device supported by the signal board. In some instances the signal board can deliver signals from the exterior volume of an electromagnetic waveguide system to an enclosed or partially enclosed interior volume of an electromagnetic waveguide system.

In some instances, the readout devices in the QPC assembly 2346 produce qubit readout signals based on readout control signals received from the control system. For instance, the qubit readout signals can be produced by the respective readout device based on an electromagnetic interaction between the readout device and the associated qubit device in response to the readout control signal. In some cases, each readout device is operatively coupled (e.g., capacitively, conductively, inductively, or otherwise coupled) to an individual qubit device. In some cases, the readout device is coupled to the qubit device through an aperture in the electromagnetic waveguide system. The readout device can, in some cases, be located in a partially interior and partially exterior volume of the waveguide system.

In some instances, the qubit readout signals produced by each respective readout device are communicated from the readout devices by signal lines included in the signal board that supports the devices within the QPC assembly 2346. For example, the signal board can include output signal lines that route the qubit readout signals within the QPC assembly 2346 to the output interconnect system 2344. Each output signal line in the signal board can have a first end that couples (e.g., conductively, inductively, capacitively, etc.) to a readout device supported by the signal board, and a second end that contacts a lead on the output interconnect system 2344. Readout signal lines can in some instances include planar or three-dimensional filter structures used to modify the impedance of the signal line at the operating frequencies of the associated readout device, qubit device or coupler devices connected to the associated qubit device.

In some instances, the qubit readout signals for each respective readout device are delivered to the output board 2350 on respective channels through the output interconnect system 2344. The example output interconnect system 2344 includes output interconnect signal lines that extend from an interior of the QPC assembly 2346 to an exterior of the QPC assembly 2346. The output interconnect signal lines can each include a first end that contacts a lead inside the QPC assembly 2346 (e.g., on a plateau of the signal board), and a second end that contacts and input channel of the output board 2350. The output interconnect signal lines can be supported within the QPC assembly 2346, for example, by plateau structures that extend vertically with respect to the plane of the two-dimensional device array in the QPC assembly 2346. The output signal processing system 2352 can include input channels configured to receive the respective qubit readout control signals from the output interconnect system 2344.

Each output processing domain in the output signal processing system 2352 on the output board 2350 receives qubit readout signals from a respective group of the readout devices (which correspond to a respective operating domain of the quantum computing system 2300). In some instances, each readout device in the group has a distinct readout frequency. The multiplexer 2358 in each output processing domain can receive the qubit readout signals from an individual group of the readout devices and generate a multiplexed readout signal by multiplexing the qubit readout signals. For example, the multiplexer 2358 can receive four distinct qubit readout signals and generate a single multiplexed readout signal. Because the multiplexer 2358 operates in the cryogenic temperature stage 2331, the qubit readout signals are multiplexed in a low-noise, cryogenic environment.

In some instances, the multiplexed readout signals are communicated from the output board 2350 on a respective physical channel for each operating domain. For instance, a multiplexed readout signal that contains qubit readout signals from four readout devices can be communicated from the output board 2350 on a single channel. The multiplexed readout signals are communicated from the cryogenic temperature stage 2331 through the intermediate temperature stage 2321. In some cases, the multiplexed readout signals are microwave signals that are communicated by a microwave waveguide or another type of transmission line. In the example shown, the multiplexed readout signals are amplified by the multichannel signal amplifier 2320 in the intermediate temperature stage 2321 before they are communicated into the room temperature stage 2301. Other arrangements of the signal path for readout signals are possible.

In some instances, the signal processor system 2310 receives the multiplexed readout signals, performs analog filtering and processing and digitizes each multiplexed readout signal by operation of the digitizer 2312, and performs digital signal processing of the digitized signal. For example, the qubit readout signals received by the output board 2350 and the multiplexed readout signals produced by the output board 2350 can be analog signals, and the signal processor system 2310 can convert the multiplexed readout signals to digital information. The signal processor system 2310 can provide the digital readout information to the control interface 2305, and the control system can process the digital readout information. For example, digital readout information for an operating domain can be generated from the multiplexed readout signal for the operating domain, and the control interface 2305 can receive the digital readout information for all operating domains.

In some instances, the control system identifies qubit readout data for each readout device based on the digital readout information. For example, the control system can digitally de-multiplex the digital readout information from the signal processor system 2310 based on the distinct operating frequencies of the respective readout devices in each group. In some cases, the readout data for a readout device includes a digital data sequence representing the qubit readout signal produced by the readout device. Thus, each qubit readout signal received by the output board 2350 can be converted to digital readout data by the control system, for example, by de-multiplexing the digitized version of the multiplexed readout signal generated by the output board 2350.

In some instances, the control system prepares multiplexed quantum processor control information for the QPC assembly 2346 based on the qubit readout data. For instance, the multiplexed quantum processor control information can be a digital control sequence for the next clock cycle of the quantum computing system 2300. In some cases, the multiplexed quantum processor control information is based on additional or different information. For example, the multiplexed quantum processor control information may be based on a quantum computing task or quantum algorithm, or other information. In some cases, the multiplexed quantum processor control information is communicated from the control interface 2305 to the signal generator system 2302, where it is processed and delivered to the QPC assembly 2346 as described above. For instance, the multiplexed quantum processor control information may include qubit control information for a group of qubit devices, coupler control information for a group of coupler devices, readout control information for a group of readout devices, or a combination of them.

Figure 23B:
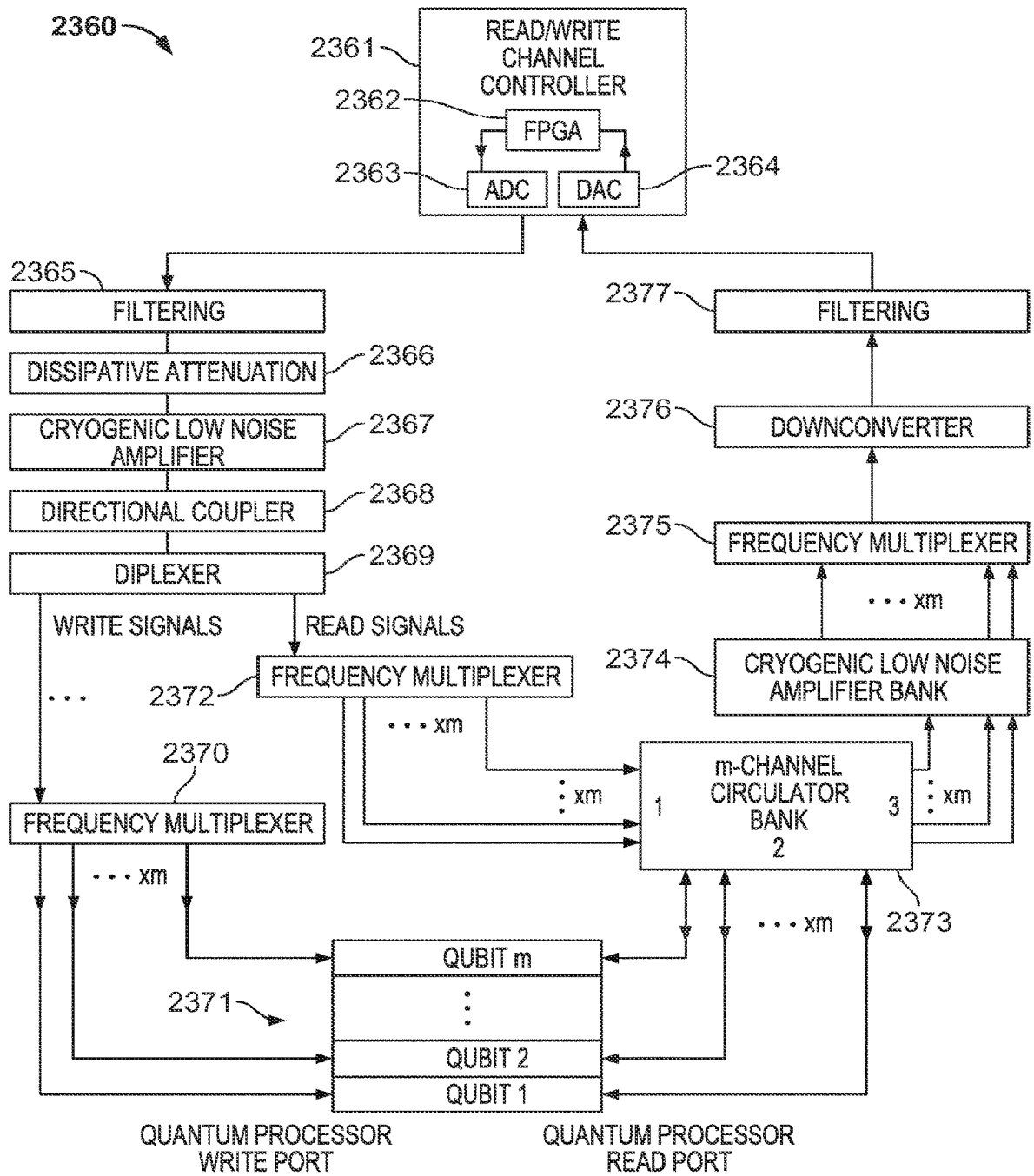
FIG. 23B is a flowchart showing an example process for operating a quantum computing system.

FIG. 23B is a flowchart showing an example process 2360 for operating a quantum computing system. For instance, the example process 2360 can be used to control an individual operating domain of the example quantum computing system 2300 shown in FIG. 23A. Some aspects of the example process 2360 may be implemented by one or more of the example components shown in FIG. 23A or by additional or different components. In some cases, the example process 2360 can be used to operate a device array that includes a frequency tiling or multiple frequency sub-arrays, such as, for example, the device array 2120 shown in FIG. 21C, the device array 2220 shown in FIG. 22C, or another device array. The process 2360 may include additional or different operations, and the operations can be performed in the order shown in FIG. 23B or in another manner.

FIG. 23B shows a read/write channel controller 2361 that includes a field-programmable gate array (FPGA) 2362, an analog-to-digital converter (ADC) 2363 and a digital-to-analog converter (DAC) 2364. In some implementations, the channel controller 2361 can be a wideband frequency-agile signal generator such as an arbitrary waveform generator. The FPGA 2362 can control the DAC 2364 to produce a pulse or other signal having one or more frequency components targeted to one or more qubit devices or readout devices. For example, the signal can be addressed to an individual qubit device by generating the signal at a frequency that corresponds to the qubit operating frequency of the qubit device. As another example, the signal can be addressed to an individual readout device by generating a signal at a frequency that corresponds to the readout frequency of the readout device.

The signals generated by the channel controller 2361 can be multiplexed in time or in frequency, and they may be separated onto physically disparate signal paths. For example, the signals may be separated onto distinct channels through power division followed by passive frequency selective filtering, or by the use of a fast solid state microwave switch, switched in synchronicity with the time-multiplexing of the signal, to dynamically separate the outgoing signals.

As shown in FIG. 23B, the example process 2360 includes an example technique for processing the signals between the channel controller 2361 and the quantum processor cell 2371. At 2365, signals from the channel controller 2361 are filtered. At 2366, the filtered signals are processed by dissipative attenuation. At 2367, the signals are processed by a cryogenic low-noise amplifier. At 2368, the amplified signals pass through a directional coupler. At 2369, the signals are divided by a diplexer. The diplexer separates write signals from read signals, for example, based on a multiplexing scheme (e.g., time multiplexing or frequency multiplexing).

In the example shown in FIG. 23B, the write signals from the diplexer are processed by a frequency multiplexer at 2370. The frequency multiplexer divides a multiplexed write signal onto multiple output channels. For example, the write signals can be delivered to the write ports of the quantum processor cell 2371 through a frequency channelized write signal array.

In the example shown in FIG. 23B, the read signals from the diplexer are processed by a frequency multiplexer at 2372. The frequency multiplexer divides a multiplexed read signal onto multiple output channels. For example, the read signals can be delivered to an m-channel circulator bank through a frequency channelized read signal array. At 2373, the read signals are circulated through a circulator bank to read ports of the quantum processor cell 2371. In some cases, signal circulation can be performed, for example, by a many-channel shielded ferrite core circulator or isolator bank on printed circuit board substrates for low-loss high-density circulation of RF signals. Other types of circulators may be used.

Readout devices in the quantum processor cell 2371 can produce qubit readout signals in response to the read signals. As shown in FIG. 23B, the example process 2360 includes an example technique for processing the readout signals between the quantum processor cell 2371 and the channel controller 2361. The qubit readout signals are communicated from the read ports to the m-channel circulator bank. At 2373, the qubit readout signals are circulated through the circulator bank to a cryogenic low noise amplifier bank. At 2374, the qubit readout signals are amplified by the cryogenic low noise amplifier bank. At 2375, the amplified qubit readout signals are multiplexed to produce a multiplexed readout signal. At 2376, the multiplexed readout signal is down-converted. At 2377, the down-converted signal is filtered and delivered to the channel controller 2361. The ADC 2363 can digitize the multiplexed readout signals and deliver them to the FPGA 2362.

Figure 24:
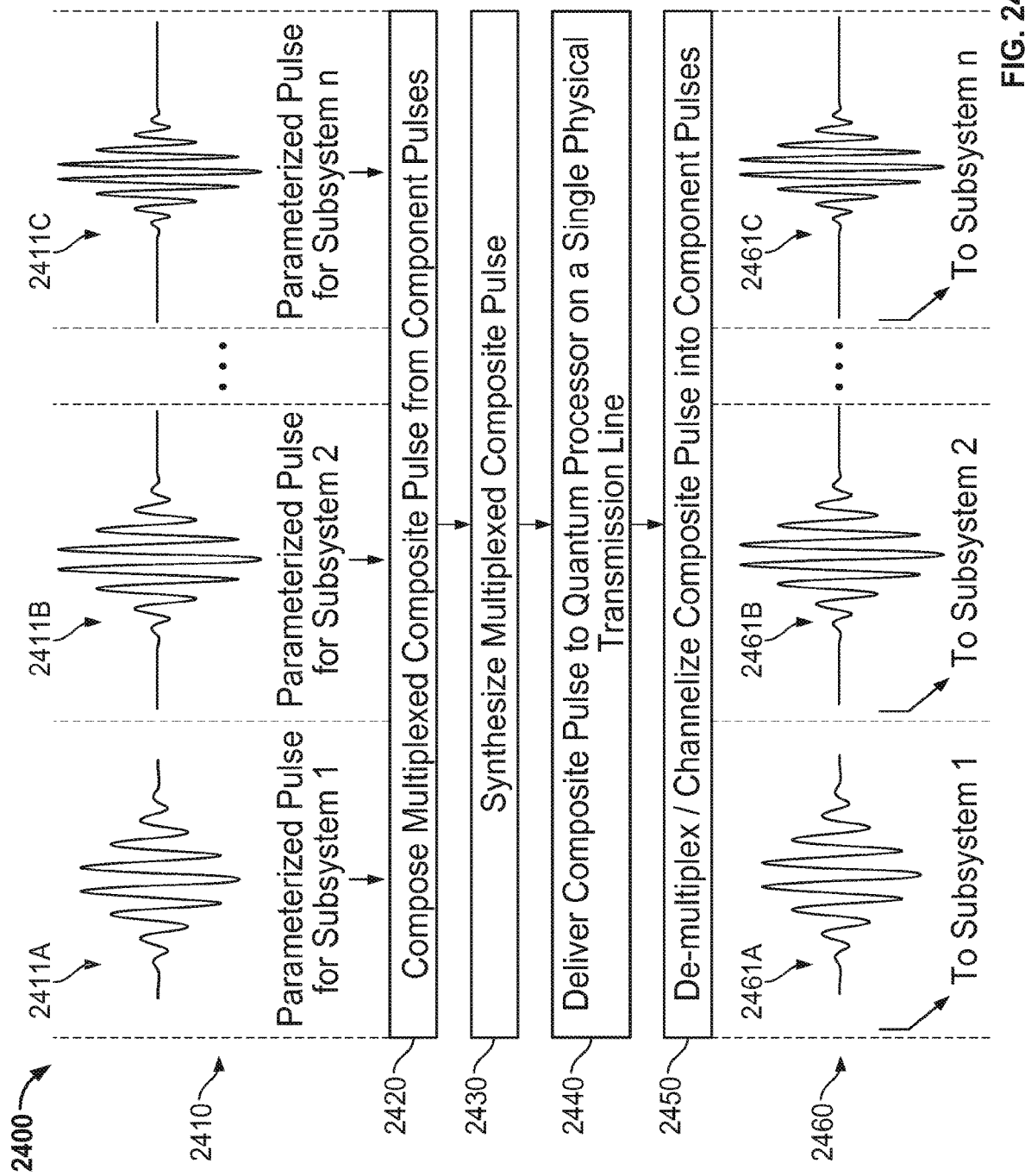
FIG. 24 is a flowchart showing an example process for delivering control signals to a quantum processor cell.

FIG. 24 is a flowchart showing an example process 2400 for delivering control signals to a quantum processor cell. For instance, the example process 2400 can be used to deliver control signals for an individual operating domain of the example quantum computing system 2300 shown in FIG. 23A. Some aspects of the example process 2400 may be implemented by one or more of the example components shown in FIG. 23A or by additional or different components. In some cases, the example process 2400 can be used to operate a device array that includes a frequency tiling or multiple frequency sub-arrays, such as, for example, the device array 2120 shown in FIG. 21C, the device array 2220 shown in FIG. 22C, or another device array. In some implementations of the process 2400 shown in FIG. 24, multiplexed composite pulses are composed and synthesized at a higher temperature (e.g., in a room temperature stage or an intermediate temperature stage), and the pulses are de-multiplexed and delivered at a lower temperature (e.g., in a cryogenic temperature stage). The process 2400 may include additional or different operations, and the operations can be performed in the order shown in FIG. 24 or in another manner.

At 2410, control information is generated for individual devices in a quantum processor cell. For example, the control information can include a control sequence for each individual device (a qubit device, coupler device, a readout device). Each control sequence can include digital information and can be generated by a classical computing system running a software program. For example, the digital information can be generated by code running in Python or MATLAB® software (available from The MathWorks, Inc.) or another type of software program.

In the example shown in FIG. 24, the control information includes pulse information for each of n subsystems. Each subsystem can include, for example, a qubit device, a coupler device, or readout device. The example pulse information 2411A represents a parameterized pulse for subsystem 1, the example pulse information 2411B represents a parameterized pulse for subsystem 2, and the example pulse information 2411C represents a parameterized pulse for subsystem n. Each pulse may be parameterized, for example, based on an operation to be performed by the subsystem. Moreover, the frequency of each pulse can be determined according to an operating frequency of the subsystem to which the pulse is addressed. In the example shown, each subsystem has a distinct operating frequency, and therefore, each pulse is centered on a distinct frequency.

At 2420, a multiplexed, composite pulse is composed from the control information. For example, the pulse information (2411A, 2411B, 2411C) for each subsystem can be combined to compose the multiplexed, composite pulse. The composite pulse composed at 2420 can include digital information and can be generated by a classical computing system running a software program. For example, the composite pulse can be generated by MATLAB® (available from The MathWorks, Inc.) or another type of software program. As such, the composite pulse can be generated by digital multiplexing or other techniques.

At 2430, the multiplexed, composite pulse is synthesized. The composite pulse synthesized at 2430 can be an analog signal generated by a waveform generator system. For example, the composite pulse can be generated by an arbitrary waveform generator (AWG) based on the digital version of the composite pulse composed at 2420. Thus, the composite pulse synthesized at 2430 can be, for example, a radio frequency or microwave frequency pulse produced on a physical transmission line. At 2440, the analog composite pulse generated at 2430 is delivered, for example, on a single physical transmission line or a single series of physical transmission lines. In some cases, the analog composite pulse is delivered to an input processing system associated with a quantum processor cell.

At 2450, the analog composite pulse generated at 2430 is de-multiplexed (or channelized) into component pulses. In the example shown, an individual analog composite pulse is separated into n analog pulses, an individual pulse for each of the n subsystems. At 2460, the analog pulses are delivered to the respective subsystems. For example, the pulses may be control signals that are communicated in parallel to the distinct subsystems (e.g., qubit devices, coupler devices, readout devices), for example, on distinct parallel transmission lines.

In the example shown in FIG. 24, a first control signal 2461A is delivered to subsystem 1, a second control signal 2461B is delivered to subsystem 2, and a third control signal 2461C is delivered to subsystem n. The first control signal 2461A is an analog control signal that corresponds to the control sequence included in the digital pulse information 2411A; the second control signal 2461B is an analog control signal that corresponds to the control sequence included in the digital pulse information 2411B; and the third control signal 2461C is an analog control signal that corresponds to the control sequence included in the digital pulse information 2411C. Thus, the component pulses generated at 2450 and delivered at 2460 correspond to the control information generated at 2410.

Figure 25:
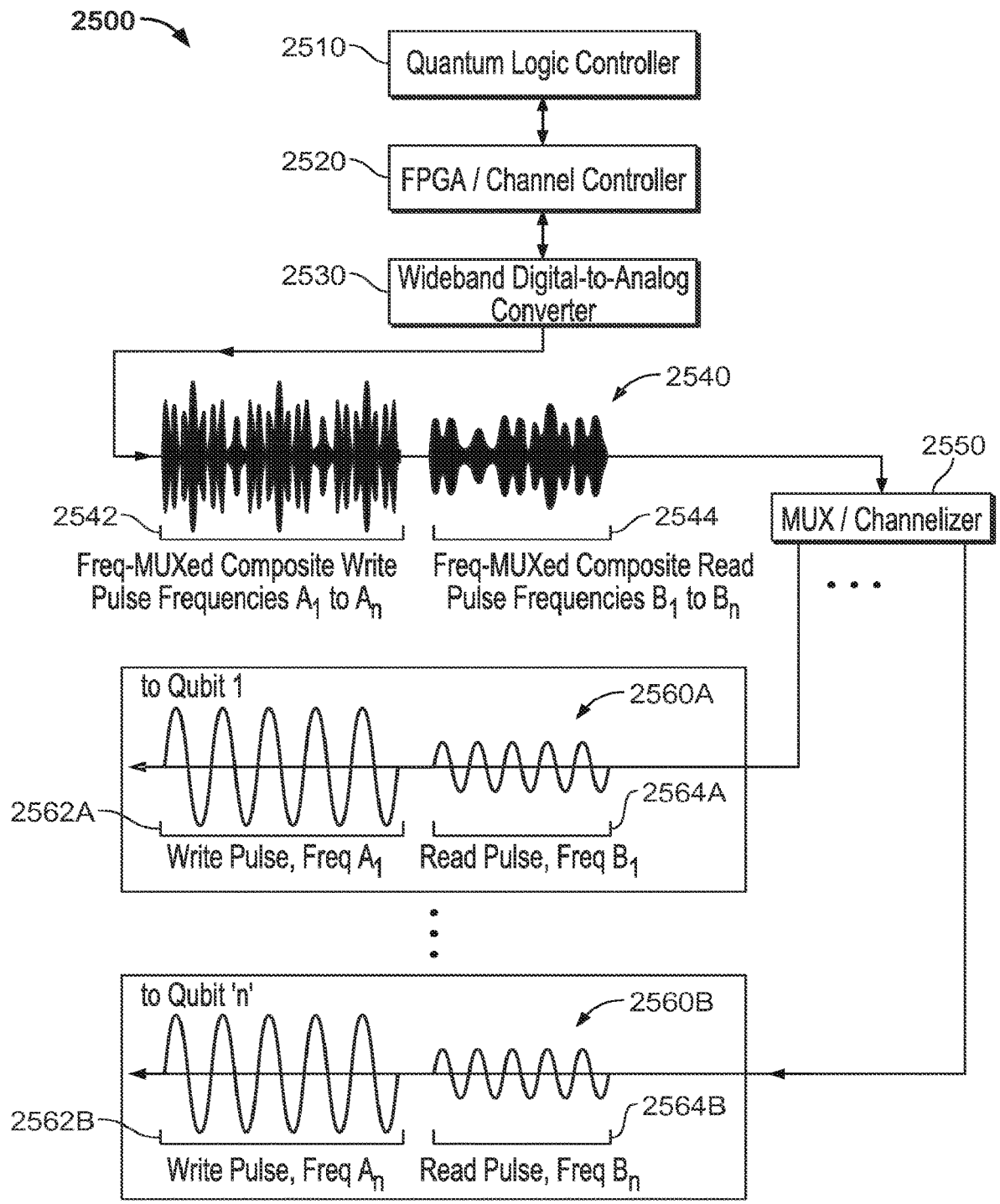
FIG. 25 is a block diagram showing an example process for delivering control signals to a quantum processor cell.

FIG. 25 is a block diagram showing an example process 2500 for delivering control signals to a quantum processor cell. For instance, the example process 2500 can be used to deliver control signals for an individual operating domain of the example quantum computing system 2300 shown in FIG. 23A. In some cases, the example process 2500 can be used to operate a device array that includes a frequency tiling or multiple frequency sub-arrays, such as, for example, the device array 2120 shown in FIG. 21C, the device array 2220 shown in FIG. 22C, or another device array. The example process 2500 can be used, for example, to synthesize and deliver a frequency-multiplexed, time-superposed control sequence that is channelized by a multiplexer for delivery to individual devices (qubit devices, readout devices, coupler devices, etc.) in a quantum processor cell.

The block diagram shown in FIG. 25 includes a quantum logic controller 2510, a channel controller 2520, a wideband digital-to-analog (DAC) converter 2530, and a channelizer 2550. Some aspects of the example process 2500 may be implemented by the example components shown in FIG. 25, by one or more of the example components shown in FIG. 23A, or by additional or different components In some implementations of the process 2500 shown in FIG. 25, frequency multiplexing of write/read signals is performed at a higher temperature (e.g., in a room temperature stage or an intermediate temperature stage), and de-multiplexing of the write/read signals is performed at a lower temperature (e.g., in a cryogenic temperature stage). The process 2500 may include additional or different operations, and the operations can be performed in the order shown in FIG. 25 or in another manner.

The example quantum logic controller 2510 receives data from the channel controller 2520 and sends instructions to the channel controller 2520. For example, the quantum logic controller 2510 may receive readout data indicating the states of one or more qubit devices; and the quantum logic controller 2510 may send instructions corresponding to a quantum logic operation to be performed by the quantum processor cell.

The example channel controller 2520 and the wideband DAC 2530 may operate, for example, similar to the FPGA 2362 and ADC 2363 shown in FIG. 23B, or they may operate in another manner. As shown in FIG. 25, the channel controller 2520 composes a digital composite control sequence based on instructions received from the quantum logic controller 2510, and the wideband DAC 2530 generates an analog composite control sequence based on the digital composite control sequence received from the channel controller 2520.

In the example shown, the wideband DAC 2530 generates frequency-multiplexed control signals 2540. The frequency-multiplexed control signal 2540 include a frequency-multiplexed composite write signal 2542 and a frequency-multiplexed composite read signal 2544. The frequency-multiplexed composite write signal 2542 contains pulses at multiple distinct write pulse frequencies ($A_1$ to $A_n$) that correspond to the distinct qubit operating frequencies of multiple qubit devices. The frequency-multiplexed composite read signal 2544 contains pulses at multiple distinct read pulse frequencies ($B_1$ to $B_n$) that correspond to the distinct readout frequencies of multiple readout devices.

In the example shown, the frequency-multiplexed control signal 2540 is de-multiplexed (or channelized) by the channelizer 2550. On one output channel, the channelizer 2550 generates a first series of de-multiplexed control signals 2560A; and on another output channel, the channelizer 2550 generates a second, distinct series of de-multiplexed control signals 2560B. The de-multiplexed control signals 2560A include a de-multiplexed write signal 2562A and a de-multiplexed read signal 2564A. The de-multiplexed control signals 2560B include a de-multiplexed write signal 2562B and a de-multiplexed read signal 2564B.

In the example shown, the de-multiplexed write signal 2562A has a first write pulse frequency $A_1$ that is addressed to a first qubit device, which has a first qubit operating frequency; and the de-multiplexed write signal 2562B has a second, distinct write pulse frequency $A_n$ that is addressed to a second qubit device, which has a distinct, second qubit operating frequency. The de-multiplexed read signal 2564A has a first read pulse frequency $B_1$ that is addressed to a first readout device, which has a first readout frequency; and the de-multiplexed read signal 2564B has a second, distinct read pulse frequency $B_n$ that is addressed to a second readout device, which has a distinct, second readout frequency.

In the example process 2500 shown in FIG. 25, the channelizer 2550 includes an input port that receives a summation of electronic signals that each have a unique frequency content. The channelizer 2550 rejects frequency content outside of the pass bands of its respective output ports. Each output port contains a specific passband and bandwidth that is matched with the bandwidth of an individual qubit device, readout device, or coupler device.

The example architecture shown in FIG. 25 may provide advantages, in some instances, for controlling the quantum processor cell. For example, the architecture may enable control signals to be delivered by a significantly smaller number of electronic components and signal channels. Reducing the number of electronic components can significantly reduce the cost and complexity of the quantum computing system. Moreover, reducing the number of signal lines can significantly reduce the interface between cryogenic temperature stages and higher temperature stages, which may improve shielding and isolation of the quantum processor cell.

Figure 26:
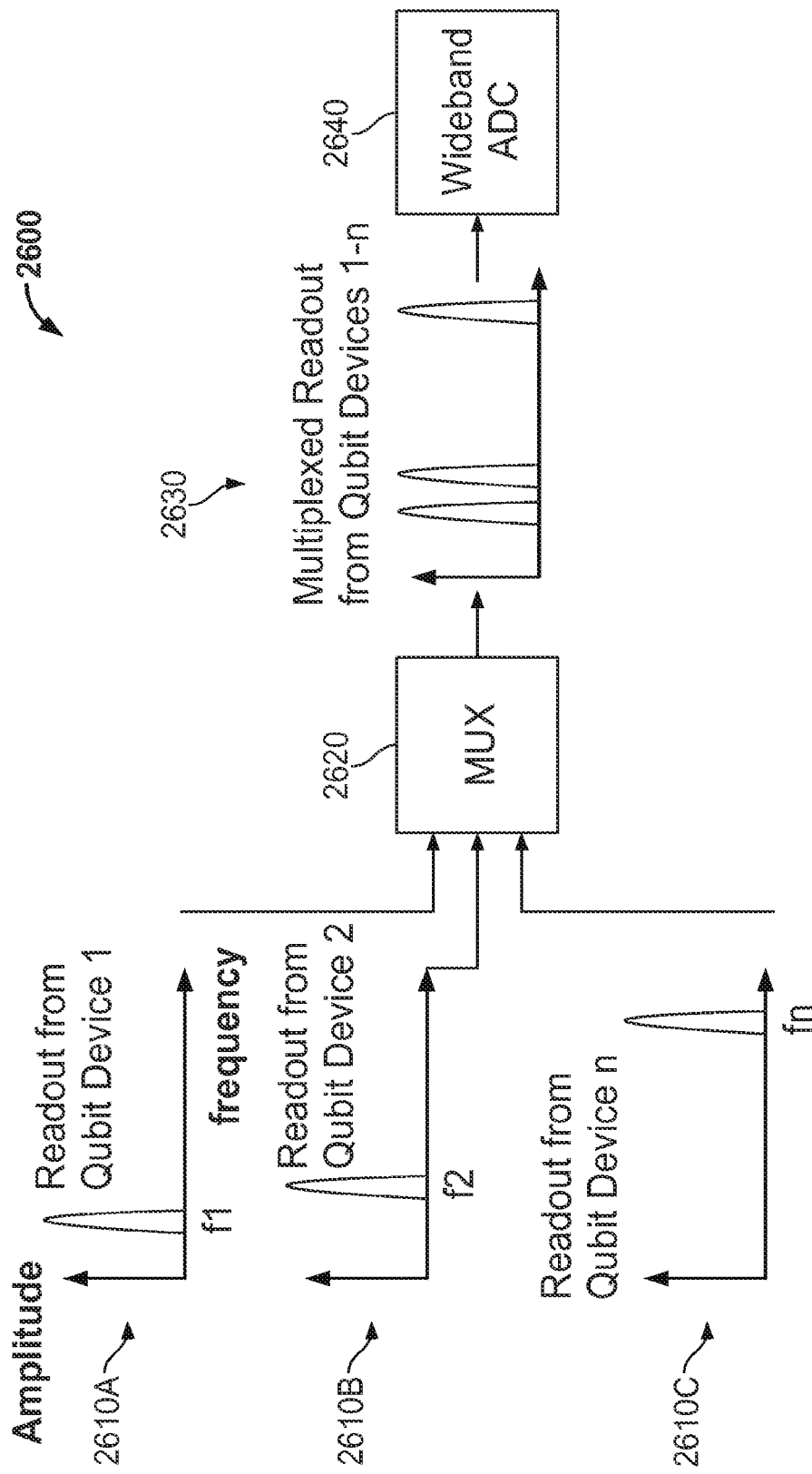
FIG. 26 is a block diagram showing an example process for delivering qubit readout signals from a quantum processor cell.

FIG. 26 is a block diagram showing an example process 2600 for delivering qubit readout signals from a quantum processor cell. For instance, the example process 2600 can be used to deliver qubit readout signals for an individual operating domain of the example quantum computing system 2300 shown in FIG. 23A. In some cases, the example process 2600 can be used to operate a device array that includes a frequency tiling or multiple frequency sub-arrays, such as, for example, the device array 2120 shown in FIG. 21C, the device array 2220 shown in FIG. 22C, or another device array.

The block diagram shown in FIG. 26 includes a multiplexer 2620 and a wideband ADC 2640. Some aspects of the example process 2600 may be implemented by the example components shown in FIG. 26, by one or more of the example components shown in FIG. 23A, or by additional or different components. In some implementations of the process 2600 shown in FIG. 26, multiplexing of qubit readout signals is performed at a lower temperature (e.g., in a cryogenic temperature stage), and de-multiplexing of the qubit readout signals is performed at a higher temperature (e.g., in a room temperature stage or an intermediate temperature stage). The process 2600 may include additional or different operations, and the operations can be performed in the order shown in FIG. 26 or in another manner.

The example multiplexer 2620 shown in FIG. 26 receives qubit readout signals produced by n readout devices interacting with n qubit devices in a quantum processor cell. Thus, each of the qubit readout signals is received from a distinct qubit device. The frequency distributions of three example qubit readout signals are plotted schematically in FIG. 26. The horizontal axis in each of the three plots represents frequency, and the vertical axis in each of the three plots represents the amplitude of the qubit readout signal at each frequency. The first qubit readout signal 2610A is centered on a first readout frequency f1, the second qubit readout signal 2610B is centered on a second readout frequency f2, and the third qubit readout signal 2610C is centered on a third readout frequency fn. The three readout frequencies (f1, f2, fn) are distinct because each qubit readout signal is generated (e.g., by a control system) for a readout device that operates at a distinct readout frequency.

The example multiplexer 2620 combines the n qubit readout signals to generate a multiplexed readout signal 2630 for all n of the qubit devices. Thus, the qubit readout signals from the n qubit devices can be communicated on a single physical channel. The frequency distribution of the multiplexed readout signal 2630 is plotted schematically in FIG. 26. The horizontal axis in the plot represents frequency, and the vertical axis of the plot represents the amplitude of the multiplexed readout signal 2630 at each frequency. As shown in the plot, the multiplexed readout signal 2630 corresponds to a summation of the first qubit readout signal 2610A, the second qubit readout signal 2610B, and the third qubit readout frequency signal 2610C. In particular, the example multiplexed readout signal 2630 includes a first component centered on the first readout frequency f1, a second component centered on the second readout frequency f2, and a third component centered on the third readout frequency fn. This signal processing scheme can be repeated for each operating domain of the quantum computing system.

In the example shown, the qubit readout signals from the readout devices and the multiplexed readout signal 2630 from the multiplexer 2620 are analog signals. As shown in FIG. 26, the multiplexed readout signal 2630 is delivered to the wideband ADC 2640. The wideband ADC 2640 digitizes the multiplexed readout signal 2630, thus producing a digitized version of the multiplexed readout signal 2630.

The digital multiplexed readout signal produced by the wideband ADC 2640 can be processed, for example, by a classical computer system. Because each qubit readout signal has a distinct readout frequency, the qubit readout data for each qubit device can be separated out of the digital multiplexed readout signal, for example, by digitally de-multiplexing the signal produced by the wideband ADC 2640. Thus, in the example shown, the digital qubit readout data for each qubit device corresponds to the analog qubit readout signal from the qubit device. The qubit readout data can be used, for example, to identify the quantum states of the qubit devices, to generate quantum processor control information, or for a combination of these and other purposes.

In some implementations, the process 2600 can provide advantages for operating a quantum computing system. For example, electrical isolation between devices in the quantum processor cell can be maintained by distinct output signal lines for each device in the quantum processor cell. As another example, frequency multiplexing may reduce the frequency bandwidth allowed through each signal path from the quantum processor cell, which may reduce noise. In addition, the frequency filtering characteristics may reject out-of-band frequency content, which may provide isolation between devices operating in distinct frequency bands. Moreover, signal multiplexing can reduce the number of signal lines needed to carry signals across temperature stages, which may reduce cooling power requirements while also facilitating electrical isolation and noise reduction. In some cases, the process 2600 can be used to obtain a dramatic reduction in cost and complexity of a quantum computing system. In some cases, the process 2600 can be used to allow a unit cell of a multi-dimensional device lattice to be reliably repeated over the lattice, for instance, to build arbitrarily large systems of interacting quantum devices.

Figure 27:
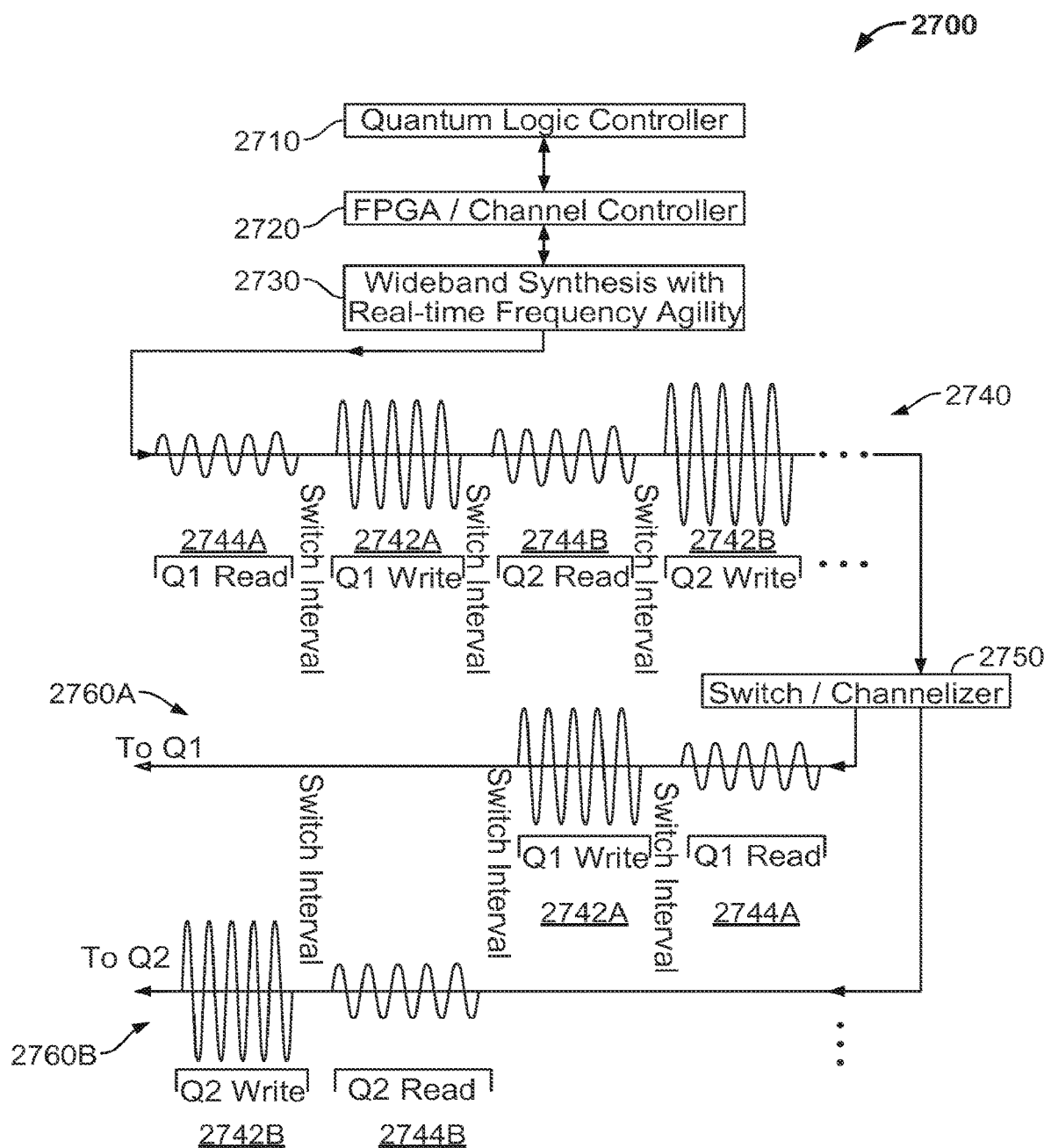
FIG. 27 is a block diagram showing an example process for delivering control signals to a quantum processor cell.

FIG. 27 is a block diagram showing an example process 2700 for delivering control signals to a quantum processor cell. For instance, the example process 2700 can be used to deliver control signals for an individual operating domain of the example quantum computing system 2300 shown in FIG. 23A. In some cases, the example process 2700 can be used to operate a device array that includes a frequency tiling or multiple frequency sub-arrays, such as, for example, the device array 2120 shown in FIG. 21C, the device array 2220 shown in FIG. 22C, or another device array. The example process 2700 can be used, for example, to synthesize and deliver a time-multiplexed composite control sequence that is channelized by a switch channelizer for delivery to individual devices (qubit devices, readout devices, coupler devices, etc.) in a quantum processor cell.

The block diagram shown in FIG. 27 includes a quantum logic controller 2710, a channel controller 2720, a wideband signal synthesizer 2730 with real-time frequency agility, and a switch 2750. Some aspects of the example process 2700 may be implemented by the example components shown in FIG. 27, by one or more of the example components shown in FIG. 23A, or by additional or different components. In some implementations of the process 2700 shown in FIG. 27, time multiplexing of write/read signals is performed at a higher temperature (e.g., in a room temperature stage or an intermediate temperature stage), and de-multiplexing of the write/read signals is performed at a lower temperature (e.g., in a cryogenic temperature stage). The process 2700 may include additional or different operations, and the operations can be performed in the order shown in FIG. 27 or in another manner.

The example quantum logic controller 2710 receives data from the channel controller 2520 and sends instructions to the channel controller 2720. For example, the quantum logic controller 2710 may receive readout data indicating the states of one or more qubit devices; and the quantum logic controller 2710 may send instructions corresponding to a quantum logic operation to be performed by the quantum processor cell. As shown in FIG. 27, the channel controller 2720 composes a digital composite control sequence based on instructions received from the quantum logic controller 2710, and the wideband signal synthesizer 2730 generates an analog composite control sequence based on the digital composite control sequence received from the channel controller 2720.

In the example shown, the wideband signal synthesizer 2730 generates time-multiplexed control signals 2740. The time-multiplexed control signals 2740 include a write signal 2742A for a first qubit device, a write signal 2742B for a second qubit device, a read signal 2744A for a first readout device, and a read signal 2744B for a second readout device. As shown in FIG. 27, each of the respective signals is separated in the time domain by a switch interval.

In the example shown, the time-multiplexed control signal 2740 is switched (or channelized) by the switch 2750. On one output channel, the switch 2750 generates a first series of de-multiplexed control signals 2760A; and on another output channel, the switch 2750 generates a second, distinct series of de-multiplexed control signals 2760B. The de-multiplexed control signals 2760A include the write signal 2742A for the first qubit device and the read signal 2744A for the first readout device. The de-multiplexed control signals 2760B include the write signal 2742B for the second qubit device and the read signal 2744B for the second readout device.

In the example shown, the write signal 2742A has a first frequency that is addressed to the first qubit device, which has a first qubit operating frequency, and the write signal 2742B has a second, distinct frequency that is addressed to the second qubit device, which has a distinct, second qubit operating frequency. Similarly, the read signal 2744A has a first frequency that is addressed to the first readout device, which has a first readout frequency, and the read signal 2744B has a second, distinct frequency that is addressed to the second readout device, which has a distinct, second readout frequency.

Aspects of the example technique shown in FIG. 27 can be implemented, for example, by a solid state switch or switched filter bank that is used to implement time-division multiplexing. As shown, the signal for each device is communicated in a time interval, and the switch is electronically controlled to provide a continuous signal path to the appropriate output while other signal paths are isolated. In each time interval, respective signals (which may have the same or different content) are routed to either the same destination or a different destination by modifying the switch state to propagate the signal along an alternate output signal path.

The example architecture shown in FIG. 27 may provide advantages, in some instances, for controlling a quantum processor cell. For example, the architecture may enable control signals to be delivered by a significantly smaller number of electronic components and signal channels. Reducing the number of electronic components can significantly reduce the cost and complexity of the quantum computing system. Moreover, reducing the number of signal lines can significantly reduce the interface between cryogenic temperature stages and higher temperature stages, which may improve shielding and isolation of the quantum processor cell.

Figure 28:
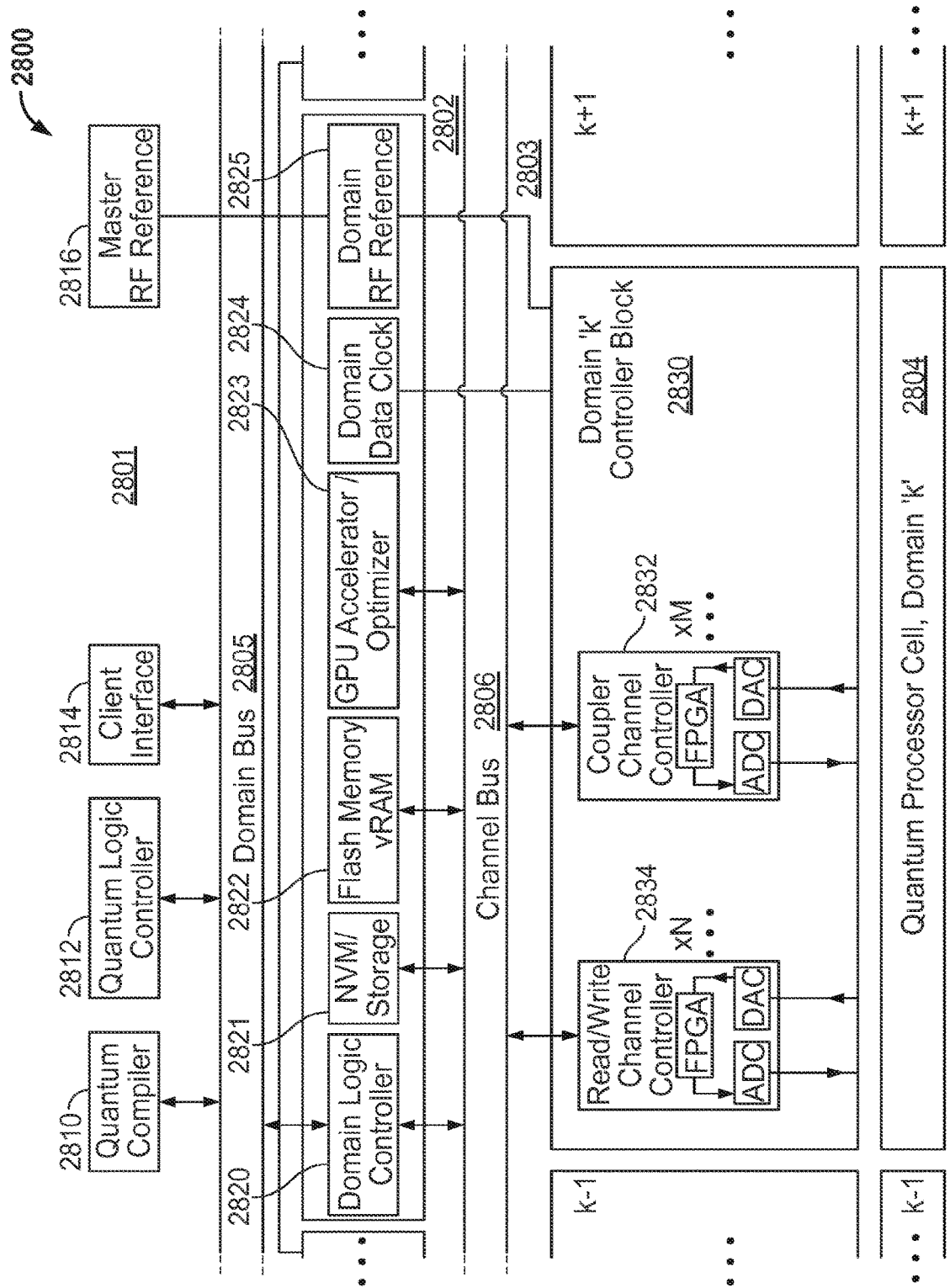
FIG. 28 is a block diagram of an example quantum computing system.

FIG. 28 is a block diagram of an example quantum computing system 2800. The example quantum computing system 2800 can include the features of the example quantum computing system 100A shown in FIG. 2, the example quantum computing system 2300 shown in FIG. 23A, or the example quantum computing system 2800 can be implemented in another manner. In some implementations, the example quantum computing system 2800 can encode and process information in a device array that includes a frequency tiling or multiple frequency sub-arrays, such as, for example, the device array 2120 shown in FIG. 21C, the device array 2220 shown in FIG. 22C, or another device array. In some instances, one or more components of the quantum computing system 2800 may operate according to the example techniques shown and described with respect to one or more of FIGS. 23A, 23B, 24, 25, 26 and 27, or the quantum computing system 2800 may operate in another manner.

The example quantum computing system 2800 shown in FIG. 28 includes multiple operating domains and multiple operating levels. The operating domains each include a subset of the qubits in a quantum processor cell, and each operating domain may include dedicated hardware at one or more of the operating levels of the quantum computing system 2800. In some cases, multiple operating domains share resources at one or more of operating levels.

In the example shown, the quantum computing system 2800 includes a system control level 2801, which is the highest operating level in the system. The quantum computing system 2800 also includes a domain control level 2802, which is the second-highest operating level in the system. Below the domain control level 2802, the quantum computing system 2800 includes a channel control level 2803. The quantum computing system 2800 also includes a quantum processor cell level, which is the lowest level in the system. The quantum processor cell level includes quantum processor cell domains 2804 for the operating domains of the quantum computing system 2800.

The example system control level 2801 shown in FIG. 28 includes a quantum compiler 2810, a quantum logic controller (QLC) 2812, a client interface 2814, a master RF reference 2816 and a domain bus 2805. As shown in FIG. 28, the quantum compiler 2810, the QLC 2812 and the client interface 2814 communicate with each other by exchanging signals on the domain bus 2805. In some instances, the quantum compiler 2810, the QLC 2812 and the client interface 2814 operate together, for example, to perform one or more operations of the example control interface 2305 shown in FIG. 23A, one or more operations of the program interface 122 in FIG. 2, or other operations. The system control level 2801 may include additional or different components, and the components of a system control level may operate in the manner described with respect to FIG. 28 or in another manner.

The example domain control level 2802 includes a domain logic controller (DLC) 2820, a non-volatile memory (NVM)/storage 2821, a video random access memory (vRAM) 2822 (e.g., a flash memory), a graphics processing unit accelerator/optimizer (GPU-AO) 2823, a domain data clock 2824 and a domain RF reference 2825. In some cases, the domain control level 2802 includes a set of such components, and possibly other components, for each operating domain of the quantum computing system 2800. In some instances, components in the domain control level 2802 perform one or more operations of the example control interface 2305 shown in FIG. 23A, one or more operations of the program interface 122 shown in FIG. 2, or other operations. The domain control level 2802 may include additional or different components, and the components of a domain control level may operate in the manner described with respect to FIG. 28 or in another manner.

As shown in FIG. 28, the domain RF reference 2825 in the domain control level 2802 communicates with the master RF reference 2816. Also as shown in FIG. 28, the NVM 2821, the vRAM 2822, and the GPU-AO 2823 communicate with each other by exchanging signals on the channel bus 2806. The example buses shown in FIG. 28 (e.g., the domain bus 2805, the channel bus 2806) can be implemented, for example, as high-speed serial computer expansion buses (e.g., a PCIe (Peripheral Component Interconnect Express)), or other types of bus devices.

The example channel control level 2803 includes multiple domain controller blocks 2830. Each domain controller block 2830 includes one or more channel controllers. The channel controllers in the domain controller block 2830 may operate, for example, as the example channel controller 2361 shown in FIG. 23B, or the channel controllers may operate in another manner. In the example shown in FIG. 28, the domain controller block 2830 includes one or more read/write channel controllers 2834 and one or more coupler channel controllers 2832. In some instances, components in the channel control level 2803 perform one or more operations of the signal generator system 2302 shown in FIG. 23A, one or more operations of the signal generator system 120 shown in FIG. 2, or other operations.

The example read/write channel controller 2834 can control the read and write operations for a group of qubit devices in the quantum processor cell domain 2804. This domain may include in some instances a group of devices, where each device in the group belongs to a different sub-array, for instance, as described in FIGS. 21A-21C and 22A-22C, or it may be operated in another way. Similarly, the example coupler channel controller 2832 can control the coupler operations for a group of coupler devices in the quantum processor cell domain 2804. The read/write channel controller 2834 and the coupler channel controller 2832 can communicate with each other by exchanging signals on the channel bus 2806. In some instances, the read/write channel controller 2834 and the coupler channel controller 2832 can communicate with components in the domain control level 2802 by exchanging signals on the channel bus 2806. As shown in FIG. 28, the domain controller block 2830 can also communicate with (e.g., receive clock signals from) the domain data clock 2824 and the domain RF reference 2825.

The quantum processor cell domain 2804 includes qubit devices, readout devices and coupler devices that are controlled by control signals from the domain controller block 2830. The readout devices may also send qubit readout signals to the domain controller block 2830. The qubit devices, readout devices and coupler devices can be housed, for example, in an electromagnetic waveguide system or another structure.

The example quantum computing system 2800 can be assembled and deployed in an appropriate operating environment. For superconducting systems, the operating environment can include a cryogenic, low-noise environment where the ambient level of background noise is reduced or minimized at frequencies relevant to operation of the quantum processor cell. For example, a quantum processor cell with qubit devices and readout devices operating in the range of 3 GHz to 8 GHz maybe be deployed in an environment between 5 mK and 10 mK. In some cases, a quantum processor cell can be deployed at other temperatures (higher or lower). The temperature range can be guided, for example, by the formula $f=k_B T/h$, where f indicates the frequency of background noise, $k_B$ represents the Boltzmann constant, T represents temperature in units of Kelvin, and h represents Planck's constant. In some cases, the temperature range for one or more components of the quantum processor cell can be guided by other considerations or formulas. Moreover, in some cases, one or more levels or components of the quantum computing system 2800 operate in higher temperature stages.

In some cases, signals are transferred between components of the quantum computing system 2800 on transmission lines or other types of signal lines. For example, liquid crystal polymer substrates or other types of materials can be used to fabricate high-density, high-isolation, many-channel microwave signal cables. The example quantum computing system 2800 shown in FIG. 28 includes signal lines that transfer signals between high and low temperature stages. In some instances, the signal lines extending from high to low temperature stages in a cryogenic apparatus can introduce a thermal shunt. Moreover, the cooling power at 10 mK may be less than 5 µW, and the signal delivery can be performed in architecture with hundreds, thousands or more qubit devices. To reduce the thermal bridging effects of transmission lines carrying DC, radio frequency, or microwave signals, a single transmission line may be used in some instances to deliver signals to multiple devices. In some cases, the signal line connects with a solid state switch, a switched filter bank, a power divider, a frequency multiplexer, or another device in the low temperature stage, and each input signal line bridging the temperature stage may divide into multiple signal distribution branches in the lower temperature stage, for example, to communicate with multiple devices. For instance, the systems and techniques shown and described with respect to FIGS. 23A, 23B, 24, 25, 26 and 27 may be used, or the signal delivery components can be configured in another manner.

In some instances, after the quantum computing system 2800 has been deployed, the system is characterized. For example, operating frequencies of the devices (qubit devices, coupler devices, readout devices) in the quantum processor cell, anharmonicities, power levels, and other parameters of the system can be determined. The system device parameters can be determined, for example, by a characterization process that operates over frequency, power, and time ranges that are broader than the operational ranges used for quantum computation. Thus, the quantum computing system 2800 may have broad operating capabilities. In some instances, s-parameters, input impedances, directional coupler outputs, and phase characteristics can be used in connection with identifying system parameters during the characterization process.

In some instances, after the system parameters have been determined by the characterization process, real-time control over the quantum processor cell components can be established. In some cases, this includes generating, delivering, applying, extracting and processing signals in connection with the devices in the quantum processor cell. The processed signals can be interpreted and used to condition subsequent input pulses, and this process can occur, for example, within a clock cycle of the quantum processor. For instance, a clock cycle can be the time between application of successive quantum logic gates during a quantum computation task. During real-time control, the device parameters and operating frequencies can be identified (e.g., periodically or continuously checked), for example, to account for sources of signal drift (e.g., aging, changes in thermal equilibrium, others).

In some instances, after establishing real-time control of the quantum processor cell, a quantum computing algorithm may be executed. The logical gates and readout operations that realize the quantum computing algorithm may be interwoven with additional overhead operations that are used to maintain the integrity of the stored quantum information. For example, quantum error correction procedures may be implemented to maintain computational integrity. The quantum computing algorithm and the quantum error correction procedures can be managed by the QLC 2812. For example, the QLC 2812 can provide instructions for individual channels and orchestrate real-time control on each individual channel across the full quantum processor cell. The QLC 2812 can receive, process and send information to the subsystems of the quantum computing system 2800, for example, to execute real-time control of the system.

In some instances, the real-time control of the quantum processor cell can be used as a computational resource. For example, the quantum computing system 2800 can communicate with an external device that is used to orchestrate recompiling and partitioning of the calculations to be performed across multiple processing nodes based on disparate underlying hardware or computing paradigms.

In the example shown in FIG. 28, the client interface 2814 communicates with the QLC 2812 and the quantum compiler 2810. In some instances, an application that communicates with the client interface 2814 can be a local application or a remote application that communicates, for example, over a data network (e.g., the Internet, cellular telecommunication infrastructure, a virtual private network, etc.) or another type of communication channel. In some cases, the client interface 2814 specifically targets the application to be run on the quantum computing system 2800. In some cases, an external system targets the application to be run on the quantum computing system 2800, and the client interface 2814 does not target applications. For example, the quantum computing system 2800 may act as a node or an obfuscated accelerator for a particular task to be performed in a larger system.

The example quantum compiler 2810 can interpret data and instructions from the client interface 2814 and compile them into a series of quantum logic gates to realize a computational task. In the example shown, the QLC 2812 can control the execution of the quantum computation on the quantum processor cell. For instance, the QLC 2812 can communicate with multiple DLCs 2820, and each DLC 2820 can orchestrate the operation of an individual operating domain. For example, each DLC 2820 can be mapped to and responsible for a physical region of the quantum processor cell (e.g., a subset of a full lattice of qubit devices and coupler devices, or another type of physical region).

The example QLC 2812 may receive measurement data and error-matching calculations performed at the domain control level 2802. The example QLC 2812 can send each DLC 2820 instructions for the application of time-sequenced or frequency-multiplexed quantum logic or other operations (e.g., single-qubit gates, multi-qubit gates, subroutines, a characterization process, an optimization protocol, measurements, etc.). The QLC 2812 may receive calculation results from error-correction calculations across all operating domains; in some implementations, such calculations at the domain control level 2802 are restricted to errors within a respective operating domain.

The example master RF reference 2816 in the system control level 2801 can function as a master clock that generates a master clock signal. In some cases, the master clock signal can be distributed for timing and synchronization to each domain in the control system.

In the domain control level 2802, the DLC 2820 communicates with the system control level 2801, for example, receiving system-level control instructions in the form of time-sequenced quantum logic operations. The example DLC 2820 can be responsible for both execution of quantum logic operations and other types of operations (e.g., characterization, testing, optimization, etc.) in a given operating domain. The example DLC 2820 may instruct one or more channels under its operating domain to operate in either a real-time computing mode or an off-line characterization and testing mode. In some cases, the operating mode of each channel is independent of the other channels in the quantum computing system 2800.

In some implementations, the DLC 2820 can be implemented as a single- or multi-core processor; as an FPGA or ASIC; or a combination of these and other systems, which may be locally or remotely located. In some cases, for example, when the processing, memory or storage demands on the DLC 2820 are significant, the DLC 2820 may be supplemented on the domain control level 2802 with a memory resource such as the vRAM 2822, the GPU-AO 2823, or another resource. For example, the vRAM 2822 or the GPU-AO 2823 can be used to support error correcting calculations, optimization of individual qubit or coupler channels, or other operations. The domain control level 2802 may include a solid state or other storage resource. The master clock signal from the system control level 2801 can be distributed to each domain in the domain control level 2802, and the domain data clock 2824 within each domain can produce a domain clock signal for synchronizing individual channel controllers in the channel control level 2803.

In some instances, the GPU-AO 2823 can provide additional computational resources beyond what is required by the quantum processor cell domain to which it is deployed. Additional processing power (e.g., to form a high-performance hybrid computing system) may be provided within the quantum computing control system described herein. For example, additional processing nodes may be implemented based on a field-programmable gate array (FPGA), a graphics processing unit (GPU), an application-specific integrated circuit (ASIC), a system-on-a-chip (SOC), a single- or multi-core central processing unit (CPU)-based processor, or another type of data processing apparatus.

In the example channel control level 2803, individual channel controllers are deployed. The read/write channel controller 2834 can be used for read/write control (e.g., measurement and operation) of qubit devices in the quantum processor cell. The coupler channel controller 2832 can be used for operation of coupler devices in the quantum processor cell. In some cases, the architecture of both types of channel controllers can be the same. In some cases, the read/write channel controller 2834 can have physical attributes or performance specifications that are distinct from the attributes or specifications of the coupler channel controller 2832. For example, the read/write channel controller 2834 may receive source signals having components in the range of 3 GHz to 5 GHz for control of qubit devices, and the range of 5 GHz to 7 GHz for control of readout devices, and the coupler control channel 2832 may receive source signals in the range of DC (zero frequency) to 1 GHz for control of coupler devices. Other frequency ranges may be used in various implementations.

In some instances, the FPGA of each channel controller is in real-time communication with the DLC 2820. At each clock cycle, the FPGA in some or all of the channel controllers in the domain controller block 2830 can communicate to the DLC 2820 a status or measurement outcome, and can receive from the DLC 2820 instruction for subsequent execution. The FPGA may receive the instructions from the DLC 2820 and induce the DAC and ADC within the channel controller to produce or process signals that allow the system to perform quantum computation operations realizing those instructions. In some cases, the FPGA can implement Kalman filter digital signal processing techniques or other types of processes to optimize or otherwise improve the interpretation of qubit readout signals. In some cases, the FPGA, the DAC and the ADC within each channel controller operate as described with respect to FIG. 23B, or they may operate in another manner.

In some implementations, the transition frequencies of the qubit devices and the quantum processor cell are staged in frequency. For instance, the qubit frequencies can be chosen such that each qubit in the quantum processor cell has a qubit operating frequency that is distinct from the operating frequencies of all nearest-neighbor qubits, and each nearest-neighbor for any given qubit has a different qubit operating frequency difference than the other nearest-neighbors for the given qubit. Thus, each qubit can have a different difference in frequency between itself and each neighboring qubit, such that no two coupler devices that have the same drive frequency are coupled to the same qubit device.

In some instances, each individual channel of the quantum computing system (e.g., each channel controller) controls a row, column, sub-array or other domain of one or more subsystems of the quantum computing system 2800. Subsystems may include any structure or component that receives control signals. For example, subsystems may include qubit devices, where control signals are used for one-qubit gates or encoding an initial state; readout devices, where control signals are used for extracting information or projective quantum measurement; or other types of devices. In some instances, staging subsystems at different frequencies and controlling those subsystems with pulses reduces the total number of control channels required in the quantum computing system, and may provide other efficiencies or advantages.

In a general aspect of what is described above, a quantum computing method includes encoding information in a multi-dimensional array of qubit devices housed in a multi-dimensional electromagnetic waveguide lattice. The qubit devices have respective qubit operating frequencies. The electromagnetic waveguide lattice is configured to suppress signal propagation between the qubit devices over a frequency range that includes the qubit operating frequencies.

Implementations of any of the general aspects described in this document may include one or more of the following features. The method can include processing the information encoded in the qubit devices by operation of coupler devices housed in the electromagnetic waveguide lattice between respective pairs of the qubit devices. The method can include processing the information encoded in the qubit devices by operation of qubit devices. The method can include extracting output information from the qubit devices by operation of readout devices housed in the quantum processor cell assembly.

In a general aspect of what is described above, a quantum computing system includes a quantum processor cell assembly. The quantum processor cell assembly includes an electromagnetic waveguide system. The electromagnetic waveguide system includes an interior surface that defines an interior volume of intersecting waveguides. The intersecting waveguides define cutoff frequencies and are configured to evanesce electromagnetic waves below the cutoff frequencies. The quantum computing system includes a multi-dimensional array of qubit devices housed in the electromagnetic waveguide system. The qubit devices have respective qubit operating frequencies below the cutoff frequencies.

Implementations of any of the general aspects described in this document may include one or more of the following features. The electromagnetic waveguide system can define a two-dimensional waveguide lattice in which a first subset of the waveguides intersect a second subset of the waveguides at a two-dimensional array of waveguide intersections, and the cutoff frequencies are independent of the size of the two-dimensional array. The two-dimensional array can include rows and columns, and the cutoff frequencies can be independent of the number of rows and the number of columns. The electromagnetic waveguide system can define a three-dimensional waveguide lattice in which three distinct subsets of the waveguides intersect each other at a three-dimensional array of waveguide intersections, and the cutoff frequencies can be independent of the size of the three-dimensional array. The three-dimensional array includes rows, columns and layers, and the cutoff frequencies are independent of the number of rows, the number of columns, and the number of layers. The interior surface can define waveguide cross-sections, and the cutoff frequencies can be defined by the waveguide cross-sections. The largest dimension of at least one of the waveguide cross-sections can be between 0.1 and 1.0 centimeters. The interior surface can define waveguide propagation axes that are perpendicular to the respective waveguide cross-sections. The intersecting waveguides can each be configured to propagate electromagnetic waves above the cutoff frequency. Each of the intersecting waveguides can define substantially the same cutoff frequency. Each qubit device can include an electronic circuit that defines the qubit operating frequency of the qubit device. A first subset of the waveguides can intersect a second subset of the waveguides at a multi-dimensional array of waveguide intersections in the quantum processor cell assembly. The quantum computing system can include the qubit devices housed at the waveguide intersections and coupler devices housed between neighboring pairs of the qubit devices within the quantum processor cell assembly. The quantum computing system can include coupler devices housed at the waveguide intersections and the qubit devices housed within the quantum processor cell assembly between neighboring pairs of the coupler devices. The multi-dimensional array of waveguide intersections can be aligned with the multi-dimensional array of qubit devices. The quantum computing system can include readout devices housed in the quantum processor cell assembly, the readout devices operably coupled to the qubit devices and configured to produce qubit readout signals based on electromagnetic interactions with the qubit devices. At least a portion of the interior surface can include a superconducting material. At least a portion of the interior surface can include a metallic conductor material. The quantum processor cell assembly can include a lid component and a base component. The lid component and based component can form a partial enclosure that includes the interior volume of the intersecting waveguides.

In a general aspect of what is described above, a quantum computing method includes receiving qubit control signals at a multi-dimensional array of qubit devices in an electromagnetic waveguide system of a quantum processor cell assembly. The qubit devices having respective qubit operating frequencies. The electromagnetic waveguide system has an interior surface that defines an interior volume of intersecting waveguides. Each intersecting waveguide defining a cutoff frequency above the qubit operating frequency and is configured to evanesce electromagnetic waves below the cutoff frequency.

Implementations of any of the general aspects described in this document may include one or more of the following features. The electromagnetic waveguide system can define apertures through a portion of the interior surface, and the qubit control signals can be received over control lines that extend in the apertures and couple the qubit devices with an external control system. The quantum computing method can include supporting the qubit devices in the electromagnetic waveguide system on a signal board disposed in the quantum processor cell assembly. The signal board can include qubit signal lines that deliver the qubit control signals to the respective qubit devices. The signal board can include a layered structure that includes the signal lines between layers of insulator material. The electromagnetic waveguide system can include an interior surface that defines waveguide propagation axes and waveguide cross-sections perpendicular to the waveguide propagation axes. The cutoff frequencies can be defined by the waveguide cross-sections. Each qubit device can include an electronic circuit that defines the qubit operating frequency. The electromagnetic waveguide system can defines a two-dimensional waveguide lattice in which a first subset of the waveguides are parallel to each other, a second subset of the waveguides are parallel to each other, and the first subset intersect the second subset at a two-dimensional array of waveguide intersections. The electromagnetic waveguide system can defines a three-dimensional waveguide lattice in which a first subset of the waveguides are parallel to each other, a second subset of the waveguides are parallel to each other, a third subset of the waveguides are parallel to each other, and the first, second and third subsets intersect each other at a three-dimensional array of waveguide intersections. The multi-dimensional array of waveguide intersections can be aligned with the multi-dimensional array of qubit devices. Receiving the qubit control signals can cause the qubit devices to process information encoded in the qubit devices. The quantum computing method can include receiving coupler control signals at coupler device housed between neighboring pairs of the qubit devices in the electromagnetic waveguide system. The quantum computing method can include producing qubit readout signal at readout devices that are housed in the electromagnetic waveguide system and coupled to the qubit devices, the qubit readout signals produced in response to readout control signals delivered to the readout devices.

In a general aspect of what is described above, a quantum computing system includes a quantum processor cell assembly comprising a system of intersecting waveguides. Each of the waveguides defines a cross-section and a propagation axis perpendicular to the cross-section, and the cross-section of each waveguide defines a cutoff frequency of the waveguide. The quantum computing system includes a multi-dimensional array of qubit devices housed in the system of intersecting waveguides. The qubit devices have respective qubit operating frequencies below the cutoff frequencies of the intersecting waveguides.

Implementations of any of the general aspects described in this document may include one or more of the following features. The waveguides can each define substantially the same cutoff frequency, and each waveguide can be configured to propagate electromagnetic waves above the cutoff frequency and to evanesce waves below the cutoff frequency. Each qubit device can include an electronic circuit that defines the qubit operating frequency of the qubit device. The qubit devices housed in the system of intersecting waveguides can have respective qubit operating frequencies below the cutoff frequencies of the intersecting waveguides. Coupler devices can be housed in the system of intersecting waveguides between respective pairs of the qubit devices. The coupler devices can have coupler operating frequencies below the cutoff frequencies of the intersecting waveguides.

In a general aspect of what is described above, a quantum computing system includes a quantum processor cell assembly that includes an electromagnetic waveguide system. The electromagnetic waveguide system has an interior surface that defines an interior volume of intersecting waveguides. A first subset of the waveguides intersect a second subset of the waveguides at a multi-dimensional array of waveguide intersections in the quantum processor cell assembly. The waveguide intersections include portions of the interior volume that are shared between the first subset and the second subset. The quantum computing system includes a multi-dimensional array of qubit devices housed in the electromagnetic waveguide system.

Implementations of any of the general aspects described in this document may include one or more of the following features. The multi-dimensional array of waveguide intersections defines distances between neighboring pairs of the waveguide intersections, and the distances can be between 0.2 and 2.0 centimeters. The quantum processor cell assembly can include a lid component and a base component. The lid component and based component can form a partial enclosure that includes the interior volume of the intersecting waveguides. The lid component can include a first portion of the interior surface, and the base component can include a second portion of the interior surface. At least a portion of the interior surface can be a superconducting material. At least a portion of the interior surface can be a metallic conductor material. The electromagnetic waveguide system can define apertures through a portion of the interior surface about the waveguide intersections. The quantum computing system can include control lines that couple the qubit devices with an external control system, and the control lines can extend in the apertures. The electromagnetic waveguide system can include a two-dimensional waveguide lattice in which the first subset of waveguides are parallel to each other and the second subset of waveguides are parallel to each other. The first subset of waveguides can be perpendicular to the second subset of waveguides, and the first subset can intersect the second subset at right angles in the quantum processor cell assembly. Each of the waveguides can include at least one subsection that has a substantially rectangular cross-section. The cross-section can be defined by opposing right and left sidewalls of the electromagnetic waveguide system. The rectangular cross-section can be partially defined by opposing upper and lower sidewalls of the electromagnetic waveguide system. At each waveguide intersection, the right and left sidewalls of a waveguide in the first subset can meet the right and left sidewalls of a waveguide in the second subset. The interior surface can include sidewalls made of at least one of metallic conducting material or superconducting material. The quantum computing system can include qubit devices housed at the waveguide intersections and coupler devices housed in the electromagnetic waveguide system between respective pairs of the qubit devices. The quantum computing system can include coupler devices housed at the waveguide intersections and qubit devices housed in the electromagnetic waveguide system between respective pairs of the coupler devices. The quantum computing system can include a signal board disposed in the quantum processor cell assembly. The signal board can support the qubit devices in the electromagnetic waveguide system. The signal board can include qubit signal lines configured to deliver qubit control signals to the respective qubit devices. The signal board can be a layered structure that includes the signal lines between layers of insulator material. The signal board can support coupler devices in the electromagnetic waveguide system. The coupler devices can reside between respective pairs of qubit devices. The signal board can include receptacles that support the qubit devices and the coupler devices and arms that support the receptacles. One or more of the arms can extend through a wall of the electromagnetic waveguide system between an interior and an exterior of the electromagnetic waveguide system. The signal board can include coupler signal lines configured to deliver coupler control signals to the coupler devices. The signal board can support each qubit device at a respective waveguide intersection, and the multi-dimensional array of qubit devices can be aligned with the multi-dimensional array of waveguide intersections. The quantum computing system can include an input interconnect system that includes plateau structures. The plateau structures can include input interconnect signal lines that deliver device control signals to the signal board. The quantum computing system can include an output interconnect system that includes plateau structures. The plateau structures can include output interconnect signal lines that transfer qubit readout signals from the signal board. The intersecting waveguides can define cutoff frequencies. Each waveguide can be configured to evanesce electromagnetic waves below the cutoff frequency of the waveguide. The cutoff frequencies can be defined by respective cross-sections of the waveguides and they can be independent of the size of the multi-dimensional array.

In a general aspect of what is described above, a quantum computing method includes receiving qubit control signals at qubit devices housed in an electromagnetic waveguide system of a quantum processor cell assembly. The electromagnetic waveguide system includes an interior surface that defines an interior volume of intersecting waveguides. A first subset of the waveguides intersect a second subset of the waveguides at a multi-dimensional array of waveguide intersections in the quantum processor cell assembly. The waveguide intersections include portions of the interior volume that are shared between the first subset and the second subset.

Implementations of any of the general aspects described in this document may include one or more of the following features. The quantum computing method includes receiving coupler control signals at coupler devices housed between neighboring pairs of the qubit devices in the electromagnetic waveguide system. Receiving the coupler control signals at the coupler devices can cause the coupler devices to produce electromagnetic interactions between the neighboring pairs of qubit devices. The quantum computing method includes producing qubit readout signals at readout devices that are housed in the electromagnetic waveguide system. The qubit readout signals can be produced in response to readout control signals delivered to the readout devices.

In a general aspect of what is described above, a method includes forming a multi-dimensional lattice of intersecting waveguides in a quantum processor cell assembly. A first subset of the waveguides intersect a second subset of the waveguides at a multi-dimensional array of waveguide intersections in the quantum processor cell assembly. The waveguide intersections include interior volumes that are shared between the first subset and the second subset. The method includes supporting a multi-dimensional array of qubit devices in the lattice of intersecting waveguides.

Implementations of any of the general aspects described in this document may include one or more of the following features. Forming the intersecting waveguides can include assembling an upper cell member to a lower cell member. The upper and lower cell members can include interior surface structures that define an interior volume of the intersecting waveguides. The qubit devices can be supported between the assembled upper and lower cell assembly members. The qubit devices can be supported by a signal board disposed between the upper and lower cell members. The signal board can include receptacles for the respective qubit devices and arms that support the receptacles. At least a portion of the arms can extend through a wall that separates an interior and an exterior of the intersecting waveguides. The interior surface structures can include sidewalls that define cross-sections of the intersecting waveguides. The qubit devices can be supported at the waveguide intersections. The method can include supporting coupler devices between neighboring pairs of the qubit devices within the intersecting waveguides. The method can include supporting coupler devices in the intersecting waveguides at the waveguide intersections. The qubit devices can be supported between respective pairs of the coupler devices. The method can include supporting readout devices in the quantum processor cell assembly. The method includes aligning the multi-dimensional array of qubit devices with the multi-dimensional array of waveguide intersections.

In a general aspect of what is described above, a quantum computing system includes qubit devices housed in a quantum processor cell assembly. The qubit devices have respective qubit operating frequencies. The quantum computing system includes an electromagnetic waveguide system in the quantum processor cell assembly. The electromagnetic waveguide system includes waveguide structures between neighboring pairs of the qubit devices. The waveguide structures are configured to suppress signal propagation in a frequency range that includes the qubit operating frequencies. The quantum computing system includes coupler devices housed in the quantum processor cell assembly between neighboring pairs of the qubit devices. The coupler devices are configured to selectively couple the respective neighboring pairs of qubit devices based on coupler control signals received from a control source external to the quantum processor cell assembly.

Implementations of any of the general aspects described in this document may include one or more of the following features. The quantum computing system can include readout devices housed in the quantum processor cell assembly. The readout devices can be operably coupled to the qubit devices and configured to produce qubit readout signals based on electromagnetic interactions with the qubit devices. The quantum computing system can include a signal board that supports the qubit devices and the coupler devices in the quantum processor cell assembly. The signal board can include receptacles that support the qubit devices and the coupler devices and arms that support the receptacles. One or more of the arms can include qubit signal lines that are configured to communicate qubit control signals to the qubit devices from an input signal processing system. One or more of the arms can include coupler signal lines that are configured to communicate coupler control signals to the qubit devices from an input signal processing system. One or more of the arms can extend through a wall of the electromagnetic waveguide system between an interior and an exterior of the electromagnetic waveguide system. The quantum computing system includes an input interconnect system that includes plateau structures. The plateau structures include input interconnect signal lines that deliver device control signals to the signal board. The quantum computing system includes an output interconnect system that includes plateau structures. The plateau structures include output interconnect signal lines that transfer qubit readout signals from the signal board. The waveguide structures can be made of superconducting material, metallic conductor material, or a combination. The coupler control signals can be received over a control line that extends through an aperture in the electromagnetic waveguide system. The electromagnetic waveguide system can include an interior surface that defines an interior volume of intersecting waveguides, and each waveguide structure can be a subsection of one of the intersecting waveguides. The electromagnetic waveguide system can include a two-dimensional waveguide lattice that includes a first subset of waveguides intersecting a second subset of the waveguides at a two-dimensional array of waveguide intersections in the quantum processor cell assembly. The two-dimensional waveguide lattice can include waveguide subsections between the waveguide intersections, and each subsection can be configured to suppress signal propagation at one or more qubit operating frequencies. The qubit devices can be housed at the waveguide intersections, and the coupler devices can be housed between the qubit devices. The coupler devices can be housed at the waveguide intersections, and the qubit devices can be housed between the coupler devices. The electromagnetic waveguide system can include a three-dimensional waveguide lattice that includes three distinct subsets of the waveguides intersecting each other at a three-dimensional array of waveguide intersections in the quantum processor cell assembly. The three-dimensional waveguide lattice can include waveguide subsections between the waveguide intersections, and each subsection can be configured to suppress signal propagation at one or more qubit operating frequencies. The waveguide structures can define cutoff frequencies, and they can be configured to evanesce electromagnetic waves below the cutoff frequencies. The qubit operating frequencies can be below the cutoff frequencies, and the coupler devices can have coupler operating frequencies below the cutoff frequencies. The qubit devices can be transmon devices, and the coupler devices can be fluxonium devices.

In a general aspect of what is described above, a quantum computing method includes receiving, at a coupler device in a quantum processor cell assembly, a coupler control signal from a control source external to the quantum processor cell assembly. The coupler device is housed between qubit devices that have respective qubit operating frequencies. The coupler control signal causes the coupler device to produce an electromagnetic interaction between the qubit devices. The quantum computing method includes suppressing, by a waveguide structure between the qubit devices, signal propagation in a frequency range that includes the qubit operating frequencies.

Implementations of any of the general aspects described in this document may include one or more of the following features. Each qubit device can include an electronic circuit that defines the qubit operating frequency of the qubit device. The quantum computing method can include receiving a qubit control signal at one of the qubit devices. The qubit control signal can cause the qubit device to process information encoded in the qubit device. The quantum computing method can include producing qubit readout signals by operation of readout devices housed in the processor cell assembly. The qubit readout signals can be produced in response to readout control signals delivered to the readout devices based on interactions between the readout devices and the qubit devices. $A_n$ electromagnetic waveguide system can include an interior surface that defines an interior volume of intersecting waveguides. The waveguide structure that suppresses propagation of signals can be a subsection of electromagnetic waveguide system. The quantum computing method can include receiving qubit control signals at qubit devices housed in an electromagnetic waveguide system in the quantum processor cell assembly. The quantum computing method can include receiving coupler control signals at coupler devices housed between respective pairs of the qubit devices in the electromagnetic waveguide system. The electromagnetic waveguide system can include a two-dimensional waveguide lattice that includes a first subset of waveguides intersecting a second subset of waveguides at waveguide intersections in the quantum processor cell assembly. The qubit devices and coupler devices can be arranged in alignment with the two-dimensional waveguide lattice. The quantum computing method can include suppressing signal propagation at one or more qubit operating frequencies by operation of the electromagnetic waveguide system.

In a general aspect of what is described above, a quantum computing system includes a quantum processor cell that includes qubit chips, coupler chips and a signal board. Each qubit chip includes a qubit device. Each coupler chip includes a coupler device. The signal board supports the qubit chips and the coupler chips within the quantum processor cell. The qubit chips are arranged in a multi-dimensional array of qubit locations. The coupler chips are arranged between neighboring pairs of the qubit chips in the multi-dimensional array.

Implementations of any of the general aspects described in this document may include one or more of the following features. The quantum processor cell can include an electromagnetic waveguide system, and the signal board supports the qubit chips and the coupler chips within the electromagnetic waveguide system. The signal board can include receptacles that support the qubit devices and the coupler devices and arms that support the receptacles. One or more of the arms can extend through a wall of the electromagnetic waveguide system between an interior and an exterior of the electromagnetic waveguide system. The signal board can include qubit signal lines that deliver the qubit control signals to the respective qubit devices. The signal board can include coupler signal lines that deliver the coupler control signals to the respective coupler devices. The signal board can be a layered structure that includes signal lines between layers of insulator material.

In a general aspect of what is described above, a quantum computing system includes a quantum processor cell that houses qubit devices and coupler devices in an electromagnetic waveguide system. The qubit devices and the coupler devices form a multi-dimensional device lattice comprising multiple adjoining unit cells. Each unit cell of the device lattice includes at least one of the qubit devices and at least one of the coupler devices. The quantum computing system includes a control system communicably coupled to the quantum processor cell. The control system is configured to control the qubit devices.

Implementations of any of the general aspects described in this document may include one or more of the following features. The quantum processor cell can house readout devices, and each unit cell of the lattice can include at least one of the readout devices. The electromagnetic waveguide system can include a multi-dimensional waveguide lattice formed by intersecting waveguide sections, and the device lattice can be aligned in the waveguide lattice. The multi-dimensional device lattice can be a two-dimensional device lattice, and each unit cell can include two or more coupler devices. The multi-dimensional device lattice can be a three-dimensional device lattice, and each unit cell can include three or more coupler devices. The quantum computing system can include a signal delivery system that communicates signals between the control system and the quantum processor cell.

In a general aspect of what is described above, a quantum computing system includes a multi-dimensional array of qubit devices. Each qubit device has a respective qubit operating frequency that is independent of an offset electromagnetic field experienced by the qubit device. The quantum computing system includes coupler devices residing at intervals between neighboring pairs of the qubit devices in the multi-dimensional array. Each coupler device is configured to produce an electromagnetic interaction between the respective neighboring pair of qubit devices. Each coupler device configured to vary a coupling strength of the electromagnetic interaction according to an offset electromagnetic field experienced by the coupler device.

Implementations of any of the general aspects described in this document may include one or more of the following features. The quantum computing system includes readout devices associated with the multi-dimensional array of qubit devices. Each readout device can be operably coupled to a single, respective qubit device and configured to produce a qubit readout signal that indicates a state of the respective qubit device. The qubit readout signal can be produced in response to a readout control signal delivered to the readout device. Each qubit device can have two or more nearest-neighbor qubit devices in the multi-dimensional array. The qubit operating frequency of each qubit device can be distinct from the respective qubit operating frequencies of each nearest-neighbor qubit device. Each of the neighboring pairs of qubit devices can include a first qubit device having a first qubit operating frequency and a second qubit device having a second, distinct qubit operating frequency. Each coupler device can have a respective coupler operating frequency that varies with the offset electromagnetic field experienced by the coupler device, and the coupling strength can vary according to the coupler operating frequency. The coupler device between each neighboring pair of qubit devices can include bias circuitry and coupler circuitry. The bias circuitry can be configured to produce an offset electromagnetic field that tunes the coupler operating frequency of the coupler device. The coupler circuitry can be configured to experience the offset electromagnetic field and produce the electromagnetic interaction between the neighboring pair of qubit devices. In the coupler device between each neighboring pair of qubit devices the bias circuitry can be configured to tune the coupler operating frequency to a frequency range associated with at least one of the first qubit operating frequency or the second qubit operating frequency. The coupler circuitry can be configured to produce the electromagnetic interaction between the neighboring pair of qubit devices by resonating at a drive frequency that corresponds to a sum or difference of the first qubit operating frequency and the second qubit operating frequency. Each of the qubit devices can be a member of at least two of the neighboring pairs of the qubit devices in the multi-dimensional array. The multi-dimensional array can defines a first set of intervals along a first dimension of the array and a second set of intervals along a second dimension of the array. A first subset of the coupler devices can reside at the first set of intervals, and a second subset of the coupler devices can reside at the second set of intervals. The multi-dimensional array can be a two-dimensional array, and the qubit devices can define rows and columns of the two-dimensional array. The coupler devices can reside at intervals between the qubit devices along the rows and columns of the two-dimensional array. The rows of the two-dimensional array can be oriented perpendicular to the columns of the two-dimensional array. The two-dimensional array can be a square array, a rectangular array, or another type of rectilinear array. The multi-dimensional array can be a three-dimensional array. The qubit devices can define rows, columns and layers of the three-dimensional array. The three-dimensional array can be a rectilinear array. Each of the qubit devices can be a charge qubit. Each of the qubit devices can be a transmon qubit. Each of the qubit devices can be a flux qubit. Each of the qubit devices can be a fluxonium qubit. Each fluxonium qubit can include a topologically closed capacitance. The quantum computing system can include an electromagnetic waveguide system. The electromagnetic waveguide system can have an interior surface that defines an interior volume of intersecting waveguides. The qubit devices can be housed in the electromagnetic waveguide system. The intersecting waveguides can define cutoff frequencies and can be configured to evanesce electromagnetic waves below the cutoff frequencies. The qubit operating frequency of each qubit device can be below the cutoff frequencies. The interior surface of the electromagnetic waveguide system can define waveguide cross-sections. The cutoff frequencies can be defined by the waveguide cross-sections. A first subset of the waveguides can intersect a second subset of the waveguides at an array of waveguide intersections in the electromagnetic waveguide system. The waveguide intersections can include portions of the interior volume that are shared between the first subset and the second subset. The qubit devices can be housed at the waveguide intersections. The coupler devices can be housed in the electromagnetic waveguide system between the intersections. The multi-dimensional array of qubit devices defines distances between neighboring pairs of the qubit devices, and the distances can be between 0.2 and 2.0 centimeters. Each coupler device can be operatively coupled to a single respective neighboring pair of the qubit devices. Each neighboring pair of the qubit devices can be operatively coupled by a single respective coupler device. Each coupler device can be configured to produce the electromagnetic interaction based on coupler control signals that include AC and DC components.

In a general aspect of what is described above, a quantum computing method includes receiving qubit control signals in a multi-dimensional array of qubit devices. Each qubit device has a respective qubit operating frequency that is independent of an offset electromagnetic field experienced by the qubit device. The qubit control signal received by each qubit device is configured to manipulate a quantum state of the qubit device. The quantum computing method includes receiving coupler control signals at coupler devices. The coupler devices reside at intervals between neighboring pairs of the qubit devices in the multi-dimensional array. The coupler control signal received by each coupler device is configured to produce an electromagnetic interaction between the neighboring pair of qubit devices that the coupler device resides between. A coupling strength of the electromagnetic interaction produced by each coupler device is influenced by an offset electromagnetic field experienced by the coupler device.

Implementations of any of the general aspects described in this document may include one or more of the following features. Each qubit control signal can include a microwave pulse. Each qubit control signal can be configured to execute a single-qubit gate on qubit device that receives the qubit control signal. A component of the coupler control signals can be a DC signal that causes the coupler devices to experience offset electromagnetic fields. Each of the coupler devices can has a respective coupler operating frequency that varies with the offset electromagnetic field experienced by the coupler device. The coupling strength can vary according to the coupler operating frequency. Each of the neighboring pairs of qubit devices can include a first qubit device having a first qubit operating frequency and a second qubit device having a second, distinct qubit operating frequency. The offset electromagnetic field experienced by each coupler device can tunes the coupler device to a frequency range associated with at least one of the first qubit operating frequency or the second qubit operating frequency. A component of the coupler control signals can be an AC signal that drives the coupler devices while the coupler operating frequencies are tuned to the respective frequency ranges. Each control device can be driven at a drive frequency that corresponds to a sum or difference of the first qubit operating frequency and the second qubit operating frequency. Each coupler control signal can be configured to execute a two-qubit gate on the respective pair of qubit devices that the coupler device resides between. Each qubit device can have two or more nearest-neighbor qubit devices in the multi-dimensional array. The qubit operating frequency of each qubit device can be distinct from the respective qubit operating frequencies of each of its nearest-neighbor qubit device. Each of the neighboring pairs of qubit devices can include a first qubit device having a first qubit operating frequency and a second qubit device having a second, distinct qubit operating frequency. The quantum computing method can include producing qubit readout signals by operation of readout devices associated with the multi-dimensional array of qubit devices. Each readout device can be operably coupled to a single, respective qubit device. Each qubit readout signal can be produced by one of the readout devices in response to a readout control signal. The qubit readout signal can be produced based on an electromagnetic interaction between the readout device and the respective qubit device. The quantum computing method can include receiving readout control signals at the readout devices. Each readout control signal can be received by a respective readout device. Each qubit readout signal can be produced by a respective readout device in response to the readout control signal received by the respective readout device. Each coupler device can be operatively coupled to a single respective neighboring pair of the qubit devices. Each coupler device can be configured to produce the electromagnetic field based on coupler control signals that include AC and DC components.

In a general aspect of what is described above, a quantum computing system includes a multi-dimensional array of qubit devices. Each qubit device has a respective qubit operating frequency that is independent of an offset electromagnetic field experienced by the qubit device. The quantum computing system includes readout devices associated with the multi-dimensional array of qubit devices. Each readout device is operably coupled to a single, respective qubit device and configured to produce a qubit readout signal that indicates a state of the respective qubit device.

Implementations of any of the general aspects described in this document may include one or more of the following features. The qubit devices can have respective qubit operating frequencies in a first frequency band, and the readout devices can respective readout frequencies in a second, separate frequency band. The qubit devices can have respective qubit operating frequencies in a frequency band, and the readout devices can have respective readout frequencies that are interleaved between the qubit operating frequencies in the frequency band. Each qubit device can have two or more nearest-neighbor qubit devices in the multi-dimensional array. The qubit operating frequency of each qubit device can be distinct from the respective qubit operating frequencies of each of its nearest-neighbor qubit device. Each readout device can have a respective readout frequency and two or more nearest-neighbor readout devices. The readout frequency of each readout device can be distinct from the respective readout frequencies of each nearest-neighbor readout device. The quantum computing system can include coupler devices residing at intervals between neighboring pairs of the qubit devices in the multi-dimensional array. Each coupler device can be configured to produce an electromagnetic interaction between the respective neighboring pair of qubit devices that the coupler device resides between. A coupling strength of the electromagnetic interaction produced by each coupler device can vary with an offset electromagnetic field experienced by the coupler device. The multi-dimensional array can be a two-dimensional array, and the qubit devices can define rows and columns of the two-dimensional array. The rows of the two-dimensional array can be oriented perpendicular to the columns of the two-dimensional array. The two-dimensional array can be a rectilinear array (e.g., a square array, a rectangular array). The multi-dimensional array can be a three-dimensional array, and the qubit devices can define rows, columns and layers of the three-dimensional array. The three-dimensional array can be a rectilinear array. Each of the qubit devices can be a charge qubit. Each of the qubit devices can be a transmon qubit. Each of the readout devices can be capacitively coupled to the single, respective qubit device. The quantum computing system can include device chips that each include one of the readout devices and the respective qubit device that the readout device is coupled to. The quantum computing system can include readout chips and separate qubit chips. Each readout chip can include one of the readout devices, and each qubit chip can include one of the qubit devices. The quantum computing system can include an electromagnetic waveguide system. The electromagnetic waveguide system can have an interior surface that defines an interior volume of intersecting waveguides. The qubit devices can be housed in the electromagnetic waveguide system. The intersecting waveguides can each define a cutoff frequency and be configured to evanesce electromagnetic waves below the cutoff frequency. The qubit operating frequency of each qubit device can be below the cutoff frequencies. The interior surface can define waveguide cross-sections, and the cutoff frequencies can be defined by the waveguide cross-sections.

In a general aspect of what is described above, a quantum computing method includes receiving qubit control signals in a multi-dimensional array of qubit devices. Each qubit device has a respective qubit operating frequency that is independent of an offset electromagnetic field experienced by the qubit device. The qubit control signal received by each qubit device is configured to manipulate a quantum state of the qubit device. The method includes producing qubit readout signals at readout devices associated with the multi-dimensional array of qubit devices. Each readout device is operably coupled to a single, respective qubit device. Each qubit readout signal is produced by one of the readout devices based on an electromagnetic interaction between the readout device and the respective qubit device.

Implementations of any of the general aspects described in this document may include one or more of the following features. The qubit devices can have respective qubit operating frequencies in a first frequency band, and the readout devices can have respective readout frequencies in a second, separate frequency band. The qubit devices can have respective qubit operating frequencies in a frequency band, and the readout devices can have respective readout frequencies that are interleaved between the qubit operating frequencies in the frequency band. Each qubit device can have two or more nearest-neighbor qubit devices in the multi-dimensional array, and the qubit operating frequency of each qubit device can be distinct from the respective qubit operating frequencies of each nearest-neighbor qubit device. Each readout device can have two or more nearest-neighbor readout devices, and a readout frequency of each readout device can be distinct from respective readout frequencies of each nearest-neighbor readout device. The quantum computing method can include receiving coupler control signals at coupler devices. The coupler devices can reside at intervals between neighboring pairs of the qubit devices in the multi-dimensional array. The coupler control signal received by each coupler device can be configured to produce an electromagnetic interaction between the neighboring pair of qubit devices that the coupler device resides between. The quantum computing method can include manipulating coupling strengths of the electromagnetic interactions produced by the respective coupler devices by controlling offset electromagnetic fields experienced by the respective coupler devices. Each qubit control signal can include a microwave pulse. Each qubit control signal can be configured to execute a single-qubit gate on a qubit device that receives the qubit control signal. The quantum computing method can include receiving readout control signals at the readout devices. Each readout control signal can be received by a respective readout device, and each qubit readout signal can be produced by a respective readout device in response to the readout control signal received by the respective readout device. The qubit readout signal produced by each readout device can be influenced by a quantum state of the qubit device that the readout device is operably coupled to. Each of the readout devices can be capacitively coupled to the single, respective qubit device.

In a general aspect of what is described above, a quantum computing system includes a quantum processor cell. The quantum processor cell includes a multi-dimensional array of qubit devices. The multi-dimensional array includes sub-arrays associated with separate frequency bands. The qubit devices in each sub-array have a qubit operating frequency within the frequency band associated with the sub-array. The quantum computing system includes a signal delivery system communicably coupled between the quantum processor cell and a control system. The signal delivery system is configured to transfer signals between the array of qubit devices and the control system.

Implementations of any of the general aspects described in this document may include one or more of the following features. The frequency bands can be spaced apart from each other by intervals along a frequency spectrum. At least one of the frequency bands can be spaced by a first interval from the nearest-neighbor frequency band in a first direction in the frequency spectrum, and the same frequency band can be spaced by a second, distinct interval from the nearest-neighbor frequency band in a second direction in the frequency spectrum. The frequency bands can be spaced apart from each other by intervals along a frequency spectrum, and the intervals between neighboring pairs of frequency bands can include a first subset of equal intervals and a second subset of equal intervals. The intervals in the first subset can be larger than the intervals in the second subset. The multi-dimensional array can include groups of the qubit devices. Each group can include one qubit device in each of the sub-arrays. The groups can collectively define a tiling over the multi-dimensional array. The multi-dimensional array can be a two-dimensional array, and the tiling can be a two-dimensional tiling. Each group can consist of six qubit devices, and the tiling can be a six-by-six tiling. Each group can consist of five qubit devices, and the tiling can be a five-by-five tiling. The control system can include one or more waveform generator systems configured to generate multiplexed control signals for each respective group of the qubit devices. The signal delivery system can include an input signal processing system that includes, for each group of qubit devices, an input channel, a de-multiplexer and output channels. The input channel can be configured to receive the multiplexed control signal for the group of qubit devices. The de-multiplexer can be configured to separate device control signals from the multiplexed control signal for the group of qubit devices. The output channels can be configured to communicate the respective device control signals into the quantum processor cell for the group of qubit devices. The signal delivery system can include an output signal processing system that includes, for each group of qubit devices, input channels, a multiplexer and an output channel. The input channels can be configured to receive qubit readout signals from a group of readout devices associated with the group of qubit devices. The multiplexer can be configured to generate a multiplexed readout signal by multiplexing the qubit readout signals. The output channel can be configured to communicate the multiplexed readout signal from the output signal processing system on a physical channel. The control system can include one or more data processors. The data processors can be operable to receive the multiplexed readout signal for each group of readout devices. The data processors can be operable to identify, from each multiplexed readout signal, qubit readout data for each qubit device in the group based on the readout frequency of the associated readout device. Each qubit device can have two or more nearest-neighbor qubit devices in the multi-dimensional array, and the qubit operating frequency of each qubit device can be distinct from the respective qubit operating frequencies of each nearest-neighbor qubit device. The quantum computing system can include readout devices associated with the multi-dimensional array of qubit devices. Each readout device can be operably coupled to a single, respective qubit device and configured to produce a qubit readout signal that indicates a state of the respective qubit device. The quantum computing system can include coupler devices residing at intervals between neighboring pairs of the qubit devices in the multi-dimensional array. Each coupler device can be configured to produce an electromagnetic interaction between the respective neighboring pair of qubit devices that the coupler device resides between. The electromagnetic interaction produced by each coupler device can have a coupling strength that varies with an offset electromagnetic field experienced by the coupler device. Each neighboring pair of qubit devices can include a first qubit device having a first qubit operating frequency and a second qubit device having a second, distinct qubit operating frequency. The multi-dimensional array can defines a first set of intervals along a first dimension of the array and a second set of intervals along a second dimension of the array. A first subset of the coupler devices can reside at the first set of intervals, and a second subset of the coupler devices can reside at the second set of intervals. Each of the qubit devices can be a charge qubit. Each of the qubit devices can be a transmon device. The quantum computing system can include an electromagnetic waveguide system. The electromagnetic waveguide system can have an interior surface that defines an interior volume of intersecting waveguides. The qubit devices can be housed in the electromagnetic waveguide system. The intersecting waveguides can each define a cutoff frequency and be configured to evanesce electromagnetic waves below the cutoff frequency. The qubit operating frequency of each qubit device can be below the cutoff frequencies. The interior surface can defines waveguide cross-sections, and the cutoff frequencies can be defined by the waveguide cross-sections.

In a general aspect of what is described above, a quantum computing method includes receiving qubit control signals at a quantum processor cell comprising a multi-dimensional array of qubit devices. The multi-dimensional array includes sub-arrays associated with separate frequency bands. The qubit devices in each sub-array have a qubit operating frequency within the frequency band associated with the sub-array. The qubit control signal received by each qubit device is configured to manipulate a quantum state of the qubit device. The quantum computing method includes communicating the qubit control signals to respective qubit devices in the quantum processor cell.

Implementations of any of the general aspects described in this document may include one or more of the following features. The frequency bands can be spaced apart from each other at intervals along a frequency spectrum. At least one of the frequency bands is spaced by a first interval from the nearest-neighbor frequency band in a first direction in the frequency spectrum, and is spaced by a second, distinct interval from the nearest-neighbor frequency band in a second direction in the frequency spectrum. The intervals between neighboring pairs of frequency bands can include a first subset of equal intervals and a second subset of equal intervals. The intervals in the first subset can be larger than the intervals in the second subset. The multi-dimensional array can include groups of the qubit devices. Each group includes one qubit device in each of the sub-arrays. The groups can collectively define a tiling over the multi-dimensional array. The multi-dimensional array can be a two-dimensional array, and the tiling can be a two-dimensional tiling. The quantum computing method can include, for each respective group of the qubit devices: generating qubit control information; generating a multiplexed control signal from the qubit control information; communicating the multiplexed control signal on a physical channel into an input signal processing system; separating qubit control signals from the multiplexed control signal by de-multiplexing the multiplexed control signal in the input signal processing system; and communicating the respective qubit control signals into the quantum processor cell. The quantum computing method can include, for each respective group of the qubit devices: producing qubit readout signals by operating a group of readout devices associated with the group of qubit devices; generating a multiplexed readout signal in an output signal processing system by multiplexing the qubit readout signals; communicating the multiplexed readout signal from the output signal processing system on a physical channel; receiving the multiplexed readout signal at a control system; and identifying, by operation of the control system, qubit readout data for each device in the group, the qubit readout data from each respective readout device identified from the multiplexed readout signal based on the readout frequency of the readout device. Each qubit device can have two or more nearest-neighbor qubit devices in the multi-dimensional array, and the qubit operating frequency of each qubit device can be distinct from the respective qubit operating frequencies of each nearest-neighbor qubit device. The quantum computing method can include producing qubit readout signals at readout devices associated with the multi-dimensional array of qubit devices. Each readout device can be operably coupled to a single, respective qubit device. Each qubit readout signal can be produced by one of the readout devices based on an electromagnetic interaction between the readout device and the respective qubit device. The quantum computing method can include receiving coupler control signals at coupler devices. The coupler devices can reside at intervals between neighboring pairs of the qubit devices in the multi-dimensional array. The coupler control signal received by each coupler device can be configured to produce an electromagnetic interaction between the neighboring pair of qubit devices that the coupler device resides between. The quantum computing method can include manipulating a coupling strength of the electromagnetic interactions produced by the respective coupler devices by controlling offset electromagnetic fields experienced by the respective coupler devices.

In a general aspect of what is described above, a quantum computing method includes generating quantum processor control information for a group of devices housed in a quantum processor cell. Each device in the group has a distinct operating frequency. A multiplexed control signal is generated based on the quantum processor control information. The multiplexed control signal is communicated on a physical channel into an input signal processing system. Device control signals are separated from the multiplexed control signal by de-multiplexing the multiplexed control signal in the input signal processing system. The respective device control signals are communicated into the quantum processor cell for the group of devices.

Implementations of any of the general aspects described in this document may include one or more of the following features. The quantum computing method can include communicating the multiplexed control signal from a first, higher temperature stage to a second, lower temperature stage, wherein the input signal processing system and the quantum processor cell operate in the second temperature stage. The first temperature stage can be a room temperature stage, and the second temperature stage can be a cryogenic temperature stage. The quantum computing method can include de-multiplexing the multiplexed control signal in a low-noise, cryogenic environment. The multiplexed control signal can be a microwave signal communicated by a microwave transmission line. The quantum computing method can include shielding the quantum processor cell against microwave and optical frequencies. The shielding can be performed by metallic, superconducting, or lossy material, or a combination thereof. The quantum processor control information can include control sequences for the respective devices in the group. Each device control signal can correspond to one of the control sequences. The control sequences can include digital information, and the device control signals can be analog information. The quantum computing method can include: receiving, at an output signal processing system, qubit readout signals from a group of readout devices housed in a quantum processor cell; generating a multiplexed readout signal in the output signal processing system by multiplexing the qubit readout signals; and communicating the multiplexed readout signal from the output signal processing system on a physical channel. The quantum computing method can include: generating multiplexed control information from the quantum processor control information; and generating a multiplexed control signal from the multiplexed control information. The quantum processor control information can include digital information generated by operation of one or more processors executing computer-readable instructions, and the multiplexed control signal can include an analog signal generated by a waveform generator. Communicating the respective device control signals into the quantum processor cell can include communicating each device control signal from the input signal processing system to a respective input interconnect signal line. Each of the input interconnect signal lines can extend from an exterior of the quantum processor cell to an interior of the quantum processor cell. The quantum computing method can include routing the device control signals to the respective devices within the quantum processor cell. The group of devices can be supported in the quantum processor cell by a signal board that includes signal lines. The device control signals can be routed to the respective devices by the signal lines. The group of devices can be a group of qubit devices. The quantum processor control information can include qubit control information for the group of qubit devices. The qubit control information can include qubit control sequences for the respective qubit devices in the group, and the qubit control sequence for each qubit device can be configured to execute a single-qubit operation on the qubit device. The group of devices can be a group of coupler devices. The quantum processor control information can include coupler control information for the group of coupler devices. The coupler control information can include coupler control sequences for the respective coupler devices in the group, and the coupler control sequence for each coupler device can be configured to execute a two-qubit operation on a pair of qubit devices that neighbor the coupler device. The group of devices can be a group of readout devices. The quantum processor control information can include readout control information for the group of readout devices. The readout control information can include readout control sequences for the respective readout devices in the group, and the readout control sequence for each readout device can be configured to execute a readout operation of a qubit device associated with the readout device. The group of devices can be a first group of devices that each have distinct operating frequencies in a frequency range, and the method can include: generating first quantum processor control information for the first group of devices; generating second, distinct quantum processor control information for a second group of devices housed in a quantum processor cell; generating a first multiplexed control signal based on the first quantum processor control information; generating a second, distinct multiplexed control signal based on the second quantum processor control information; communicating the first multiplexed control signal on a first physical channel into the input signal processing system; communicating the second multiplexed control signal on a second, distinct physical channel into the input signal processing system; separating a first set of device control signals from the first multiplexed control signal by de-multiplexing the first multiplexed control signal in the input signal processing system; separating a second, distinct set of device control signals from the second multiplexed control signal by de-multiplexing the second multiplexed control signal in the input signal processing system; communicating the first set of device control signals into the quantum processor cell for the first group of devices; and communicating the second set of device control signals into the quantum processor cell for the second group of devices. The quantum processor cell can include a multi-dimensional array of qubit devices. The multi-dimensional array can include sub-arrays associated with separate frequency bands. The qubit devices in each sub-array can have a qubit operating frequency within the frequency band associated with the sub-array. The group of devices can be a group of the qubit devices in the multi-dimensional array, and the group of qubit devices can include one qubit device in each of the sub-arrays. The multi-dimensional array includes multiple groups of qubit devices, and each group of qubit devices can include one qubit device in each of the sub-arrays.

In a general aspect of what is described above, a quantum computing system includes a control system and an input signal processing system. The control system includes one or more data processors and a waveform generator. The input signal processing system includes an input channel, a de-multiplexer and output channels.

Implementations of any of the general aspects described in this document may include one or more of the following features. The one or more data processors are configured to generate quantum processor control information for a group of qubit devices housed in a quantum processor cell. Each device in the group has a distinct operating frequency. The waveform generator is configured to generate a multiplexed control signal from the quantum processor control information. The waveform generator can be an arbitrary waveform generator configured to convert digital signals to analog signals. The input channel is configured to receive the multiplexed control signal. The de-multiplexer is configured to separate device control signals from the multiplexed control signal. The output channels are configured to communicate the respective device control signals into the quantum processor cell for the group of devices. The control system can be configured to operate at a first, higher temperature stage, and the input signal processing system and the quantum processor cell can be configured to operate at a second, lower temperature stage. The first temperature stage can be a room temperature stage, and the second temperature stage can be a cryogenic temperature stage. The input signal processing system can be configured to process device control signals in a low-noise, cryogenic environment. The quantum computing system can include magnetic shielding material about the quantum processor cell and the input signal processing system. The multiplexed control signal can be a microwave signal, and the quantum computing system can include a microwave transmission line configured to communicate the multiplexed control signal. The quantum processor control information can include control sequences for the respective devices in the group, and each device control signal can corresponds to one of the control sequences. The control system can be configured to generate digital information that defines the control sequences, and the waveform generator can be configured to generate analog information that defines the multiplexed control signal. The input signal processing system can include a board that supports processing cards. The processing cards can be supported in receptacle slots defined in the board. The input signal processing system can include multiple input processing domains. Each input processing domain can include a respective subset of the processing cards. At least one of the processing cards in each input processing can be interchangeable with a corresponding processing card in another input processing domain. The quantum computing system can include an output signal processing system that includes: input channels configured to receive qubit readout signals from the group of devices; a multiplexer configured to generate a multiplexed readout signal by multiplexing the qubit readout signals; and an output channel configured to communicate the multiplexed readout signal from the output signal processing system. The quantum computing system can include an input interconnect system that includes input interconnect signal lines extending from an exterior of the quantum processor cell to an interior of the quantum processor cell. The input interconnect signal lines can be configured to communicate the device control signals between the output channels and the respective devices. The input interconnect system can include plateau structures that support at least a portion of the input interconnect signal lines inside the quantum processor cell. The quantum computing system can include a signal board that supports the devices in the quantum processor cell and includes signal lines. The signal lines can be configured to route the device control signals within the quantum processor cell to the respective devices. The group of devices can be a group of qubit devices. The quantum processor control information can include qubit control information for the group of qubit devices. The group of devices can be a group of coupler devices. The quantum processor control information can include coupler control information for the group of coupler devices. The group of devices can be a group of readout devices. The quantum processor control information can include readout control information for the group of readout devices. The quantum processor cell can include a multi-dimensional array of qubit devices. The multi-dimensional array can include sub-arrays associated with separate frequency bands. The qubit devices in each sub-array can have a qubit operating frequency within the frequency band associated with the sub-array. The group of devices can include a group of the qubit devices in the multi-dimensional array. The group of qubit devices can include one qubit device in each of the sub-arrays. The multi-dimensional array can include multiple groups of qubit devices. Each group of qubit devices can include one qubit device in each of the sub-arrays.

In a general aspect of what is described above, a quantum computing method includes receiving, at an output signal processing system, qubit readout signals from a group of readout devices housed in a quantum processor cell. A multiplexed readout signal is generated in the output signal processing system by multiplexing the qubit readout signals. The multiplexed readout signal is communicated from the output signal processing system on a physical channel. The multiplexed readout signal is received at a control system. Qubit readout data are identified, by operation of the control system, from each readout device. The qubit readout data for each respective readout device are identified from the multiplexed readout signal based on the distinct readout frequency of the readout device. Based on qubit readout data, multiplexed quantum processor control information is generated for the quantum processor cell.

Implementations of any of the general aspects described in this document may include one or more of the following features. The quantum computing method can include communicating the multiplexed readout signal from a first, lower temperature stage to a second, higher temperature stage. The output signal processing system and the quantum processor cell can operate in the first temperature stage, and the control system can operate in the second temperature stage. The first temperature stage can be a cryogenic temperature stage, and the second temperature stage can be a room temperature stage. The quantum computing method can include multiplexing the qubit readout signals in a low-noise, cryogenic environment. The quantum computing method can include shielding the quantum processor cell against microwave and optical frequencies. The shielding is performed by a metallic, superconducting, or lossy material, or a combination thereof. The quantum computing method can include: generating an analog multiplexed readout signal in the output signal processing system by multiplexing the qubit readout signals; communicating the analog multiplexed readout signal from the output signal processing system on a physical channel; generating a digital multiplexed readout signal by digitizing the analog multiplexed readout signal; and identifying, by operation of the control system, the qubit readout data from the digitized multiplexed readout signal. The qubit readout data for each respective device can correspond to the qubit readout signal from the device. The qubit readout data can include digital information, and the qubit readout signals can include analog information. The quantum computing method can include: generating a multiplexed control signal based on the multiplexed quantum processor control information; communicating the multiplexed control signal on a physical channel into an input signal processing system; separating device control signals from the multiplexed control signal by de-multiplexing the multiplexed control signal in the input signal processing system; and communicating the respective device control signals into the quantum processor cell for the group of devices. The qubit readout data can include digital information, and the multiplexed readout signal can include analog information. The quantum computing method can include communicating the qubit readout signals from the respective devices to the output signal processing system. Each qubit readout signal can be communicated to the output signal processing system by a respective output interconnect signal line. Each of the output interconnect signal lines can extends from an interior of the quantum processor cell to an exterior of the quantum processor cell. The quantum computing method can include routing the qubit readout signals from the devices to the output interconnect signal lines within the quantum processor cell. The group of devices can be supported in the quantum processor cell by a signal board that includes the signal lines. The qubit readout signals can be routed from the respective devices by the signal lines. The quantum computing method can include obtaining the qubit readout signals by operation of the readout devices in the quantum processor cell. Each of the readout devices can be operatively coupled to a respective qubit device in the quantum processor cell. The quantum processor control information can include coupler control information for a group of coupler devices in the quantum processor cell. The coupler control information can include coupler control sequences for the respective coupler devices in the group, and the coupler control sequence for each coupler device can be configured to execute a two-qubit operation on a pair of qubit devices that neighbor the coupler device. The quantum processor cell can house a group of qubit devices. Each of the readout devices can be operably coupled to a single, respective one of the qubit devices. The qubit readout signal produced by each readout device can indicates a state of the qubit device to which the readout device is operably coupled. The group of readout devices can include a first group of readout devices that each have distinct operating frequencies in a frequency range. The quantum computing method can include: receiving, at the output signal processing system, first qubit readout signals from the first group of readout devices; receiving, at the output signal processing system, second, distinct qubit readout signals from a second, distinct group of readout devices housed in the quantum processor cell, the second group each having distinct operating frequencies in the frequency range; generating a first multiplexed readout signal in the output signal processing system by multiplexing the first qubit readout signals; generating a second, distinct multiplexed readout signal in the output signal processing system by multiplexing the second qubit readout signals; communicating the first multiplexed readout signal from the output signal processing system on a first physical channel; communicating the second multiplexed readout signal from the output signal processing system on a second, distinct physical channel; receiving the first and second multiplexed readout signals at the control system; identifying, by operation of the control system, qubit readout data from each readout device in the first and second groups, the qubit readout data for each respective readout device identified from the first and second multiplexed readout signals based on the distinct readout frequency of the readout device; and based on qubit readout data, preparing the multiplexed quantum processor control information for the quantum processor cell. The quantum processor cell can include a multi-dimensional array of qubit devices. The multi-dimensional array can include sub-arrays associated with separate frequency bands. The qubit devices in each sub-array can have a qubit operating frequency within the frequency band associated with the sub-array. The qubit readout signals can be associated with a group of the qubit devices in the multi-dimensional array, and the group of qubit devices can include one qubit device in each of the sub-arrays.

In a general aspect of what is described above, a quantum computing system includes an output signal processing system and a control system. The output signal processing system includes input channels, a multiplexer and an output channel. The control system includes one or more data processors.

Implementations of any of the general aspects described in this document may include one or more of the following features. The input channels are configured to receive qubit readout signals from a group of readout devices housed in a quantum processor cell. Each readout device in the group has a distinct readout frequency. The multiplexer is configured to generate a multiplexed readout signal by multiplexing the qubit readout signals. The output channel is configured to communicate the multiplexed readout signal from the output signal processing system. The one or more data processors are operable to receive the multiplexed readout signal. The one or more data processors are operable to identify, from the multiplexed readout signal, qubit readout data for each qubit device in the group based on the distinct readout frequency of the readout device The one or more data processors are operable to prepare multiplexed quantum processor control information for the quantum processor cell based on the qubit readout data. The control system can be configured to operate at a first, higher temperature stage. The output signal processing system and the quantum processor cell can be configured to operate at a second, lower temperature stage. The first temperature stage can be a room temperature stage, and the second temperature stage can be a cryogenic temperature stage. The output signal processing system can be configured to process device control signals in a low-noise, cryogenic environment. The quantum computing system can include magnetic shielding material about the quantum processor cell and the output signal processing system. The qubit readout data for each respective device can corresponds to the qubit readout signal from the device. The output signal processing system can include a board that supports processing cards. The processing cards can be supported in receptacle slots defined in the board. The output signal processing system can include multiple output processing domains. Each output processing domain can include a respective subset of the processing cards. At least one of the processing cards in each output processing domain can be interchangeable with a corresponding processing card in another output processing domain. The quantum computing system can include a waveform generator configured to generate a multiplexed control signal from the multiplexed quantum processor control information and an input signal processing system. The input signal processing system can include: an input channel configured to receive the multiplexed control signal; a de-multiplexer configured to separate device control signals from the multiplexed control signal; and output channels configured to communicate the respective device control signals into the quantum processor cell. The quantum computing system can include an output interconnect system that includes output interconnect signal lines extending from an interior of the quantum processor cell to an exterior of the quantum processor cell. The output interconnect signal lines can be configured to communicate the qubit readout signals between the readout devices and the respective input channels of the output signal processing system. The output interconnect system can include plateau structures that support at least a portion of the output interconnect signal lines inside the quantum processor cell. The quantum computing system can include a signal board that supports the devices in the quantum processor cell and includes signal lines. The signal lines can be configured to route the qubit signals within the quantum processor cell from the respective readout devices. The quantum computing system can include the quantum processor cell and a group of qubit devices housed in the quantum processor cell. Each qubit device can have a respective qubit operating frequency. Each of the readout devices can be operably coupled to a single, respective one of the qubit devices. The qubit readout signal produced by each readout device can indicate a state of the qubit device to which the readout device is operably coupled. The quantum processor cell can include a multi-dimensional array of qubit devices. The multi-dimensional array can include sub-arrays associated with separate frequency bands. The qubit devices in each sub-array can have a qubit operating frequency within the frequency band associated with the sub-array. The qubit readout signals can be associated with a group of the qubit devices in the multi-dimensional array. The group of qubit devices can includes one qubit device in each of the sub-arrays. The output signal processing system can include filters, circulators and quantum amplifiers configured to process the qubit readout signals.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

The invention claimed is:

1. A quantum computing system comprising:
a quantum processor cell comprising a multi-dimensional array of qubit devices, the multi-dimensional array comprising sub-arrays associated with separate frequency bands, the qubit devices in each sub-array having a qubit operating frequency within the frequency band associated with the sub-array; and
a signal delivery system communicably coupled between the quantum processor cell and a control system, the signal delivery system configured to transfer signals between the array of qubit devices and the control system.

2. The quantum computing system of claim 1, wherein:
the frequency bands are spaced apart from each other by intervals along a frequency spectrum, and
at least one of the frequency bands is spaced by a first interval from the nearest-neighbor frequency band in a first direction in the frequency spectrum, and is spaced by a second, distinct interval from the nearest-neighbor frequency band in a second direction in the frequency spectrum.

3. The quantum computing system of claim 1, wherein:
the frequency bands are spaced apart from each other by intervals along a frequency spectrum, and
the intervals between neighboring pairs of frequency bands include a first subset of equal intervals and a second subset of equal intervals, the intervals in the first subset being larger than the intervals in the second subset.

4. The quantum computing system of claim 1, wherein the multi-dimensional array includes groups of the qubit devices, each group includes one qubit device in each of the sub-arrays, the groups collectively define a tiling over the multi-dimensional array.

5. The quantum computing system of claim 1, a wherein the multi-dimensional array includes groups of the qubit devices, each group includes one qubit device in each of the sub-arrays, and the control system comprises one or more waveform generator systems configured to generate multiplexed control signals for each respective group of the qubit devices.

6. The quantum computing system of claim 5, wherein the signal delivery system comprises an input signal processing system that includes, for each group of qubit devices:
an input channel configured to receive the multiplexed control signal for the group of qubit devices;
a de-multiplexer configured to separate device control signals from the multiplexed control signal for the group of qubit devices; and output channels configured to communicate the respective device control signals into the quantum processor cell for the group of qubit devices.

7. The quantum computing system of claim 6, wherein the signal delivery system comprises an output signal processing system that includes, for each group of qubit devices:
input channels configured to receive qubit readout signals from a group of readout devices associated with the group of qubit devices;
a multiplexer configured to generate a multiplexed readout signal by multiplexing the qubit readout signals; and
an output channel configured to communicate the multiplexed readout signal from the output signal processing system on a physical channel.

8. The quantum computing system of claim 7, wherein the control system comprises one or more data processors operable to:
receive the multiplexed readout signal for each group of readout devices; and
identify, from each multiplexed readout signal, qubit readout data for each qubit device in the group based on the readout frequency of the associated readout device.

9. The quantum computing system of claim 1, a wherein each qubit device has two or more nearest-neighbor qubit devices in the multi-dimensional array, and the qubit operating frequency of each qubit device is distinct from the respective qubit operating frequencies of each nearest-neighbor qubit device.

10. The quantum computing system of claim 1, comprising readout devices associated with the multi-dimensional array of qubit devices, each readout device operably coupled to a single, respective qubit device and configured to produce a qubit readout signal that indicates a state of the respective qubit device.

11. The quantum computing system of claim 1, comprising coupler devices residing at intervals between neighboring pairs of the qubit devices in the multi-dimensional array, each coupler device being configured to produce an electromagnetic interaction between the respective neighboring pair of qubit devices that the coupler device resides between.

12. The quantum computing system of claim 11, wherein the electromagnetic interaction produced by each coupler device has a coupling strength that varies with an offset electromagnetic field experienced by the coupler device.

13. The quantum computing system of claim 11, wherein each neighboring pair of qubit devices comprises a first qubit device having a first qubit operating frequency and a second qubit device having a second, distinct qubit operating frequency.

14. The quantum computing system of claim 11, wherein the multi-dimensional array defines a first set of intervals along a first dimension of the array and a second set of intervals along a second dimension of the array, a first subset of the coupler devices reside at the first set of intervals, and a second subset of the coupler devices reside at the second set of intervals.

15. The quantum computing system of claim 1, comprising an electromagnetic waveguide system, the electromagnetic waveguide system comprising an interior surface that defines an interior volume of intersecting waveguides, wherein the qubit devices are housed in the electromagnetic waveguide system.

16. The quantum computing system of claim 15, wherein the intersecting waveguides each define a cutoff frequency and is configured to evanesce electromagnetic waves below the cutoff frequency, and the qubit operating frequency of each qubit device is below the cutoff frequencies.

17. The quantum computing system of claim 16, wherein the interior surface defines waveguide cross-sections, and the cutoff frequencies are defined by the waveguide cross-sections.

18. A quantum computing method comprising:
receiving qubit control signals at a quantum processor cell comprising a multi-dimensional array of qubit devices, the multi-dimensional array comprising sub-arrays associated with separate frequency bands, the qubit devices in each sub-array having a qubit operating frequency within the frequency band associated with the sub-array, the qubit control signal received by each qubit device being configured to manipulate a quantum state of the qubit device; and
communicating the qubit control signals to respective qubit devices in the quantum processor cell.

19. The quantum computing method of claim 18, wherein:
the frequency bands are spaced apart from each other at intervals along a frequency spectrum, and
at least one of the frequency bands is spaced by a first interval from the nearest-neighbor frequency band in a first direction in the frequency spectrum, and is spaced by a second, distinct interval from the nearest-neighbor frequency band in a second direction in the frequency spectrum.

20. The quantum computing method of claim 18, wherein:
the frequency bands are spaced apart from each other at intervals along a frequency spectrum, and
the intervals between neighboring pairs of frequency bands include a first subset of equal intervals and a second subset of equal intervals, the intervals in the first subset being larger than the intervals in the second subset.

21. The quantum computing method of claim 18, wherein the multi-dimensional array includes groups of the qubit devices, each group includes one qubit device in each of the sub-arrays, and the groups collectively define a tiling over the multi-dimensional array.

22. The quantum computing method of claim 21, wherein the multi-dimensional array comprises a two-dimensional array, and the tiling comprises a two-dimensional tiling.

23. The quantum computing method of claim 18, wherein the multi-dimensional array includes groups of the qubit devices, each group includes one qubit device in each of the sub-arrays, and the method comprises, for each respective group of the qubit devices:
generating qubit control information;
generating a multiplexed control signal from the qubit control information;
communicating the multiplexed control signal on a physical channel into an input signal processing system;
separating qubit control signals from the multiplexed control signal by de-multiplexing the multiplexed control signal in the input signal processing system; and
communicating the respective qubit control signals into the quantum processor cell.

24. The quantum computing method of claim 18, wherein the multi-dimensional array includes groups of the qubit devices, each group includes one qubit device in each of the sub-arrays, and the method comprises, for each respective group of the qubit devices:
producing qubit readout signals by operating a group of readout devices associated with the group of qubit devices, the group of readout devices having respective readout frequencies;

generating a multiplexed readout signal in an output signal processing system by multiplexing the qubit readout signals;

communicating the multiplexed readout signal from the output signal processing system on a physical channel;

receiving the multiplexed readout signal at a control system; and identifying, by operation of the control system, qubit readout data for each device in the group, the qubit readout data from each respective readout device identified from the multiplexed readout signal based on the readout frequency of the readout device.

25. The quantum computing method of claim 18, wherein each qubit device has two or more nearest-neighbor qubit devices in the multi-dimensional array, and the qubit operating frequency of each qubit device is distinct from the respective qubit operating frequencies of each nearest-neighbor qubit device.

26. The quantum computing method of claim 18, comprising producing qubit readout signals at readout devices associated with the multi-dimensional array of qubit devices, each readout device operably coupled to a single, respective qubit device, each qubit readout signal produced by one of the readout devices based on an electromagnetic interaction between the readout device and the respective qubit device.

27. The quantum computing method of claim 18, comprising receiving coupler control signals at coupler devices, the coupler devices residing at intervals between neighboring pairs of the qubit devices in the multi-dimensional array, the coupler control signal received by each coupler device being configured to produce an electromagnetic interaction between the neighboring pair of qubit devices that the coupler device resides between.

28. The quantum computing method of claim 27, comprising manipulating a coupling strength of the electromagnetic interactions produced by the respective coupler devices by controlling offset electromagnetic fields experienced by the respective coupler devices.

* * * * *

UNITED STATES PATENT AND TRADEMARK OFFICE
CERTIFICATE OF CORRECTION

PATENT NO. : 10,748,082 B2
APPLICATION NO. : 15/874326
DATED : August 18, 2020
INVENTOR(S) : Rigetti et al.

Page 1 of 1

It is certified that error appears in the above-identified patent and that said Letters Patent is hereby corrected as shown below:

In the Specification

Column 26, Line 53, delete "f c" and insert -- f' c -- therefor.

Column 26, Line 55, delete "fc≠fc)." and insert -- fc≠f' c -- therefor.

Column 89, Line 22, delete "$A_n$" and insert -- An -- therefor.

In the Claims

Column 104, Line 53, Claim 5, before "wherein", delete "a".

Column 105, Line 25, Claim 9, before "wherein", delete "a".

Signed and Sealed this
Third Day of November, 2020

Andrei Iancu
*Director of the United States Patent and Trademark Office*